US012589850B2

(12) United States Patent
Moffat et al.

(10) Patent No.: US 12,589,850 B2
(45) **Date of Patent: *Mar. 31, 2026**

(54) WAVE-POWERED PROPULSION SHROUD

(71) Applicant: Lone Gull Holdings, Ltd., Portland, OR (US)

(72) Inventors: Brian Lee Moffat, Portland, OR (US); Garth Alexander Sheldon-Coulson, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,861

(22) Filed: Oct. 8, 2024

(65) Prior Publication Data

US 2025/0121922 A1 Apr. 17, 2025

Related U.S. Application Data

(60) Provisional application No. 63/548,525, filed on Nov. 14, 2023, provisional application No. 63/545,913, filed on Oct. 26, 2023, provisional application No. 63/544,192, filed on Oct. 15, 2023.

(51) Int. Cl.
*B63H 19/02* (2006.01)
*F03B 13/22* (2006.01)

(52) U.S. Cl.
CPC ............. *B63H 19/02* (2013.01); *F03B 13/22* (2013.01)

(58) Field of Classification Search
CPC ................................ B63H 19/02; F03B 13/22
See application file for complete search history.

(56) References Cited

U.S. PATENT DOCUMENTS

2010/0207393 A1 8/2010 Roberts
2010/0287927 A1 11/2010 Moore
2013/0236314 A1 9/2013 Feiler
2014/0284925 A1 9/2014 Ross
2016/0327013 A1* 11/2016 Koivusaari .......... H02K 7/1876
2018/0073482 A1 3/2018 Sheldon-Coulson et al.
2019/0353139 A1* 11/2019 Sheldon-Coulson ........................ H02K 7/1823
2020/0056578 A1* 2/2020 Sheldon-Coulson ... B63B 1/048
2022/0136481 A1* 5/2022 Moffat .................. F03B 13/142
2023/0078347 A1 3/2023 Sheldon-Coulson et al.

FOREIGN PATENT DOCUMENTS

EP 3343021 A1 4/2018
KR 1020150017475 A 2/2015

OTHER PUBLICATIONS

International Search Report and Written Opinion from PCT/US2024/050595 dated Jan. 24, 2025, 12 pgs.

(Continued)

*Primary Examiner* — Viet P Nguyen
(74) *Attorney, Agent, or Firm* — Schwabe, Williamson & Wyatt, P.C.

(57) ABSTRACT

Disclosed are embodiments of a novel type of wave-powered propulsion adapted for use by buoyant vessels in order to provide or supplement their self-propulsion. An approximately vertical and semi-cylindrical propulsive shroud attached to a vessel interacts with a wave motion at and below the vessel in order to impart a thrust to the vessel.

19 Claims, 114 Drawing Sheets

(56) References Cited

OTHER PUBLICATIONS

Non-final Office Action from U.S. Appl. No. 18/909,864, dated Feb. 6, 2025, 11 pgs.
International Search Report and Written Opinion from PCT/US2024/050596 dated Feb. 12, 2025, 16 pgs.
Final Office Action from U.S. Appl. No. 18/909,864 dated May 20, 2025, 16 pgs.

* cited by examiner

WAVE-POWERED PROPULSION SHROUD

CROSS-REFERENCE TO RELATED APPLICATIONS

This application claims the benefit of U.S. Provisional Application No. 63/544,192, filed on Oct. 15, 2023, the entire contents of which are hereby incorporated by reference herein.

This application claims the benefit of U.S. Provisional Application No. 63/545,913, filed on Oct. 26, 2023, the entire contents of which are hereby incorporated by reference herein.

This application claims the benefit of U.S. Provisional Application No. 63/548,525, filed on Nov. 14, 2023, the entire contents of which are hereby incorporated by reference herein.

BACKGROUND

Waves traveling across the surface of the sea are typically manifestations of significant energy and/or power which move respective particles of water in the circular orbits characteristic of those waves. And propulsion of vessels across a surface of a body of water is typically an energy-intensive process. Many vessels operating in the seas consume large quantities of energy, often through a burning of fossil fuels, in order to produce amounts of power sufficient to propel those vessels through their respective bodies of water.

A method, technology, and/or mechanism, capable of efficiently capturing and redirecting the power within water waves in order to propel a vessel across a surface of a body of water would reduce and/or eliminate the need to consume chemical fuels, especially fossil fuels, in order to achieve vessel propulsion.

SUMMARY OF THE DISCLOSURE

Disclosed herein are embodiments of a type of water-wave propulsion mechanism and/or technology that obstructs and/or redirects wave motion in a manner that results in a forward thrust and propulsion of a buoyant vessel. A shroud having a nominally vertical plane of symmetry, and/or a nominally vertical longitudinal axis of approximate radial symmetry, obstructs the motion of a wave impinging upon the shroud, thereby causing a portion of the power of that wave to be redirected into a forward thrust and a resulting forward propulsive force.

SCOPE OF THE DISCLOSURE

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modern, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

The scope of this disclosure includes embodiments possessing, incorporating, including, and/or utilizing, any number of propulsive shrouds, and propulsive shrouds of any and all shapes, sizes, surface areas, widths, heights, curvatures, diameters, drafts, and tapers. The scope of this disclosure includes embodiments possessing, incorporating, including, and/or utilizing, propulsive shrouds made of any and all materials. The scope of this disclosure includes propulsive shrouds that are semi-cylindrical and incorporate no bends, distortions, and/or non-cylindrical portions. The scope of this disclosure includes propulsive shrouds that are non-cylindrical and include curvatures and/or bends along their lengths. The scope of this disclosure includes propulsive shrouds that constitute continuous, unbroken, surfaces. The scope of this disclosure includes propulsive shrouds that include, incorporate, and/or comprise, surfaces that include holes, gaps, deformations, bends, and/or other irregularities.

The scope of this disclosure includes embodiments possessing, incorporating, including, and/or utilizing, wave-motion energized power take offs, including, but not limited to: fluid and/or hydrokinetic turbines of any and all types, any and all diameters, any and all efficiencies, any and all power ratings, and made of any and all materials; magnetohydrodynamic generators of any and all types, any and all diameters, any and all efficiencies, any and all power ratings, and made of any and all materials; hydraulic pumps, accumulators, and/or generators, of any and all types, any and all diameters, any and all efficiencies, any and all power ratings, and made of any and all materials; pendulum mechanisms, and/or mechanisms possessing, incorporating, including, and/or utilizing, unbalanced and/or off-axis weights, of any and all types, any and all diameters, any and all efficiencies, any and all power ratings, and made of any and all materials; electrical generators and/or alternators of any and all types, any and all diameters, any and all efficiencies, any and all power ratings, and made of any and all materials; and/or energy conversion mechanisms, systems, and/or apparatuses, of any and all types, any and all diameters, any and all efficiencies, any and all power ratings, and made of any and all materials.

The scope of this disclosure includes embodiments possessing, incorporating, including, and/or utilizing, any number of fluid chambers, and fluid chambers of any design, size, shape, volume, relative and/or absolute position within an embodiment. The scope of this disclosure includes embodiments possessing, incorporating, including, and/or utilizing, fluid chambers made of any and all materials.

The scope of this disclosure includes embodiments possessing, incorporating, including, and/or utilizing, any number of fluid channels, and fluid channels of any design, size, shape, volume, relative and/or absolute position within an embodiment. The scope of this disclosure includes embodiments possessing, incorporating, including, and/or utilizing, fluid channels made of any and all materials.

A portion of many embodiments of the present disclosure include, incorporate, and/or utilize, at least one buoyant portion, buoy, vessel, and/or module. These buoyant portions may be referred to as hollow flotation modules, buoys, buoyant capsules, buoyant chambers, buoyant compartments, buoyant enclosures, buoyant vessels, hollow balls, and/or hollow spheroids. Many terms, names, descriptors, and/or labels, could adequately distinguish an embodiment's buoyant portion from among its other components, features, and/or elements, and the scope of the present disclosure incorporates any naming convention and/or choice, and is not limited by the nomenclature used to describe an embodiment or its parts.

BRIEF DESCRIPTION OF THE DRAWINGS

FIG. 120 is a top-down view of the seventeenth embodiment of the present invention;

FIG. 121 is a bottom-up view of the seventeenth embodiment of the present invention;

FIG. 122 is a perspective side view of a eighteenth embodiment of the present invention;

FIG. 123 is a side view of the eighteenth embodiment of the present invention;

FIG. 124 is a side view of the eighteenth embodiment of the present invention;

FIG. 125 is a side view of the eighteenth embodiment of the present invention;

FIG. 126 is a side view of the eighteenth embodiment of the present invention;

FIG. 127 is a top-down view of the eighteenth embodiment of the present invention;

FIG. 128 is a bottom-up view of the eighteenth embodiment of the present invention;

FIG. 129 is a perspective side view of a nineteenth embodiment of the present invention;

FIG. 130 is a side view of the nineteenth embodiment of the present invention;

FIG. 131 is a side view of the nineteenth embodiment of the present invention;

Figure 132:
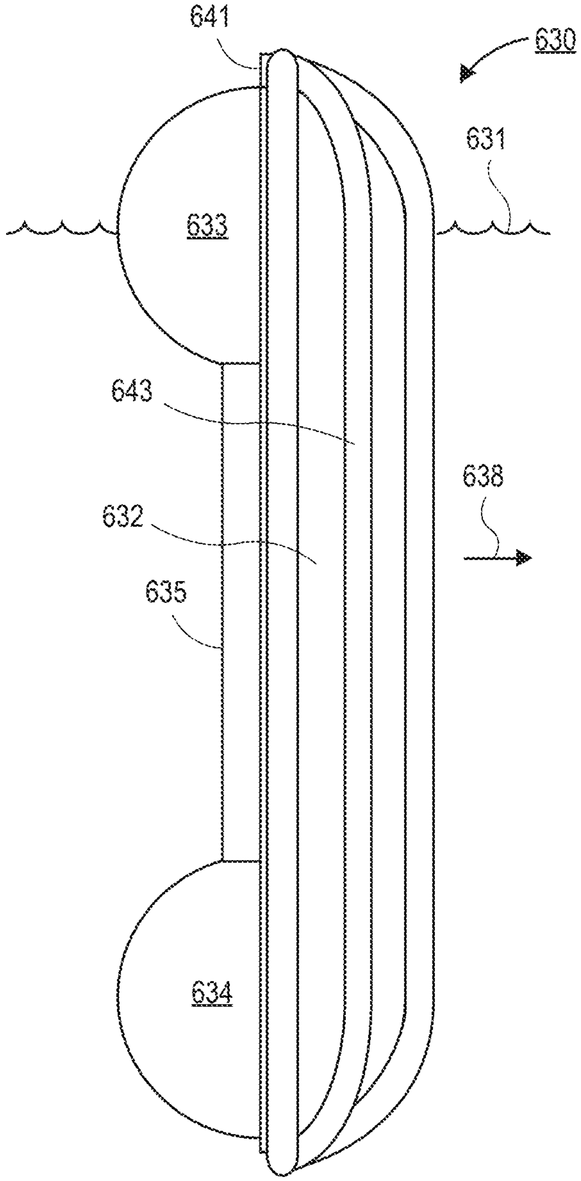
Figure 133:
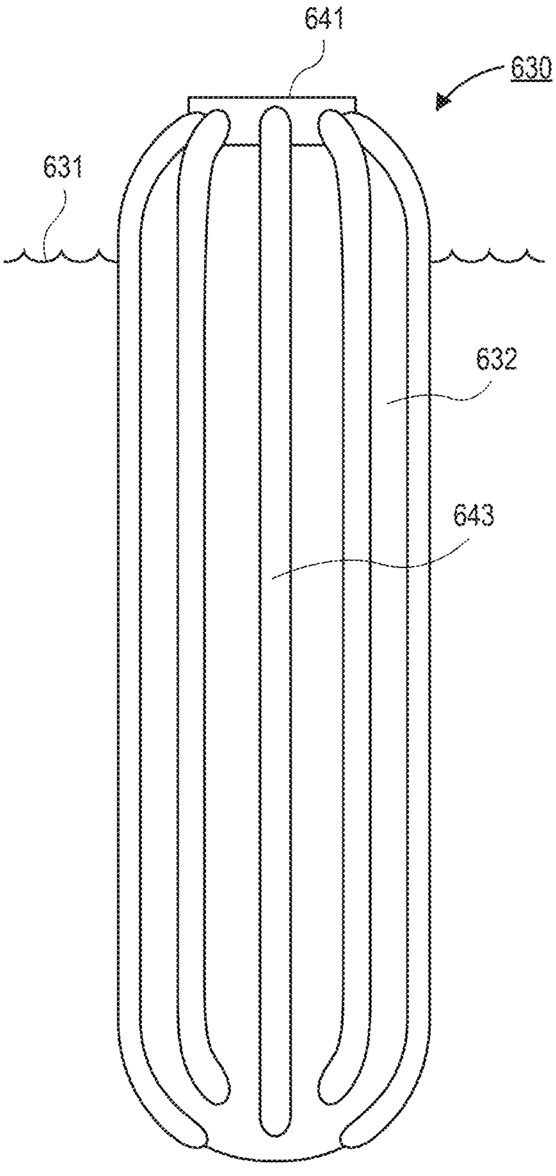
Figure 134:
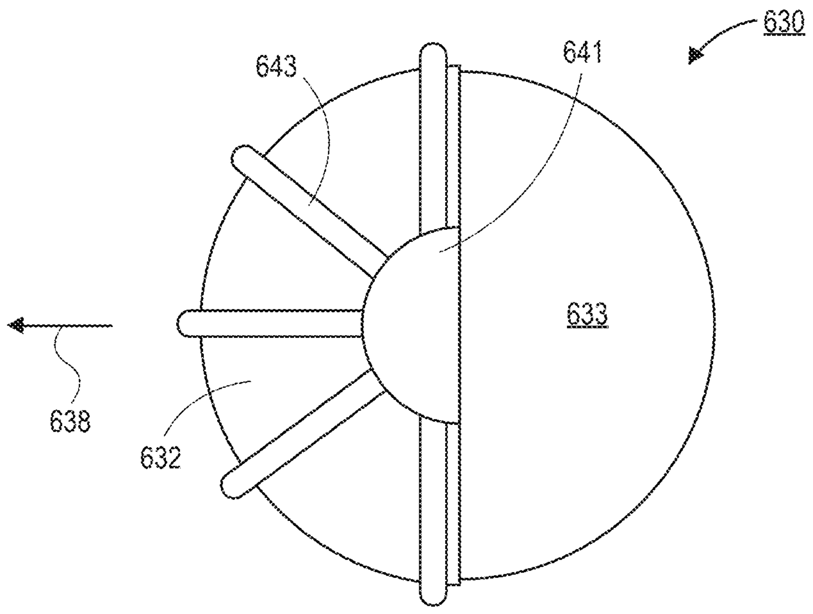
Figure 135:
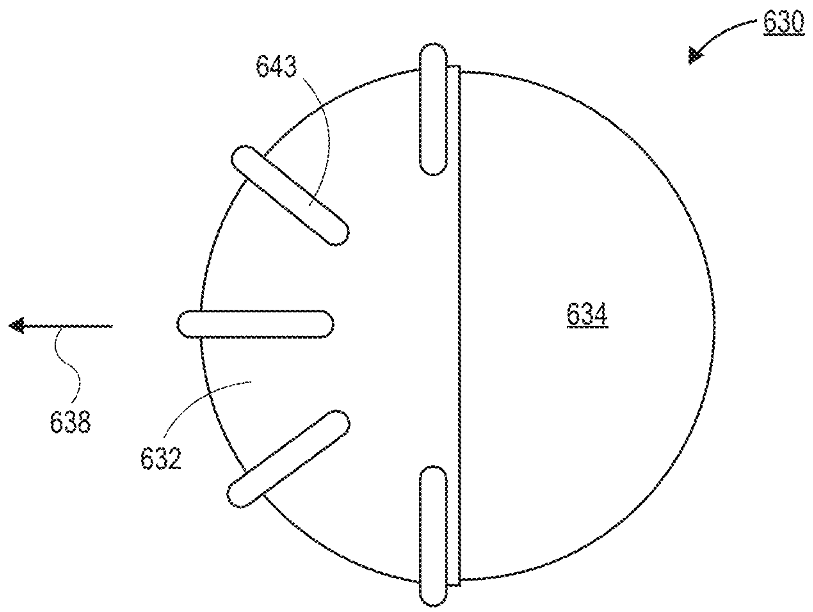
Figure 136:
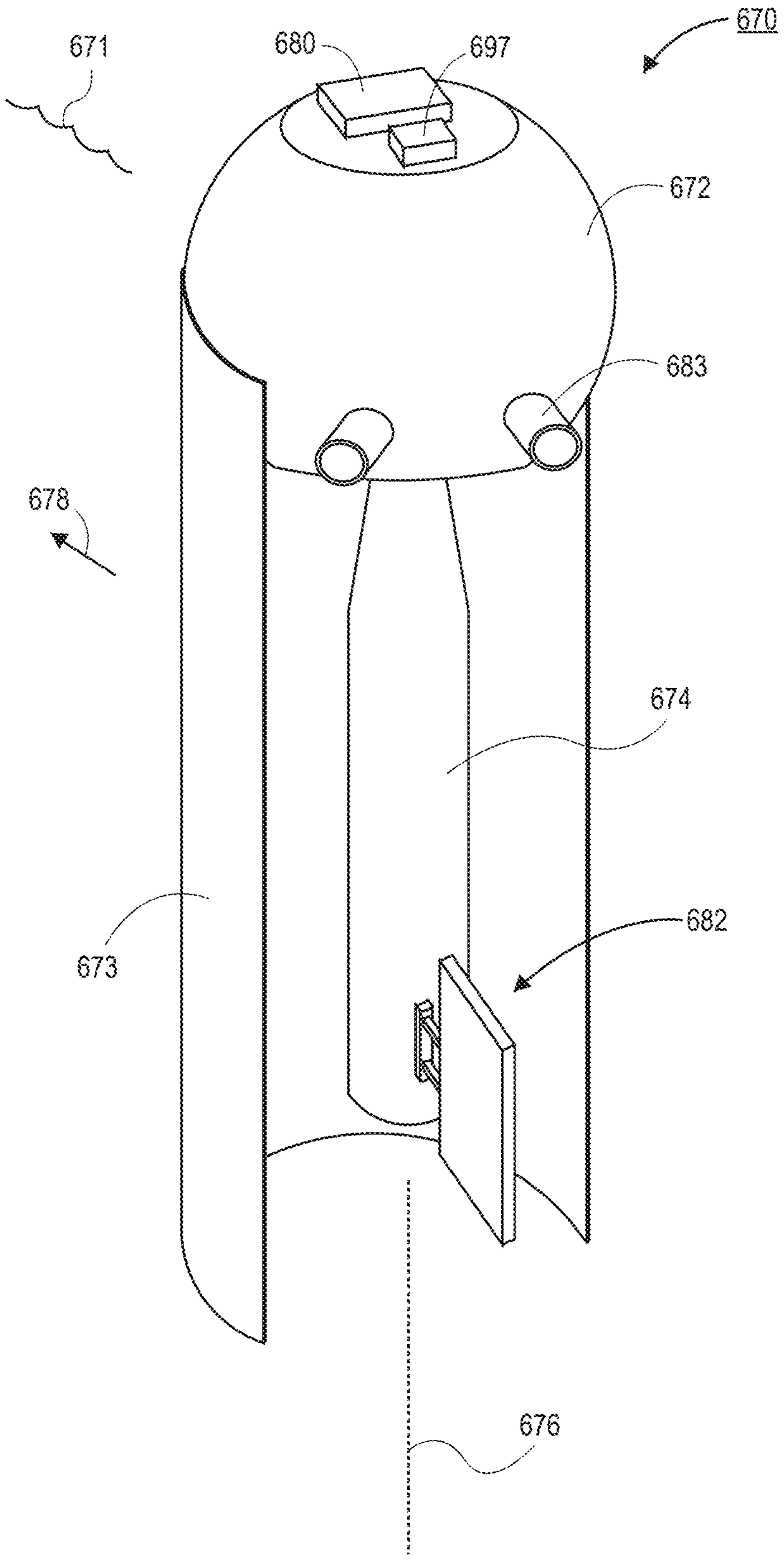
Figure 138:
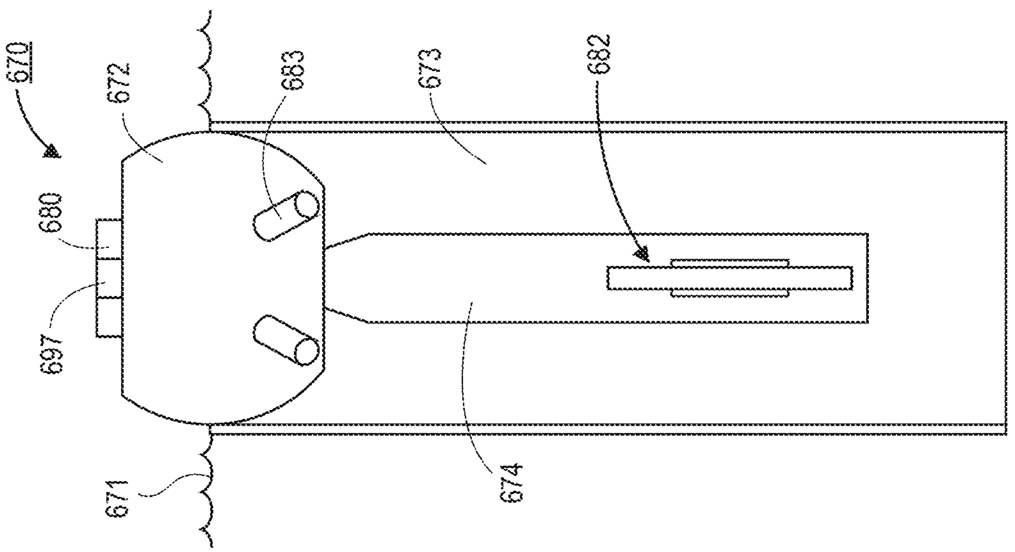
Figure 137:
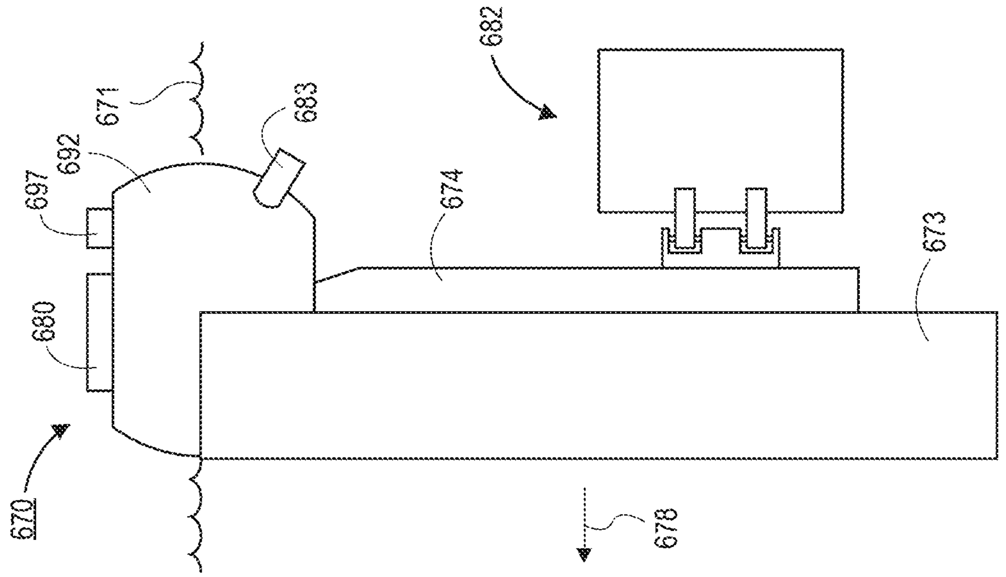
Figure 140:
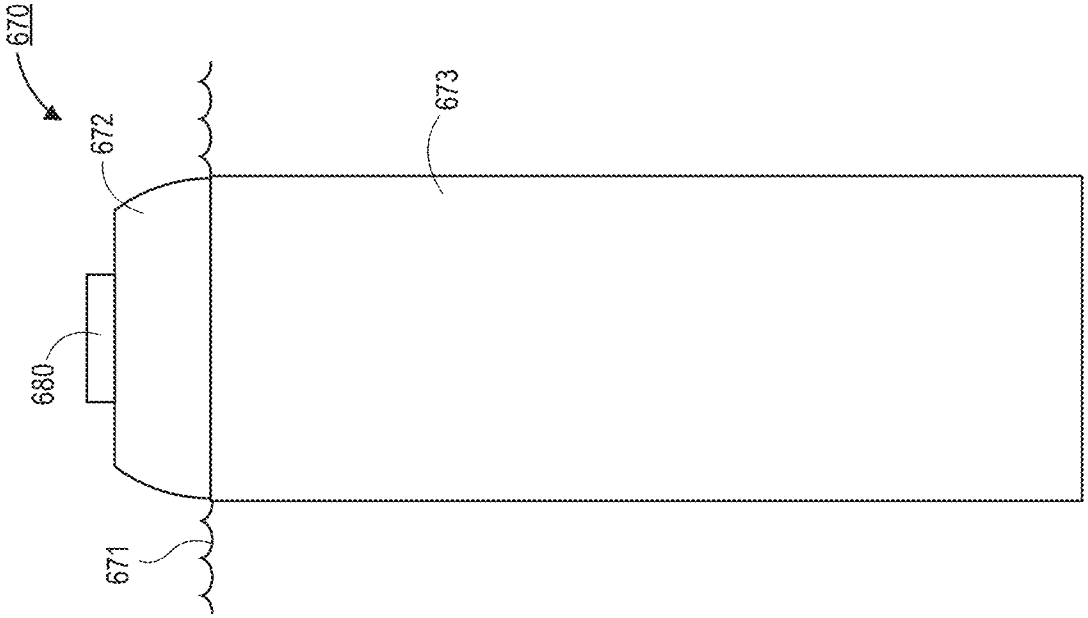
Figure 139:
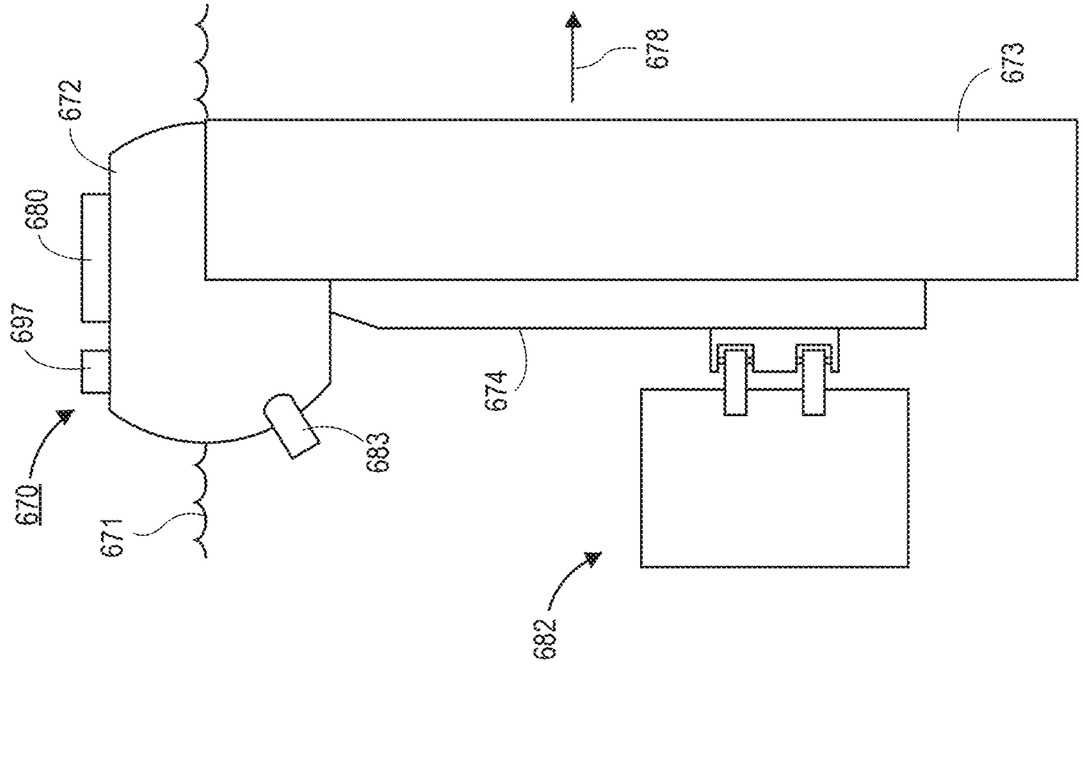
Figure 141:
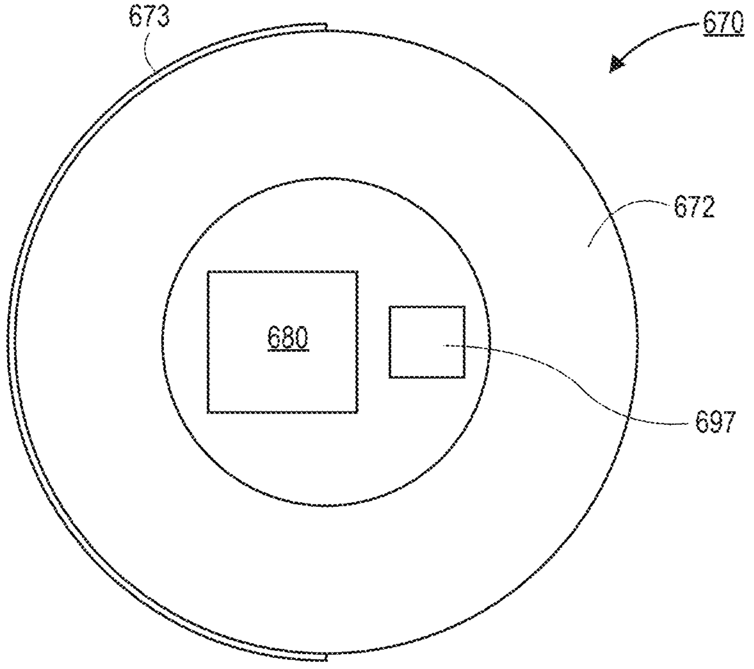
Figure 142:
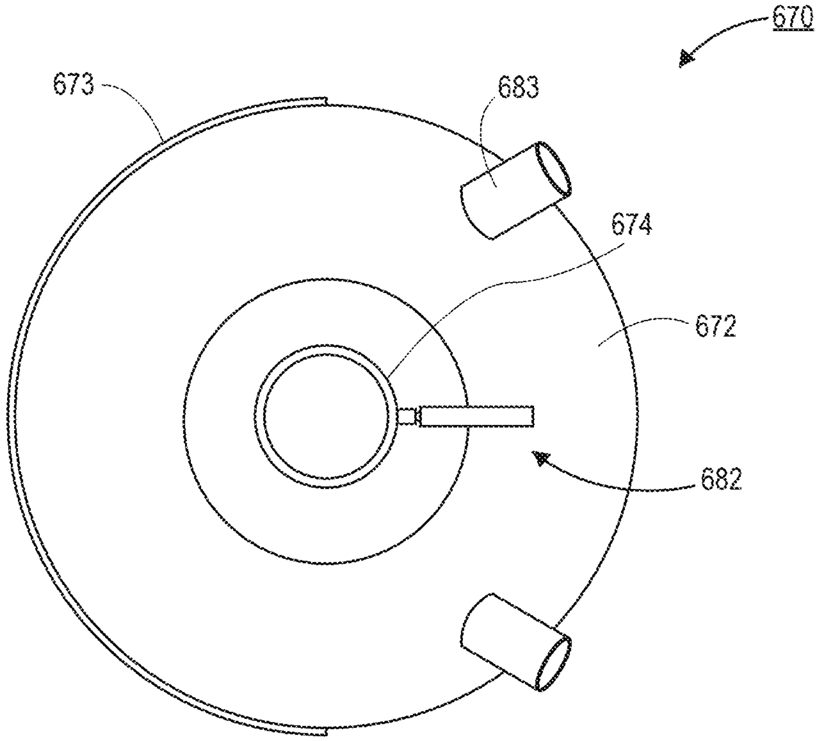
Figure 143:
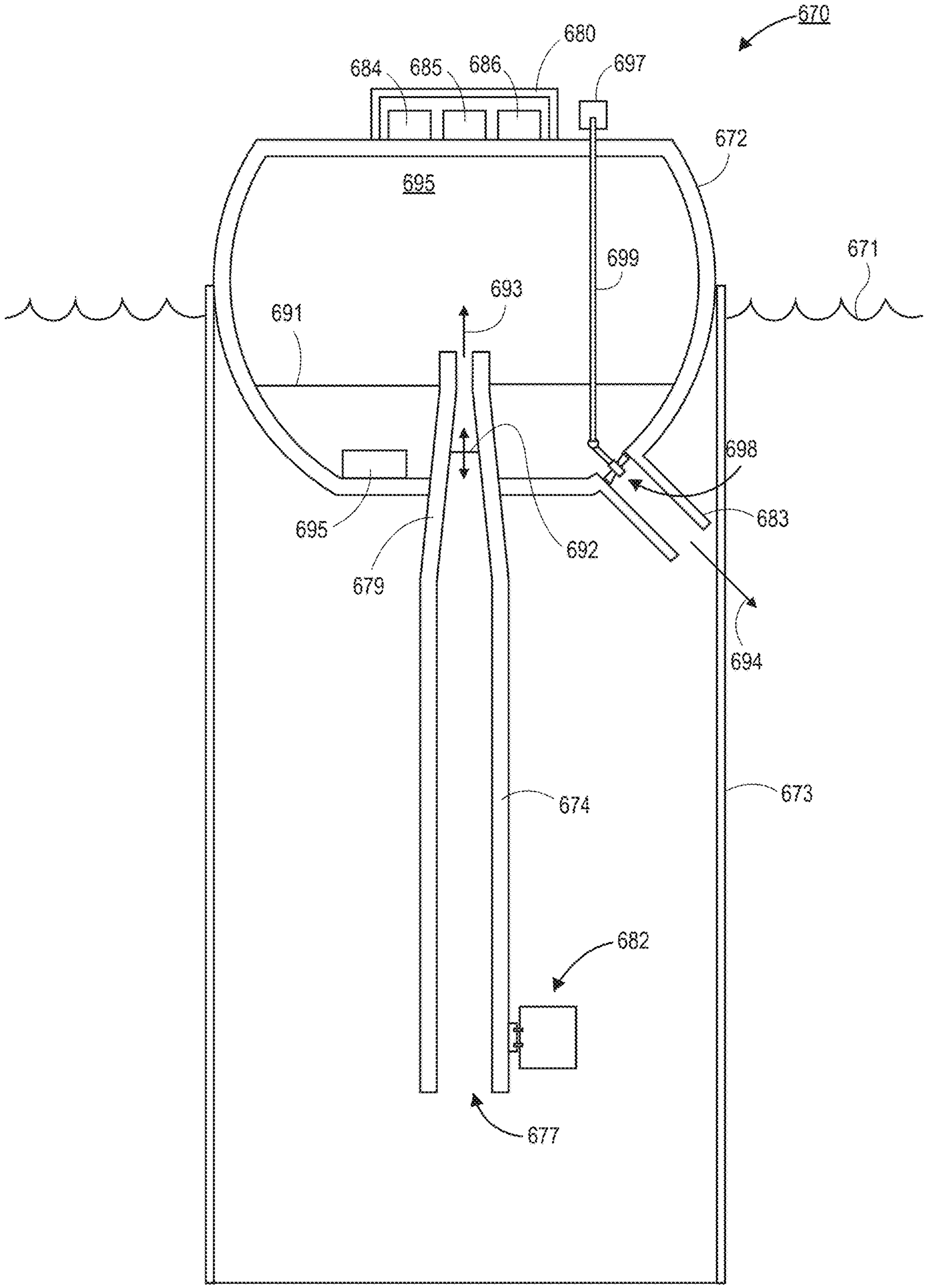
Figure 144:
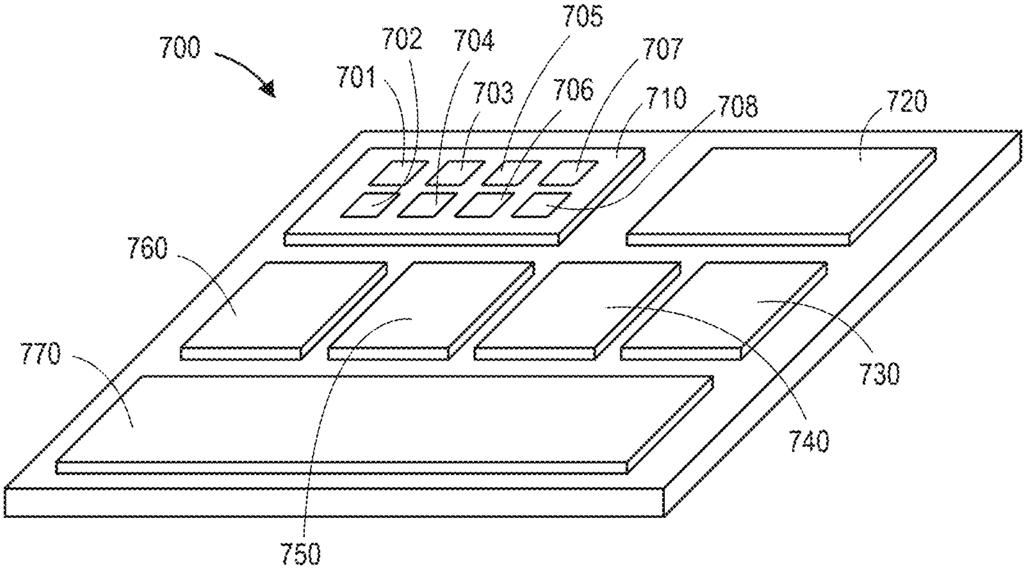
Figure 145:
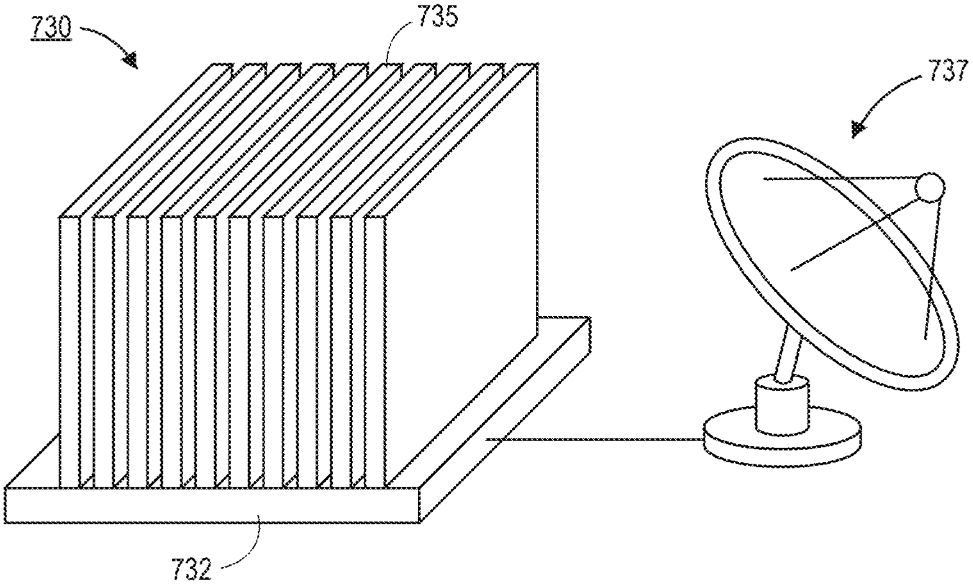

FIG. 132 is a side view of the nineteenth embodiment of the present invention;

FIG. 133 is a side view of the nineteenth embodiment of the present invention;

FIG. 134 is a top-down view of the nineteenth embodiment of the present invention;

FIG. 135 is a bottom-up view of the nineteenth embodiment of the present invention;

FIG. 136 is a perspective side view of a twentieth embodiment of the present invention;

FIG. 137 is a side view of the twentieth embodiment of the present invention;

FIG. 138 is a side view of the twentieth embodiment of the present invention;

FIG. 139 is a side view of the twentieth embodiment of the present invention;

FIG. 140 is a side view of the twentieth embodiment of the present invention;

FIG. 141 is a top-down view of the twentieth embodiment of the present invention;

FIG. 142 is a bottom-up view of the twentieth embodiment of the present invention;

FIG. 143 is a cross-section view of the twentieth embodiment of the present invention;

FIG. 144 is a perspective view of an electronic module used in the twentieth embodiment of the present invention;

FIG. 145 is a perspective view of a server rack used in the twentieth embodiment of the present invention.

DETAILED DESCRIPTIONS OF THE DRAWINGS

For a fuller understanding of the nature and objects of the disclosure, reference should be made to the preceding detailed description, taken in connection with the accompanying drawings. The following figures, and the illustrations offered therein, in no way constitute limitations, either explicit or implicit, on the scope of the current disclosure. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

Figure 1:
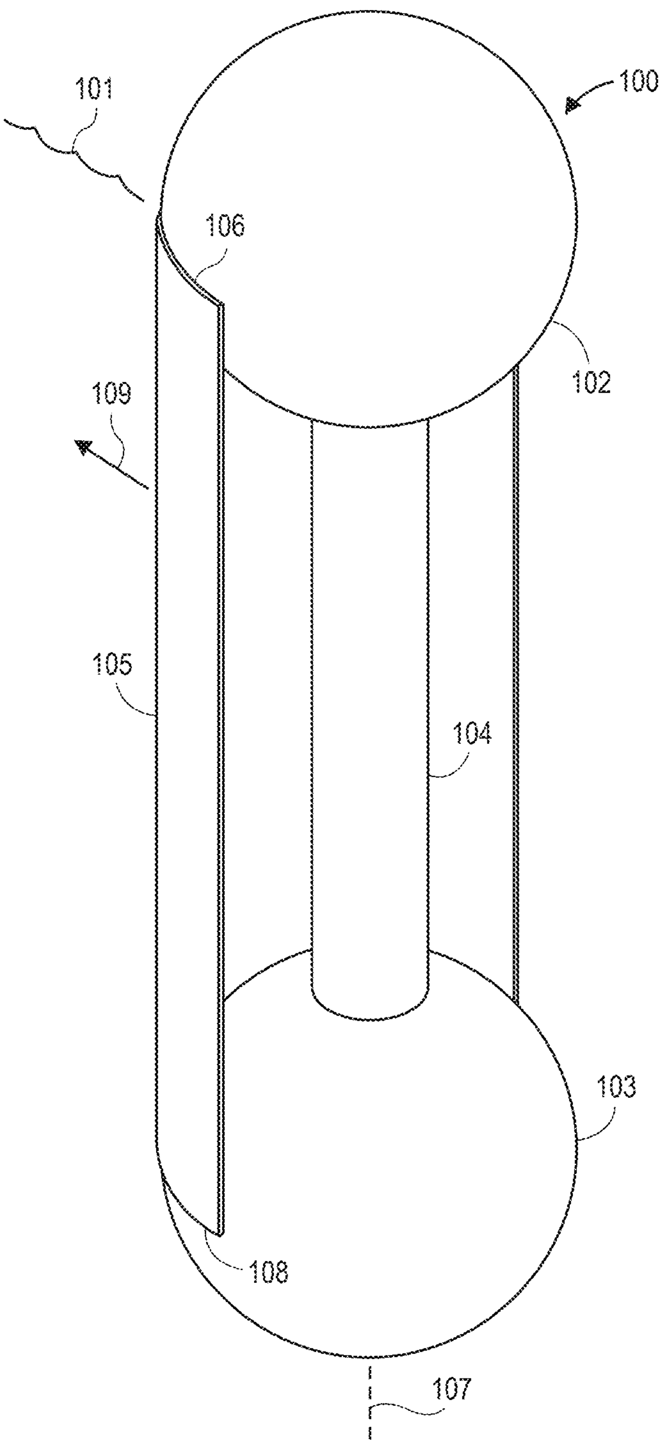
FIG. 1 is a perspective side view of a first embodiment of the present invention.

FIG. 1 shows a side perspective view of an embodiment 100 of the current disclosure.

The embodiment 100 floats adjacent to an upper surface 101 of a body of water over which waves pass.

The embodiment comprises an upper hollow and buoyant chamber 102, a lower chamber 103, and a cylindrical tube 104 that rigidly connects the upper chamber 102 to the lower chamber 103. Attached to a "forward" side of the upper 102 and lower 103 chambers is a semi-cylindrical propulsive shroud 105. The radius of curvature of the semi-cylindrical propulsive shroud is approximately equal to the radii of the upper and lower chambers.

The propulsive shroud is attached to the upper chamber 102 at, and/or along, an upper seam 106 oriented horizontally, and/or within a plane normal to a longitudinal axis 107 of the embodiment. The propulsive shroud is attached to the lower chamber 103 at, and/or along, a lower seam 108 oriented horizontally, and/or within a plane normal to a longitudinal axis 107 of the embodiment. The propulsive shroud 105 may be considered as being directly attached to the upper chamber 102 and/or the lower chamber 103. For example, the propulsive shroud 102 may directly contact the surfaces of the upper chamber 102 and/or the surfaces of the lower chamber 103. Directly attached may also refer to the propulsive shroud 102 being welded or otherwise adhered to the upper chamber 102 and/or the lower chamber 103. That is, upper seam 106 and lower seam 108 may comprise welded material, an adhesive layer, or the like.

The semi-cylindrical propulsive shroud 105 of embodiment 100 is approximately radially symmetrical about, and coaxial with, the embodiment's longitudinal axis 107. The angular extent of the semi-cylindrical propulsive shroud about the embodiment's longitudinal axis is approximately 180 degrees. Thus, the propulsive shroud of embodiment 100 is substantially a "half-pipe."

When the embodiment 100, and its propulsive shroud 105, interact with a wave passing at and/or along the surface 101 of the body of water on which the embodiment floats, a portion of the motive energy within the wave is redirected so as to create a propulsive force that tends to propel 109 the embodiment in a "forward" direction. The "forward" direction may include a direction that is generally against the primary direction of motion of the wave passing at and/or along the surface 101 of the body of water. That is, the "forward" direction may be described as being upstream of the primary wave direction and/or as being against the current. Without being tied to a particular theory of operation, it is understood that embodiment 100 (and other embodiments described herein) operate through one or more different propulsion mechanisms. For example a single propulsion mechanism may dominate or be entirely responsible for motion of the embodiment 100, or multiple different propulsion mechanisms may combine to provide motion of the embodiment 100.

One such propulsion mechanism may be described as being related to differential drag along the propulsive shroud 105. Non-uniformities in drag through the water along different surfaces of the propulsive shroud 105 may result in an overall force that pulls and/or pushes the propulsive shroud 105 upstream. Another potential propulsion mechanism may include a collision force that is applied along an interior surface of the propulsive shroud 105. As the embodiment 100 moves up and down in the body of water in response to the wave motion, a low pressure region forms between the lower chamber 103 and the upper chamber 102. This low pressure region is rapidly filled with water from the body of water. The rapid filling provides a collision force against the interior surface of the propulsive shroud 105, and the force may propagate the embodiment 100 upstream. Yet another potential propulsion mechanism may include a jetting process. The jetting process may include one or more focused jets of water that are expelled from the embodiment 100 away from the propulsive shroud 105. The jets of water may be generally located proximate to a bottom of the upper chamber 102 and a top of the lower chamber 103. As the embodiment 100 oscillates up and down in the body of water, portions of the volume of water partially enclosed by the propulsive shroud 105 is ejected out the back as a result of displacement of the upper chamber 102 and the lower chamber 103.

Another propulsion mechanism for the embodiment 100 may include the generation of a net momentum flux in the positive direction. The embodiment 100 with the propulsive shroud 105 at least partially encloses a region of water between the upper chamber 102 and the lower chamber 103. As the embodiment 100 oscillates up and down in the water, the partially confined region of water acquires momentum. At some points in time during oscillation, the embodiment 100 is displaced in a direction opposing the momentum of the partially enclosed region of water. Since water is substantially incompressible, the opposing forces result in a jet of water being ejected out the back of the opening away from the propulsive shroud 105. However, the total volume of the partially enclosed region of water must remain the same. Accordingly, an influx of water replaces the volume expelled through the jetting process.

While the volume of water entering the partially enclosed region is substantially equal to the volume of water exiting the partially enclosed region, the net momentum fluxes are not equal. The net momentum flux pointing in the forward direction can be attributable to several factors. One factor is that a velocity of the jetted (or expelled) water is higher than a velocity of the incoming water. This can be at least partially explained through differences in area. The expelled water is concentrated or focused at either the top or bottom of the partially confined region, and the incoming water is spread across a larger area between the top and bottom of the partially confined region. Since the flow rate in and out is equal, the ejected water must have a higher velocity.

An additional factor contributing to a net forward momentum flux may be the direction of the incoming and outgoing water flows. The jetted water expelled out the back of the embodiment may be substantially normal to the propulsive shroud 105. This provides a force primarily in the positive horizontal direction. In contrast, the influx of water may come from a range of different angles relative to the propulsive shroud 105. Accordingly, all of the negative force is not applied in the horizontal direction. That is, some of the force is applied in the vertical direction, which does not cancel the forward horizontal force generated by the expelled water.

An embodiment similar to the one illustrated in FIG. 1 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 1 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 1 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 1 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

The embodiment 100 in FIG. 1 may include any suitable form factor that enables propulsion. In some aspects, the embodiment 100 may include an upper chamber 102 and a lower chamber 103 that have diameters that are approximately 20 meters or smaller, approximately, 10 meters or smaller, or approximately 1 meter or smaller. A length of the tube 104 may be approximately 100 meters or less, approximately 50 meters or less, approximately 20 meters or less, or approximately 1 meter or less. More generally, a length of the tube 104 may be related to a diameter of the upper chamber 102 and/or the lower chamber 103 by a ratio of (tube length:chamber diameter) that is 0.5:1 or greater, 1:1 or greater, 2:1 or greater, 5:1 or greater, or 10:1 or greater.

With respect to propulsive shroud 105 dimensions, the propulsive shroud 105 is sized to enable suitable propulsion in combination with the desired size of the remainder of the embodiment 100. As noted above, the inner diameter of the propulsive shroud 105 may be approximately equal to the diameter of the upper chamber 102 and/or the lower chamber 103. Though, (as will be described in greater detail below), an inner diameter of the propulsive shroud 105 may be smaller or larger than a diameter of the upper chamber 102 and/or the lower chamber 103. For example, the inner diameter of the propulsive shroud 105 may be up to twice the diameter of the upper chamber 102 and/or the lower chamber 103, or the propulsive shroud 105 may have an inner diameter that is as small as one-quarter the diameter of the upper chamber 102 and/or the lower chamber 103.

In the preceding paragraphs, general dimensions are provided to describe examples of embodiments 100 that may be beneficial in some applications. Though, it is to be appreciated that other use cases or applications may arise in which embodiments 100 with dimensions greater than and/or smaller than those listed above may be useful. Such dimensions should also be considered as being included as options for embodiment 100 and other embodiments described herein. Further, while dimensions are explicitly called out for embodiment 100 illustrated in FIG. 1, it is to be appreciated that other embodiments described in greater detail herein may also conform to dimension ranges and/or ratios similar to those described with respect to embodiment 100.

Figure 2:
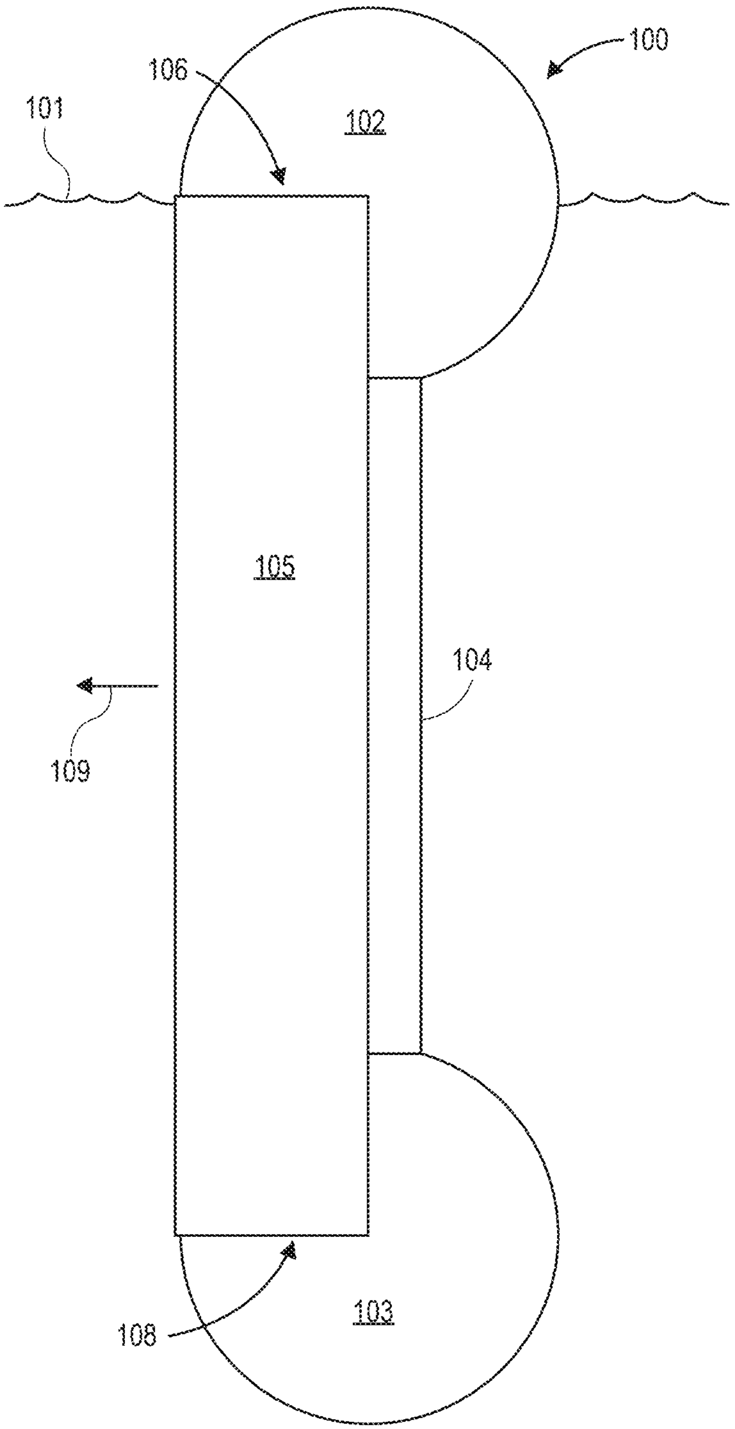
FIG. 2 is a side view of the first embodiment of the present invention.

FIG. 2 shows a side view of the same embodiment 100 of the current disclosure that is illustrated in FIG. 1.

Figure 3:
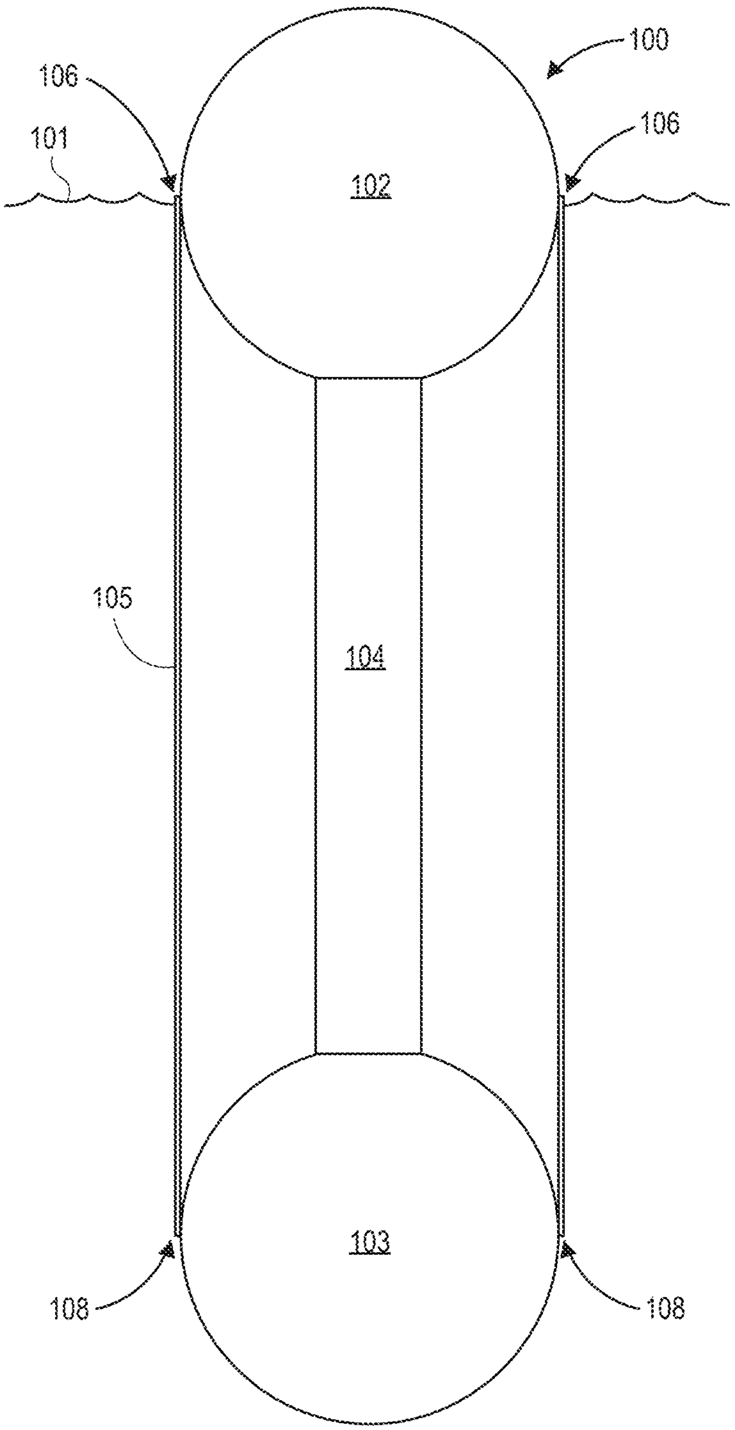
FIG. 3 is a side view of the first embodiment of the present invention.

FIG. 3 shows a side view of the same embodiment 100 of the current disclosure that is illustrated in FIGS. 1 and 2.

Figure 4:
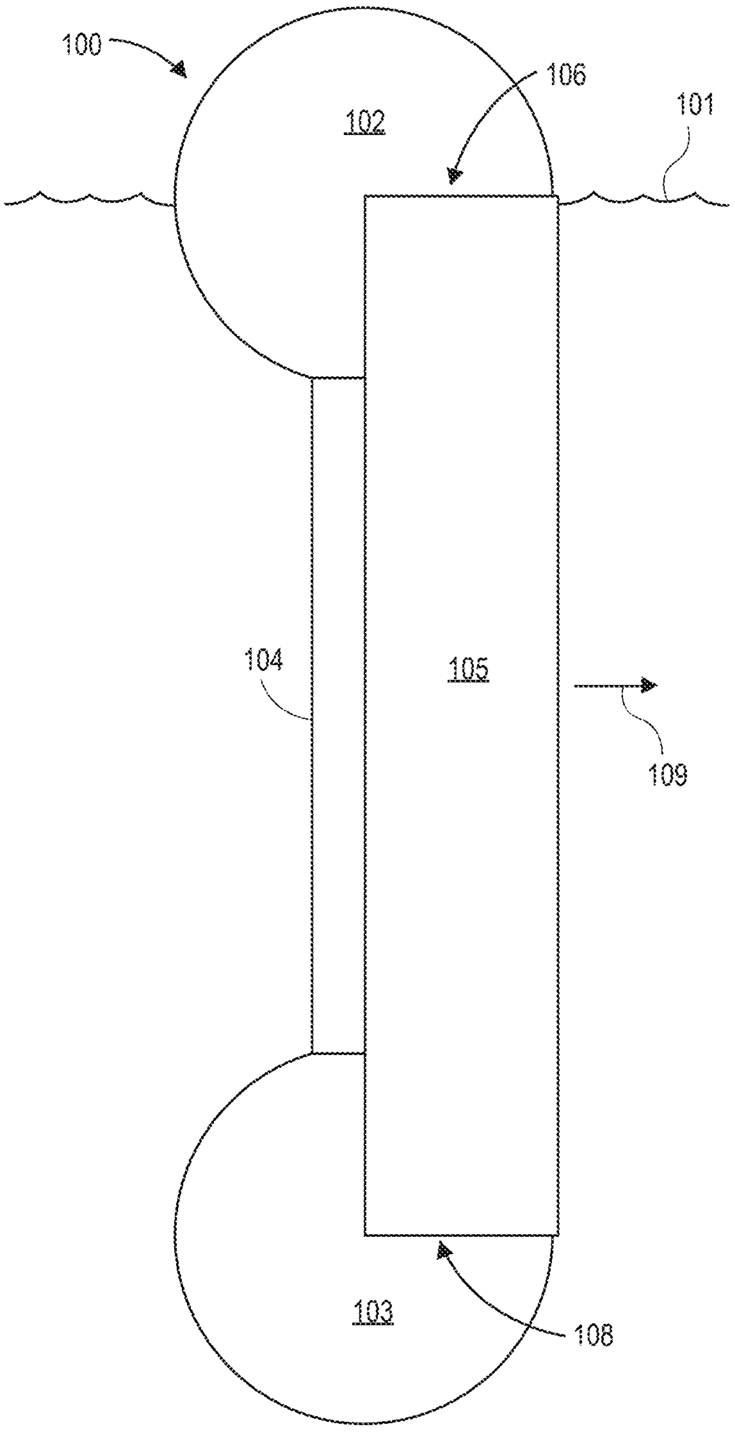
FIG. 4 is a side view of the first embodiment of the present invention.

FIG. 4 shows a side view of the same embodiment 100 of the current disclosure that is illustrated in FIGS. 1-3.

Figure 5:
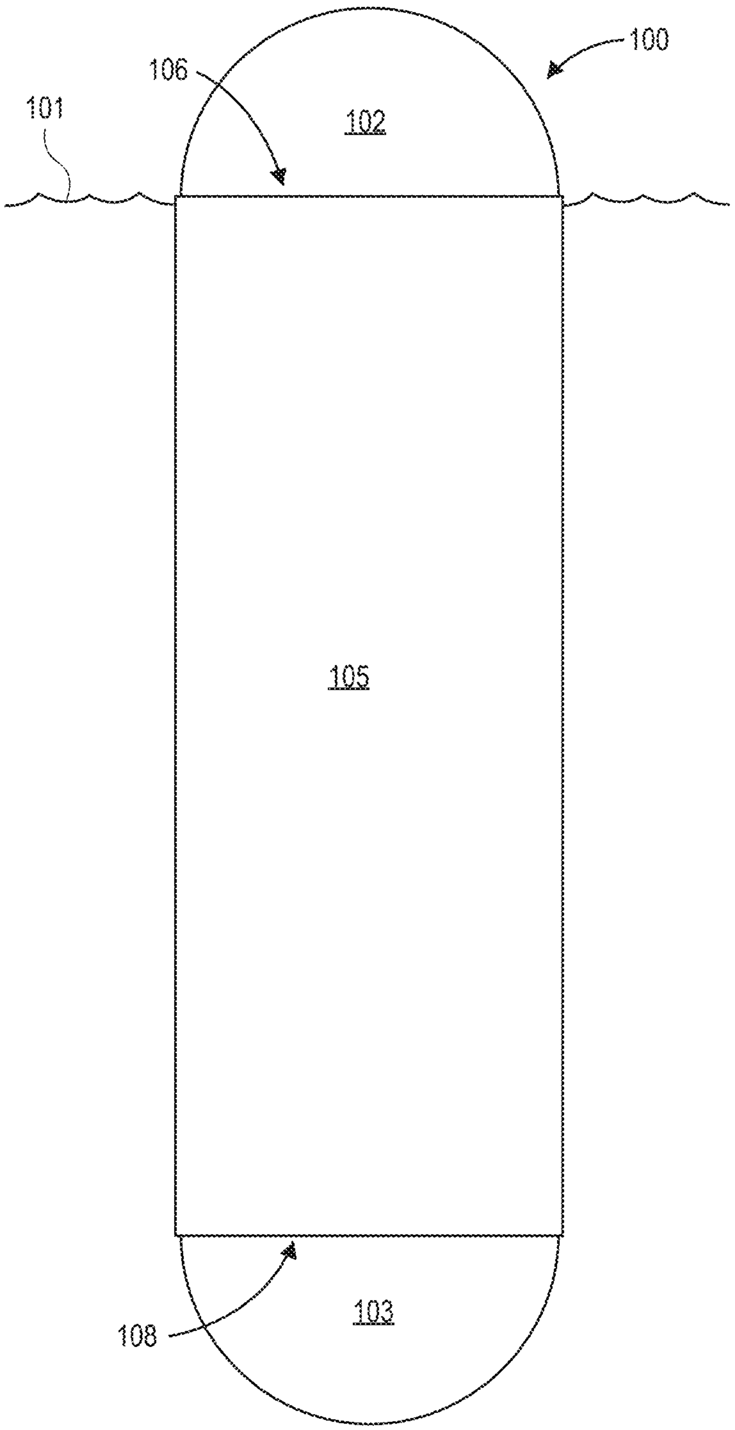
FIG. 5 is a side view of the first embodiment of the present invention.

FIG. 5 shows a side view of the same embodiment 100 of the current disclosure that is illustrated in FIGS. 1-4.

Figure 6:
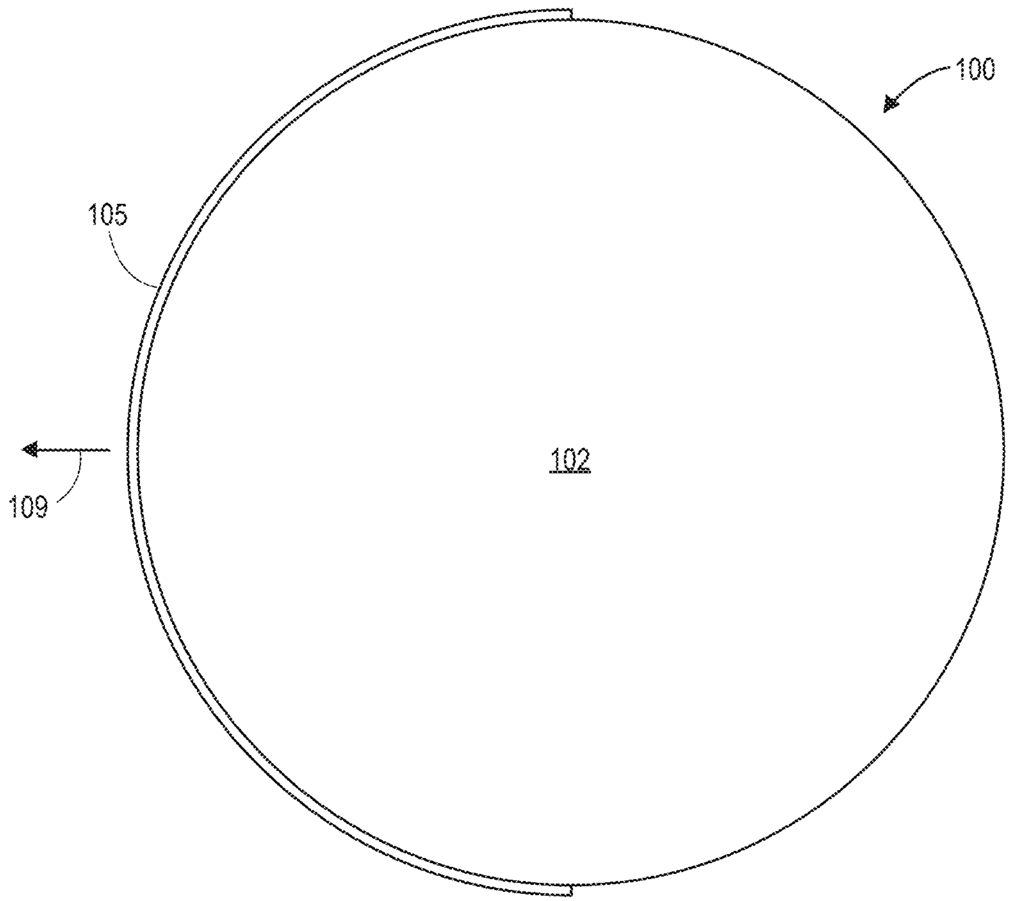
FIG. 6 is a top-down view of the first embodiment of the present invention.

FIG. 6 shows a top-down view of the same embodiment 100 of the current disclosure that is illustrated in FIGS. 1-5.

Figure 7:
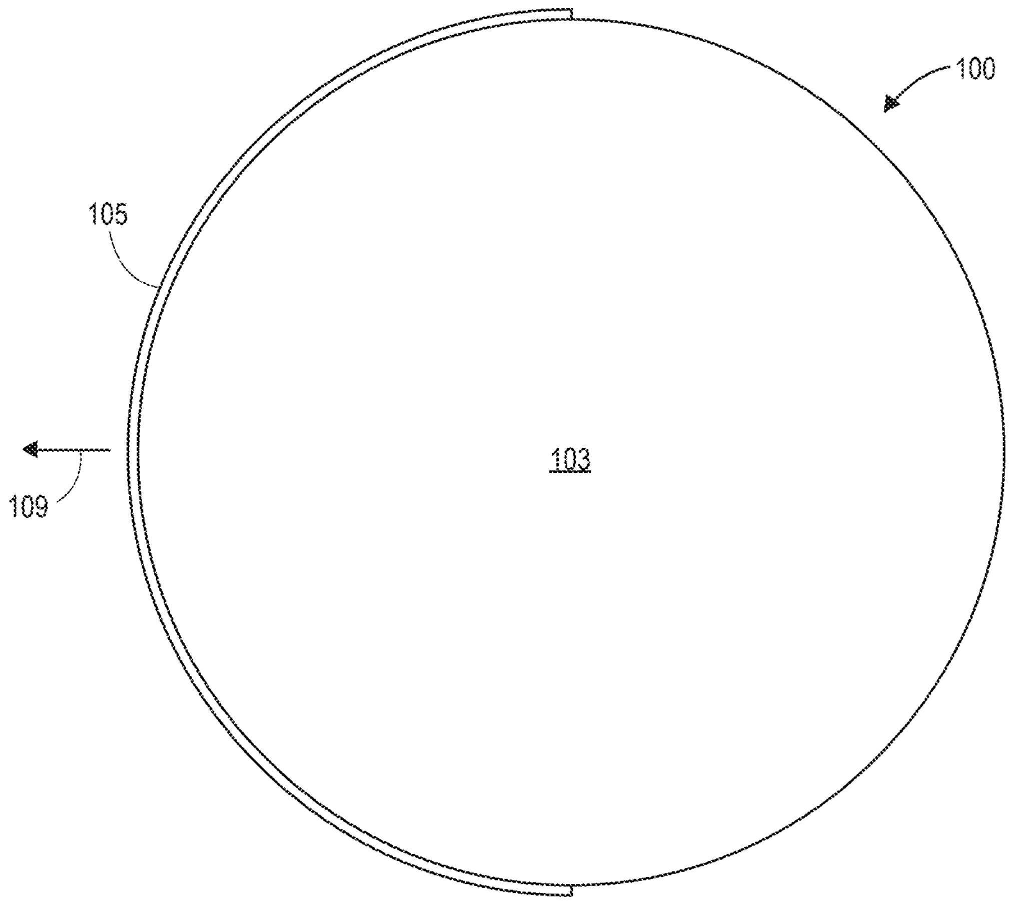
FIG. 7 is a bottom-up view of the first embodiment of the present invention.

FIG. 7 shows a bottom-up view of the same embodiment 100 of the current disclosure that is illustrated in FIGS. 1-6.

Figure 8:
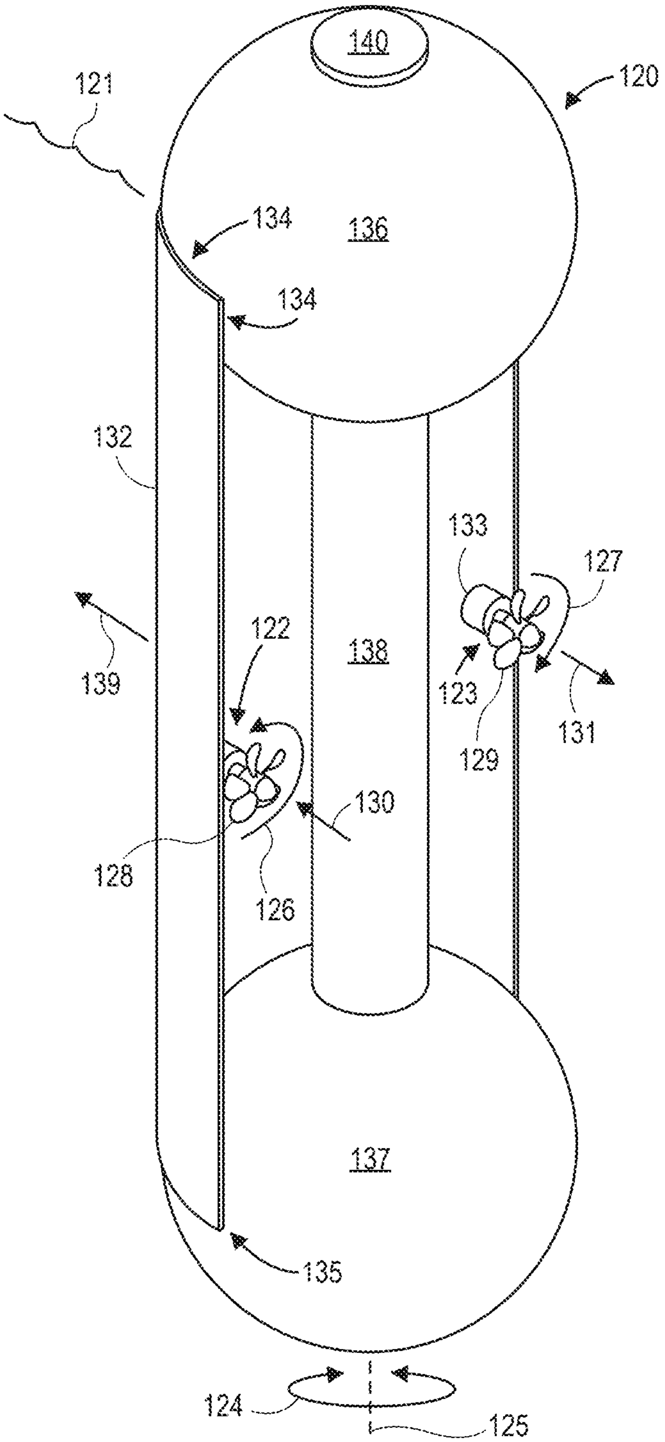
FIG. 8 is a perspective side view of a second embodiment of the present invention.

FIG. 8 shows a side perspective view of an embodiment 120 of the current disclosure.

The embodiment 120 floats adjacent to an upper surface 121 of a body of water over which waves pass. The embodiment 120 is similar to the embodiment 100 illustrated in FIGS. 1-7. However, unlike embodiment 100, embodiment 120 includes a pair 122 and 123 of thrusters which, when energized, apply a torque to the embodiment that causes the embodiment to rotate 124 clockwise or counterclockwise about its nominally vertical longitudinal axis 125. The direction of the embodiment's rotation depends on the respective direction of rotation, e.g., 126 and 127, of each propeller 126 and 127 of each of the embodiment's two thrusters 122 and 123.

For example, when the propeller 128 of thruster 122 is spun in a counterclockwise direction (with respect to a perspective looking into the interior of the propulsive shroud's interior), then water is pulled 130 into the propeller 128, and exerts a tangential force on the embodiment's propulsive shroud 132 that, in turn, exerts a torque on the embodiment 120 that tends to cause the embodiment to rotate, e.g., 124, about its longitudinal axis 125 in a counterclockwise direction (with respect to a top-down perspective of the embodiment). If the direction of the rotation of the propeller 128 of thruster 122 is reversed, then so too will be the induced flow 130 of water, i.e., thereby being pushed from the propeller instead of pulled into it. And, such a reversal of the propeller's 128 rotation will cause an opposite torque and direction of rotation to be imparted to the embodiment.

Similarly, when the propeller 129 of thruster 123 is spun by its operably connected electrical motor 133 in a clockwise direction (with respect to a perspective looking into the interior of the propulsive shroud's interior), then water is pushed 131 from the propeller 128, and exerts a tangential force on the embodiment's propulsive shroud 132 that, in turn, exerts a torque on the embodiment 120 that tends to cause the embodiment to rotate, e.g., 124, about its longitudinal axis 125 in a counterclockwise direction (with respect to a top-down perspective of the embodiment). If the direction of the rotation of the propeller 129 of thruster 123 is reversed, then so too will be the induced flow 131 of water, i.e., thereby being pulled toward the propeller instead of pushed from it. And, such a reversal of the propeller's 127 rotation will cause an opposite torque and direction of rotation to be imparted to the embodiment.

Thus, when one of the embodiment's two thrusters 122 or 123 is energized such that its respective propeller rotates in a first direction, then if the other of the embodiment's two thrusters is either not energized, or is energized such that its respective propeller rotates in a second direction, opposite the first direction, then the embodiment will tend to be rotated about its longitudinal axis 125 in a first direction. Conversely, when both of the embodiment's two thrusters are energized such that the propeller of each is rotated in the same direction, then the torques imparted to the embodiment by their combined thrust will cancel, and the combined thrust will either add to the forward propulsion imparted to the embodiment by its propulsive shroud, or it will oppose a forward propulsion of the embodiment.

The embodiment's propulsive shroud 132 is connected to the embodiment by upper 134 and lower 135 seams, e.g., welds, which attach those respective upper and lower edges of the propulsive shroud to the vertical centers, and/or equators, of the upper 136 and lower 137 chambers along relatively narrow bands adjacent to the respective upper and lower edges of the propulsive shroud. The propulsive shroud 132 may be considered as being directly attached to the upper chamber 136 and/or the lower chamber 137. For example, the propulsive shroud 132 may directly contact the surfaces of the upper chamber 136 and/or the surfaces of the lower chamber 137. Directly attached may also refer to the propulsive shroud 132 being welded or otherwise adhered to the upper chamber 136 and/or the lower chamber 137. That is, upper seam 134 and lower seam 135 may comprise welded material, an adhesive layer, or the like. The radius of curvature of the semi-cylindrical propulsive shroud is approximately equal to the radii of the upper and lower chambers. The propulsive shroud provides structural support to the embodiment at the upper 136 and lower 137 chambers. The cylindrical tube 138 provides additional structural support to the embodiment.

As a consequence of its obstruction of wave motion at the embodiment, the propulsive shroud 132 imparts a forward force, i.e., a lateral force at the propulsive shroud and directed away from the cylindrical tube, to the embodiment. That forward force then tends to propel 139 the embodiment in the same forward direction.

The semi-cylindrical propulsive shroud 132 of embodiment 120 is approximately radially symmetrical about, and coaxial with, the embodiment's longitudinal axis 125. The angular extent of the semi-cylindrical propulsive shroud about the embodiment's longitudinal axis is approximately 180 degrees. Thus, the propulsive shroud of embodiment 120 is substantially a "half-pipe."

A dome 140 affixed to a top side of the upper buoyant chamber 136 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a thruster control circuit (not shown) that the embodiment control circuit uses to activate and control the thrusters 122 and 123 in order to alter and/or control the yaw of the embodiment.

Torques applied to the embodiment 120 by the embodiment's two thrusters 122 and/or 123 allow the yaw, and/or direction of forward propulsion, to be altered, adjusted, corrected, and/or controlled thereby enabling the embodiment's control circuit to steer the embodiment and navigate the embodiment to a geospatial location at the surface 121 of the body of water.

An embodiment similar to the one illustrated in FIG. 8 contains an internal power take off that converts a wave-induced motion of the embodiment into an electrical power that is then used to provide electrical power to, and energize, the electrical components and systems, as well as to provide power to the motors, e.g., 133, that rotate the propellers 128 and 129 of the respective thrusters 122 and 123.

An embodiment similar to the one illustrated in FIG. 8 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motors, e.g., 133, that rotate the propellers 128 and 129 of the respective thrusters 122 and 123.

Figure 9:
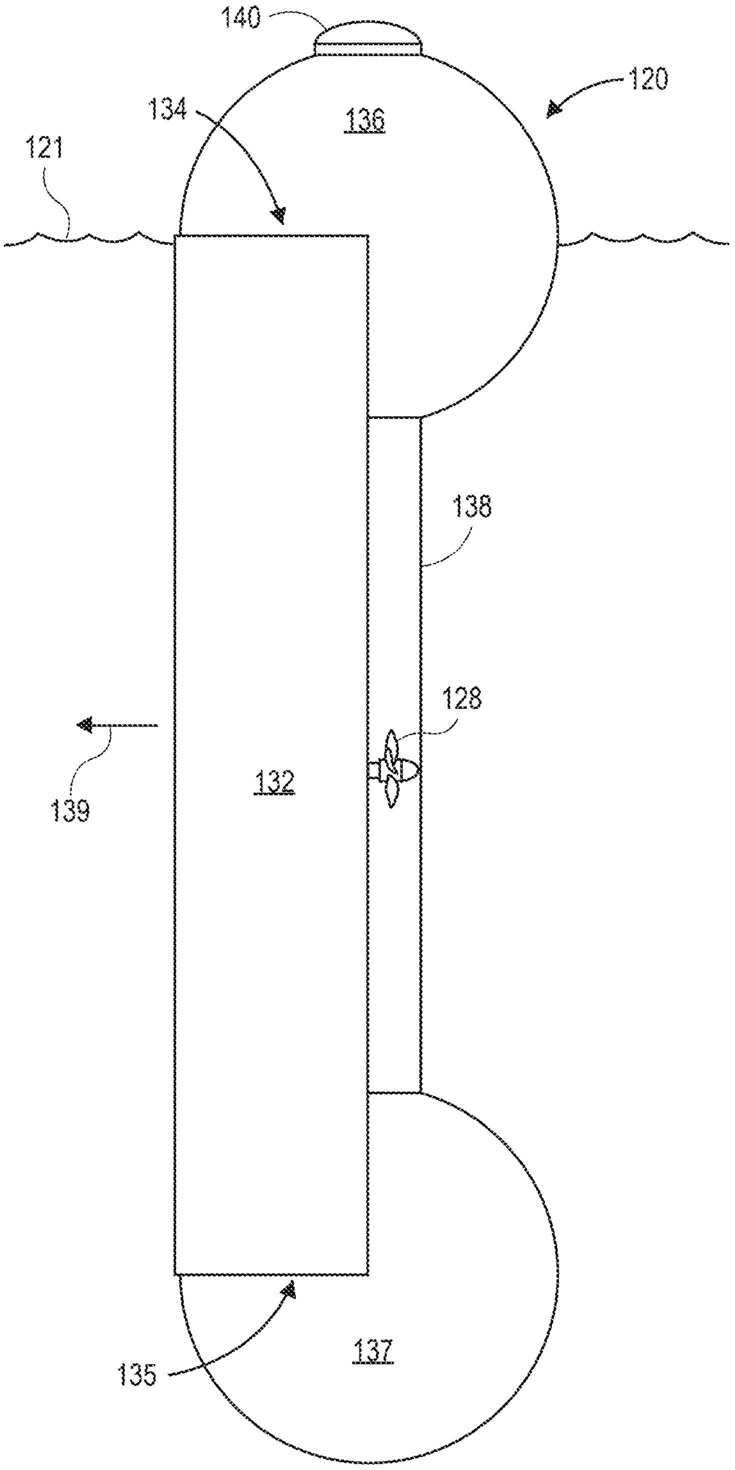
FIG. 9 is a side view of the second embodiment of the present invention.

FIG. 9 shows a side view of the same embodiment 120 of the current disclosure that is illustrated in FIG. 8.

Figure 10:
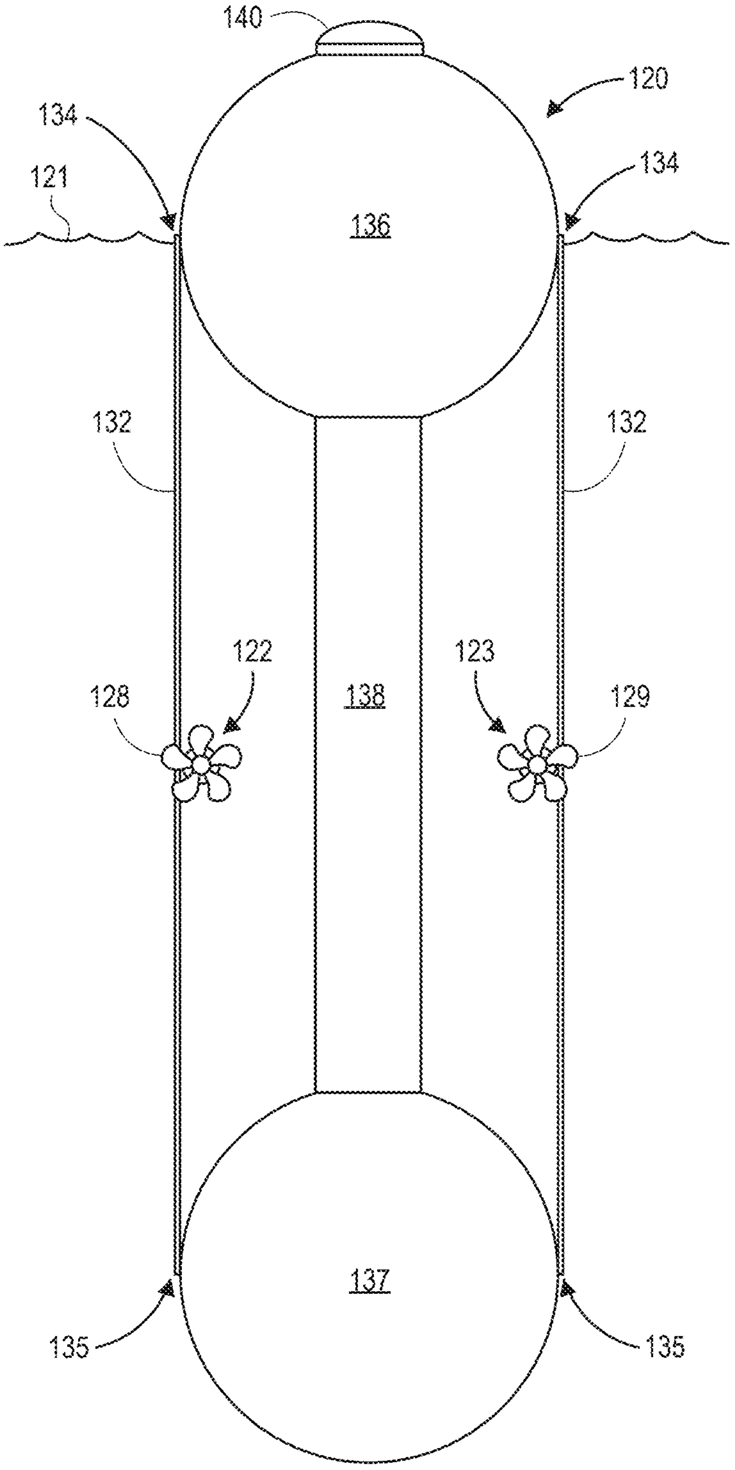
FIG. 10 is a side view of the second embodiment of the present invention.

FIG. 10 shows a side view of the same embodiment 120 of the current disclosure that is illustrated in FIGS. 8 and 9.

Figure 11:
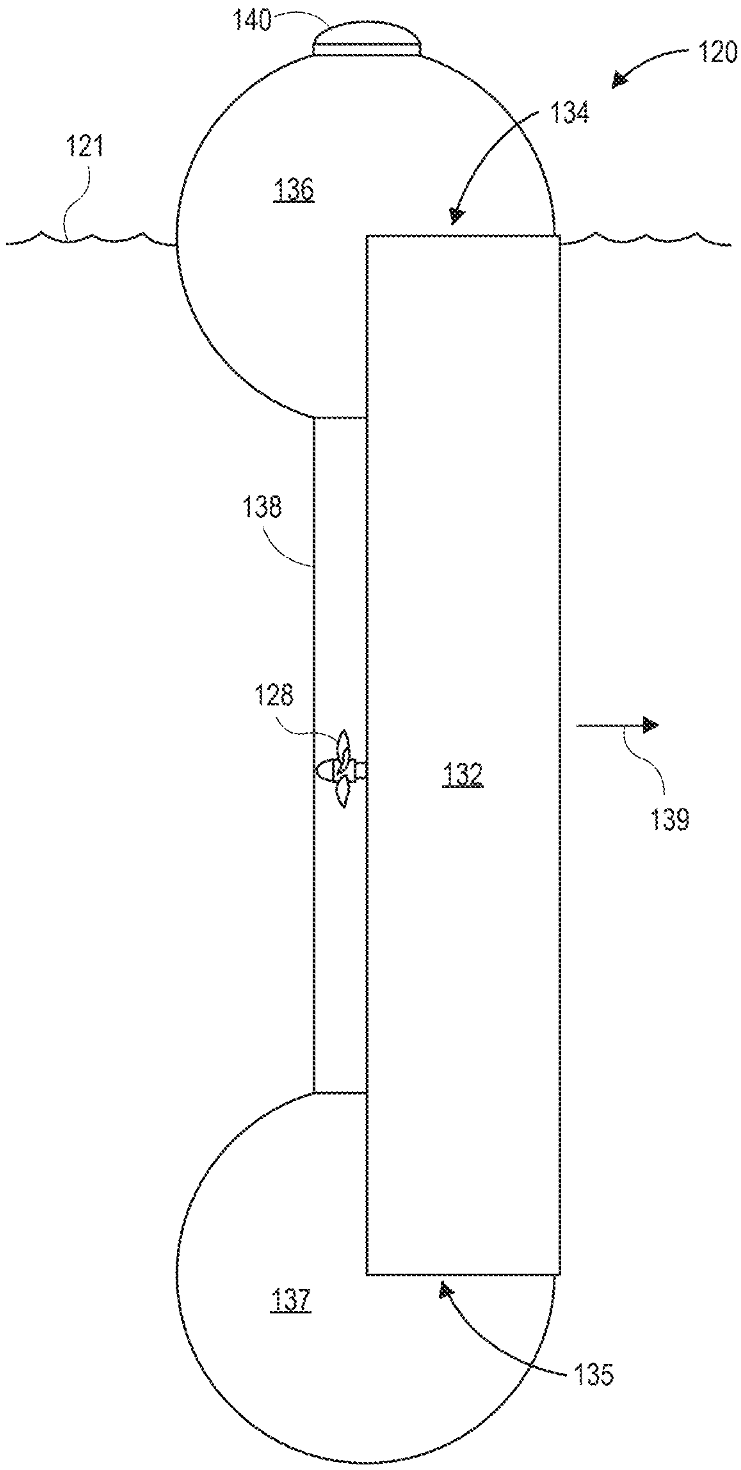
FIG. 11 is a side view of the second embodiment of the present invention.

FIG. 11 shows a side view of the same embodiment 120 of the current disclosure that is illustrated in FIGS. 8-10.

Figure 12:
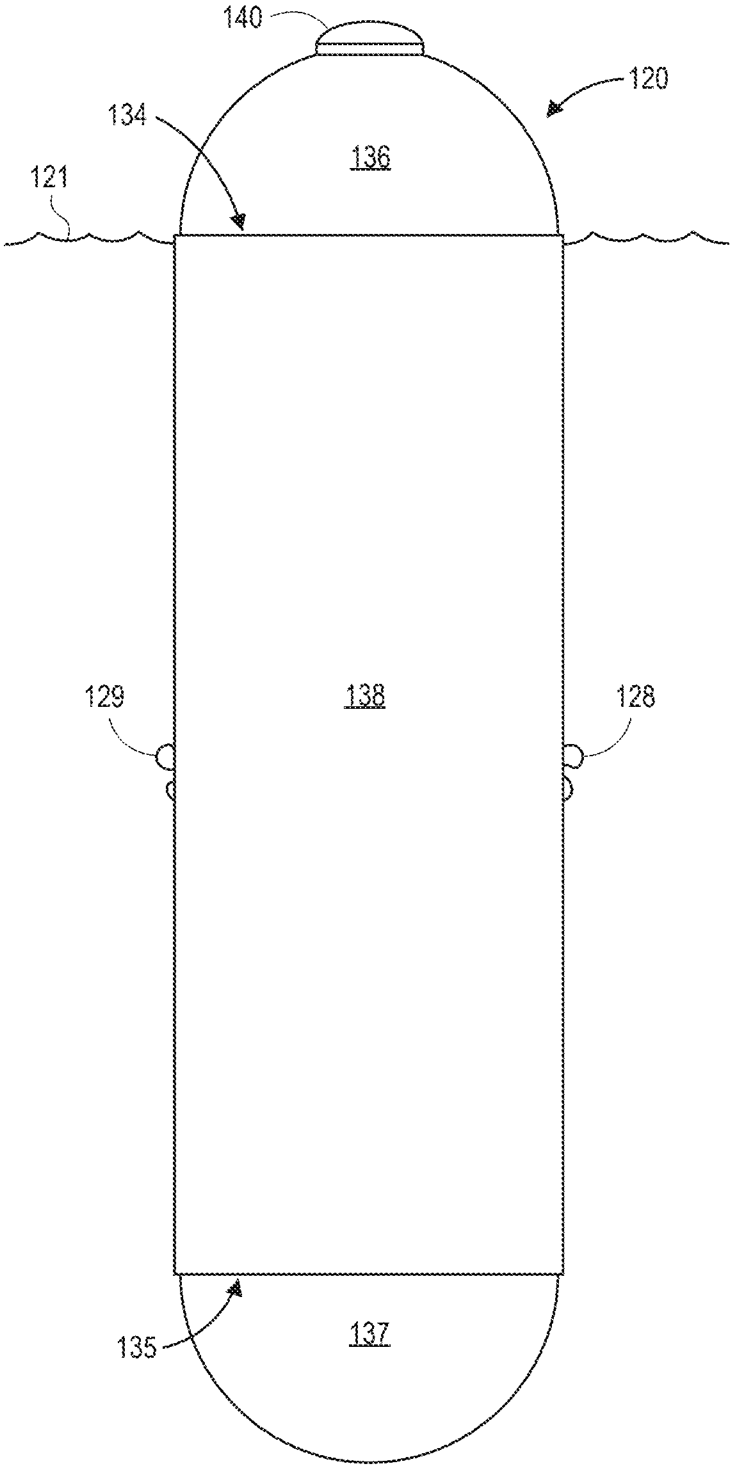
FIG. 12 is a side view of the second embodiment of the present invention.

FIG. 12 shows a side view of the same embodiment 120 of the current disclosure that is illustrated in FIGS. 8-11.

Figure 13:
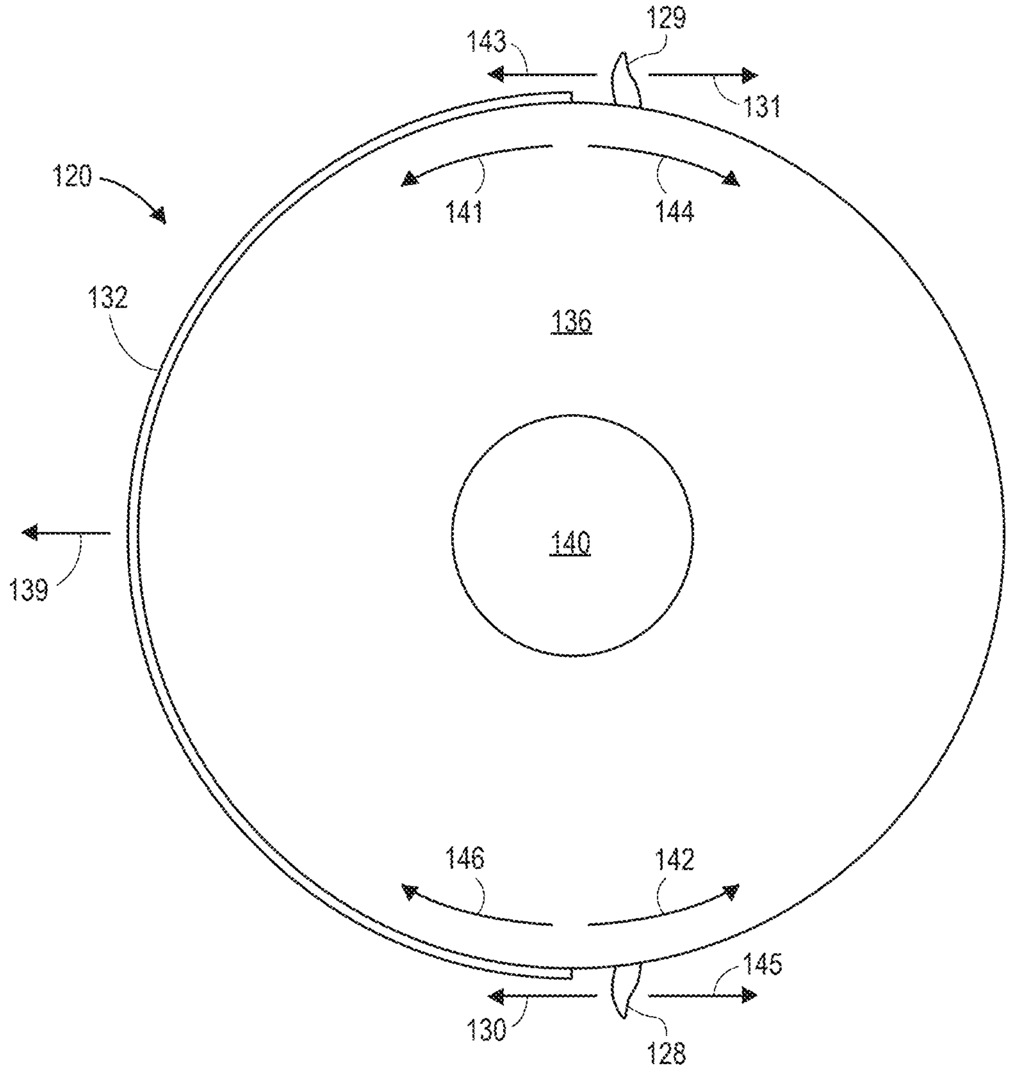
FIG. 13 is a top-down view of the second embodiment of the present invention.

FIG. 13 shows a top-down view of the same embodiment 120 of the current disclosure that is illustrated in FIGS. 8-12.

When the embodiment's control circuit (not shown) within the embodiment's dome 140 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., not visible, 133 in FIG. 8) operably connected to propeller 129 so as to rotate that propeller in a direction that pushes 131 water "backward" (i.e., away from the propulsive shroud 132), then that propeller's thrust will impart to the embodiment 120 a torque 141 which will tend to alter the embodiment's yaw by rotating the embodiment about its longitudinal axis (125 in FIG. 8) in a counterclockwise direction (relative to a top-down perspective).

If the embodiment's control circuit actuates and/or energizes the motor (e.g., not visible) operably connected to propeller 128 so as to rotate that propeller in a direction that pushes 130 water "forward" (i.e., toward the propulsive shroud 132), then that propeller's thrust will impart to the embodiment 120 a torque 142 which will tend to alter the embodiment's yaw by rotating the embodiment about its longitudinal axis (125 in FIG. 8) in a counterclockwise direction (relative to a top-down perspective).

By actuating, and/or energizing, either or both of the thrusters so that they produce one or two sources of thrust one of which, and/or both in combination, tend to rotate the embodiment about its longitudinal axis (125 in FIG. 8) in a counterclockwise direction, the embodiment's control circuit can adjust the yaw of the embodiment in a counterclockwise direction, even as the forward force produced by the propulsive shroud propels 139 the embodiment forward.

If the embodiment's control circuit actuates and/or energizes the motor (e.g., not visible, 133 in FIG. 8) operably connected to propeller 129 so as to rotate that propeller in a direction that pushes 143 water "forward" (i.e., toward the propulsive shroud 132), then that propeller's thrust will impart to the embodiment 120 a torque 144 which will tend to alter the embodiment's yaw by rotating the embodiment about its longitudinal axis (125 in FIG. 8) in a clockwise direction (relative to a top-down perspective).

If the embodiment's control circuit actuates and/or energizes the motor (e.g., not visible) operably connected to propeller 128 so as to rotate that propeller in a direction that pushes 145 water "backward" (i.e., away from the propulsive shroud 132), then that propeller's thrust will impart to the embodiment 120 a torque 146 which will tend to alter the embodiment's yaw by rotating the embodiment about its longitudinal axis (125 in FIG. 8) in a clockwise direction (relative to a top-down perspective).

By actuating, and/or energizing, either or both of the thrusters so that they produce one or two sources of thrust one of which, and/or both in combination, tend to rotate the embodiment about its longitudinal axis (125 in FIG. 8) in a clockwise direction, the embodiment's control circuit can adjust the yaw of the embodiment in a clockwise direction, even as the forward force produced by the propulsive shroud propels 139 the embodiment forward.

Figure 14:
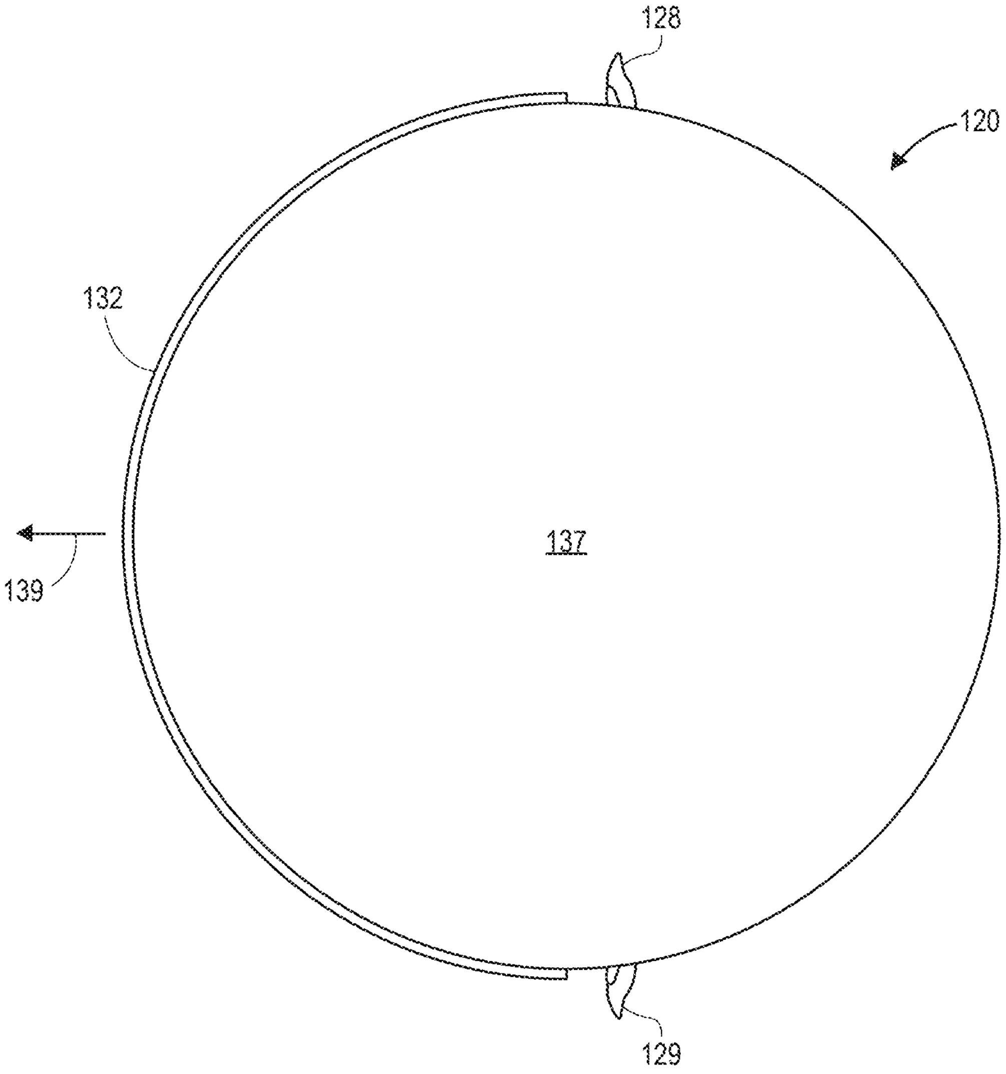
FIG. 14 is a bottom-up view of the second embodiment of the present invention.

FIG. 14 shows a bottom-up view of the same embodiment 120 of the current disclosure that is illustrated in FIGS. 8-13.

Figure 15:
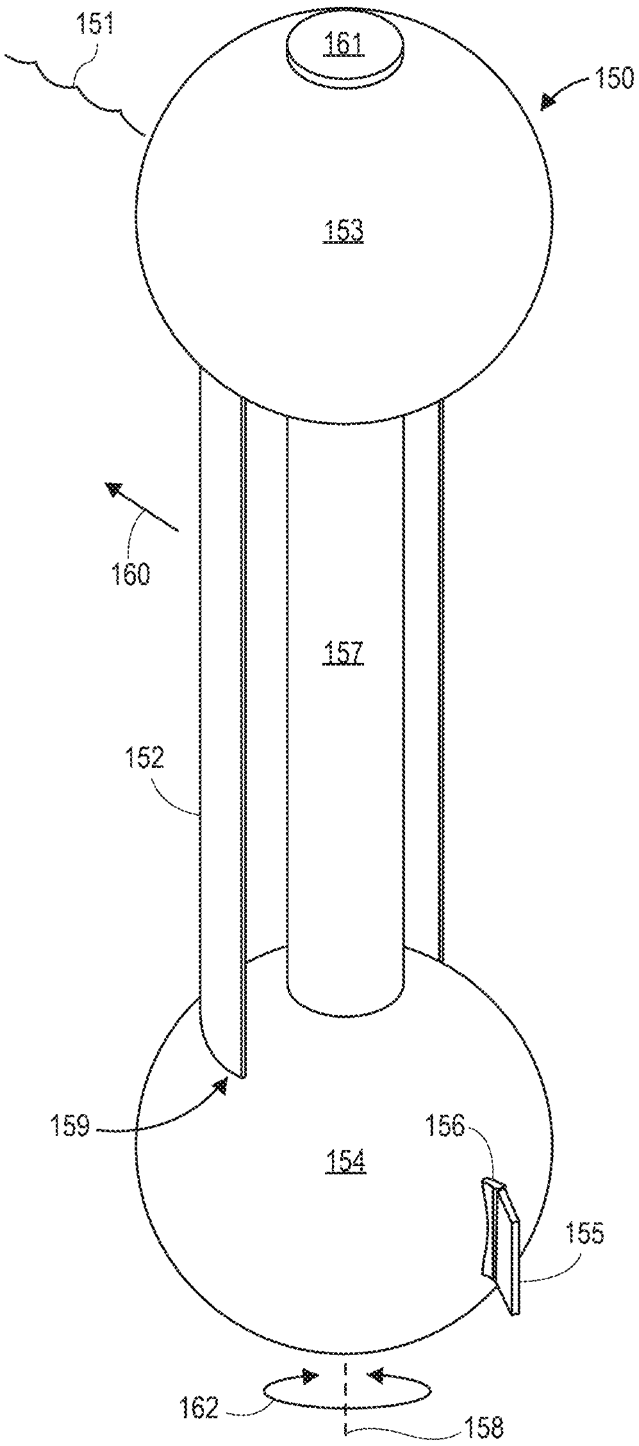
FIG. 15 is a perspective side view of a third embodiment of the present invention.

FIG. 15 shows a side perspective view of an embodiment 150 of the current disclosure.

The embodiment 150 floats adjacent to an upper surface 151 of a body of water over which waves pass. The embodiment 150 is similar to the embodiment 100 illustrated in FIGS. 1-7. However, unlike embodiment 100, the radius of curvature of the embodiment's semi-cylindrical propulsive shroud 152 is substantially less than the radii of the upper buoyant chamber 153 and the lower chamber 154 to which it is connected, attached, and/or affixed.

The embodiment 150 is similar to the embodiment 120 illustrated in FIGS. 8-14. However, whereas embodiment 120 controls, corrects, adjusts, and/or regulates, its yaw with a pair of thrusters (122 and 123), the embodiment 150 controls, corrects, adjusts, and/or regulates, its yaw with a rudder 155 that is rotatably connected to a rudder shaft 156.

Similarly to the embodiments 100 and 120, the embodiment 150 comprises an upper buoyant chamber 153 which causes the embodiment to float adjacent to an upper surface 151 of a body of water over which waves pass. Similarly to the embodiments 100 and 120, the embodiment 150 further comprises a lower chamber 154, and its upper and lower chambers are structurally connected by a central cylindrical tube 157.

The propulsive shroud 152 of embodiment 150 is attached, and/or affixed, to the upper chamber 153 at, and/or along, an upper seam (not visible) oriented horizontally, and/or within a plane normal to a longitudinal axis 158 of the embodiment. The propulsive shroud is attached, and/or affixed, to the lower chamber 154 at, and/or along, a lower seam 159 oriented horizontally, and/or within a plane normal to a longitudinal axis 158 of the embodiment. The propulsive shroud 152 may be considered as being directly attached to the upper chamber 153 and/or the lower chamber 154. For example, the propulsive shroud 152 may directly contact the surfaces of the upper chamber 153 and/or the surfaces of the lower chamber 154. Directly attached may also refer to the propulsive shroud 152 being welded or otherwise adhered to the upper chamber 153 and/or the lower chamber 154. That is, an upper seam and a lower seam may comprise welded material, an adhesive layer, or the like. The radius of curvature of the semi-cylindrical propulsive shroud 152 of embodiment 150 is substantially less than the radii of the upper 153 and lower 154 chambers.

As a consequence of, and/or in response to, its obstruction of the motion of a wave at the embodiment 150, the propulsive shroud 152 produces a lateral force that tends to propel 160 the embodiment in a "forward" direction, i.e., in a direction relative to the propulsive shroud that is opposite the direction of the propulsive shroud with respect to, and/or away from, the rudder 155.

The semi-cylindrical propulsive shroud 152 of embodiment 150 is approximately radially symmetrical about, and coaxial with, the embodiment's longitudinal axis 158. The angular extent of the semi-cylindrical propulsive shroud about the embodiment's longitudinal axis is approximately 180 degrees. Thus, the propulsive shroud of embodiment 150 is substantially a "half-pipe."

A dome 161 affixed to a top side of the upper buoyant chamber 153 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a rudder control circuit (not shown) that the embodiment control circuit uses to control the angular orientation of the rudder 155, e.g., through an activation and/or control of an electrical worm-screw a rotation of which controls the angular position and/or orientation of the rudder, in order to alter and/or control the yaw 162 of the embodiment.

An embodiment similar to the one illustrated in FIG. 15 contains an internal power take off that converts a wave-induced motion of the embodiment into an electrical power that is then used to provide electrical power to, and energize, the electrical components and systems, as well as to provide power to the rudder 155, e.g., to an electrical worm-screw motor (not shown) that rotates the rudder about the vertical rudder shaft 156 rotatably connecting the rudder to the rest of the embodiment.

An embodiment similar to the one illustrated in FIG. 15 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the rudder 155, e.g., to an electrical worm-screw motor (not shown) that rotates the rudder about the vertical rudder shaft 156 rotatably connecting the rudder to the rest of the embodiment.

Figure 16:
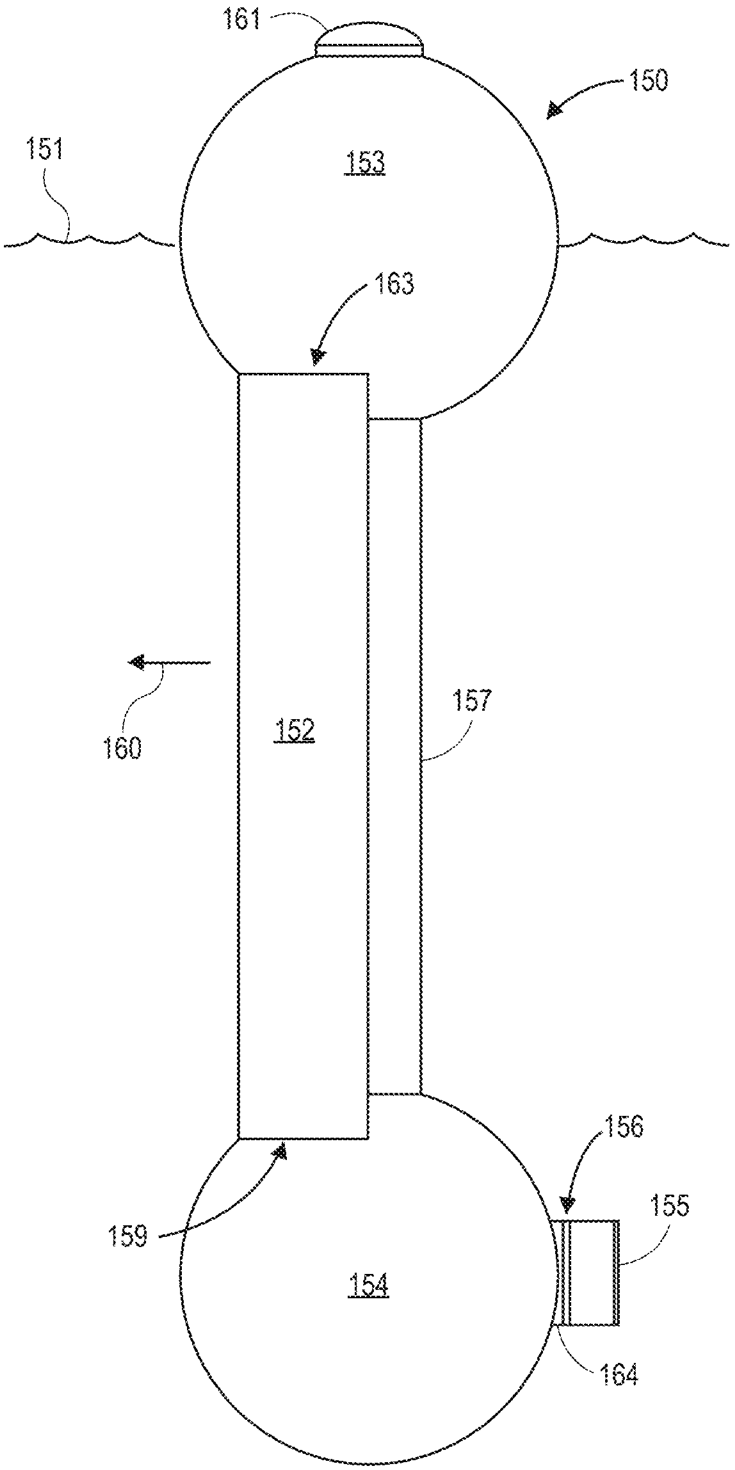
FIG. 16 is a side view of the third embodiment of the present invention.

FIG. 16 shows a side view of the same embodiment 150 of the current disclosure that is illustrated in FIG. 15.

The embodiment's propulsive shroud 152 is attached to the upper chamber 153 at, and/or along, an upper seam 163 oriented horizontally, and/or within a plane normal to a longitudinal axis (158 in FIG. 15) of the embodiment.

The rudder shaft 156 by which the rudder 155 is rotatably connected to the other parts and/or portions of the embodiment 150 is mounted to a bulwark 164 rigidly connected to, and/or integrated within, the structure of the embodiment's lower chamber 154.

Figure 17:
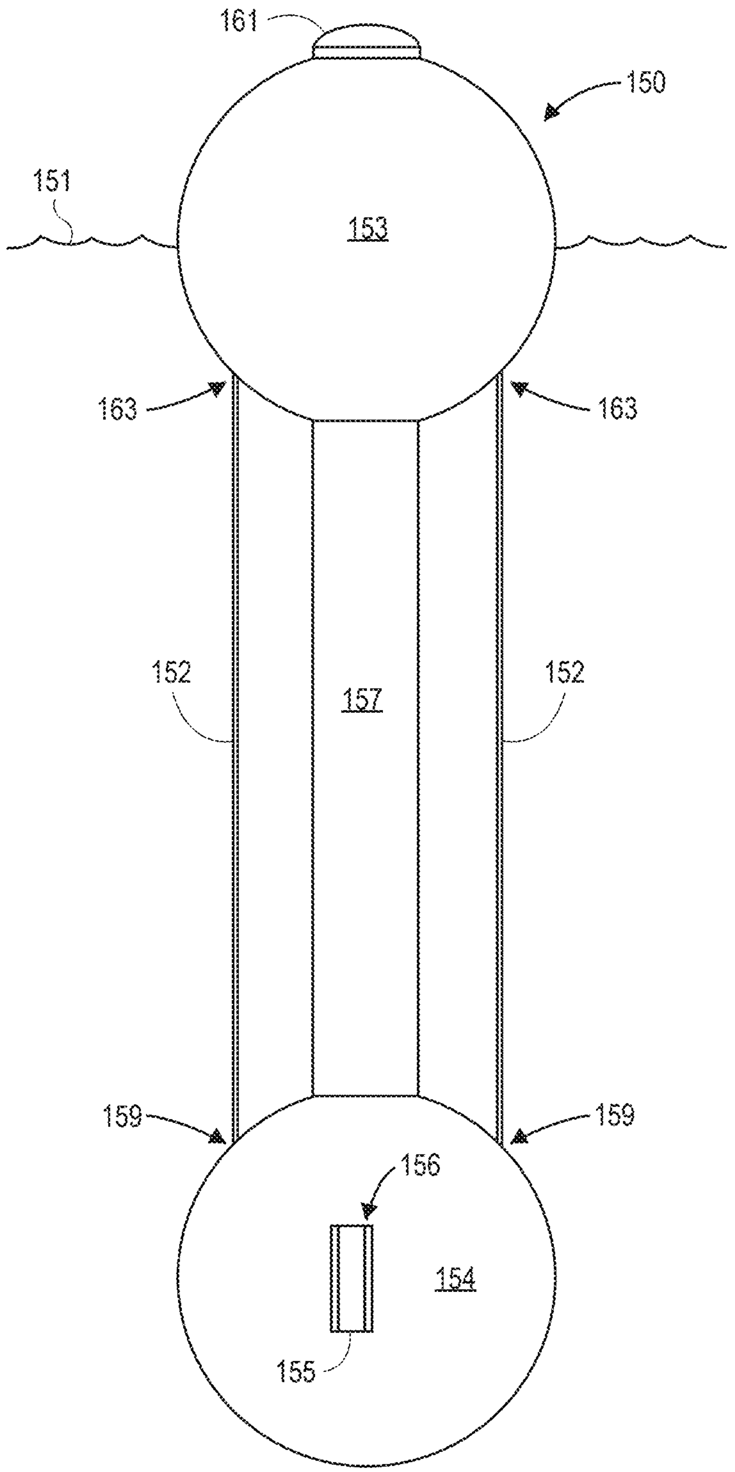
FIG. 17 is a side view of the third embodiment of the present invention.

FIG. 17 shows a side view of the same embodiment 150 of the current disclosure that is illustrated in FIGS. 15 and 16.

Figure 18:
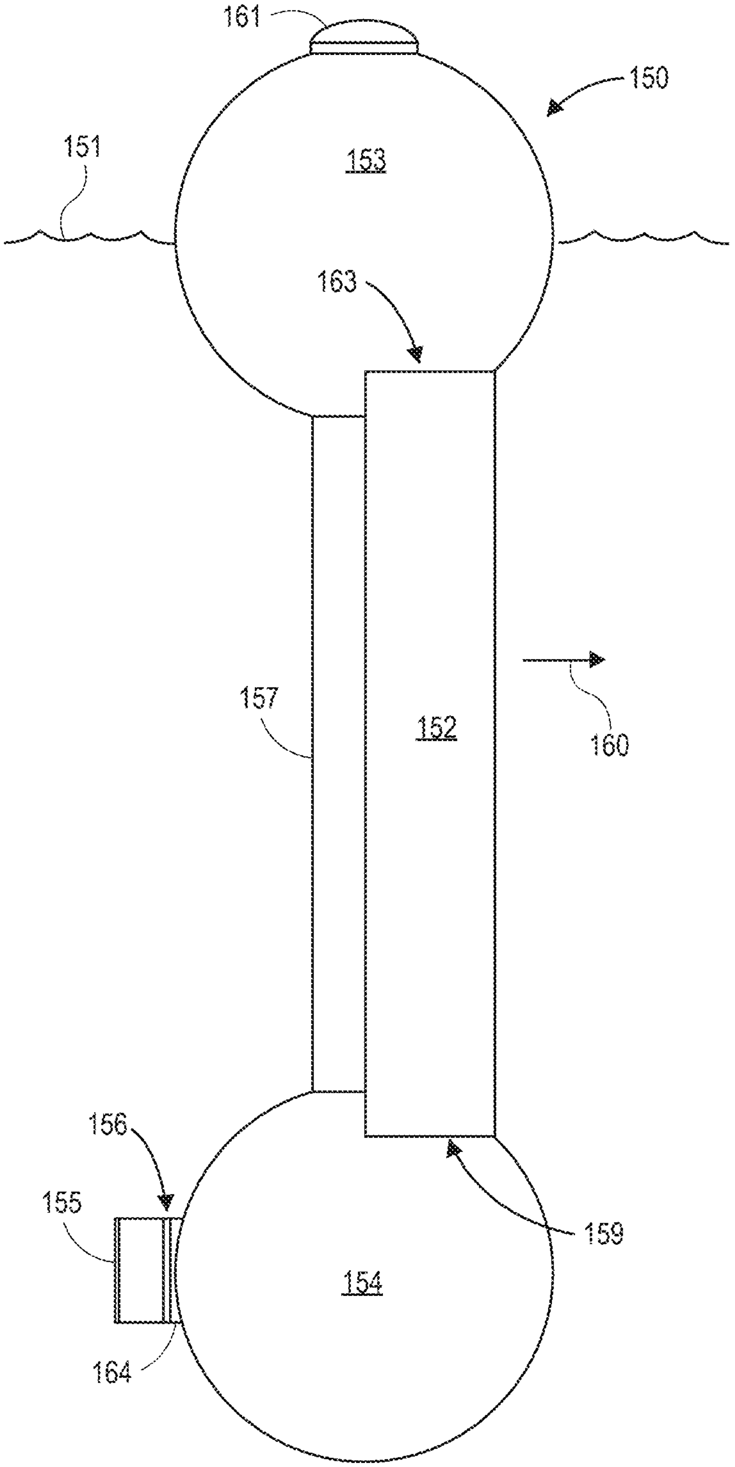
FIG. 18 is a side view of the third embodiment of the present invention.

FIG. 18 shows a side view of the same embodiment 150 of the current disclosure that is illustrated in FIGS. 15-17.

Figure 19:
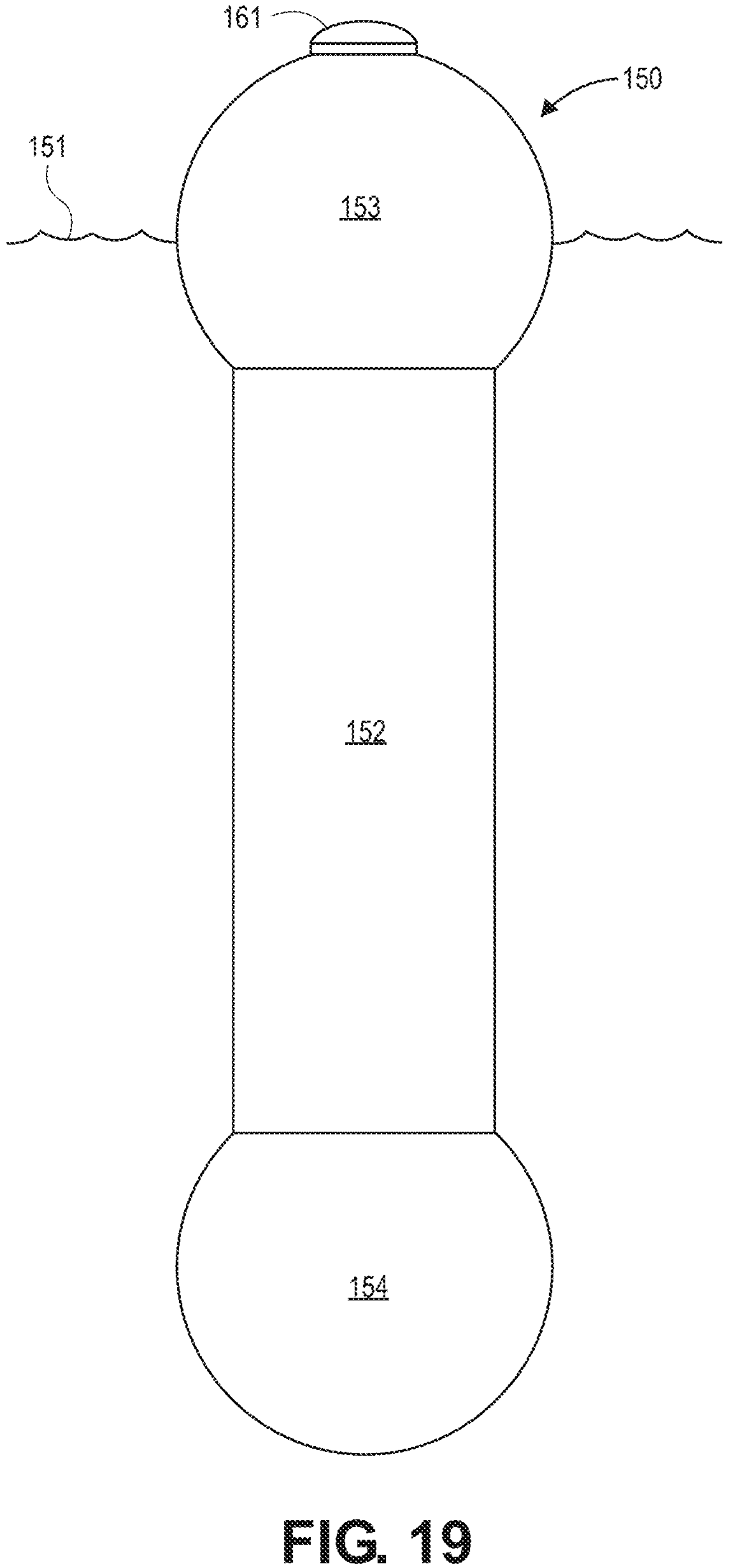
FIG. 19 is a side view of the third embodiment of the present invention.

FIG. 19 shows a side view of the same embodiment 150 of the current disclosure that is illustrated in FIGS. 15-18.

Figure 20:
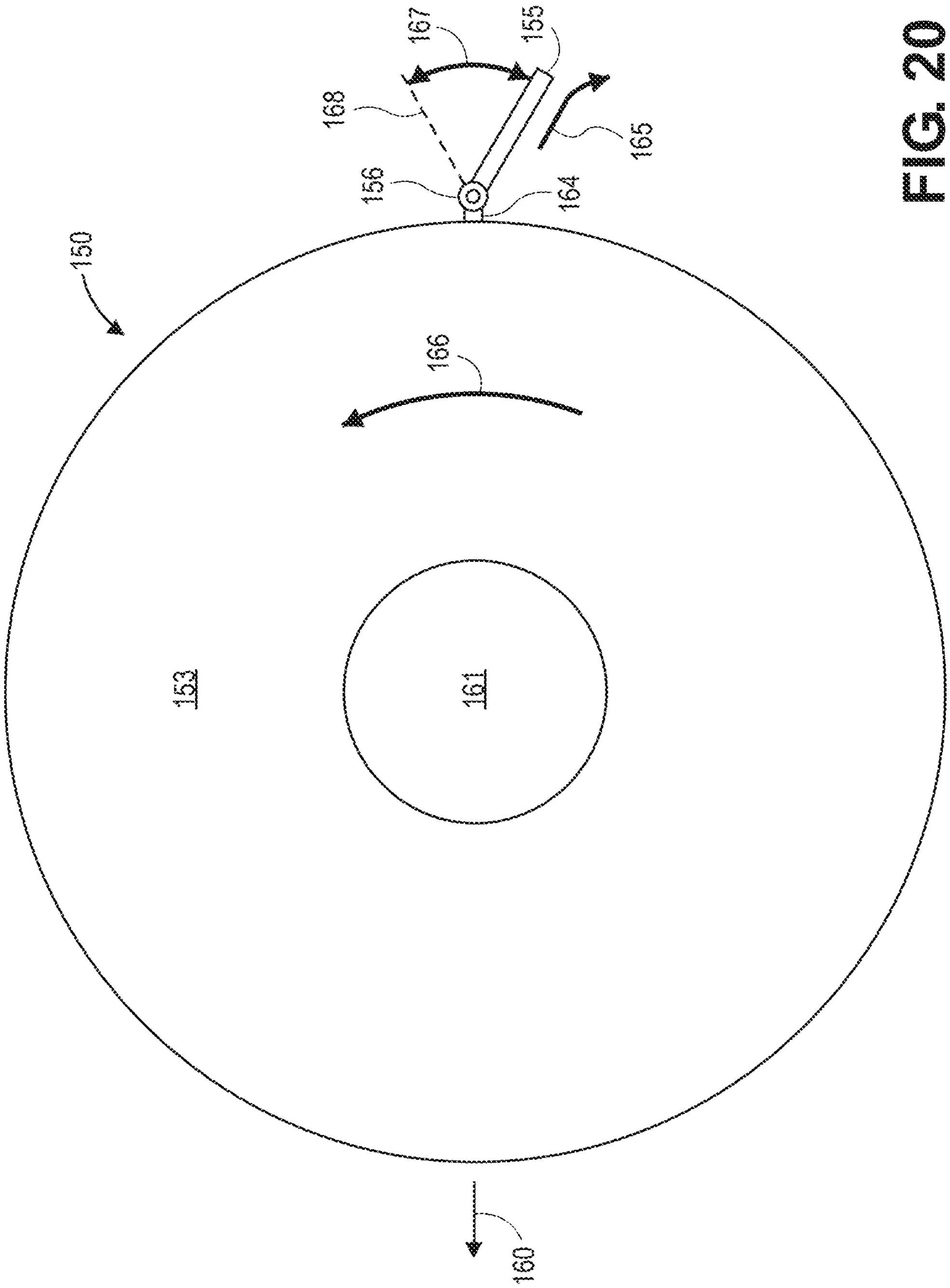
FIG. 20 is a top-down view of the third embodiment of the present invention.

FIG. 20 shows a top-down view of the same embodiment 150 of the current disclosure that is illustrated in FIGS. 15-19.

When the embodiment's control circuit (not shown) within the embodiment's dome 161 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 155, and not shown) operably connected to rudder 155 so as to rotate that rudder in a direction that deflects 165 water in a clockwise direction (relative to a top-down perspective), then that rudder's thrust will impart to the embodiment 150 a counterclockwise torque which will tend to alter the embodiment's yaw by rotating 166 the embodiment about its longitudinal axis (158 in FIG. 15) in a counterclockwise direction (relative to a top-down perspective).

By adjusting the angular position of the rudder 155, to an orientation within a range 167 of rudder orientations, the embodiment's control circuit can alter the yaw, e.g., 162 in FIG. 15, of the embodiment, thereby enabling the embodiment's control circuit to steer the embodiment and navigate the embodiment to a geospatial location at the surface 121 of the body of water. For example, when moved to an angular position 168 laterally opposite that of the illustrated angular position (at 155) the torque, and the rotation, imparted to the embodiment would be opposite that illustrated at 166.

An embodiment similar to the one illustrated in FIGS. 15-20 contains an internal power take off that converts a wave-induced motion of the embodiment into an electrical power that is then used to provide electrical power to, and energize, the electrical components and systems, as well as to provide power to the motor (not shown) that rotates the embodiment's rudder.

An embodiment similar to the one illustrated in FIG. 15-20 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder.

An embodiment similar to the one illustrated in FIG. 15-20 includes, incorporates, utilizes, and/or further comprises, thrusters, such as those illustrated in conjunction with embodiment 120 illustrated in FIGS. 8-14.

Figure 21:
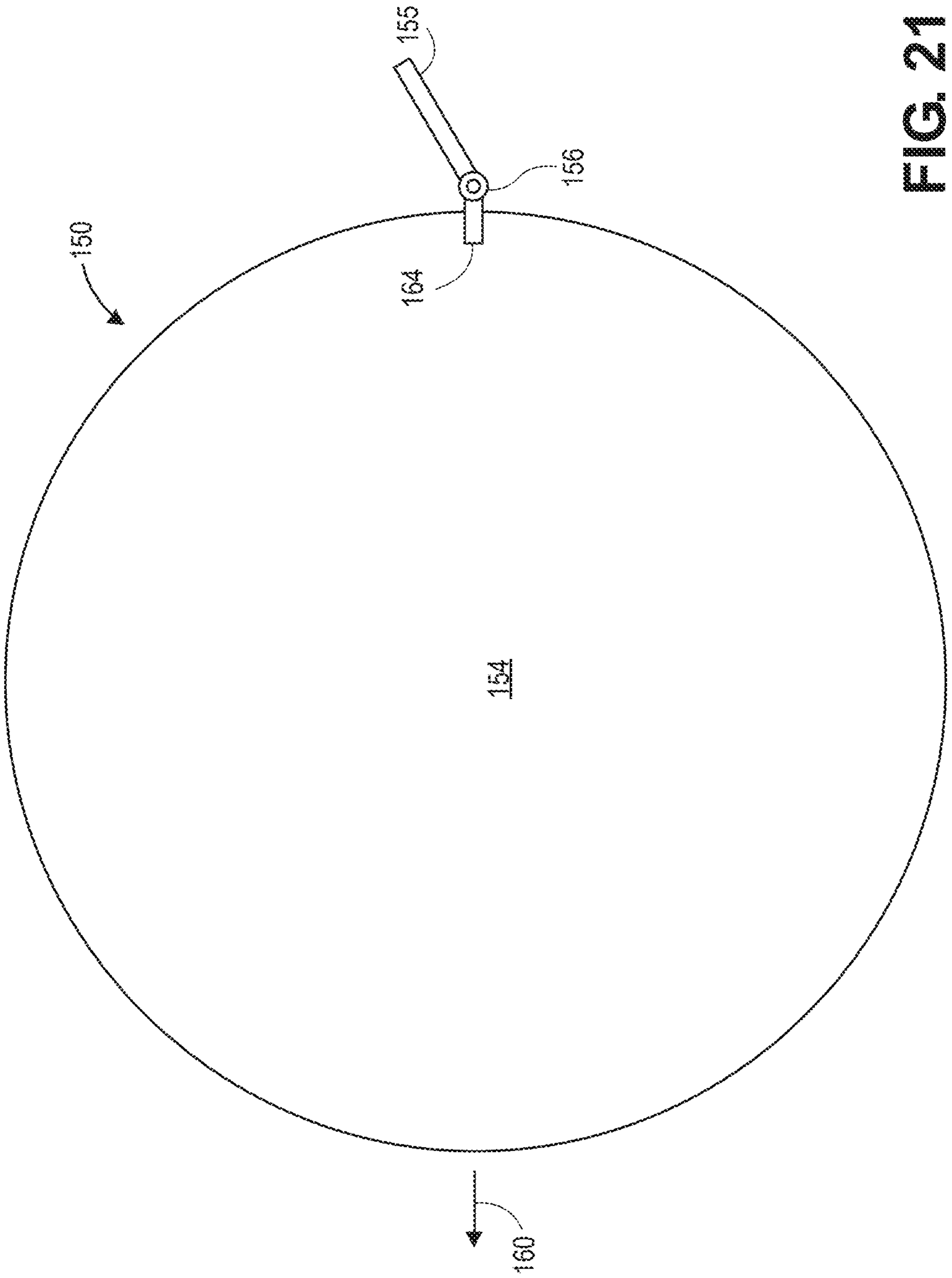
FIG. 21 is a bottom-up view of the third embodiment of the present invention.

FIG. 21 shows a bottom-up view of the same embodiment 150 of the current disclosure that is illustrated in FIGS. 15-20.

Figure 22:
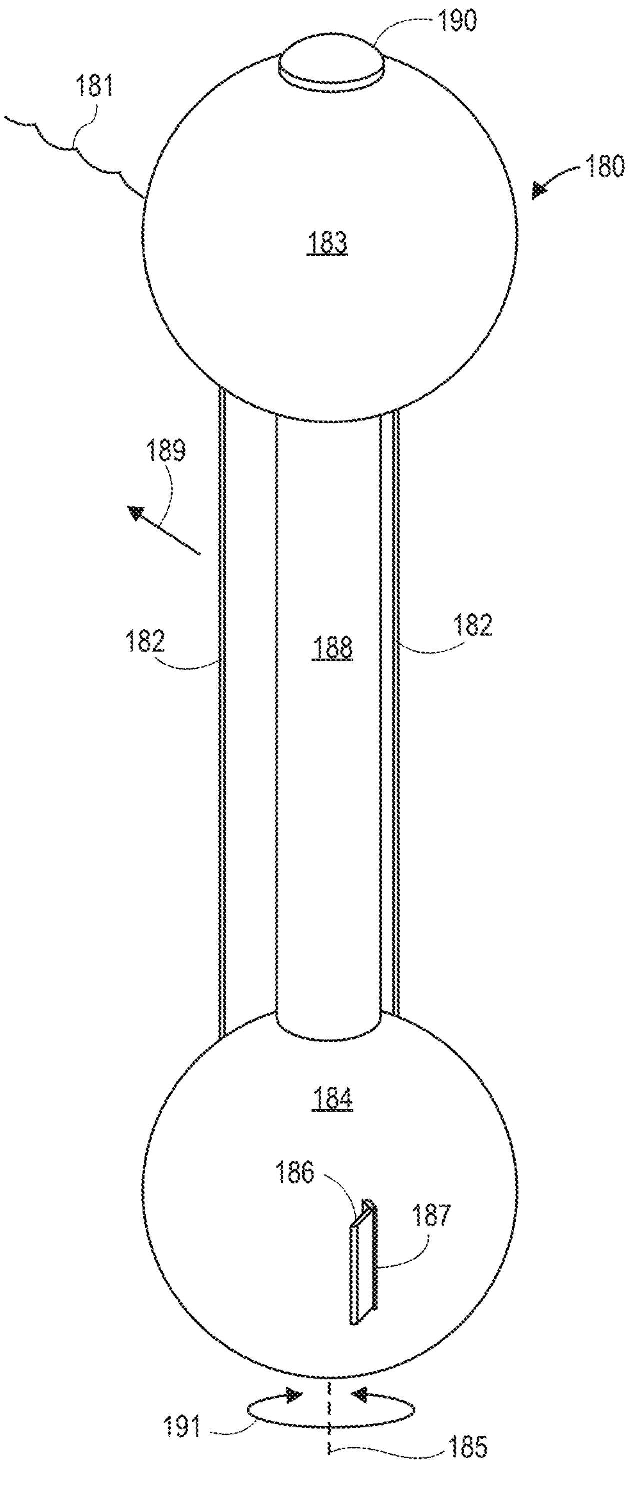
FIG. 22 is a perspective side view of a fourth embodiment of the present invention.

FIG. 22 shows a side perspective view of an embodiment 180 of the current disclosure.

The embodiment 180 floats adjacent to an upper surface 181 of a body of water over which waves pass. The embodiment 180 is similar to the embodiments 100, 120, and 150. Similar to the embodiment 150, the embodiment 180 has a radius of curvature of its semi-cylindrical propulsive shroud 182 is substantially less than the radii of the upper buoyant chamber 183 and the lower chamber 184 to which it is connected, attached, and/or affixed. The propulsive shroud 182 may be considered as being directly attached to the upper chamber 183 and/or the lower chamber 184. For example, the propulsive shroud 182 may directly contact the surfaces of the upper chamber 183 and/or the surfaces of the lower chamber 184. Directly attached may also refer to the propulsive shroud 182 being welded or otherwise adhered to the upper chamber 183 and/or the lower chamber 184. That is, an upper seam and a lower seam may comprise welded material, an adhesive layer, or the like. And, similar to the embodiments 100, 120, and 150, the semi-cylindrical propulsive shroud of embodiment 180 is approximately coaxial with the embodiment's longitudinal axis 185.

However, whereas the angular extent of the semi-cylindrical propulsive shrouds of the embodiments 100, 120, and 150 about their respective longitudinal axes is approximately 180 degrees, the angular extent of the semi-cylindrical propulsive shroud 182 of the embodiment 180 is approximately 90 degrees—approximately half that of the other embodiments. Though, it is to be appreciated that the angular extent of the semi-cylindrical propulsive shroud 182 may be as small as 10 degrees.

Similar to the embodiment 150, embodiment 180 controls, corrects, adjusts, and/or regulates, its yaw with a rudder 186 that is rotatably connected to a rudder shaft 187.

Similarly to the embodiments 100, 120, and 150, the embodiment 180 comprises an upper buoyant chamber 183 which causes the embodiment to float adjacent to an upper surface 181 of a body of water over which waves pass. Similarly to the embodiments 100, 120, and 150, the embodiment 180 further comprises a lower chamber 184, and its upper and lower chambers are structurally connected by a central cylindrical tube 188.

The propulsive shroud 182 of embodiment 180 is attached, and/or affixed, to the upper chamber 183 at, and/or along, an upper seam (not visible) oriented horizontally, and/or within a plane normal to a longitudinal axis 185 of the embodiment. The propulsive shroud is attached, and/or affixed, to the lower chamber 184 at, and/or along, a lower seam (not visible) oriented horizontally, and/or within a plane normal to a longitudinal axis 185 of the embodiment. Similar to embodiment 150, the radius of curvature of the semi-cylindrical propulsive shroud 152 of embodiment 180 is substantially less than the radii of the upper 183 and lower 184 chambers.

As a consequence of, and/or in response to, its obstruction of the motion of a wave at the embodiment 180, the propulsive shroud 182 produces a lateral force that tends to propel 189 the embodiment in a "forward" direction, i.e., in a direction relative to the propulsive shroud that is opposite the direction of the propulsive shroud with respect to, and/or away from, the rudder 186.

A dome 190 affixed to a top side of the upper buoyant chamber 183 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a rudder control circuit (not shown) that the embodiment control circuit uses to control the angular orientation of the rudder 186, e.g., through an activation and/or control of an electrical worm-screw a rotation of which controls the angular position and/or orientation of the rudder, in order to alter and/or control the yaw 191 of the embodiment.

An embodiment similar to the one illustrated in FIG. 22 contains an internal power take off that converts a wave-induced motion of the embodiment into an electrical power that is then used to provide electrical power to, and energize, the electrical components and systems, as well as to provide power to the rudder 186, e.g., to an electrical worm-screw motor (not shown) that rotates the rudder about the vertical rudder shaft 187 rotatably connecting the rudder to the rest of the embodiment.

An embodiment similar to the one illustrated in FIG. 22 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the rudder 186, e.g., to an electrical worm-screw motor (not shown) that rotates the rudder about the vertical rudder shaft 187 rotatably connecting the rudder to the rest of the embodiment.

Figure 23:
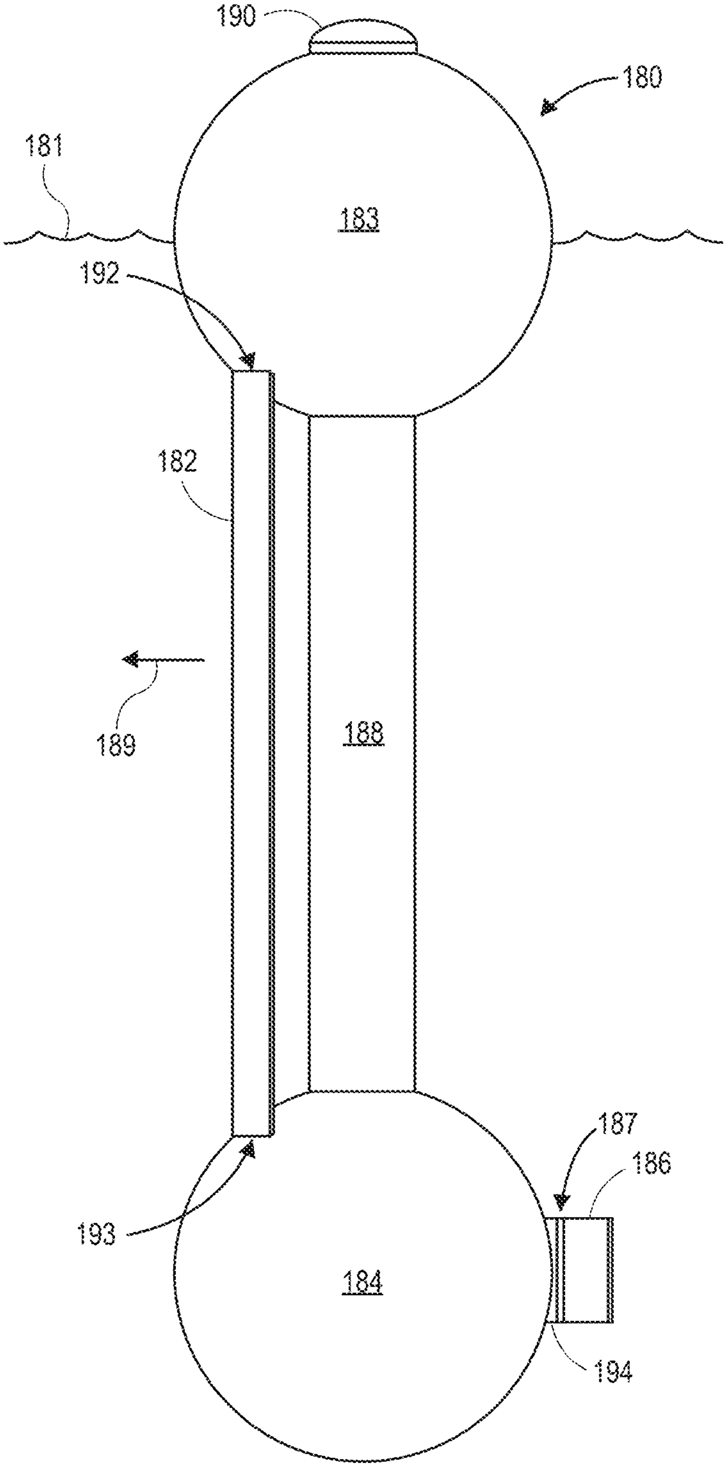
FIG. 23 is a side view of the fourth embodiment of the present invention.

FIG. 23 shows a side view of the same embodiment 180 of the current disclosure that is illustrated in FIG. 22.

The embodiment's propulsive shroud 182 is attached to the upper chamber 183 at, and/or along, an upper seam 192 oriented horizontally, and/or within a plane normal to a longitudinal axis (185 of FIG. 22) of the embodiment. The propulsive shroud is attached to the lower chamber 184 at, and/or along, a lower seam 193 oriented horizontally, and/or within a plane normal to a longitudinal axis (185 of FIG. 22) of the embodiment.

The rudder shaft 187 by which the rudder 186 is rotatably connected to the other parts and/or portions of the embodiment 180 is mounted to a bulwark 194 rigidly connected to, and/or integrated within, the structure of the embodiment's lower chamber 184.

Figure 24:
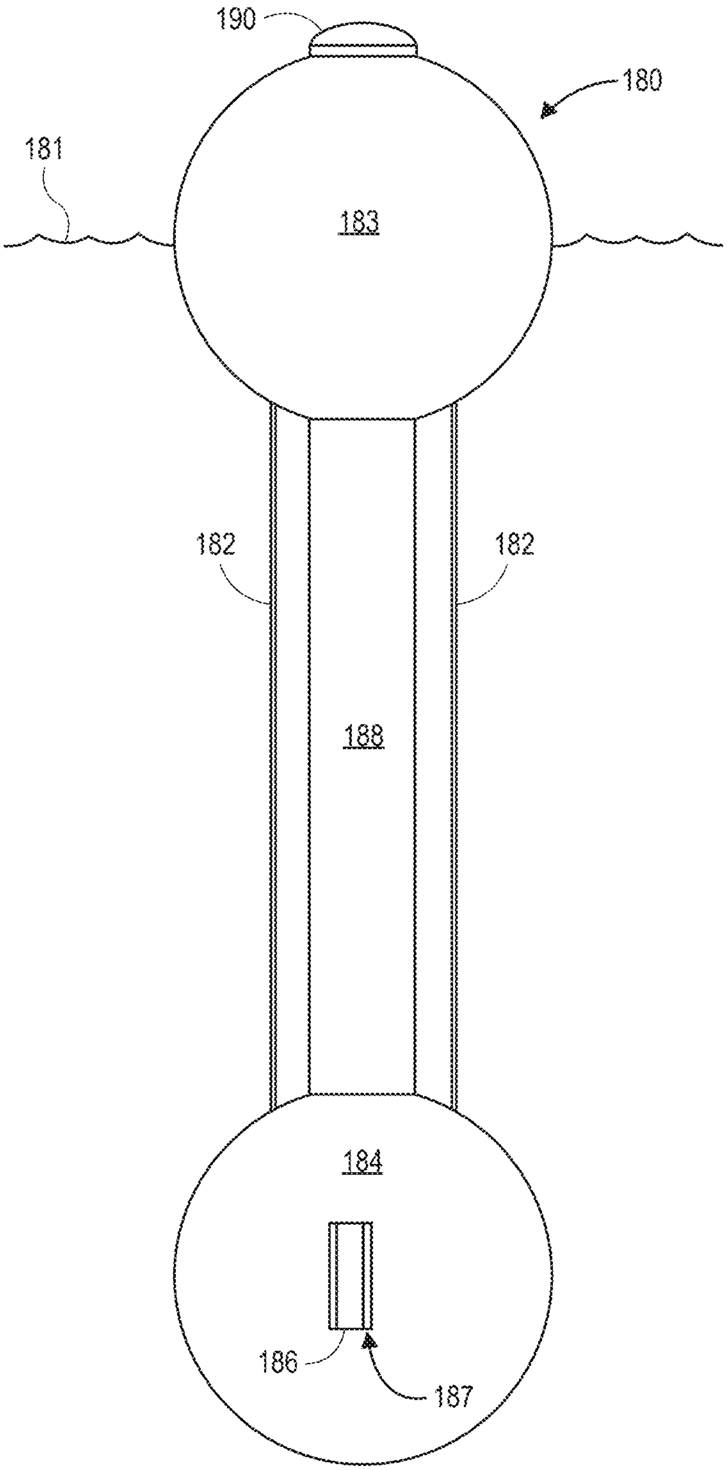
FIG. 24 is a side view of the fourth embodiment of the present invention.

FIG. 24 shows a side view of the same embodiment 180 of the current disclosure that is illustrated in FIGS. 22 and 23.

Figure 25:
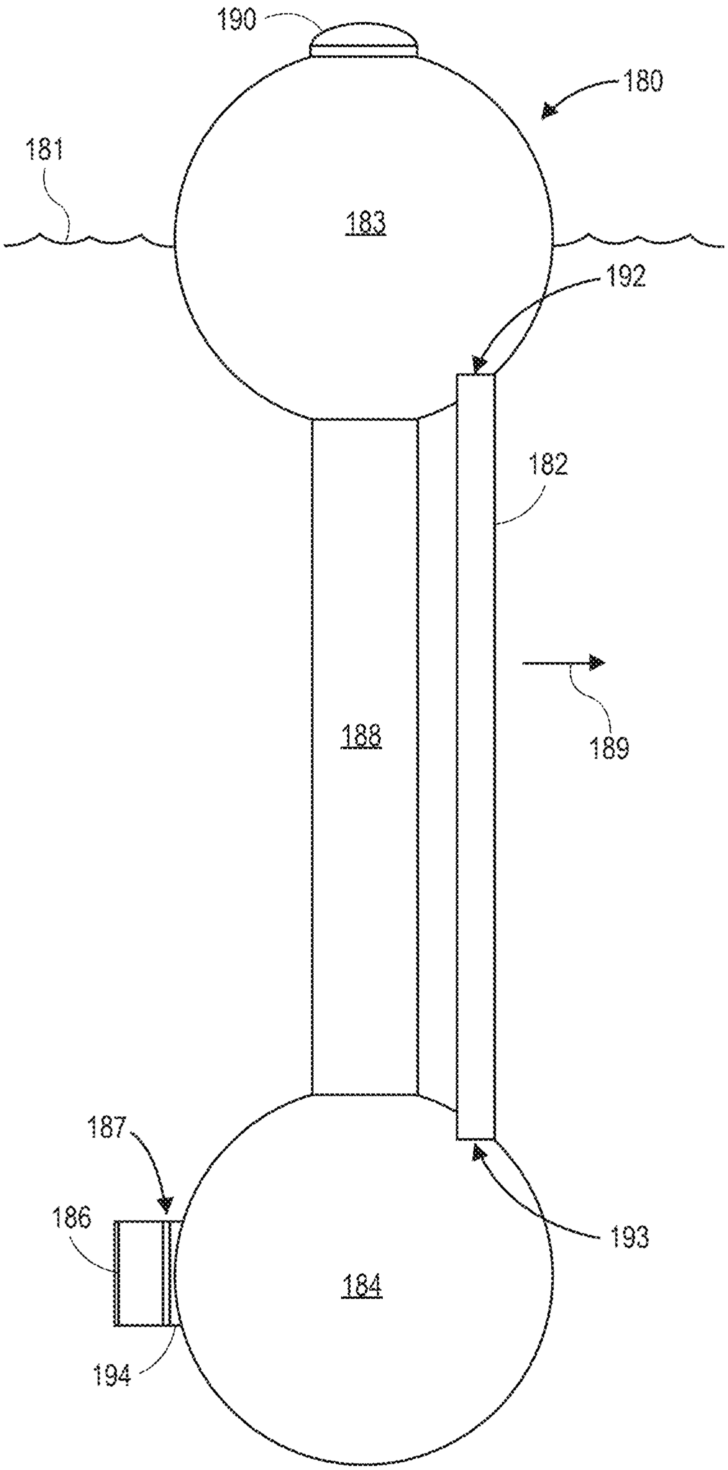
FIG. 25 is a side view of the fourth embodiment of the present invention.

FIG. 25 shows a side view of the same embodiment 180 of the current disclosure that is illustrated in FIGS. 22-24.

Figure 26:
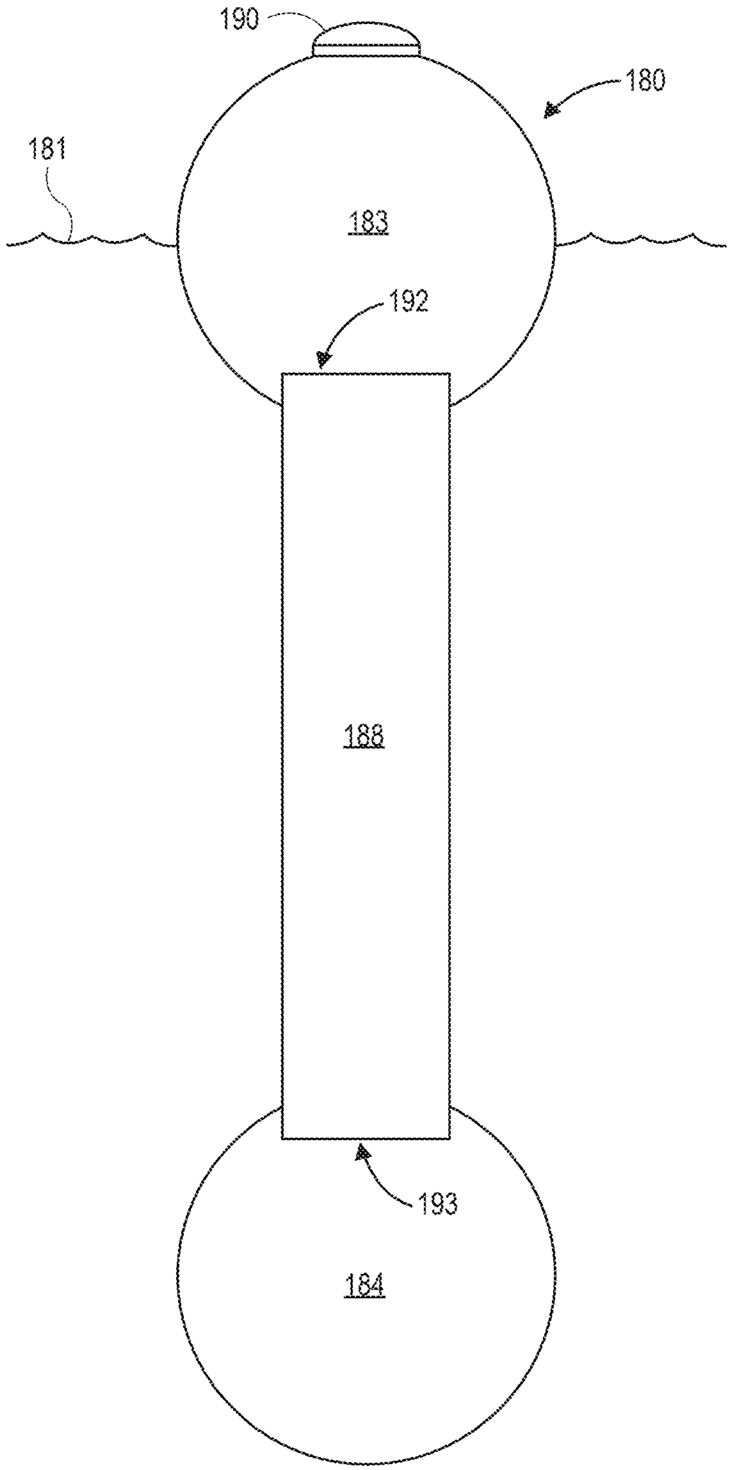
FIG. 26 is a side view of the fourth embodiment of the present invention.

FIG. 26 shows a side view of the same embodiment 180 of the current disclosure that is illustrated in FIGS. 22-25.

Figure 27:
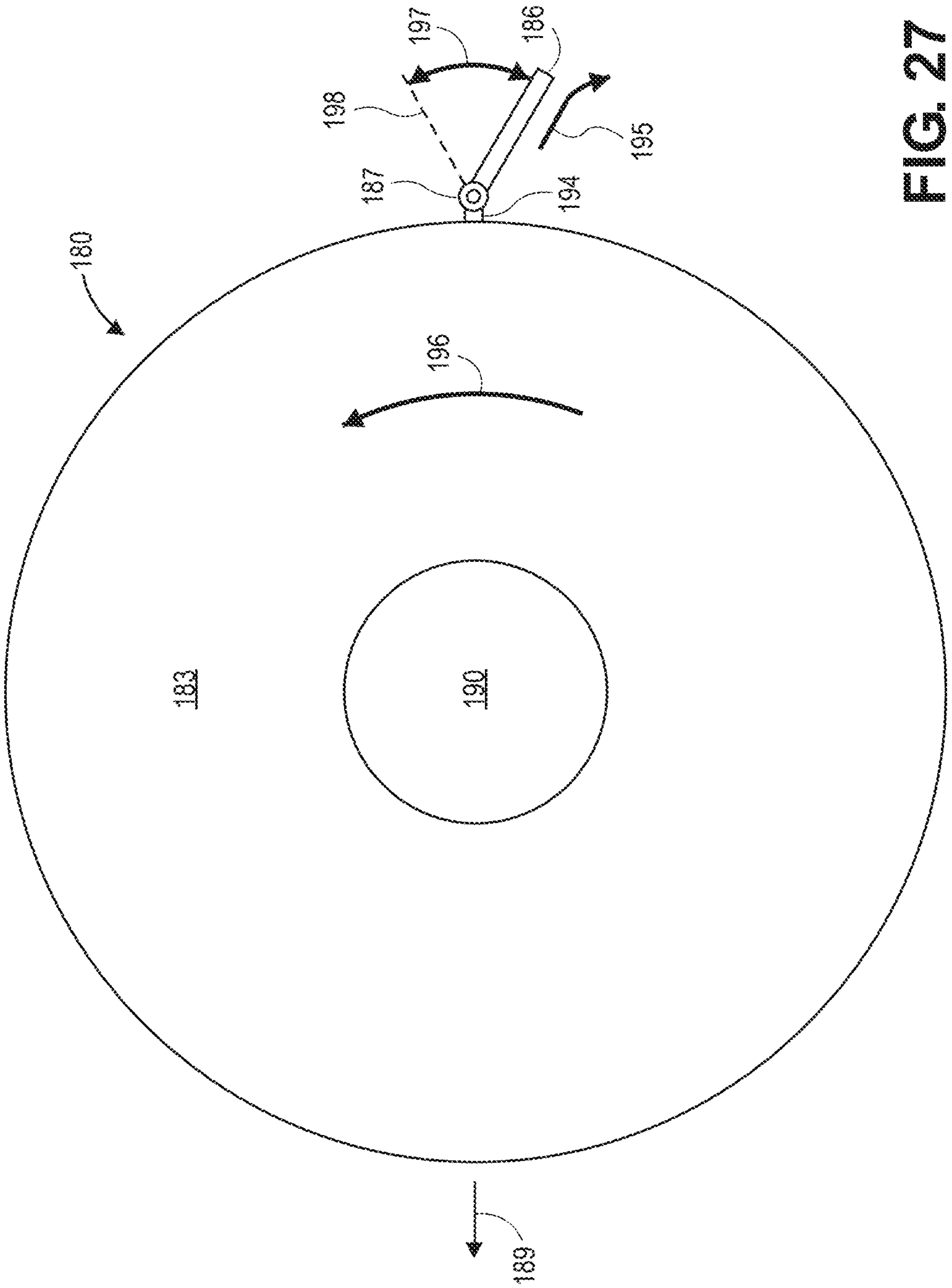
FIG. 27 is a top-down view of the fourth embodiment of the present invention.

FIG. 27 shows a top-down view of the same embodiment 180 of the current disclosure that is illustrated in FIGS. 22-26.

When the embodiment's control circuit (not shown) within the embodiment's dome 190 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 186, and not shown) operably connected to rudder 186 so as to rotate that rudder in a direction that deflects 195 water in a clockwise direction (relative to a top-down perspective), then that rudder's thrust will impart to the embodiment 180 a counterclockwise torque which will tend to alter the embodiment's yaw by rotating 196 the embodiment about its longitudinal axis (185 in FIG. 22) in a counterclockwise direction (relative to a top-down perspective).

By adjusting the angular position of the rudder 186, to an orientation within a range 197 of rudder orientations, the embodiment's control circuit can alter the yaw, e.g., 191 in FIG. 22, of the embodiment, thereby enabling the embodiment's control circuit to steer the embodiment and navigate the embodiment to a geospatial location at the surface 181 of the body of water. For example, when moved to an angular position 198 laterally opposite that of the illustrated angular position (at 186) the torque, and the rotation, imparted to the embodiment would be opposite that illustrated at 196.

An embodiment similar to the one illustrated in FIGS. 22-27 contains an internal power take off that converts a wave-induced motion of the embodiment into an electrical power that is then used to provide electrical power to, and energize, the electrical components and systems, as well as to provide power to the motor (not shown) that rotates the embodiment's rudder.

An embodiment similar to the one illustrated in FIG. 22-27 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder.

An embodiment similar to the one illustrated in FIG. 22-27 includes, incorporates, utilizes, and/or further comprises, thrusters, such as those illustrated in conjunction with embodiment 120 illustrated in FIGS. 8-14.

Figure 28:
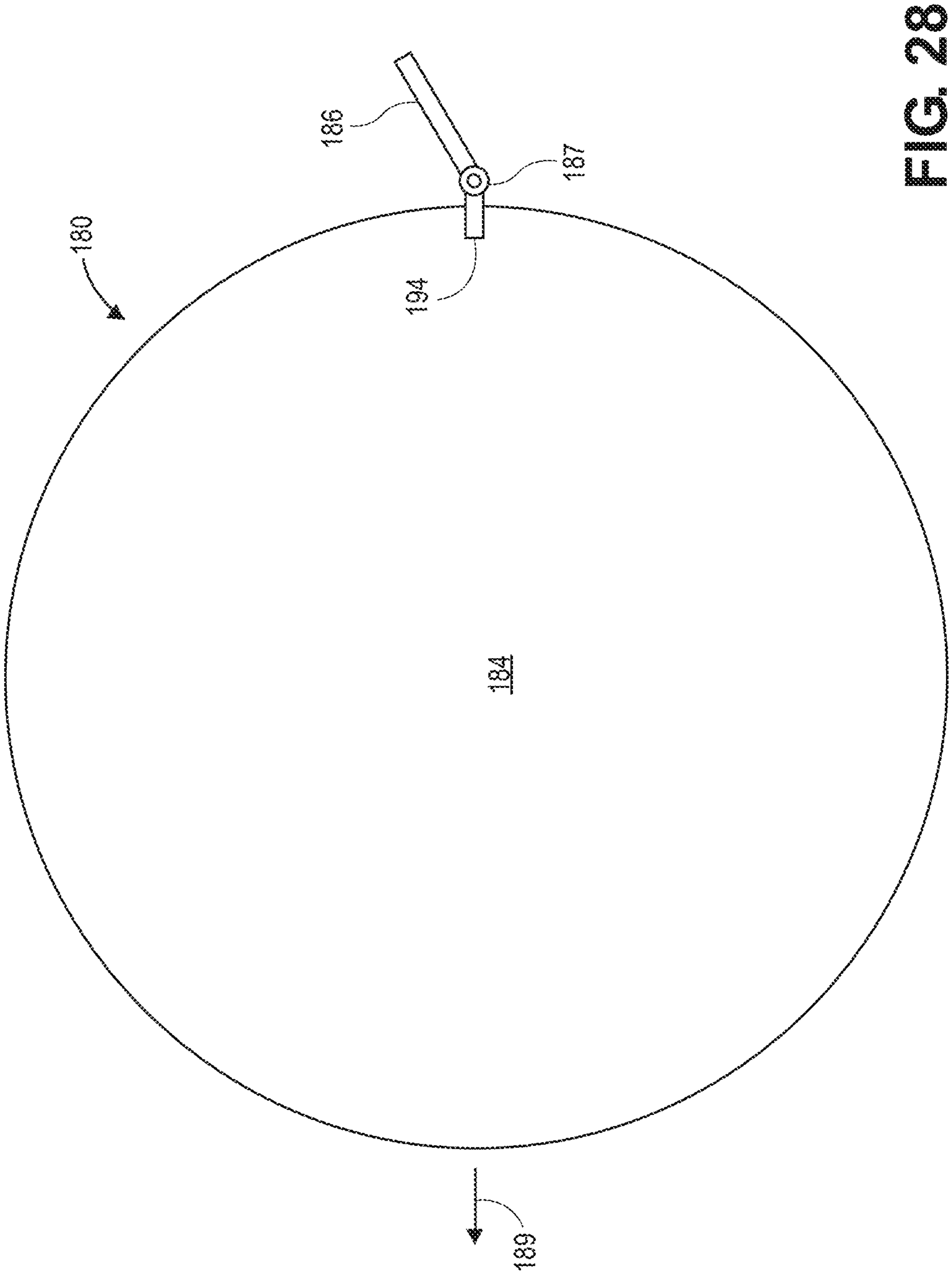
FIG. 28 is a bottom-up view of the fourth embodiment of the present invention.

FIG. 28 shows a bottom-up view of the same embodiment 180 of the current disclosure that is illustrated in FIGS. 22-27.

Figure 29:
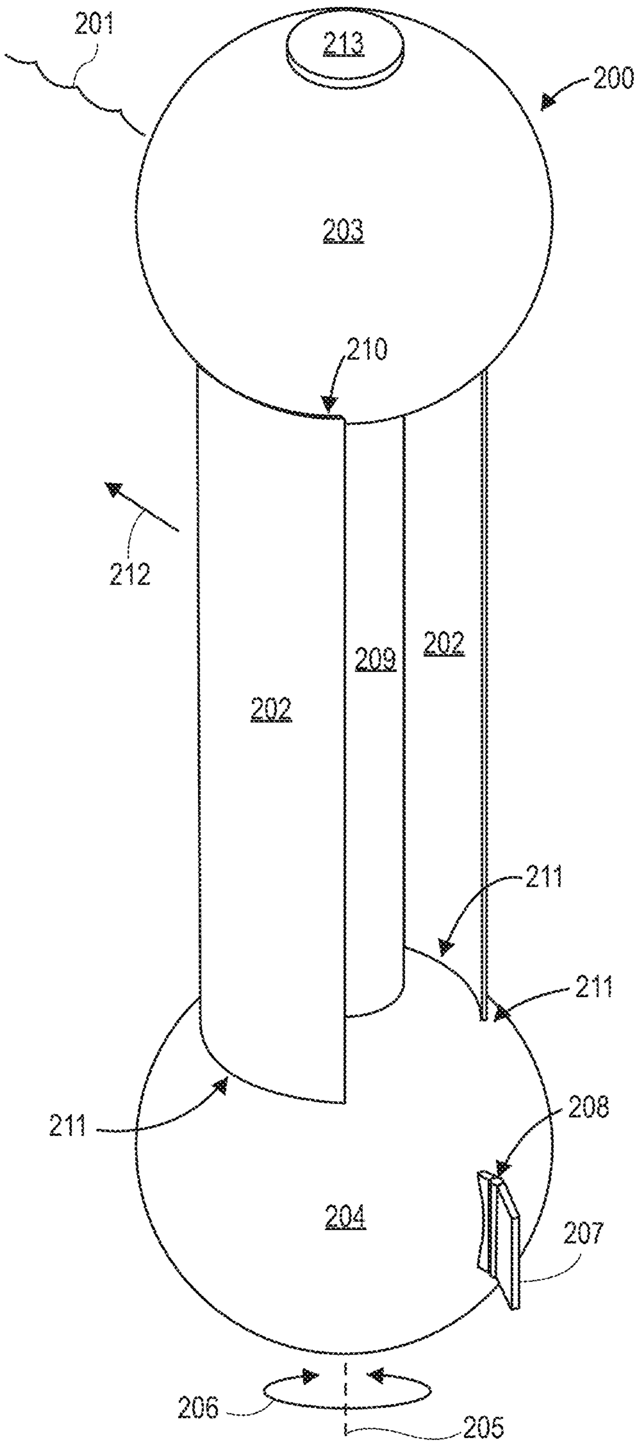
FIG. 29 is a perspective side view of a fifth embodiment of the present invention.

FIG. 29 shows a side perspective view of an embodiment 200 of the current disclosure.

The embodiment 200 floats adjacent to an upper surface 201 of a body of water over which waves pass. The embodiment 200 has a radius of curvature of its semi-cylindrical propulsive shroud 202 is substantially less than the radii of the upper buoyant chamber 203 and the lower chamber 204 to which it is connected, attached, and/or affixed. The propulsive shroud 202 may be considered as being directly attached to the upper chamber 203 and/or the lower chamber 204. For example, the propulsive shroud 202 may directly contact the surfaces of the upper chamber 204 and/or the surfaces of the lower chamber 204. Directly attached may also refer to the propulsive shroud 202 being welded or otherwise adhered to the upper chamber 203 and/or the lower chamber 204. That is, an upper seam and a lower seam may comprise welded material, an adhesive layer, or the like. The semi-cylindrical propulsive shroud of embodiment 200 is approximately coaxial with the embodiment's longitudinal axis 205.

Whereas the angular extent of the semi-cylindrical propulsive shrouds of the embodiments 100, 120, and 150 about their respective longitudinal axes is approximately 180 degrees, the angular extent of the semi-cylindrical propulsive shroud 202 of the embodiment 200 is approximately 270 degrees. Though, it is to be appreciated that the angular extent of the semi-cylindrical propulsive shroud 202 may extend up to anything less than 360 degrees.

Similar to the embodiments 150 and 180, embodiment 200 controls, corrects, adjusts, and/or regulates, its yaw 206 with a rudder 207 that is rotatably connected to a rudder shaft 208.

The embodiment 200 comprises, in part, an upper buoyant chamber 203 which causes the embodiment to float adjacent to an upper surface 201 of a body of water over which waves pass. The embodiment 200 further comprises a lower chamber 204, and its upper and lower chambers are structurally connected by a central cylindrical tube 209.

The propulsive shroud 202 of embodiment 200 is attached, and/or affixed, to the upper chamber 203 at, and/or along, an upper seam 210 oriented horizontally, and/or within a plane normal to a longitudinal axis 205 of the embodiment. The propulsive shroud is attached, and/or affixed, to the lower chamber 204 at, and/or along, a lower seam 211 oriented horizontally, and/or within a plane normal to a longitudinal axis 205 of the embodiment. The radius of curvature of the semi-cylindrical propulsive shroud 202 of embodiment 200 is substantially less than the radii of the upper 203 and lower 204 chambers.

As a consequence of, and/or in response to, its obstruction of the motion of a wave at the embodiment 200, the propulsive shroud 202 produces a lateral force that tends to propel 212 the embodiment in a "forward" direction, i.e., in a direction relative to the propulsive shroud that is opposite the direction of the propulsive shroud with respect to, and/or away from, the rudder 207.

A dome 213 affixed to a top side of the upper buoyant chamber 203 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a rudder control circuit (not shown) that the embodiment control circuit uses to control the angular orientation of the rudder 207, e.g., through an activation and/or control of an electrical worm-screw a rotation of which controls the angular position and/or orientation of the rudder, in order to alter and/or control the yaw 206 of the embodiment.

An embodiment similar to the one illustrated in FIG. 29 contains an internal power take off that converts a wave-induced motion of the embodiment into an electrical power that is then used to provide electrical power to, and energize, the electrical components and systems, as well as to provide power to the rudder 207, e.g., to an electrical worm-screw motor (not shown) that rotates the rudder about the vertical rudder shaft 208 rotatably connecting the rudder to the rest of the embodiment.

An embodiment similar to the one illustrated in FIG. 29 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the rudder 207, e.g., to an electrical worm-screw motor (not shown) that rotates the rudder about the vertical rudder shaft 208 rotatably connecting the rudder to the rest of the embodiment.

Figure 30:
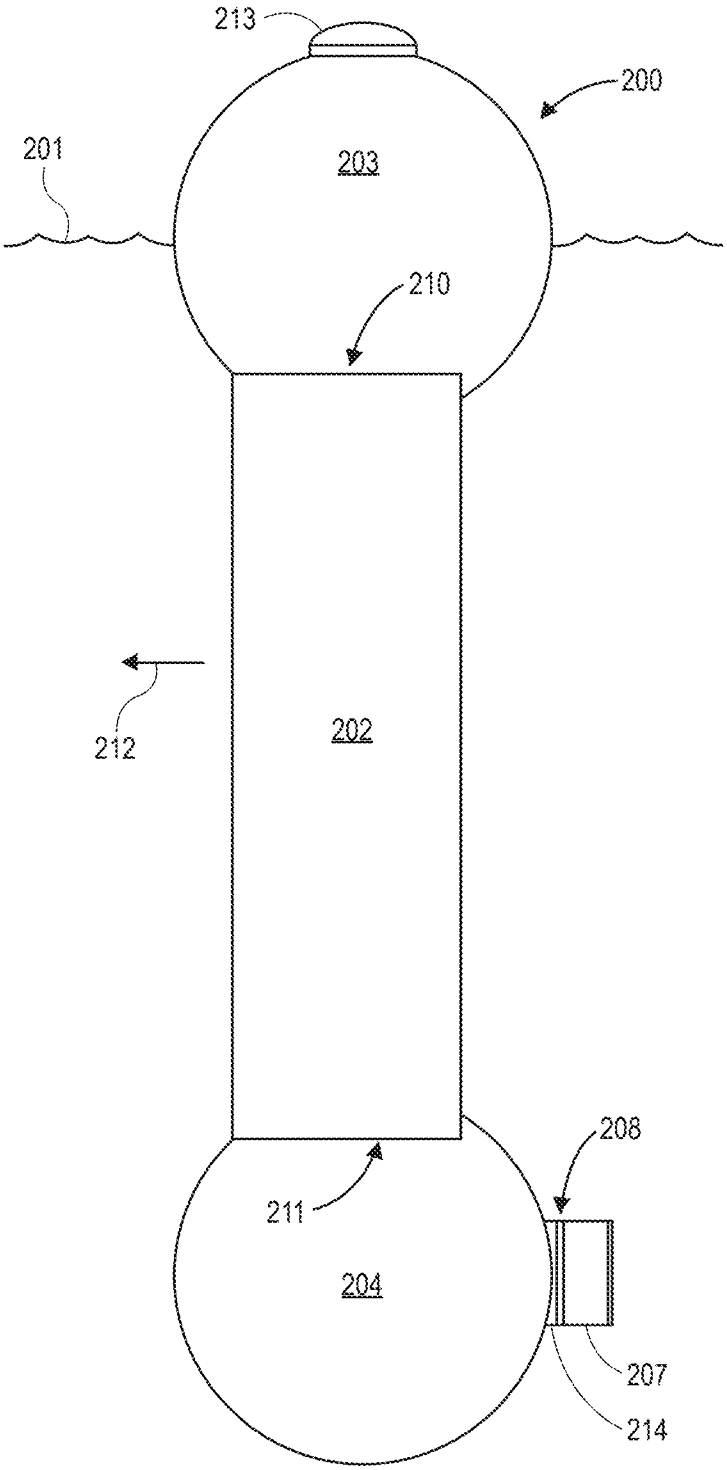
FIG. 30 is a side view of the fifth embodiment of the present invention.

FIG. 30 shows a side view of the same embodiment 200 of the current disclosure that is illustrated in FIG. 29.

The rudder shaft 208 by which the rudder 207 is rotatably connected to the other parts and/or portions of the embodiment 200 is mounted to a bulwark 214 rigidly connected to, and/or integrated within, the structure of the embodiment's lower chamber 204.

Figure 31:
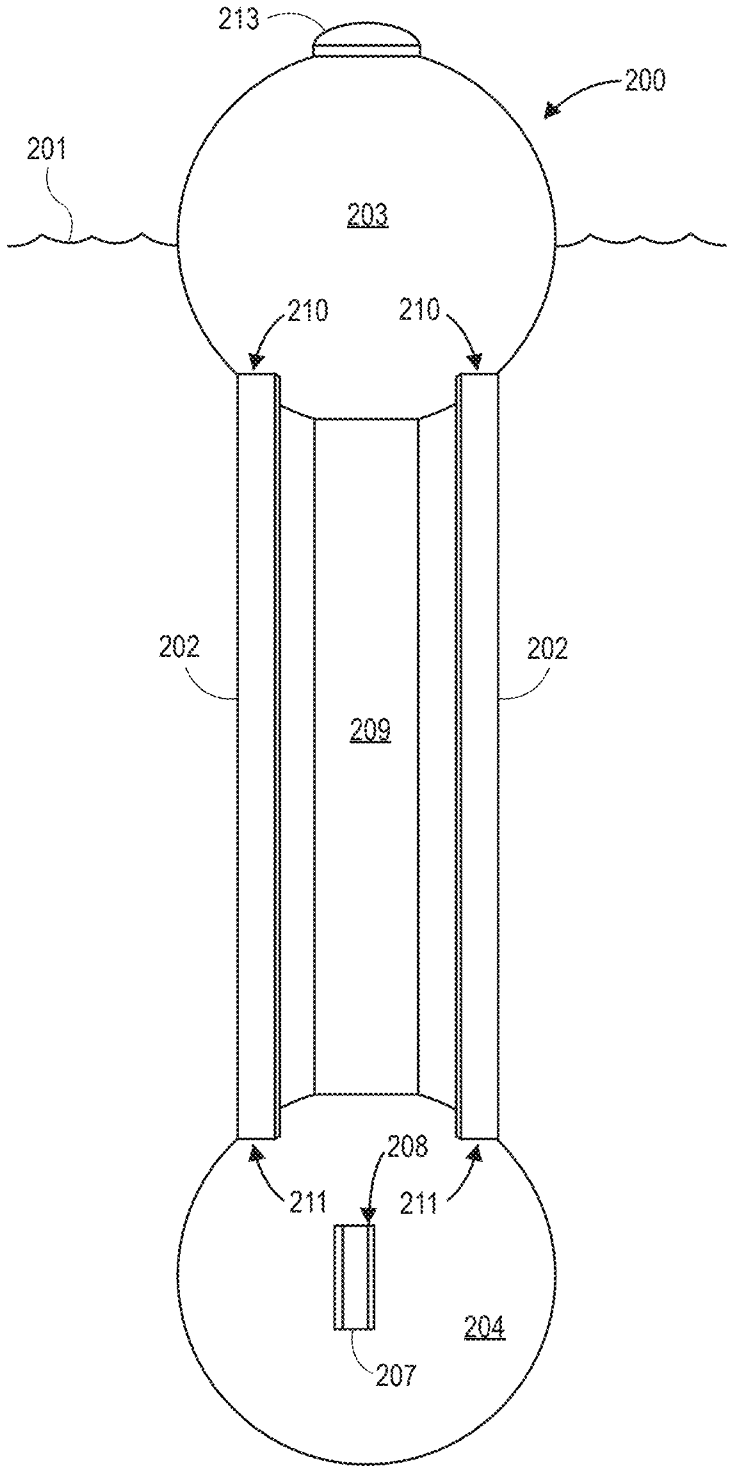
FIG. 31 is a side view of the fifth embodiment of the present invention.

FIG. 31 shows a side view of the same embodiment 200 of the current disclosure that is illustrated in FIGS. 29 and 30.

Figure 32:
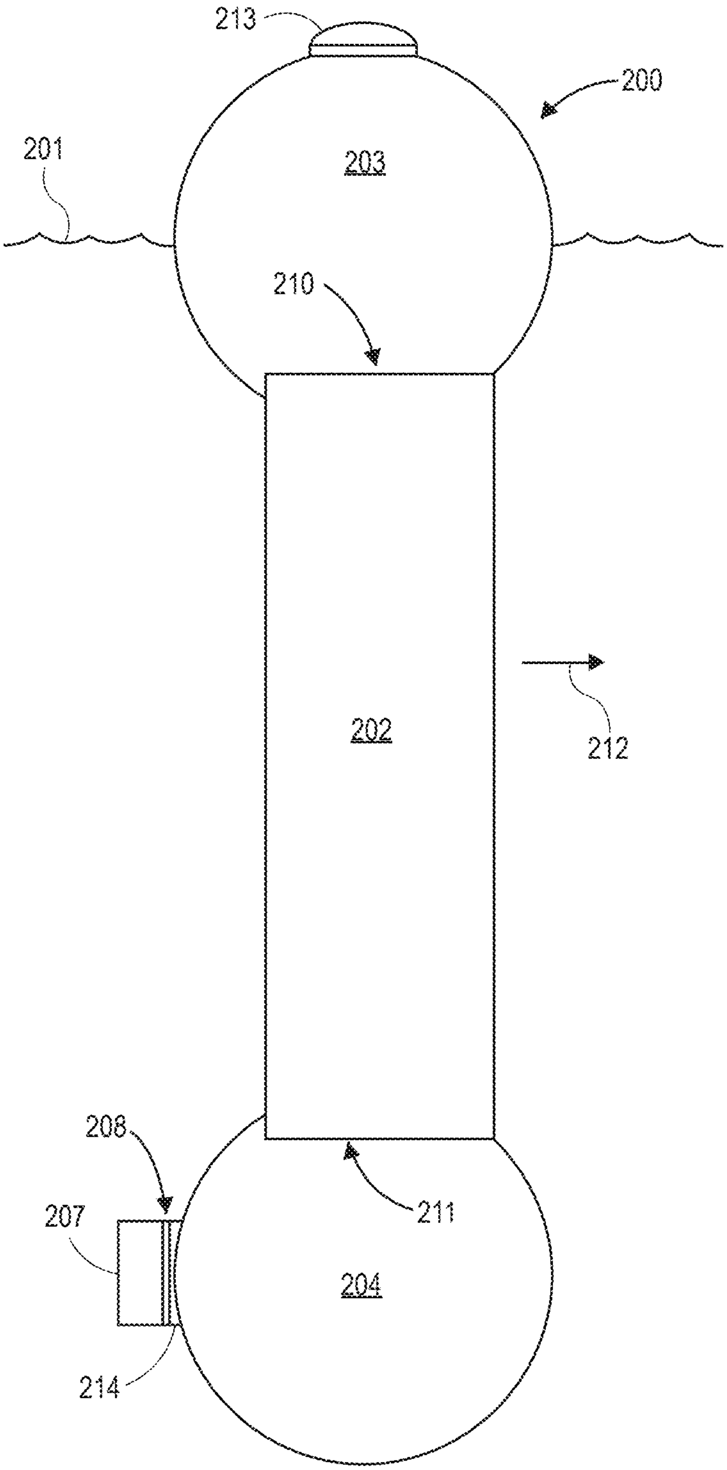
FIG. 32 is a side view of the fifth embodiment of the present invention.

FIG. 32 shows a side view of the same embodiment 200 of the current disclosure that is illustrated in FIGS. 29-31.

Figure 33:
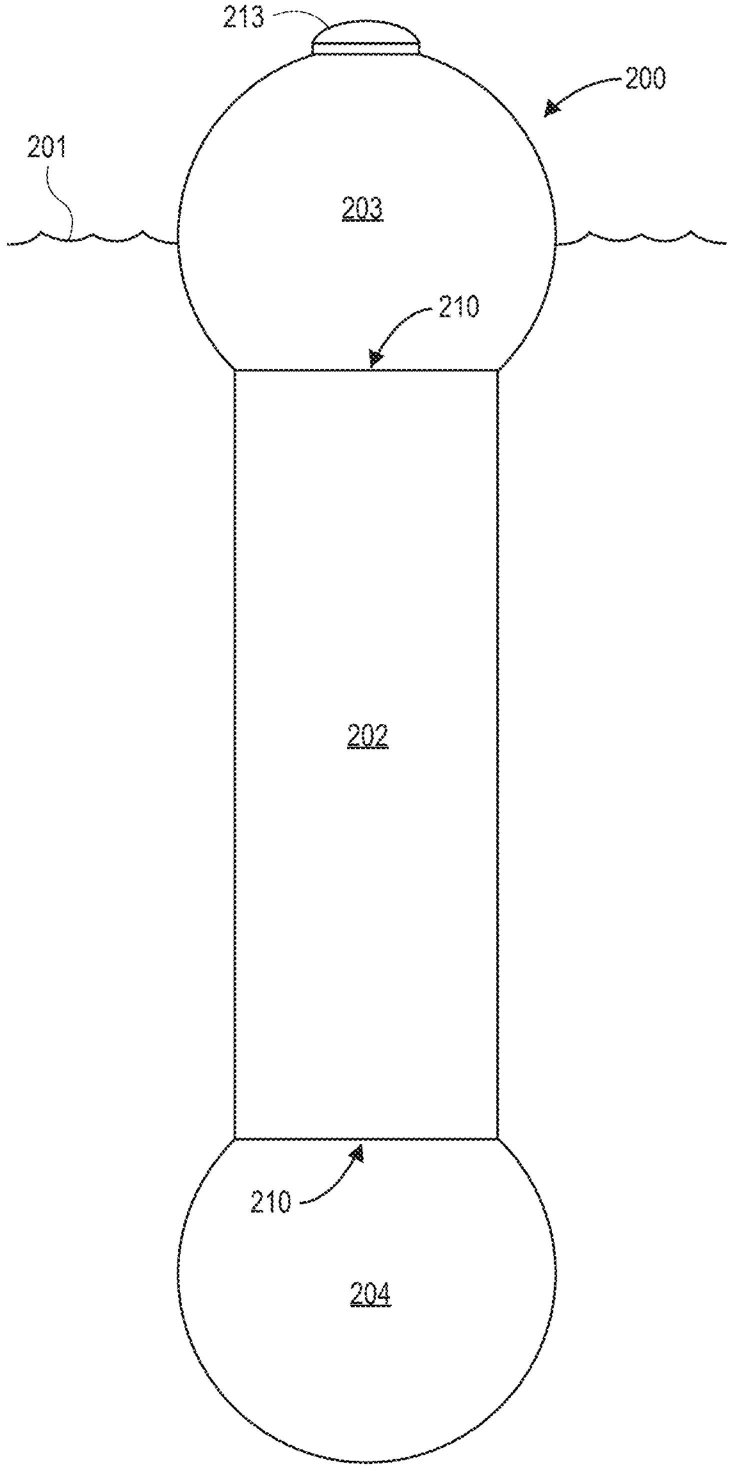
FIG. 33 is a side view of the fifth embodiment of the present invention.

FIG. 33 shows a side view of the same embodiment 200 of the current disclosure that is illustrated in FIGS. 29-32.

Figure 34:
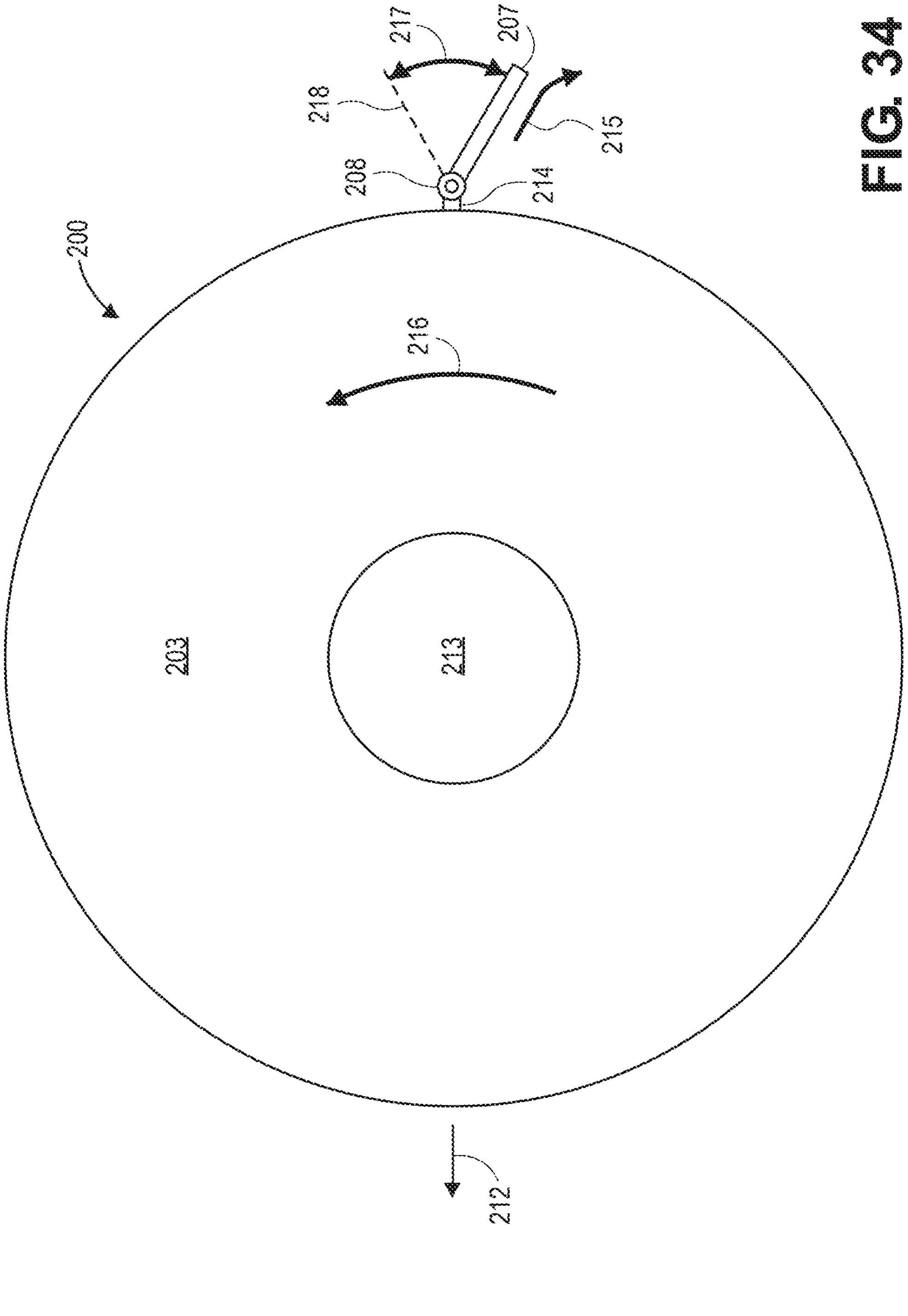
FIG. 34 is a top-down view of the fifth embodiment of the present invention.

FIG. 34 shows a top-down view of the same embodiment 200 of the current disclosure that is illustrated in FIGS. 29-33.

When the embodiment's control circuit (not shown) within the embodiment's dome 213 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw (206 in FIG. 29) in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 207, and not shown) operably connected to rudder 207 so as to rotate that rudder in a direction that deflects 215 water in a clockwise direction (relative to a top-down perspective), then that rudder's thrust will impart to the embodiment 200 a counterclockwise torque which will tend to alter the embodiment's yaw by rotating 216 the embodiment about its longitudinal axis (205 in FIG. 29) in a counterclockwise direction (relative to a top-down perspective).

By adjusting the angular position of the rudder 207, to an orientation within a range 217 of rudder orientations, the embodiment's control circuit can alter the yaw, e.g., 206 in FIG. 29, of the embodiment, thereby enabling the embodiment's control circuit to steer the embodiment and navigate the embodiment to a geospatial location at the surface 201 of the body of water. For example, when moved to an angular position 218 laterally opposite that of the illustrated angular position (at 207) the torque, and the rotation, imparted to the embodiment would be opposite that illustrated at 216.

An embodiment similar to the one illustrated in FIGS. 29-34 contains an internal power take off that converts a wave-induced motion of the embodiment into an electrical power that is then used to provide electrical power to, and energize, the electrical components and systems, as well as to provide power to the motor (not shown) that rotates the embodiment's rudder.

An embodiment similar to the one illustrated in FIG. 29-34 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder.

An embodiment similar to the one illustrated in FIG. 29-34 includes, incorporates, utilizes, and/or further comprises, thrusters, such as those illustrated in conjunction with embodiment 120 illustrated in FIGS. 8-14.

Figure 35:
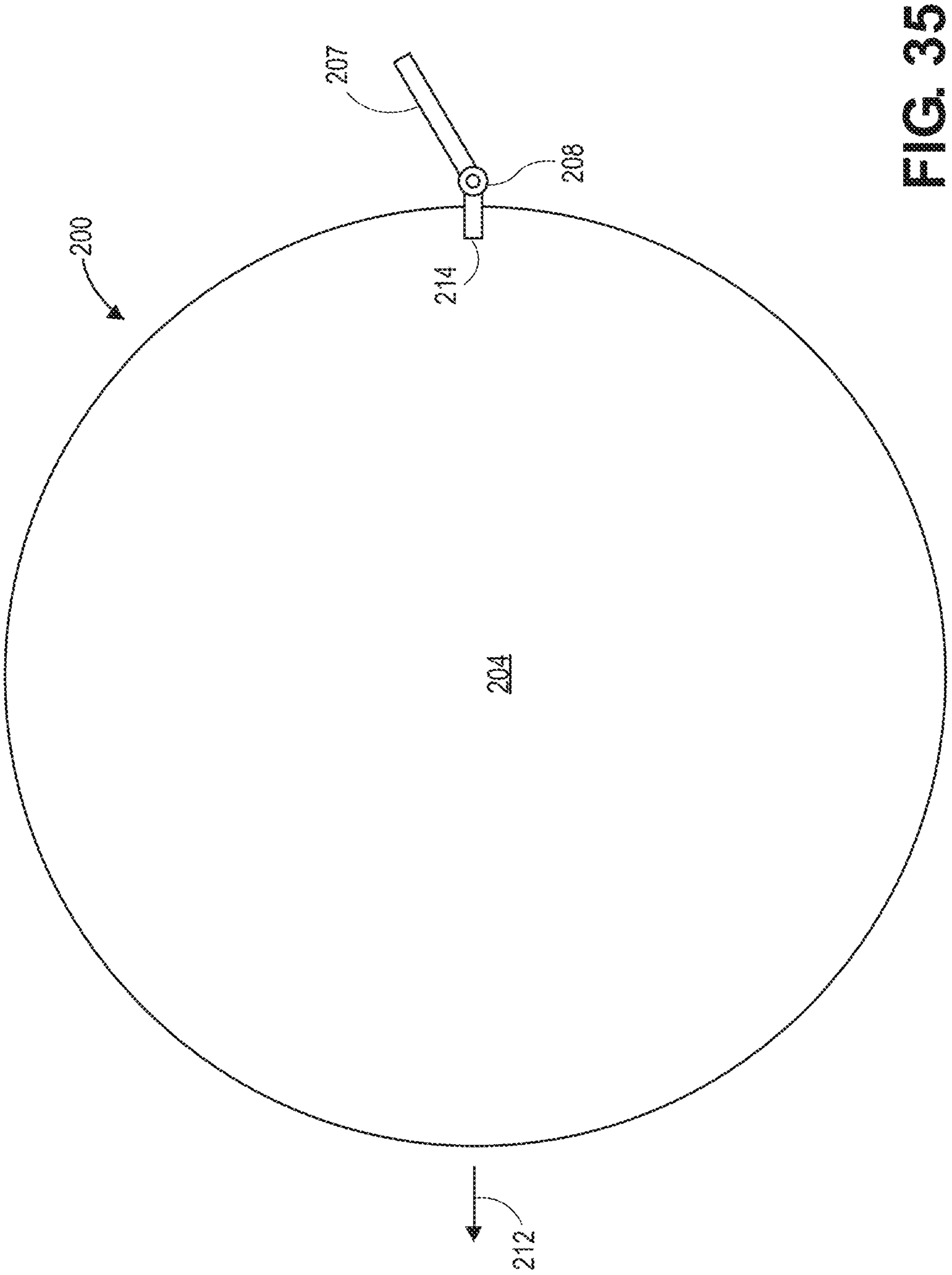
FIG. 35 is a bottom-up view of the fifth embodiment of the present invention.

FIG. 35 shows a bottom-up view of the same embodiment 200 of the current disclosure that is illustrated in FIGS. 29-34.

Figure 36:
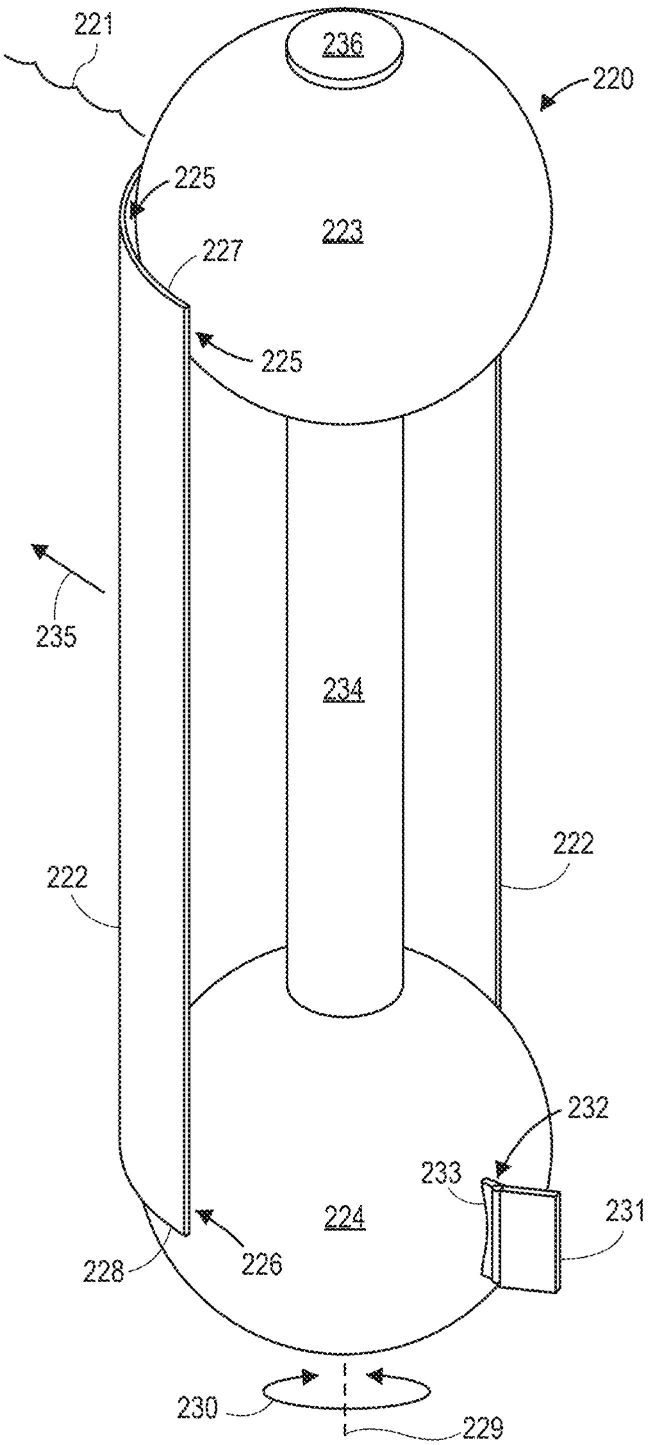
FIG. 36 is a perspective side view of a sixth embodiment of the present invention.

FIG. 36 shows a side perspective view of an embodiment 220 of the current disclosure.

The embodiment 220 floats adjacent to an upper surface 221 of a body of water over which waves pass. The embodiment 220 has a radius of curvature of its semi-cylindrical propulsive shroud 222 is greater than the radii of the adjacent upper buoyant chamber 223 and the lower chamber 224, thereby leaving upper 225 and lower 226 gaps between the upper 227 and lower 228 edges of the propulsive shroud and the respective hulls of the upper 223 and lower 224 chambers.

The upper 227 and lower 228 edges of the propulsive shroud 222 are connected, attached, and/or affixed, to the hulls of the respective upper 223 and lower 224 chambers by a plurality of struts (not shown) normal to the respective inner surfaces of the propulsive shroud and the respective outer surfaces of the upper and lower chambers. The semi-cylindrical propulsive shroud of embodiment 220 is approximately coaxial with the embodiment's longitudinal axis 229.

The angular extent of the semi-cylindrical propulsive shroud of embodiment 220 about its respective longitudinal axis is approximately 180 degrees.

Similar to the embodiments 150, 180, and 200, embodiment 220 controls, corrects, adjusts, and/or regulates, its yaw 230 with a rudder 231 that is rotatably connected to a rudder shaft 232. The rudder shaft 232 by which the rudder 231 is rotatably connected to the other parts and/or portions of the embodiment 220 is mounted to a bulwark 233 rigidly connected to, and/or integrated within, the structure of the embodiment's lower chamber 224.

The embodiment 220 comprises, in part, an upper buoyant chamber 223 which causes the embodiment to float adjacent to an upper surface 221 of a body of water over which waves pass. The embodiment 220 further comprises a lower chamber 224, and its upper and lower chambers are structurally connected by a central cylindrical tube 234.

As a consequence of, and/or in response to, its obstruction of the motion of a wave at the embodiment 220, the propulsive shroud 222 produces a lateral force that tends to propel 235 the embodiment in a "forward" direction, i.e., in a direction relative to the propulsive shroud that is opposite the direction of the propulsive shroud with respect to, and/or away from, the rudder 231.

A dome 236 affixed to a top side of the upper buoyant chamber 223 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a rudder control circuit (not shown) that the embodiment control circuit uses to control the angular orientation of the rudder 231, e.g., through an activation and/or control of an electrical worm-screw a rotation of which controls the angular position and/or orientation of the rudder, in order to alter and/or control the yaw 230 of the embodiment.

An embodiment similar to the one illustrated in FIG. 36 contains an internal power take off that converts a wave-induced motion of the embodiment into an electrical power that is then used to provide electrical power to, and energize, the electrical components and systems, as well as to provide power to the rudder 231, e.g., to an electrical worm-screw motor (not shown) that rotates the rudder about the vertical rudder shaft 232 rotatably connecting the rudder to the rest of the embodiment.

An embodiment similar to the one illustrated in FIG. 36 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the rudder 231, e.g., to an electrical worm-screw motor (not shown) that rotates the rudder about the vertical rudder shaft 232 rotatably connecting the rudder to the rest of the embodiment.

Figure 37:
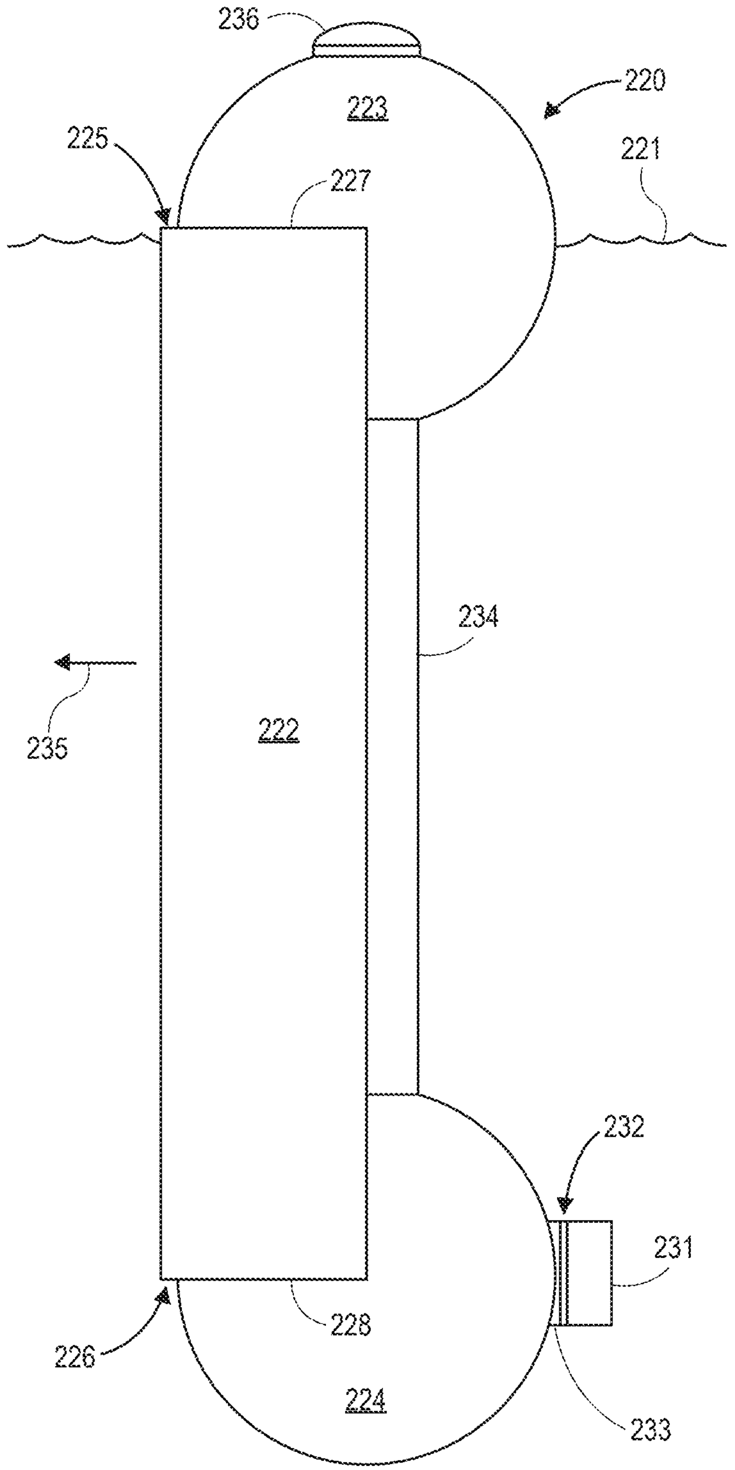
FIG. 37 is a side view of the sixth embodiment of the present invention.

FIG. 37 shows a side view of the same embodiment 220 of the current disclosure that is illustrated in FIG. 36.

Figure 38:
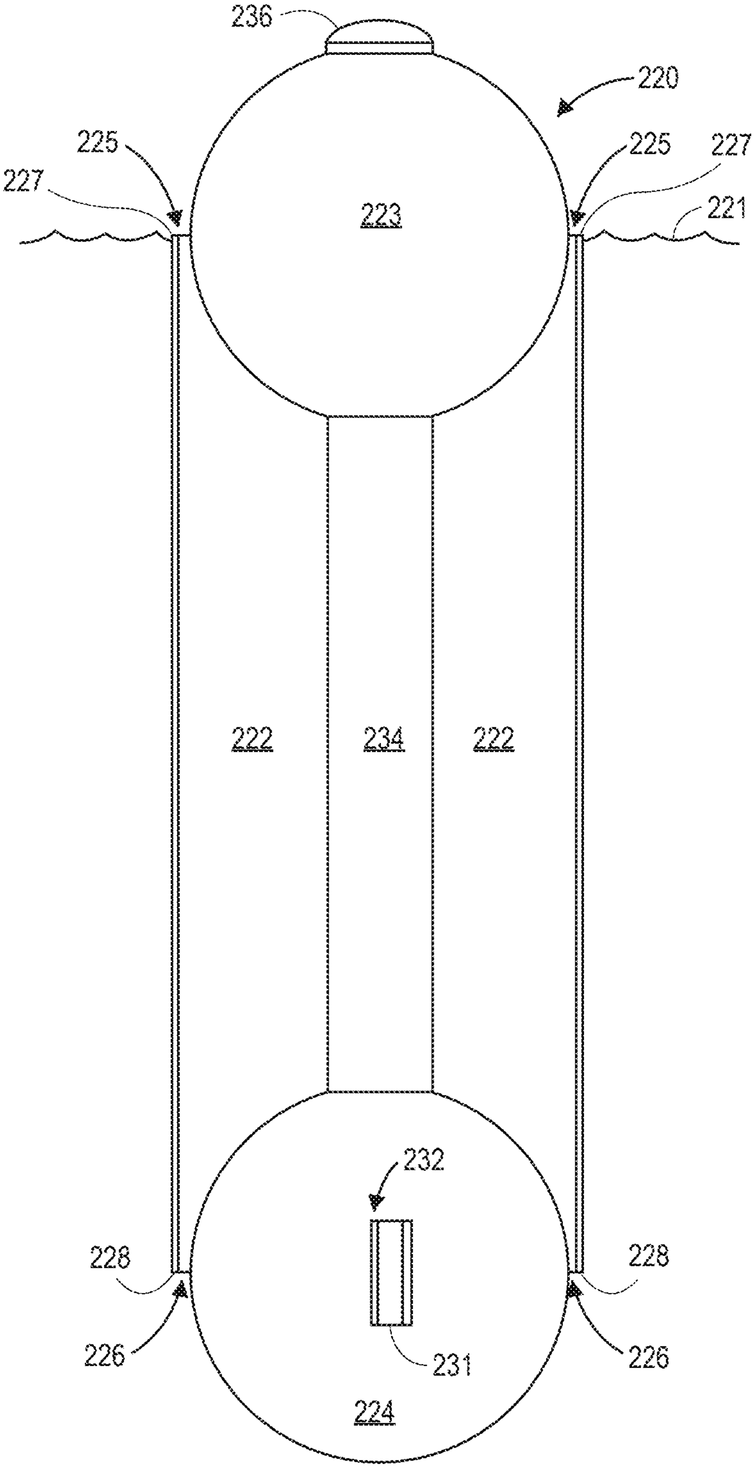
FIG. 38 is a side view of the sixth embodiment of the present invention.

FIG. 38 shows a side view of the same embodiment 220 of the current disclosure that is illustrated in FIGS. 36 and 37.

Figure 39:
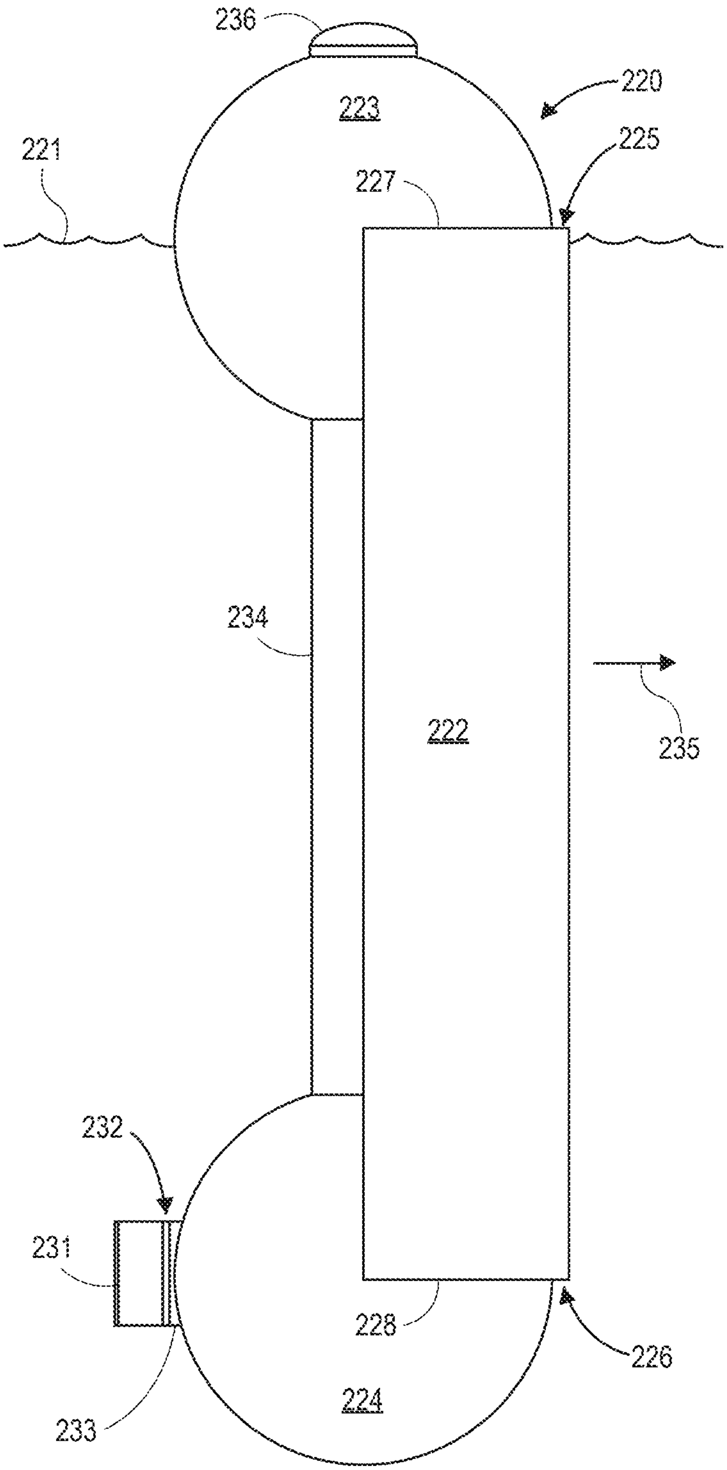
FIG. 39 is a side view of the sixth embodiment of the present invention.

FIG. 39 shows a side view of the same embodiment 220 of the current disclosure that is illustrated in FIGS. 36-38.

Figure 40:
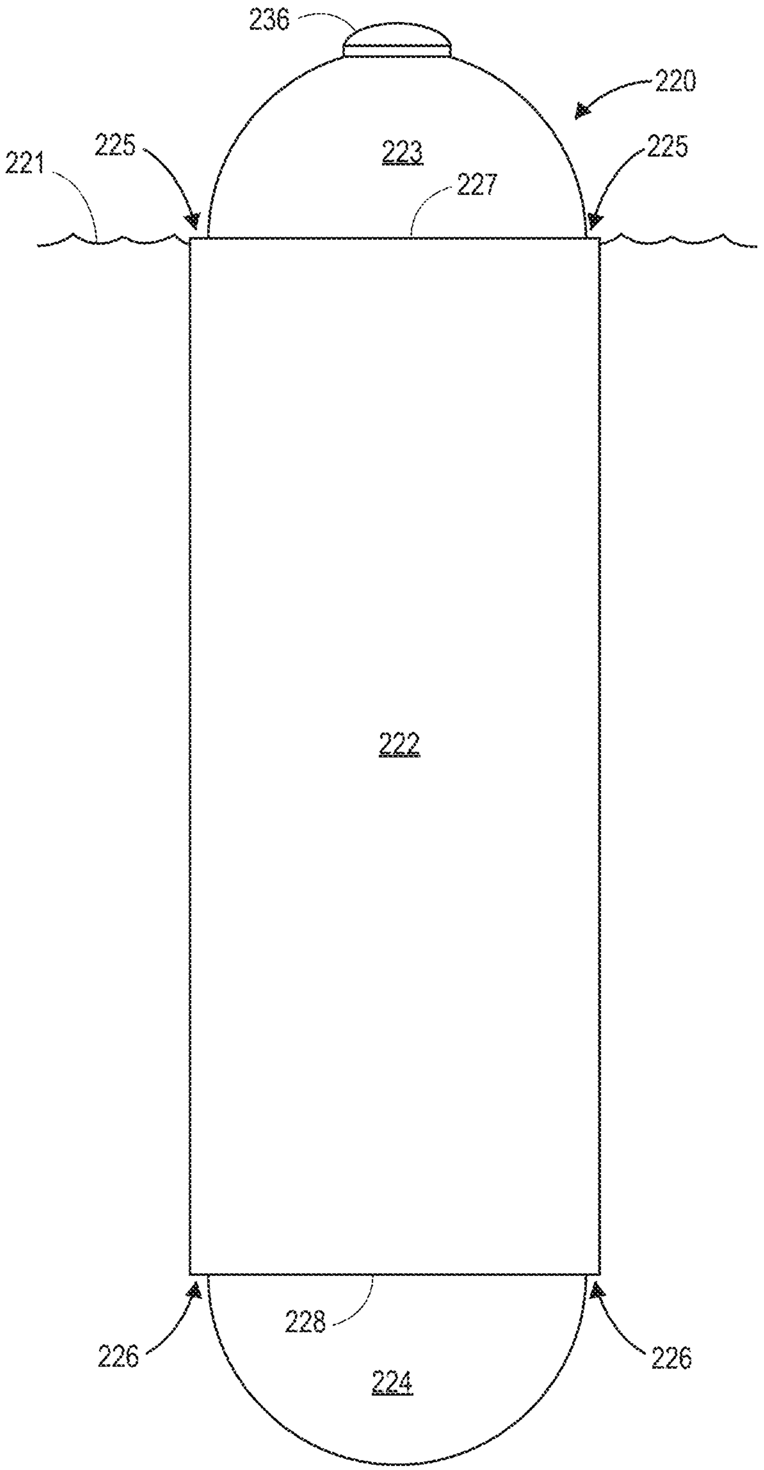
FIG. 40 is a side view of the sixth embodiment of the present invention.

FIG. 40 shows a side view of the same embodiment 220 of the current disclosure that is illustrated in FIGS. 36-39.

Figure 41:
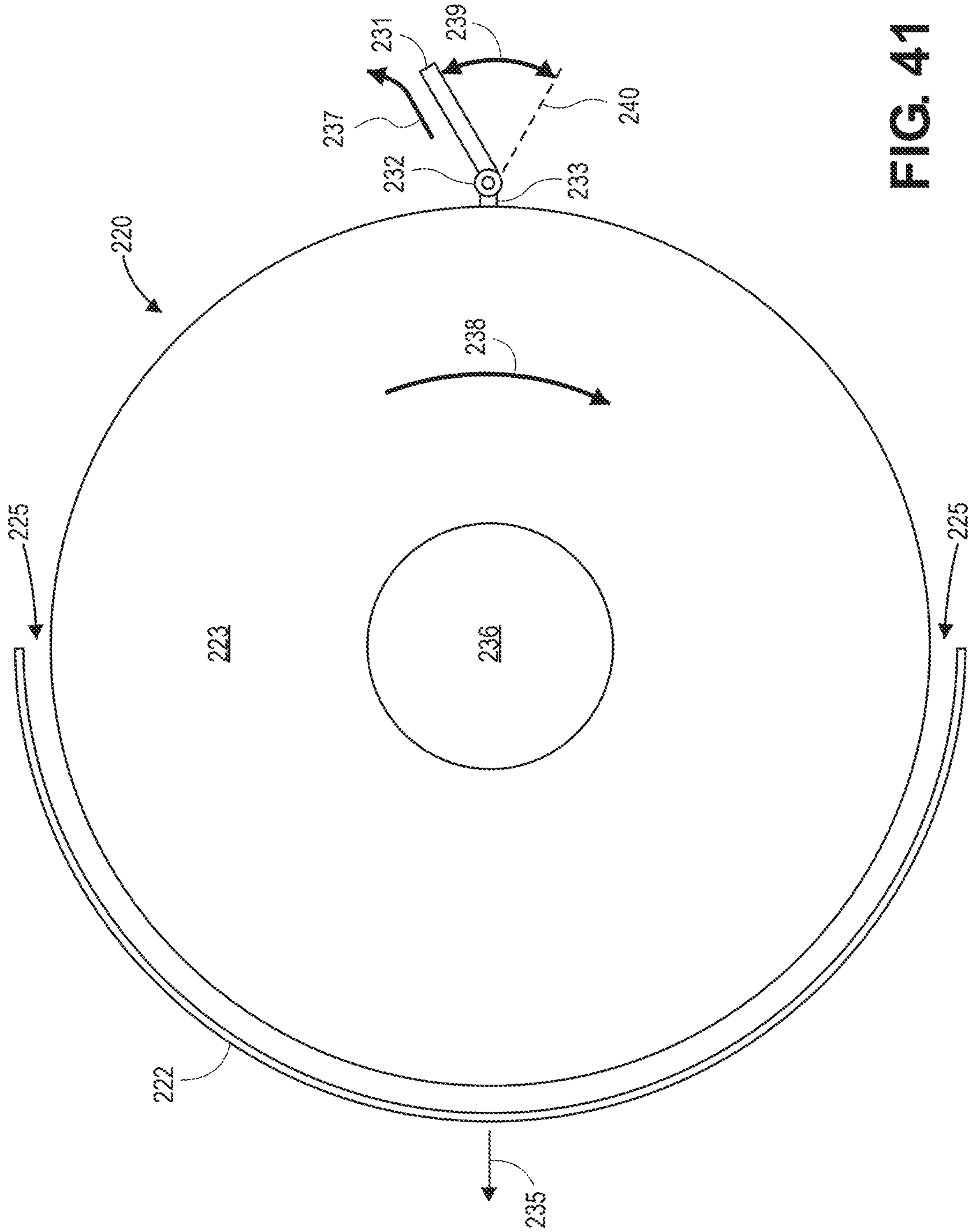
FIG. 41 is a top-down view of the sixth embodiment of the present invention.

FIG. 41 shows a top-down view of the same embodiment 220 of the current disclosure that is illustrated in FIGS. 36-40.

When the embodiment's control circuit (not shown) within the embodiment's dome 236 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 231, and not shown) operably connected to rudder 231 so as to rotate that rudder in a direction that deflects 237 water in a counterclockwise direction (relative to a top-down perspective), then that rudder's thrust will impart to the embodiment 220 a clockwise torque which will tend to alter the embodiment's yaw by rotating 238 the embodiment about its longitudinal axis (229 in FIG. 36) in a clockwise direction (relative to a top-down perspective).

By adjusting the angular position of the rudder 231, to an orientation within a range 239 of rudder orientations, the embodiment's control circuit can alter the yaw, e.g., 230 in FIG. 36, of the embodiment, thereby enabling the embodiment's control circuit to steer the embodiment and navigate the embodiment to a geospatial location at the surface 221 of the body of water. For example, when moved to an angular position 240 laterally opposite that of the illustrated angular position (at 231) the torque, and the rotation, imparted to the embodiment would be opposite that illustrated at 238.

An embodiment similar to the one illustrated in FIGS. 36-41 contains an internal power take off that converts a wave-induced motion of the embodiment into an electrical power that is then used to provide electrical power to, and energize, the electrical components and systems, as well as to provide power to the motor (not shown) that rotates the embodiment's rudder.

An embodiment similar to the one illustrated in FIG. 36-41 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder.

An embodiment similar to the one illustrated in FIG. 36-41 includes, incorporates, utilizes, and/or further comprises, thrusters, such as those illustrated in conjunction with embodiment 120 illustrated in FIGS. 8-14.

Figure 42:
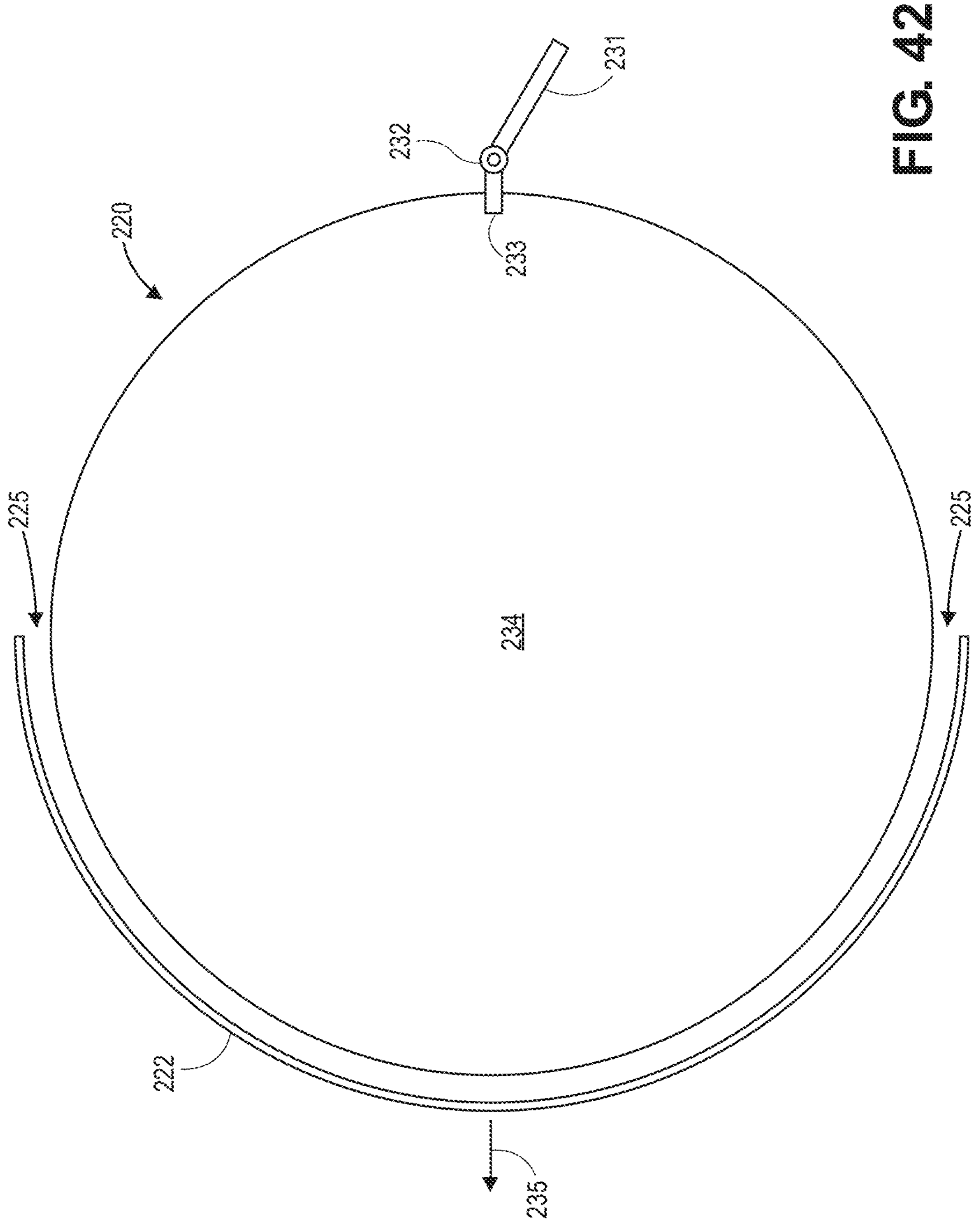
FIG. 42 is a bottom-up view of the sixth embodiment of the present invention.

FIG. 42 shows a bottom-up view of the same embodiment 220 of the current disclosure that is illustrated in FIGS. 36-41.

Figure 43:
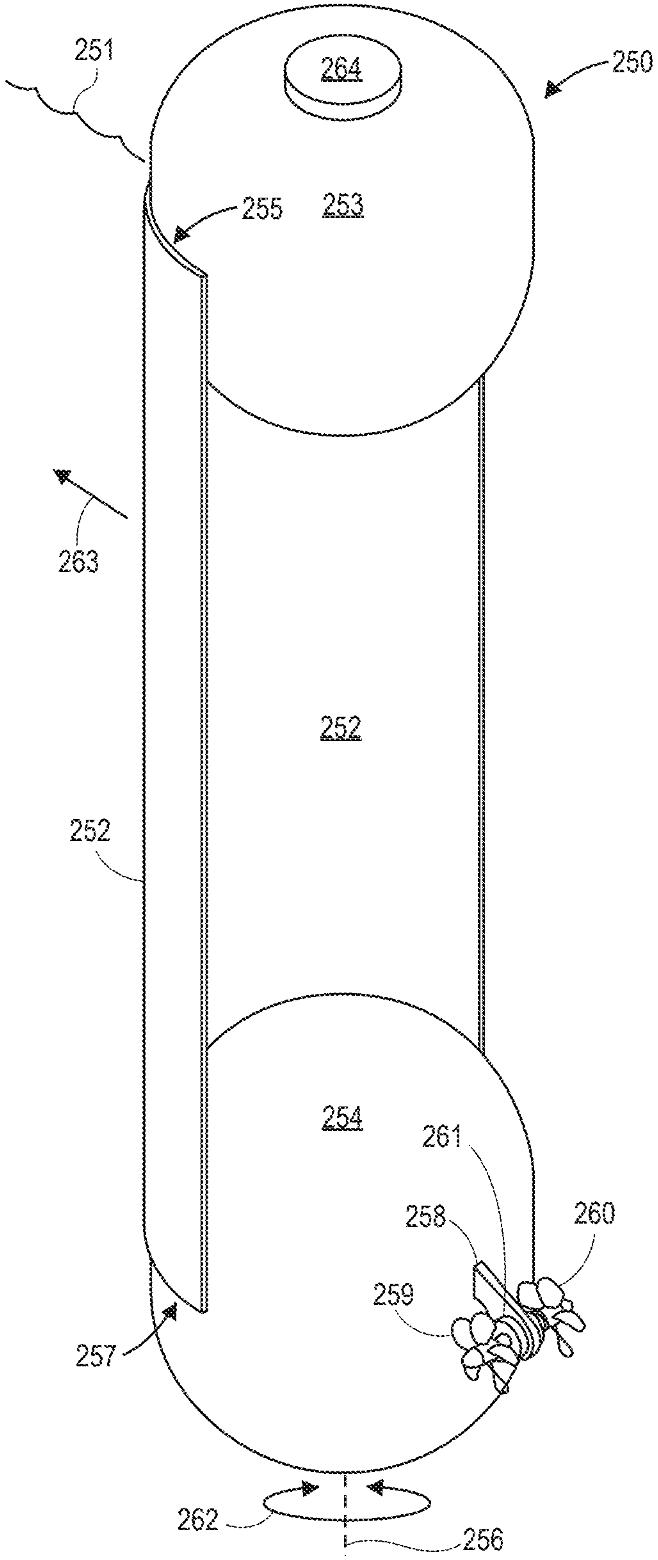
FIG. 43 is a perspective side view of a seventh embodiment of the present invention.

FIG. 43 shows a side perspective view of an embodiment 250 of the current disclosure.

The embodiment 250 floats adjacent to an upper surface 251 of a body of water over which waves pass. The embodiment 250 has a semi-cylindrical propulsive shroud 252 which has a radius of curvature approximately equal to the lateral radii of the semi-cylindrical upper buoyant chamber 253 and the semi-cylindrical lower chamber 254 to which it is connected, attached, and/or affixed.

The propulsive shroud 252 of embodiment 250 is attached, and/or affixed, e.g., by welds, to the upper chamber 253 at, and/or along, an upper seam 255 oriented horizontally, and/or within a plane normal to a longitudinal axis 256 of the embodiment. The propulsive shroud is attached, and/or affixed, e.g., by welds, to the lower chamber 254 at, and/or along, a lower seam 257 oriented horizontally, and/or within a plane normal to a longitudinal axis 256 of the embodiment. The propulsive shroud 252 may be considered as being directly attached to the upper chamber 253 and/or the lower chamber 254. For example, the propulsive shroud 252 may directly contact the surfaces of the upper chamber 253 and/or the surfaces of the lower chamber 254. Directly attached may also refer to the propulsive shroud 252 being welded or otherwise adhered to the upper chamber 253 and/or the lower chamber 254. That is, an upper seam and a lower seam may comprise welded material, an adhesive layer, or the like.

The embodiment 250 comprises the upper buoyant chamber 253 which causes the embodiment to float adjacent to the upper surface 251 of a body of water. And, the embodiment 250 further comprises a lower chamber 254. The upper and lower chambers are structurally connected by the propulsive shroud 252.

The embodiment 250 controls, corrects, adjusts, and/or regulates, its yaw with a thruster assembly 258. The thruster comprises a pair of propellers 259 and 260 attached, and/or connected, to a common thruster shaft. The propellers, and the thruster shaft to which they are connected, are caused to rotate by a thruster motor 261 that is activated and controlled by a thruster control circuit (not shown). The thruster control circuit's control of the thruster motor, and its connected propellers, permits the embodiment to control, correct, adjust, and/or regulate, its yaw 262.

As a consequence of its obstruction of wave motion at the embodiment, the propulsive shroud 252 imparts a "forward" force, i.e., a lateral force at the propulsive shroud and directed away from the embodiment's longitudinal axis 256. That forward force then tends to propel 263 the embodiment in the same forward direction.

The semi-cylindrical propulsive shroud 252 of embodiment 250 is approximately radially symmetrical about, and coaxial with, the embodiment's longitudinal axis 256. The angular extent of the semi-cylindrical propulsive shroud about the embodiment's longitudinal axis is approximately 180 degrees. Thus, the propulsive shroud of embodiment 250 is substantially a "half-pipe."

A dome 264 affixed to a top side of the upper buoyant chamber 253 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a thruster control circuit (not shown) that the embodiment control circuit uses to activate and control, via its activation and control of the thruster motor, the left 259 and right 260 propellers in order to alter and/or control the yaw 262 of the embodiment.

The direction of the embodiment's rotation about its longitudinal axis 256 depends on the respective direction of rotation of the thruster shaft, and the consequent direction of rotation of the left 259 and right 260 propellers.

Torques applied to the embodiment 250 by the embodiment's thruster assembly 258 allow the yaw 262, and/or direction of forward propulsion, to be altered, adjusted, corrected, and/or controlled, thereby enabling the embodiment's control circuit to steer the embodiment and navigate the embodiment to a geospatial location at the surface 251 of the body of water.

An embodiment similar to the one illustrated in FIG. 43 contains an internal power take off that converts a wave-induced motion of the embodiment into an electrical power that is then used to provide electrical power to, and energize, the electrical components and systems, as well as to provide power to the thruster motor 261 that rotates the left 259 and right 260 propellers.

An embodiment similar to the one illustrated in FIG. 43 stores compressed hydrogen in its upper chamber 253. It incorporates, includes, and/or stores, ballast (including, but not limited to, water) in its lower chamber 254. The embodiment further comprises a fuel cell that consumes a portion of the hydrogen stored within the upper chamber, in combination and/or conjunction with oxygen in the atmosphere outside the embodiment, in order to produce, and/or to provide, a supply of electrical power to the embodiment. The embodiment uses a portion of the electrical power produced by its fuel cell to provide electrical power to, and energize, the electrical components and systems, as well as to provide power to the thruster motor 261 that rotates the left 259 and right 260 propellers.

Figure 44:
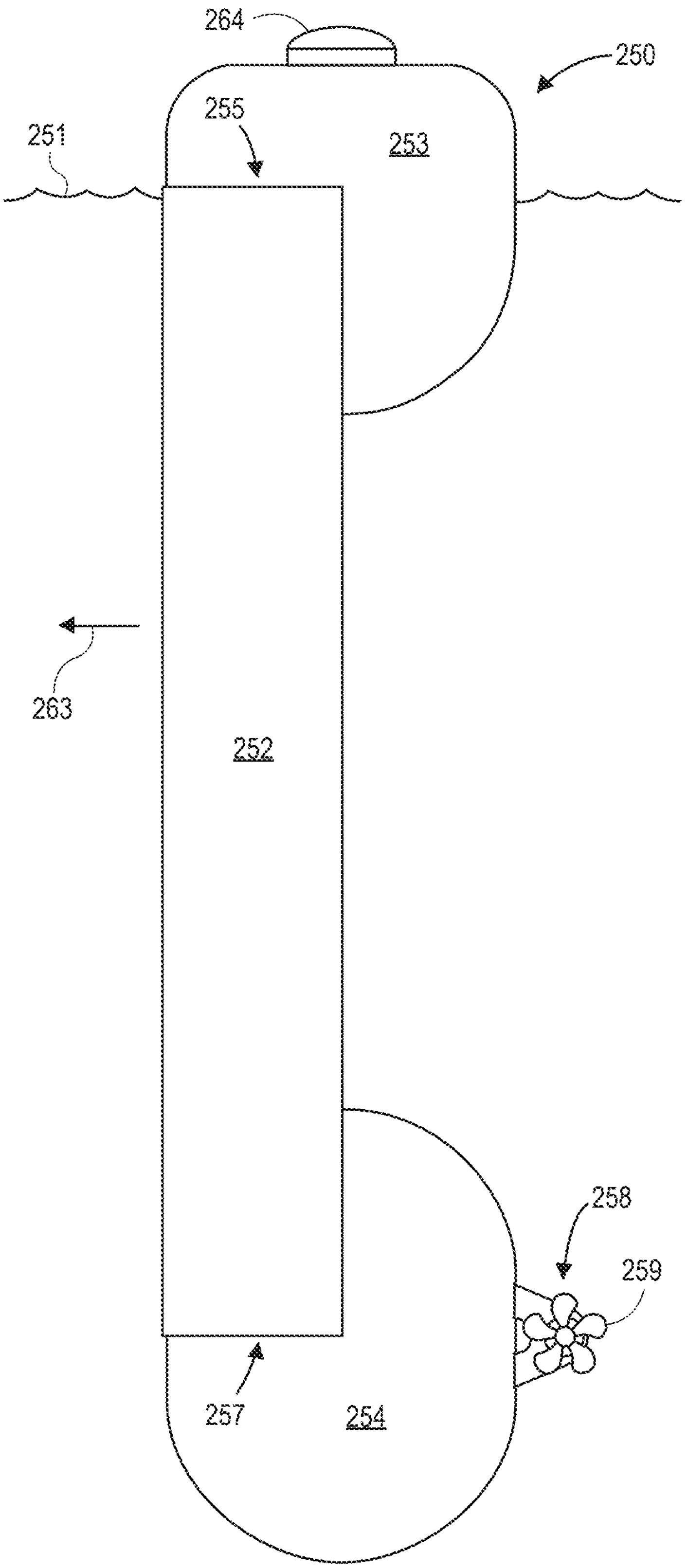
FIG. 44 is a side view of the seventh embodiment of the present invention.

FIG. 44 shows a side view of the same embodiment 250 of the current disclosure that is illustrated in FIG. 43.

Figure 45:
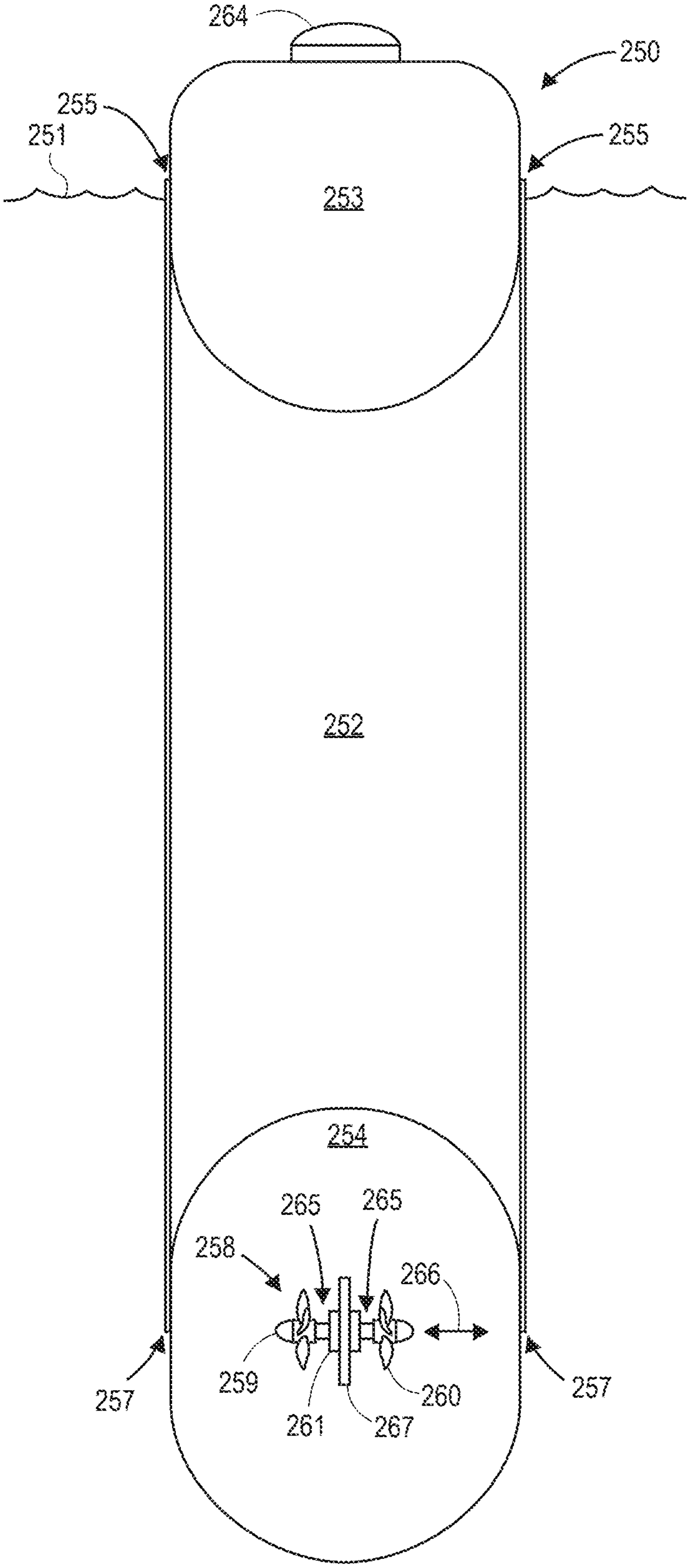
FIG. 45 is a side view of the seventh embodiment of the present invention.

FIG. 45 shows a side view of the same embodiment 250 of the current disclosure that is illustrated in FIGS. 43 and 44.

The thruster assembly 258 comprises, in part, left 259 and right 260 propellers, each attached to the same thruster shaft 265, and a thruster motor 261 which rotates the thruster shaft, and thereby rotates the left and right propellers, in either of two directions of rotation, e.g., causing lateral thrusts, e.g., 266, that alter the embodiment's yaw in clockwise or counterclockwise directions, respectively (relative to a top-down perspective).

The thruster assembly further comprises a structural support or bulwark 267 to which the thruster motor is attached, connected, and/or mounted.

Figure 46:
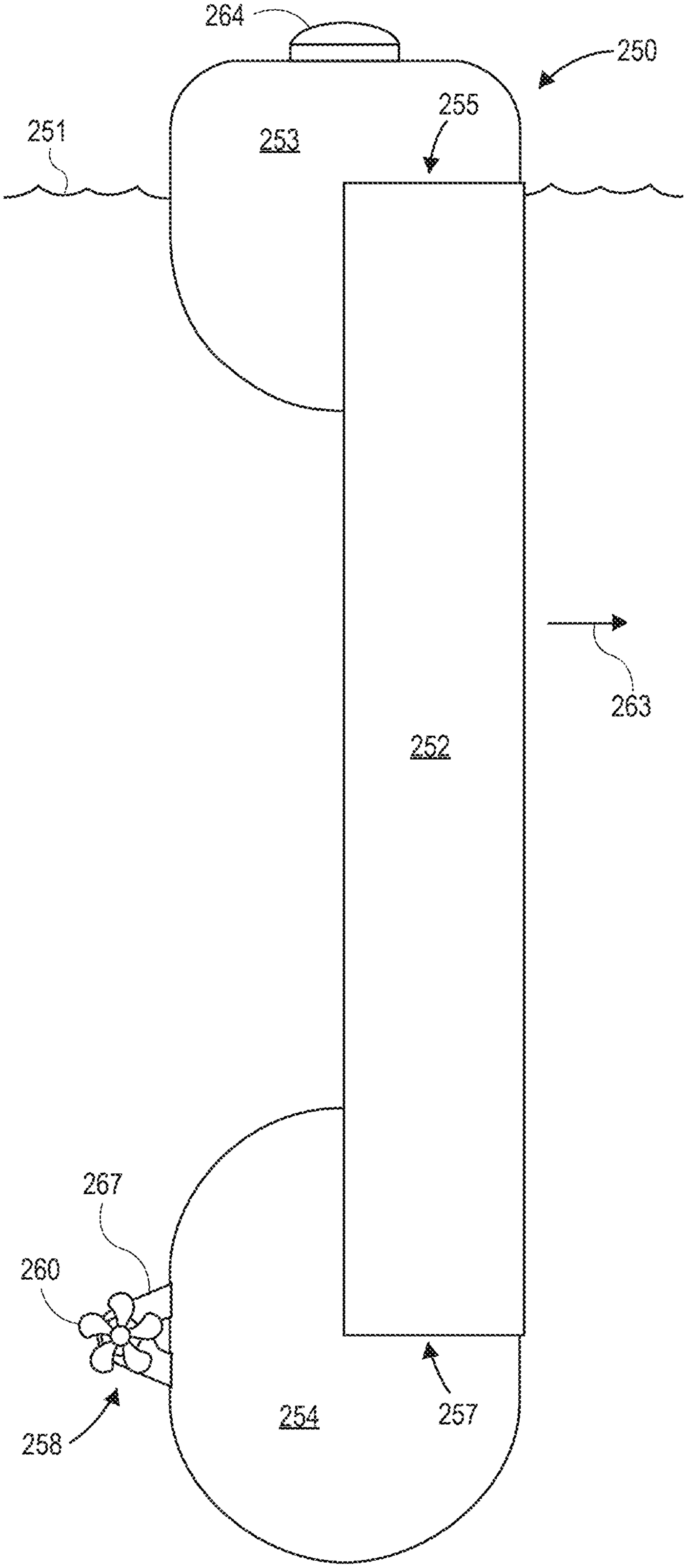
FIG. 46 is a side view of the seventh embodiment of the present invention.

FIG. 46 shows a side view of the same embodiment 250 of the current disclosure that is illustrated in FIGS. 43-45.

Figure 47:
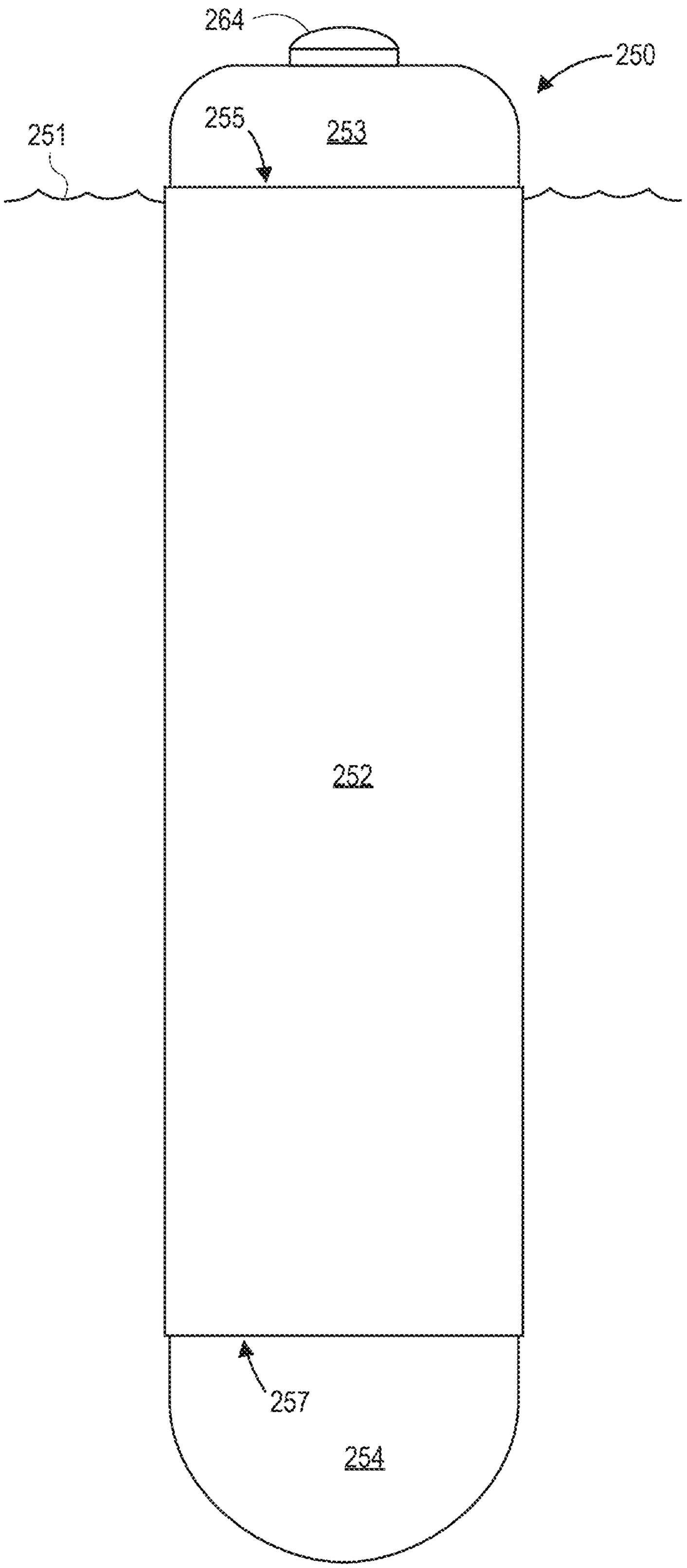
FIG. 47 is a side view of the seventh embodiment of the present invention.

FIG. 47 shows a side view of the same embodiment 250 of the current disclosure that is illustrated in FIGS. 43-46.

Figure 48:
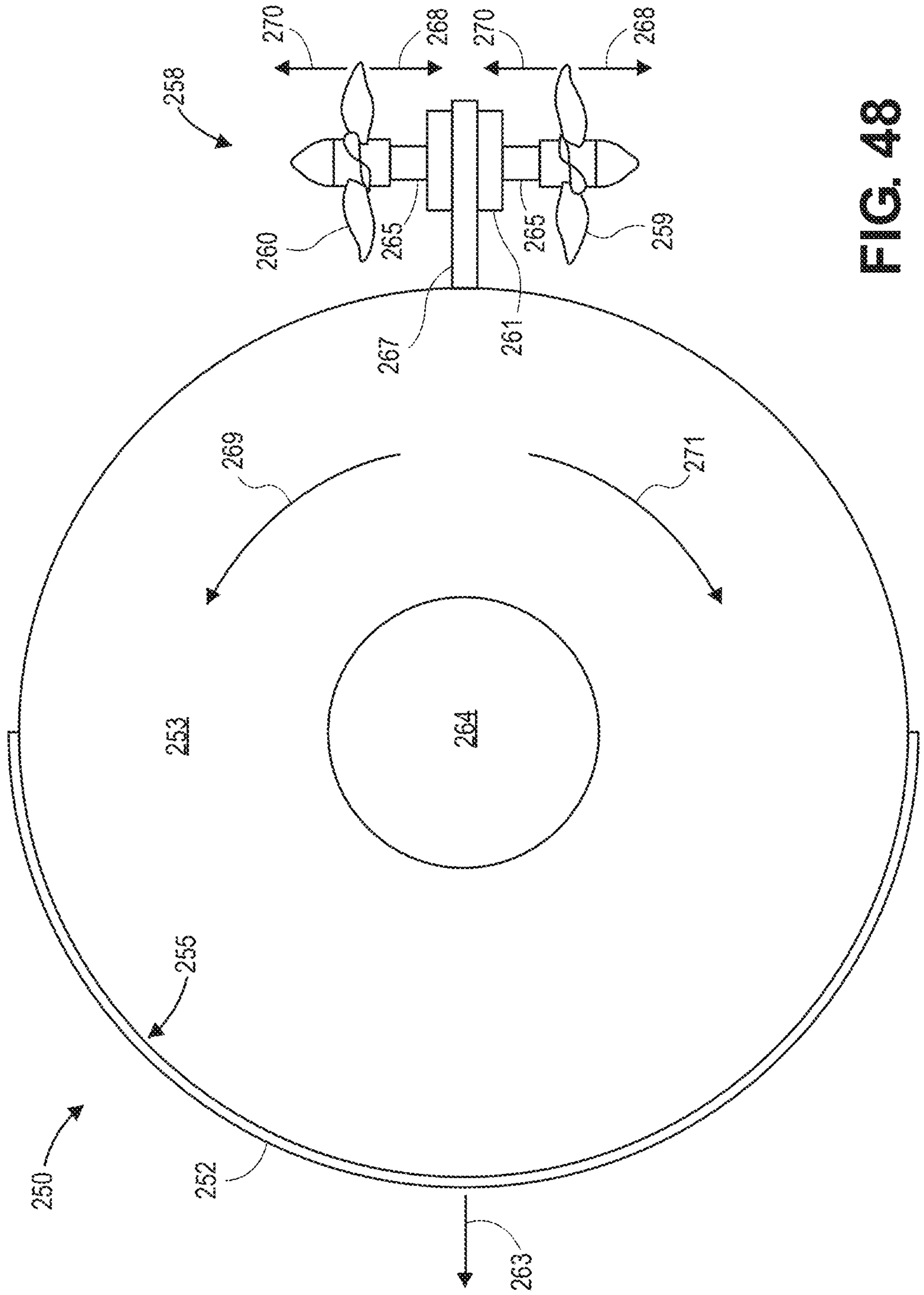
FIG. 48 is a top-down view of the seventh embodiment of the present invention.

FIG. 48 shows a top-down view of the same embodiment 250 of the current disclosure that is illustrated in FIGS. 43-47.

When the embodiment's control circuit (not shown) within the embodiment's dome 264 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the thruster motor 261 operably connected to the thruster shaft 265, and therethrough to the left 259 and right 260 propellers, so as to rotate those propellers in a direction that pushes 268 water in a clockwise direction (relative to a top-down perspective), then the thrust of those propellers will impart to the embodiment 250 a torque which will tend to alter the embodiment's yaw (230 in FIG. 43) by rotating 269 the embodiment about its longitudinal axis (229 in FIG. 43) in a counterclockwise direction (relative to a top-down perspective).

If the embodiment's control circuit actuates and/or energizes the thruster motor 261 operably connected to the thruster shaft 265, and therethrough to the left 259 and right 260 propellers, so as to rotate those propellers in a direction that pushes water 270 in a counterclockwise direction (relative to a top-down perspective), then the thrust of those propellers will impart to the embodiment 250 a torque which will tend to alter the embodiment's yaw (230 in FIG. 43) by rotating 271 the embodiment about its longitudinal axis (229 in FIG. 43) in a clockwise direction (relative to a top-down perspective).

By actuating, and/or energizing, the thruster motor, and the left and right propellers thereto attached, so that they produce a tangential thrust at the thrust assembly 258, the embodiment may be rotated, e.g., 269 and 271, about its longitudinal axis (229 in FIG. 43) in a counterclockwise or clockwise direction, respectively, thereby enabling the embodiment's control circuit (not shown) to adjust the yaw of the embodiment in counterclockwise or clockwise directions, even as the forward force produced by the propulsive shroud propels 263 the embodiment forward, thereby enabling the embodiment's control circuit to navigate the embodiment, and/or steer the embodiment, to and/or toward a geospatial location at the surface (251 of FIG. 43) of the body of water on which it floats.

Figure 49:
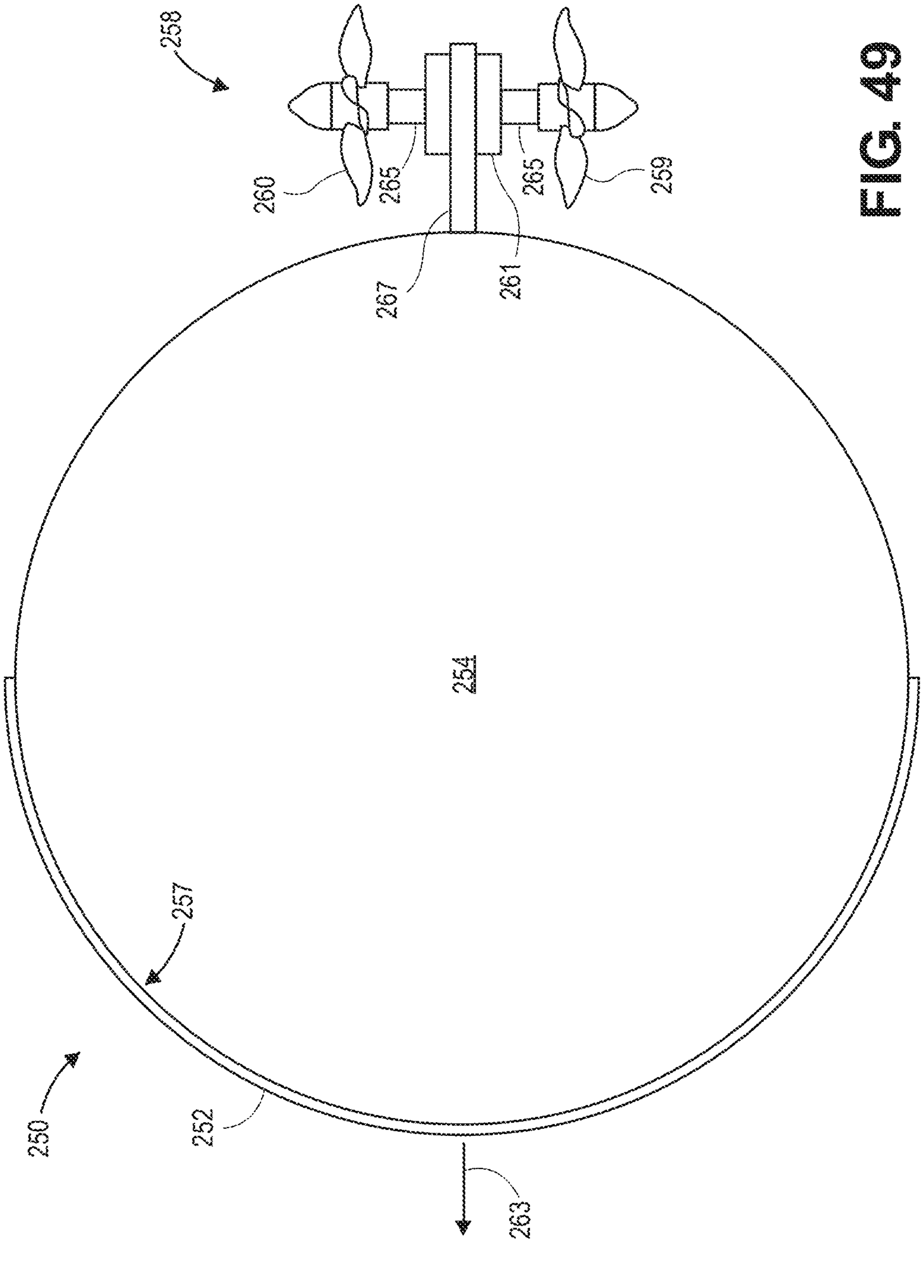
FIG. 49 is a bottom-up view of the seventh embodiment of the present invention.

FIG. 49 shows a bottom-up view of the same embodiment 250 of the current disclosure that is illustrated in FIGS. 43-48.

Figure 50:
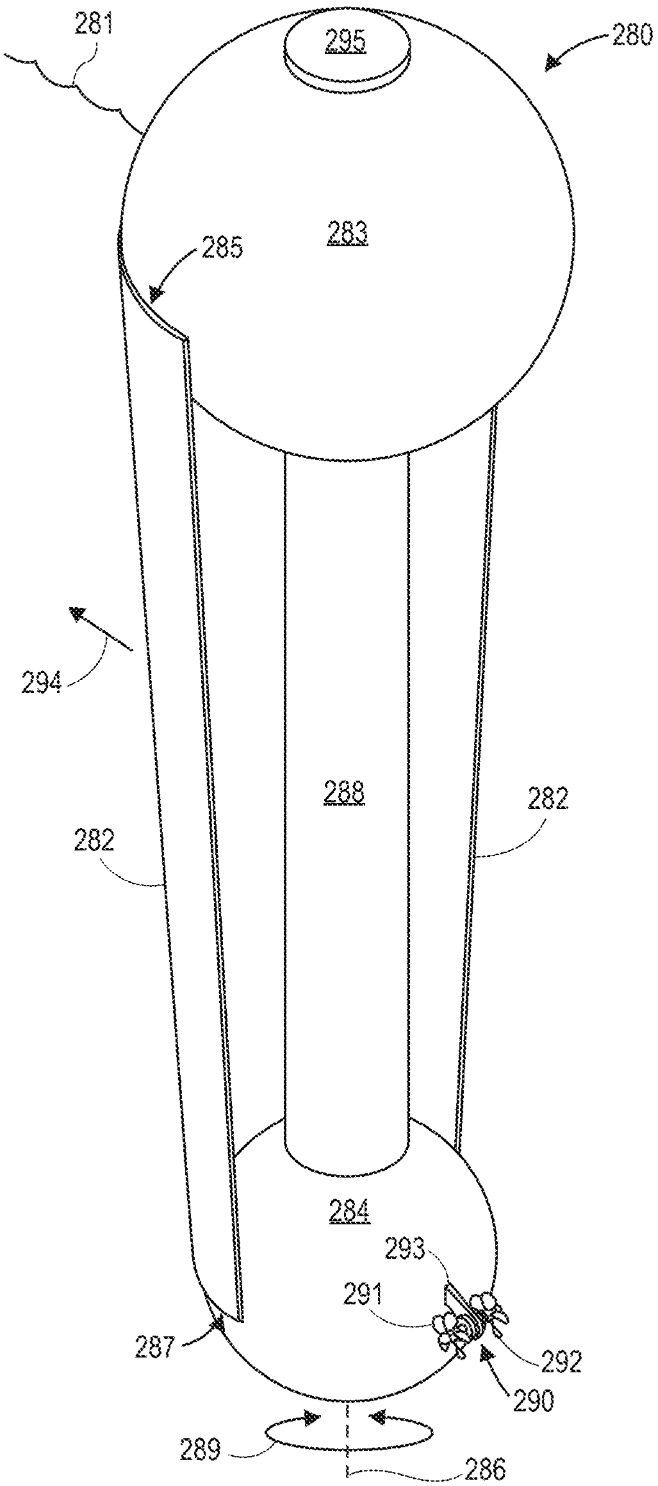
FIG. 50 is a perspective side view of a eighth embodiment of the present invention.

FIG. 50 shows a side perspective view of an embodiment 280 of the current disclosure.

The embodiment 280 floats adjacent to an upper surface 281 of a body of water over which waves pass. The embodiment 280 has a semi-frustoconical propulsive shroud 282 has a radius of curvature at an uppermost end that is approximately equal to the lateral radius of an upper buoyant chamber 283 to which it is connected, attached, and/or affixed. The semi-frustoconical propulsive shroud 282 has a radius of curvature at a lowermost end that is approximately equal to the lateral radius of a lower chamber 284 to which it is also connected, attached, and/or affixed. The radius of curvature of the uppermost end is greater than the radius of curvature of the lowermost end. The propulsive shroud 282 may be considered as being directly attached to the upper chamber 283 and/or the lower chamber 284. For example, the propulsive shroud 282 may directly contact the surfaces of the upper chamber 283 and/or the surfaces of the lower chamber 284. Directly attached may also refer to the propulsive shroud 282 being welded or otherwise adhered to the upper chamber 283 and/or the lower chamber 284. That is, an upper seam and a lower seam may comprise welded material, an adhesive layer, or the like.

The propulsive shroud 282 of embodiment 280 is attached, and/or affixed, e.g., by welds, to the upper chamber 283 at, and/or along, an upper seam 285 oriented horizontally, and/or within a plane normal to a longitudinal axis 286 of the embodiment. The propulsive shroud is attached, and/or affixed, e.g., by welds, to the lower chamber 284 at, and/or along, a lower seam 287 oriented horizontally, and/or within a plane normal to a longitudinal axis 286 of the embodiment.

The embodiment 280 comprises the upper buoyant chamber 283 which causes the embodiment to float adjacent to the upper surface 281 of a body of water. And, the embodiment 280 further comprises the lower chamber 284. The upper and lower chambers are structurally connected by the propulsive shroud 282 as well as by a central approximately cylindrical tube 288 that rigidly connects the upper chamber 283 to the lower chamber 284.

The embodiment 280 controls, corrects, adjusts, and/or regulates, its yaw 289 with a thruster assembly 290. The thruster comprises a pair of propellers 291 and 292 attached, and/or connected, to a common thruster shaft. The propellers, and the thruster shaft to which they are connected, are caused to rotate by a thruster motor that is activated and controlled by a thruster control circuit (not shown). The thruster control circuit's control of the thruster motor, and its connected propellers, permits the embodiment to control, correct, adjust, and/or regulate, its yaw. The thruster assembly further comprises a structural support or bulwark 293 to which the thruster motor is attached, connected, and/or mounted.

As a consequence of its obstruction of wave motion at the embodiment, the propulsive shroud 282 imparts a "forward" force, i.e., a lateral force at the propulsive shroud and directed away from the embodiment's longitudinal axis 286. That forward force then tends to propel 294 the embodiment in the same forward direction.

The semi-frustoconical propulsive shroud 282 of embodiment 280 is approximately radially symmetrical about, and coaxial with, the embodiment's longitudinal axis 286. The angular extent of the semi-frustoconical propulsive shroud about the embodiment's longitudinal axis is approximately 180 degrees. Thus, the propulsive shroud of embodiment 250 is substantially a "half-conical segment."

A dome 295 affixed to a top side of the upper buoyant chamber 283 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a thruster control circuit (not shown) that the embodiment control circuit uses to activate and control, via its activation and control of the thruster motor, the left 291 and right 292 propellers in order to alter and/or control the yaw 289 of the embodiment.

The direction of the embodiment's rotation about its longitudinal axis 286 depends on the respective direction of rotation of the thruster shaft, and the consequent direction of rotation of the left 291 and right 292 propellers.

Torques applied to the embodiment 280 by the embodiment's thruster assembly 290 allow the yaw 289, and/or direction of forward propulsion, to be altered, adjusted, corrected, and/or controlled, thereby enabling the embodiment's control circuit to steer the embodiment and navigate the embodiment to a geospatial location at the surface 281 of the body of water.

An embodiment similar to the one illustrated in FIG. 50 contains an internal power take off that converts a wave-induced motion of the embodiment into an electrical power that is then used to provide electrical power to, and energize, the electrical components and systems, as well as to provide power to the thruster motor that rotates the left 291 and right 292 propellers.

An embodiment similar to the one illustrated in FIG. 50 stores compressed hydrogen in its upper chamber 283. It incorporates, includes, and/or stores, ballast (including, but not limited to, water) in its lower chamber 284. The embodiment further comprises a fuel cell that consumes a portion of the hydrogen stored within the upper chamber, in combination and/or conjunction with oxygen in the atmosphere outside the embodiment, in order to produce, and/or to provide, a supply of electrical power to the embodiment. The embodiment uses a portion of the electrical power produced by its fuel cell to provide electrical power to, and energize, the electrical components and systems, as well as to provide power to the thruster motor that rotates the left 291 and right 292 propellers.

Figure 51:
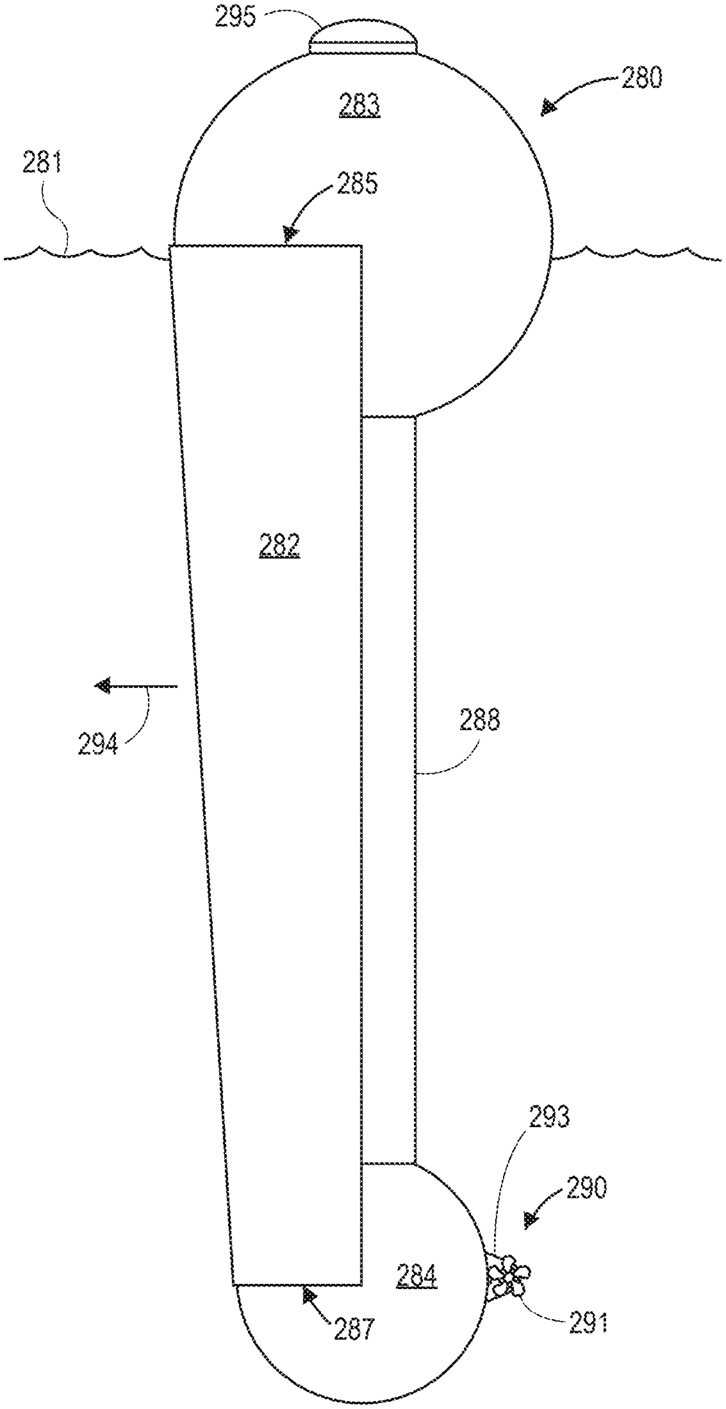
FIG. 51 is a side view of the eighth embodiment of the present invention.

FIG. 51 shows a side view of the same embodiment 280 of the current disclosure that is illustrated in FIG. 50.

Figure 52:
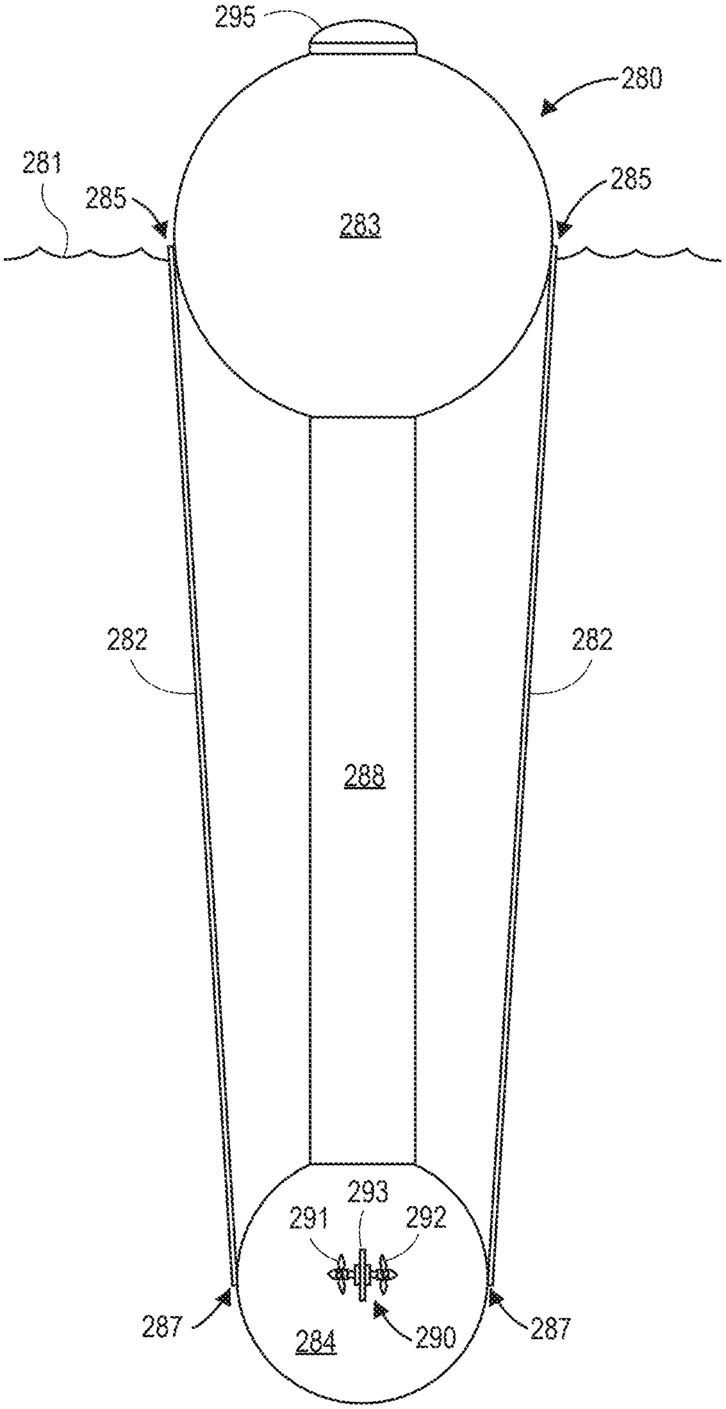
FIG. 52 is a side view of the eighth embodiment of the present invention.

FIG. 52 shows a side view of the same embodiment 280 of the current disclosure that is illustrated in FIGS. 50 and 51.

Figure 53:
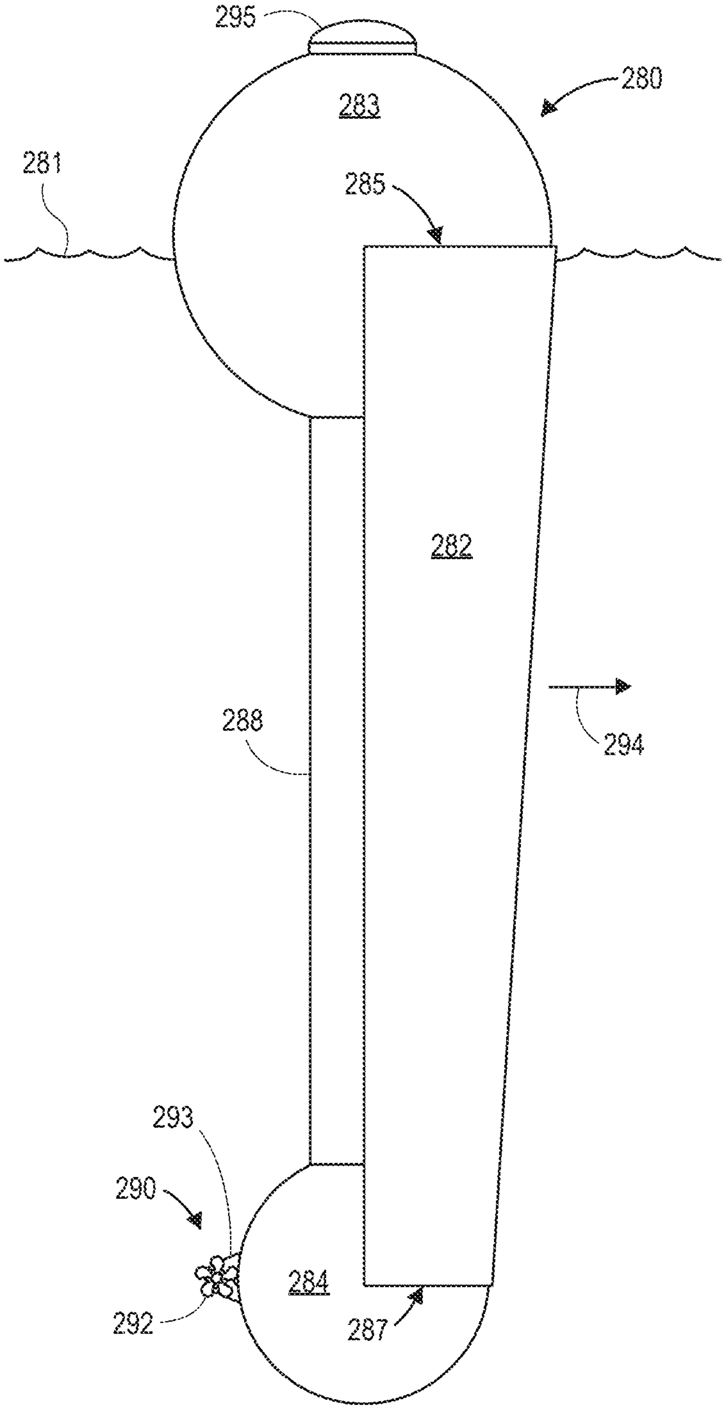
FIG. 53 is a side view of the eighth embodiment of the present invention.

FIG. 53 shows a side view of the same embodiment 280 of the current disclosure that is illustrated in FIGS. 50-52.

Figure 54:
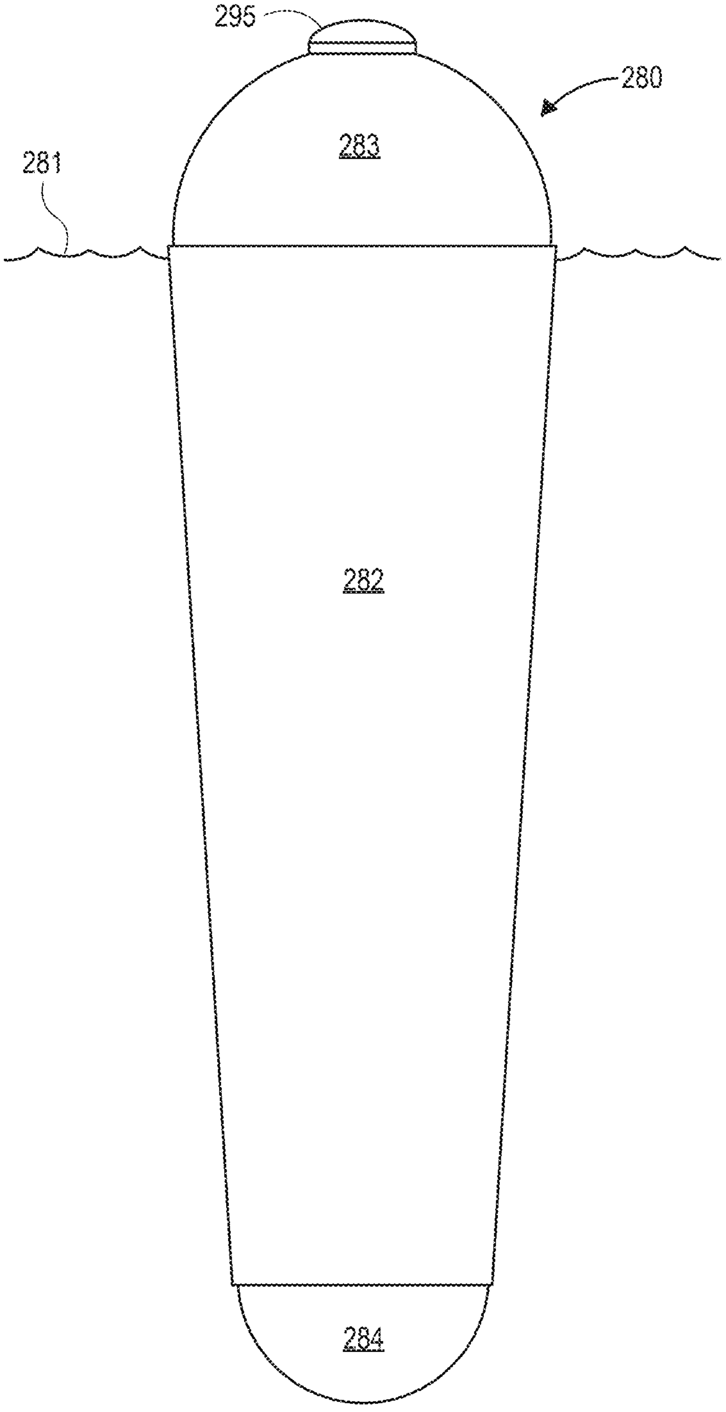
FIG. 54 is a side view of the eighth embodiment of the present invention.

FIG. 54 shows a side view of the same embodiment 280 of the current disclosure that is illustrated in FIGS. 50-53.

Figure 55:
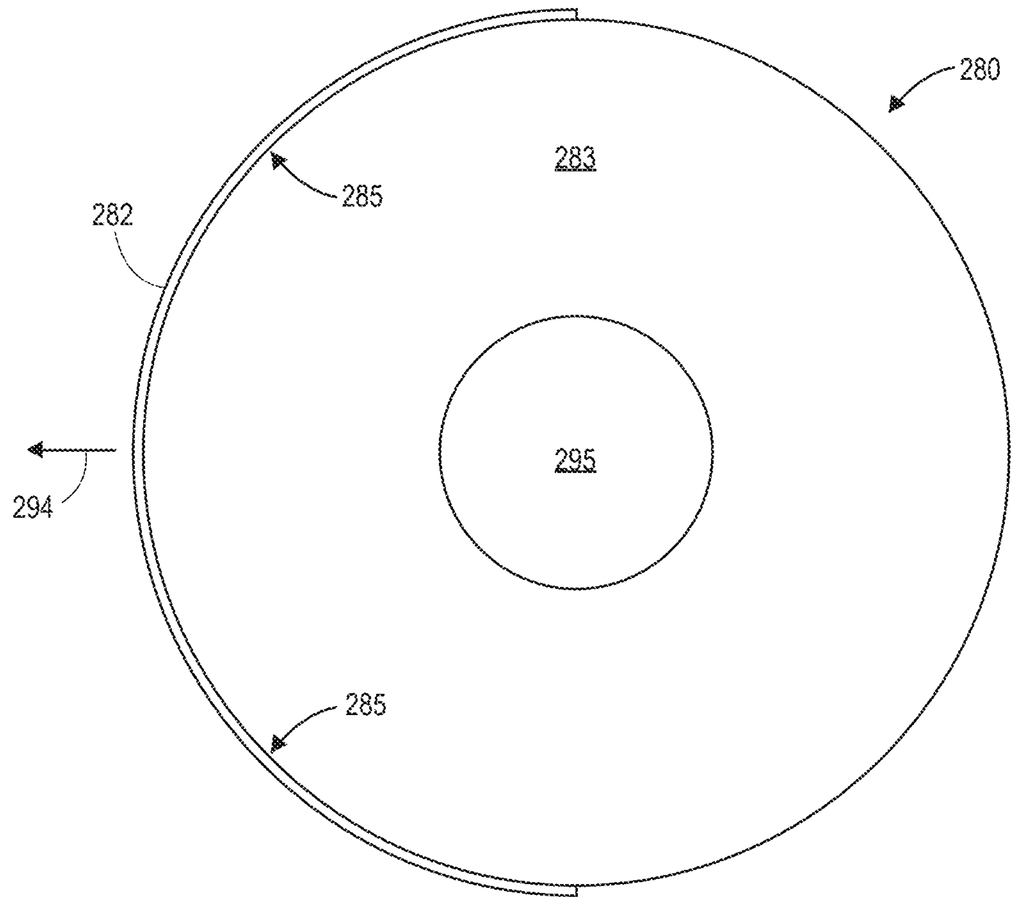
FIG. 55 is a top-down view of the eighth embodiment of the present invention.

FIG. 55 shows a top-down view of the same embodiment 280 of the current disclosure that is illustrated in FIGS. 50-54.

Figure 56:
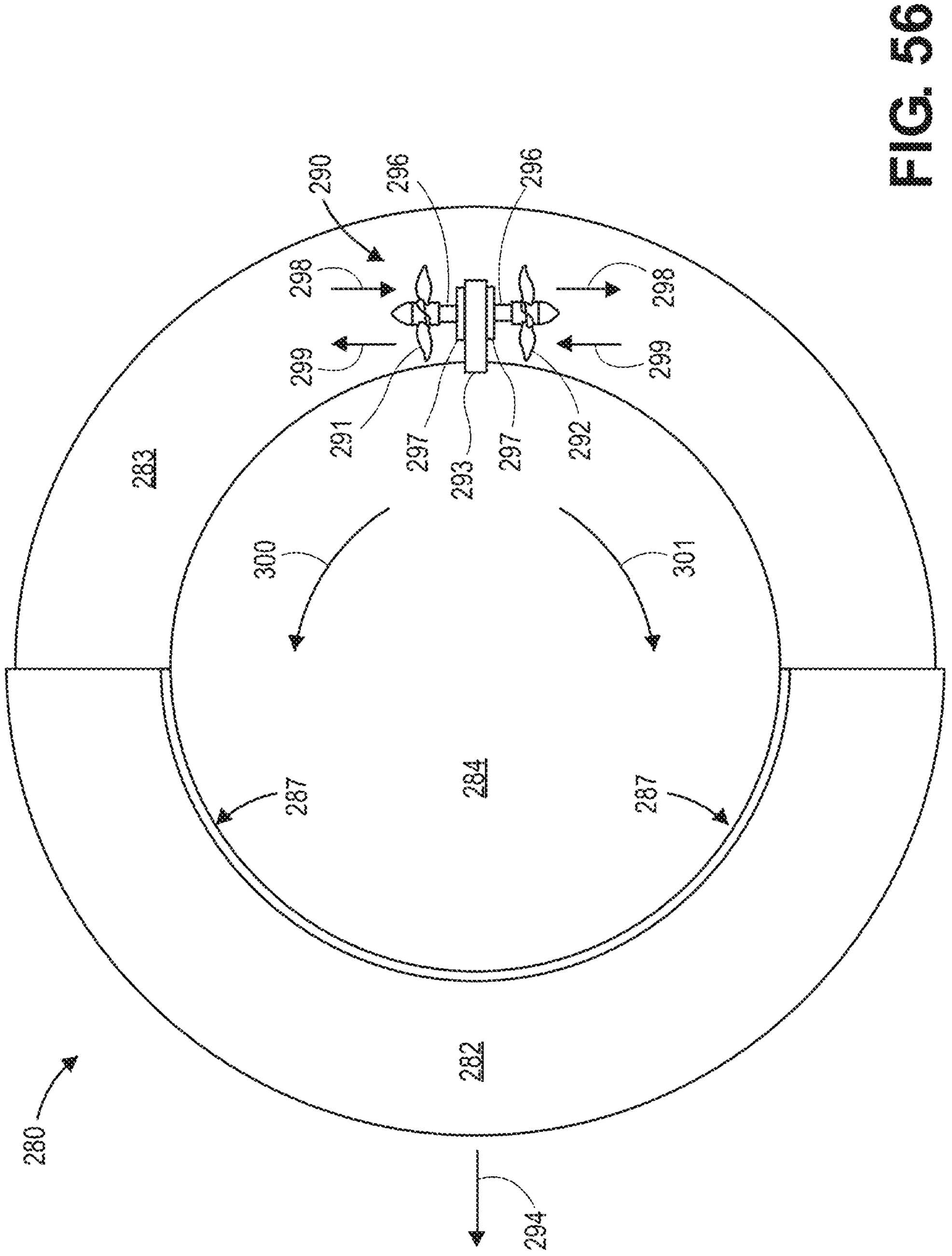
FIG. 56 is a bottom-up view of the eighth embodiment of the present invention.

FIG. 56 shows a bottom-up view of the same embodiment 280 of the current disclosure that is illustrated in FIGS. 50-55.

The thruster assembly 290 comprises, in part, left 291 and right 292 propellers, each attached to the same thruster shaft 296, and a thruster motor 297 which rotates the thruster shaft, and thereby rotates the left and right propellers, in either of two directions of rotation, e.g., causing lateral thrusts, e.g., 298 and 299, that alter the embodiment's yaw in clockwise or counterclockwise directions, respectively (relative to a top-down perspective).

When the embodiment's control circuit (not shown) within the embodiment's dome 295 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the thruster motor 297 operably connected to the thruster shaft 296, and therethrough to the left 291 and right 292 propellers, so as to rotate those propellers in a direction that pushes 298 water in a clockwise direction (relative to a bottom-up perspective), then the thrust of those propellers will impart to the embodiment 280 a torque which will tend to alter the embodiment's yaw (289 in FIG. 50) by rotating 300 the embodiment about its longitudinal axis (286 in FIG. 50) in a counterclockwise direction (relative to a bottom-up perspective).

If the embodiment's control circuit actuates and/or energizes the thruster motor 297 operably connected to the thruster shaft 296, and therethrough to the left 291 and right 292 propellers, so as to rotate those propellers in a direction that pushes 299 water in a counterclockwise direction (relative to a bottom-up perspective), then the thrust of those propellers will impart to the embodiment 280 a torque which will tend to alter the embodiment's yaw (289 in FIG. 50) by rotating 301 the embodiment about its longitudinal axis (286 in FIG. 50) in a clockwise direction (relative to a bottom-up perspective).

By actuating, and/or energizing, the thruster motor, and the left and right propellers thereto attached, so that they produce a tangential thrust at the thrust assembly 290, the embodiment may be rotated, e.g., 300 and 301, about its longitudinal axis (286 in FIG. 50) in a counterclockwise or clockwise direction, respectively, (relative to a bottom-up perspective) thereby enabling the embodiment's control circuit (not shown) to adjust the yaw of the embodiment in counterclockwise or clockwise directions, even as the forward force produced by the propulsive shroud 282 propels 294 the embodiment forward, thereby enabling the embodiment's control circuit to navigate the embodiment, and/or steer the embodiment, to and/or toward a geospatial location at the surface (281 of FIG. 50) of the body of water on which it floats.

Figure 57:
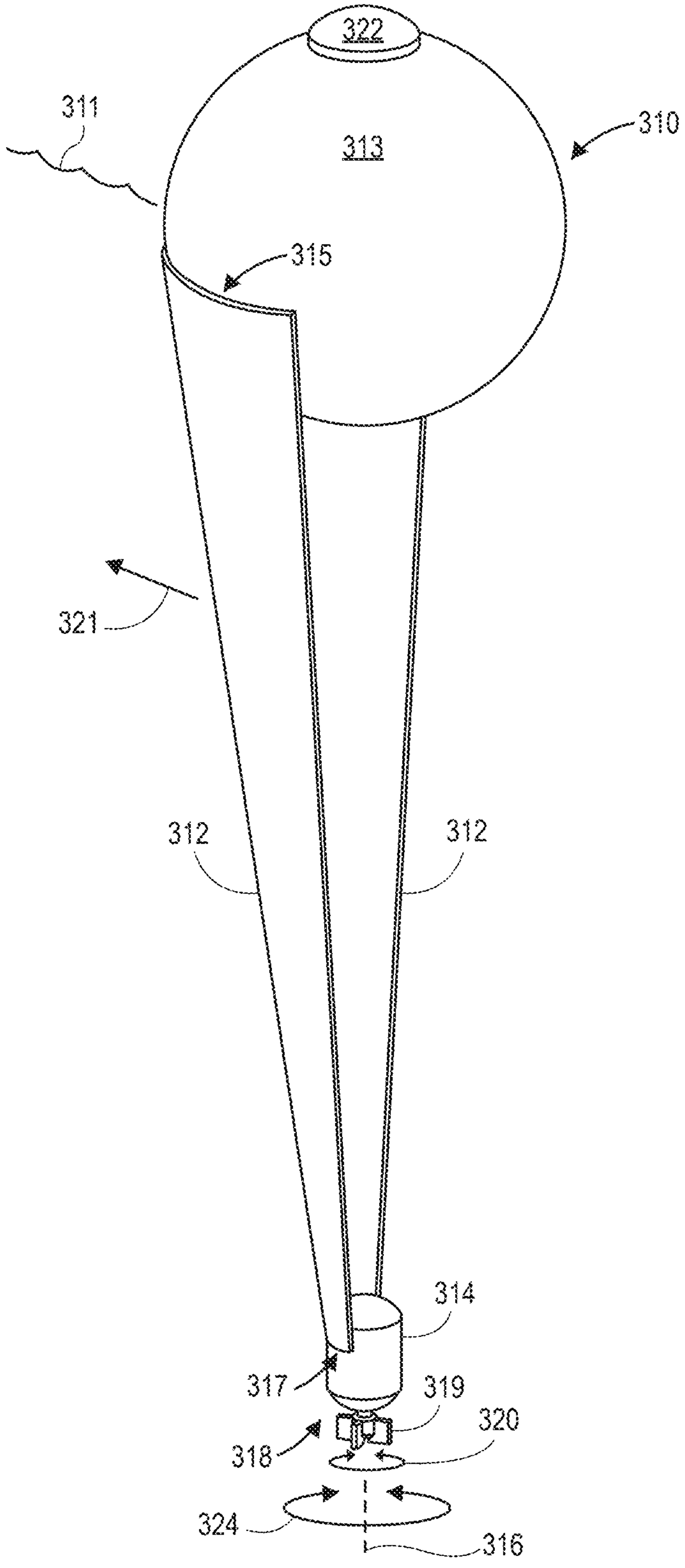
FIG. 57 is a perspective side view of a ninth embodiment of the present invention.

FIG. 57 shows a side perspective view of an embodiment 310 of the current disclosure.

The embodiment 310 floats adjacent to an upper surface 311 of a body of water over which waves pass. The embodiment 310 has a frustoconical propulsive shroud 312 has a radius of curvature at an uppermost end that is approximately equal to the lateral radius of an upper buoyant chamber 313 to which it is connected, attached, and/or affixed. The frustoconical propulsive shroud 312 has a radius of curvature at a lowermost end that is approximately equal to the lateral radius of a paddle-wheel motor 314 to which it is also connected, attached, and/or affixed. The propulsive shroud 312 may be considered as being directly attached to the upper chamber 313 and/or the paddle-wheel motor 314. For example, the propulsive shroud 312 may directly contact the surfaces of the upper chamber 313 and/or the surfaces of the paddle-wheel motor 314. Directly attached may also refer to the propulsive shroud 312 being welded or otherwise adhered to the upper chamber 313 and/or the lower chamber 314. That is, an upper seam and a lower seam may comprise welded material, an adhesive layer, or the like. The radius of curvature of the uppermost end is greater than the radius of curvature of the lowermost end.

The propulsive shroud 312 of embodiment 310 is attached, and/or affixed, e.g., by welds, to the upper chamber 313 at, and/or along, an upper seam 315 oriented horizontally, and/or within a plane normal to a longitudinal axis 316 of the embodiment. The propulsive shroud is attached, and/or affixed, e.g., by welds, to the paddle-wheel motor 314 at, and/or along, a lower seam 317 oriented horizontally, and/or within a plane normal to a longitudinal axis 316 of the embodiment.

The embodiment 310 comprises the upper buoyant chamber 313 which causes the embodiment to float adjacent to the upper surface 311 of a body of water. And, the embodiment

310 further comprises a paddle-wheel motor 314. The upper chamber and the paddle-wheel motor are structurally connected by the propulsive shroud 312 to which each is fixedly attached, e.g., by welds.

The embodiment 310 controls, corrects, adjusts, and/or regulates, its yaw 324 with a paddle-wheel assembly 318. The paddle-wheel assembly comprises a paddle wheel 319 attached, and/or connected, to a paddle-wheel shaft. The paddle wheel, and the paddle-wheel shaft to which it is connected, are caused to rotate by a paddle-wheel motor 314 that is activated and controlled by a paddle-wheel control circuit (not shown). When so activated, the paddle-wheel motor spins the paddle-wheel shaft and thereby spins 320 the paddle wheel, in one of two rotational directions. The paddle-wheel control circuit's control of the paddle-wheel motor, and its connected paddle wheel, permits the embodiment to control, correct, adjust, and/or regulate, its yaw 324.

As a consequence of its obstruction of wave motion at the embodiment, the propulsive shroud 312 imparts a "forward" force, i.e., a lateral force at the propulsive shroud and directed away from the embodiment's longitudinal axis 316. That forward force then tends to propel 321 the embodiment in the same forward direction.

The frustoconical propulsive shroud 312 of embodiment 310 is approximately radially symmetrical about, and coaxial with, the embodiment's longitudinal axis 316. The angular extent of the frustoconical propulsive shroud about the embodiment's longitudinal axis is approximately 180 degrees. Thus, the propulsive shroud of embodiment 310 is substantially a "half-cone" and/or a "half-frustoconical segment."

A dome 322 affixed to a top side of the upper buoyant chamber 313 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a thruster control circuit (not shown) that the embodiment control circuit uses to activate and control, via its activation and control of the paddle-wheel motor 314, the paddle-wheel shaft, and the paddle wheel 319 attached thereto, in order to alter and/or control the yaw 316 of the embodiment.

The direction of the embodiment's rotation about its longitudinal axis 316 depends on the respective direction of rotation of the paddle-wheel shaft, and the consequent direction of rotation of the paddle wheel 319.

Torques applied to the embodiment 310 by the embodiment's paddle-wheel assembly 318 allow the yaw 324, and/or direction 321 of forward propulsion, to be altered, adjusted, corrected, and/or controlled, thereby enabling the embodiment's control circuit to steer the embodiment and navigate the embodiment to a geospatial location at the surface 311 of the body of water.

An embodiment similar to the one illustrated in FIG. 57 contains an internal power take off that converts a wave-induced motion of the embodiment into an electrical power that is then used to provide electrical power to, and energize, the electrical components and systems, as well as to provide power to the paddle-wheel motor 314 that rotates the paddle wheel.

An embodiment similar to the one illustrated in FIG. 57 stores compressed hydrogen within a hydrogen tank (not shown) positioned within its upper chamber 313. The embodiment further comprises a fuel cell, e.g., also positioned within the upper chamber 313, that consumes a portion of the hydrogen stored within the hydrogen tank, in combination and/or conjunction with oxygen taken from the atmosphere outside the embodiment, in order to produce, and/or to provide, a supply of electrical power to the embodiment. The embodiment uses a portion of the electrical power produced by its fuel cell to provide electrical power to, and energize, the electrical components and systems, as well as to provide power to the paddle-wheel motor 314 that rotates the paddle wheel 319.

Figure 58:
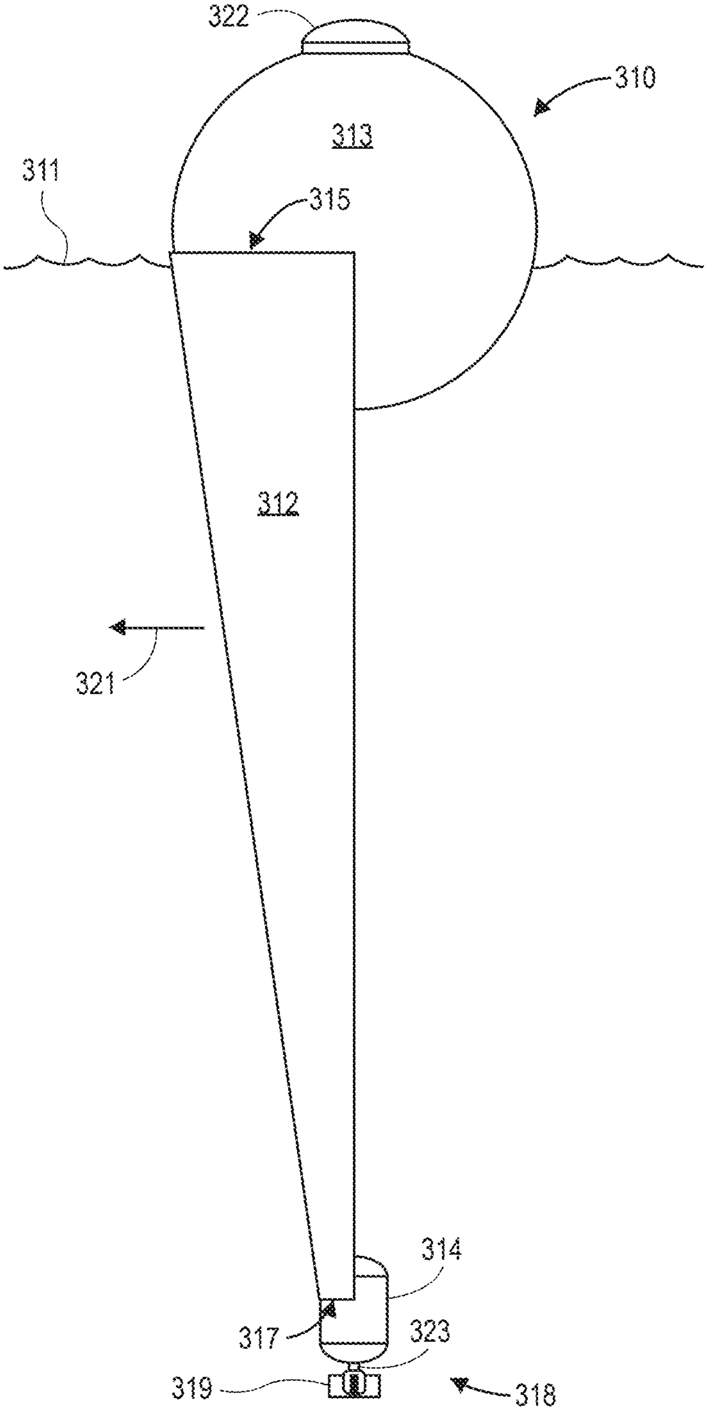
FIG. 58 is a side view of the ninth embodiment of the present invention.

FIG. 58 shows a side view of the same embodiment 310 of the current disclosure that is illustrated in FIG. 57.

The paddle-wheel assembly 318 is comprised of a paddle-wheel motor 314, a paddle-wheel shaft 323 rotatably connected to the paddle-wheel motor, and a paddle wheel 319 fixedly attached to the paddle-wheel shaft.

Figure 59:
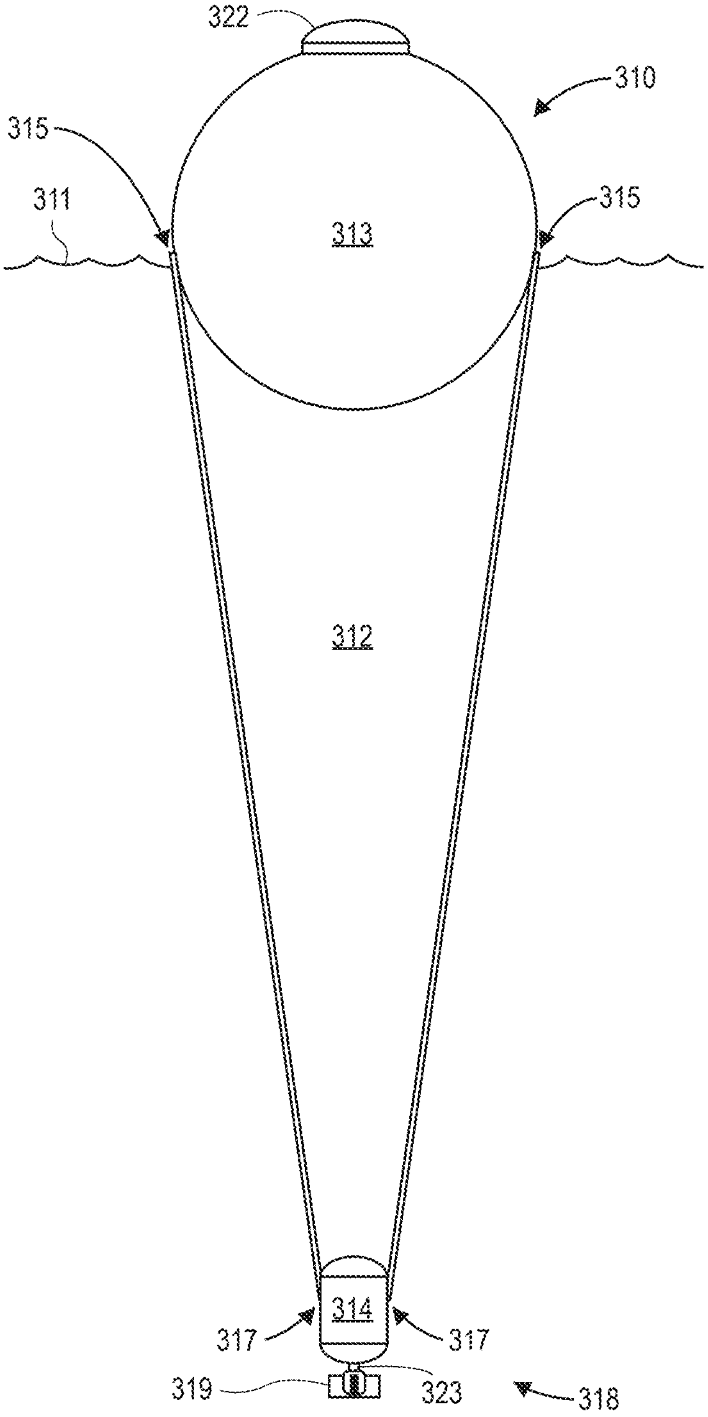
FIG. 59 is a side view of the ninth embodiment of the present invention.

FIG. 59 shows a side view of the same embodiment 310 of the current disclosure that is illustrated in FIGS. 57 and 58.

Figure 60:
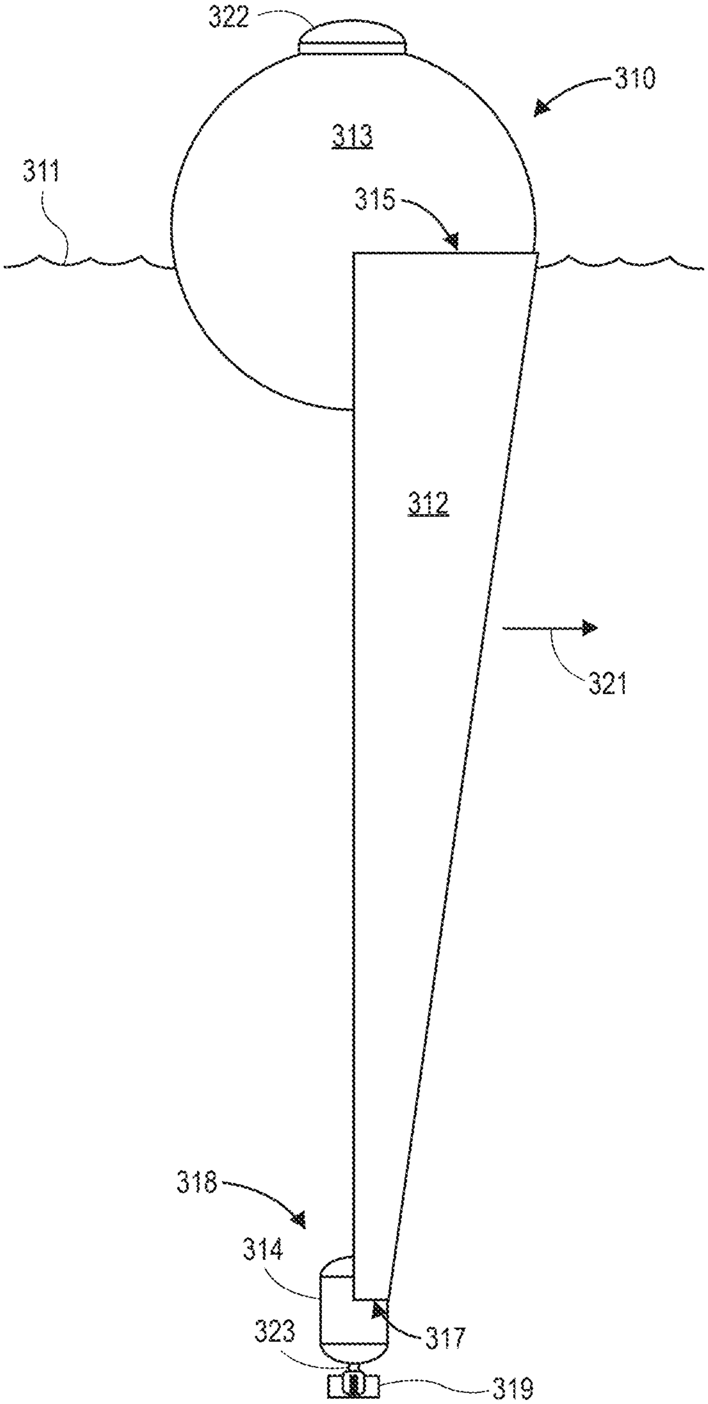
FIG. 60 is a side view of the ninth embodiment of the present invention.

FIG. 60 shows a side view of the same embodiment 310 of the current disclosure that is illustrated in FIGS. 57-59.

Figure 61:
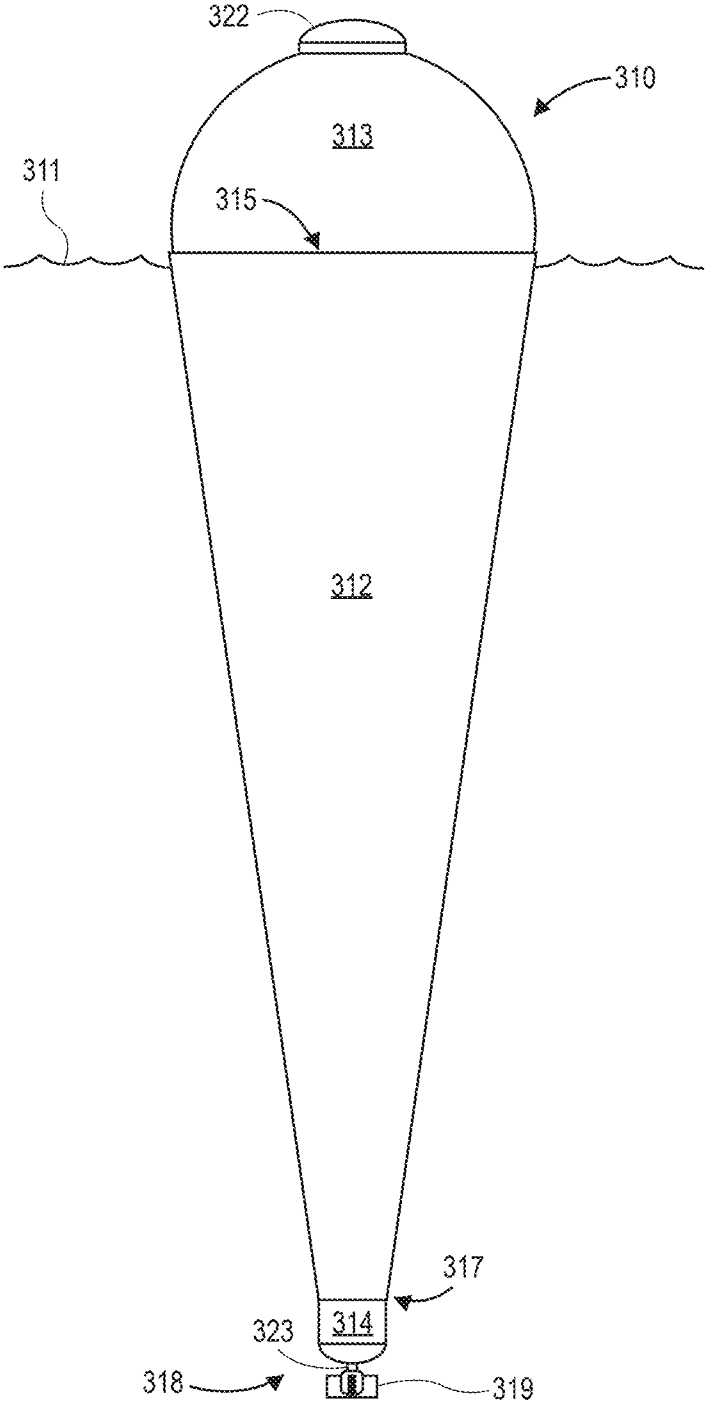
FIG. 61 is a side view of the ninth embodiment of the present invention.

FIG. 61 shows a side view of the same embodiment 310 of the current disclosure that is illustrated in FIGS. 57-60.

Figure 62:
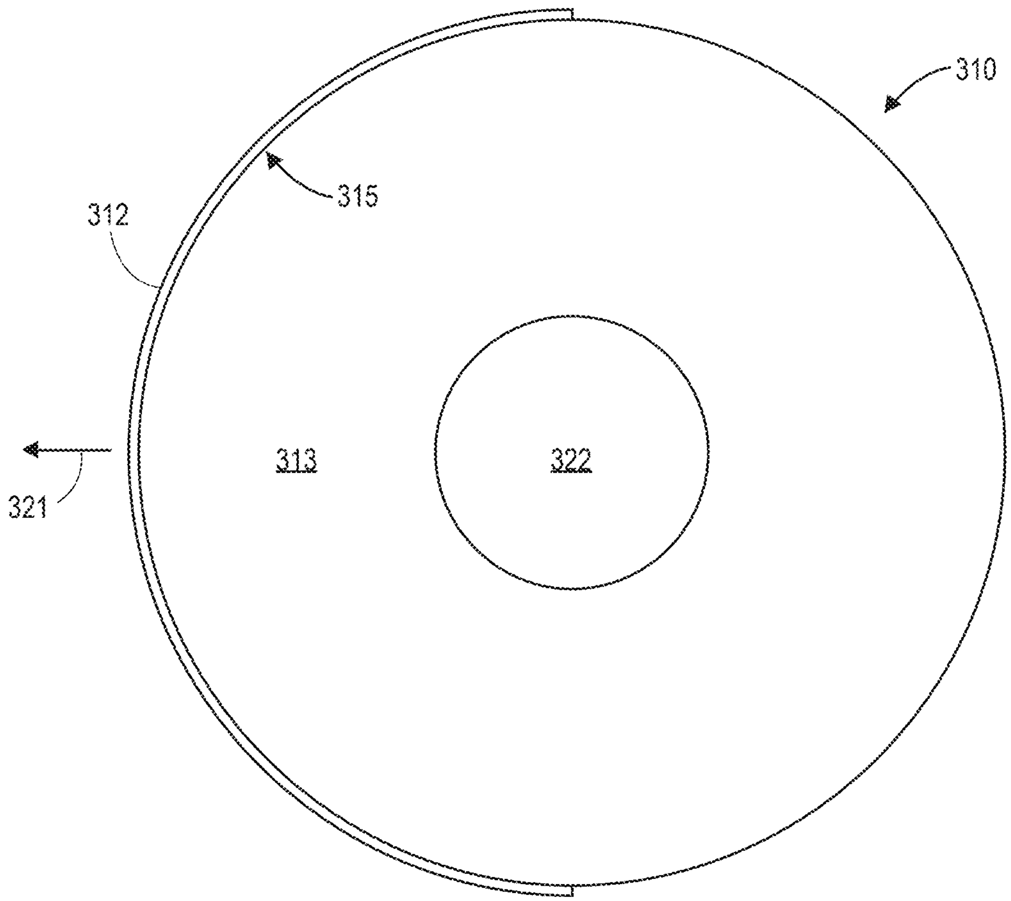
FIG. 62 is a top-down view of the ninth embodiment of the present invention.

FIG. 62 shows a top-down view of the same embodiment 310 of the current disclosure that is illustrated in FIGS. 57-61.

Figure 63:
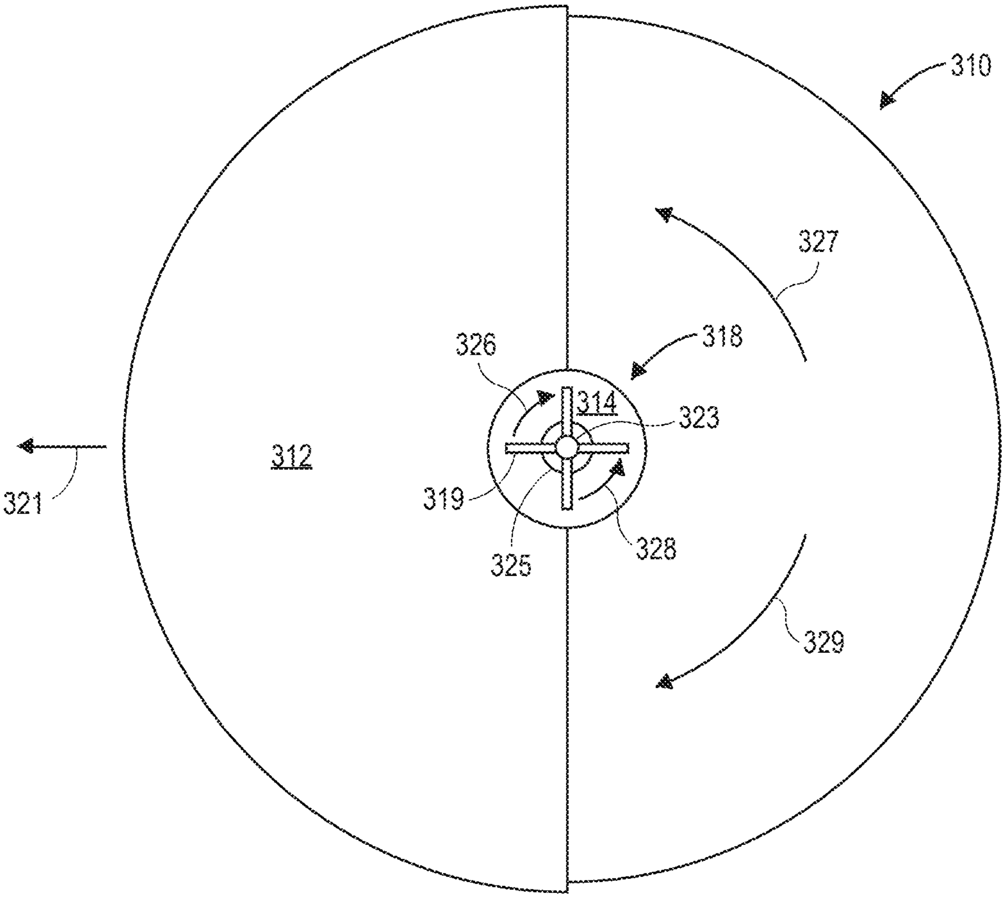
FIG. 63 is a bottom-up view of the ninth embodiment of the present invention.

FIG. 63 shows a bottom-up view of the same embodiment 310 of the current disclosure that is illustrated in FIGS. 57-62.

The paddle-wheel assembly 318 comprises, in part, a paddle wheel 319 having four flat paddles, each paddle is attached to a paddle-wheel hub 325, which is fixedly attached to the paddle-wheel shaft 323, which in turn is rotatably connected to, paddle-wheel motor 314 which rotates the paddle-wheel shaft, the paddle-wheel hub, and the four paddles attached thereto, in either of two directions of rotation, each of which alters the embodiment's yaw 324.

When the embodiment's control circuit (not shown) within the embodiment's dome 322 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the paddle-wheel motor 314, which is operably connected to the paddle-wheel shaft 323, the paddle-wheel hub 325, and therethrough to the four-paddle paddle wheel, so as to rotate that paddle wheel about the longitudinal axis of the paddle-wheel shaft in a direction that rotates 326 water in a clockwise direction (relative to a bottom-up perspective), then the torque of that paddle wheel 319 will impart a torque to the embodiment 310 which will tend to alter the embodiment's yaw (324 in FIG. 57) by rotating 327 the embodiment about its longitudinal axis (324 in FIG. 57) in a counterclockwise direction (relative to a bottom-up perspective).

If the embodiment's control circuit actuates and/or energizes the paddle-wheel motor 314, which is operably connected to the paddle-wheel shaft 323, the paddle-wheel hub 325, and therethrough to the four-paddle paddle wheel, so as to rotate that paddle wheel about the longitudinal axis of the paddle-wheel shaft in a direction that rotates 328 water in a counterclockwise direction (relative to a bottom-up perspective), then the torque of that paddle wheel 319 will impart a torque to the embodiment 310 which will tend to alter the embodiment's yaw (324 in FIG. 57) by rotating 329 the embodiment about its longitudinal axis (324 in FIG. 57) in a clockwise direction (relative to a bottom-up perspective).

By actuating, and/or energizing, the paddle-wheel motor 314, and the paddle wheel 319 thereto attached, so that the paddle wheel produces a torque at the paddle-wheel assembly 318, the embodiment may be rotated, e.g., 327 and 329, about its longitudinal axis (324 in FIG. 57) in a clockwise or counterclockwise direction, respectively, (relative to a bottom-up perspective) thereby enabling the embodiment's control circuit (not shown) to adjust the yaw of the embodiment in clockwise or counterclockwise directions, even as the forward force produced by the propulsive shroud 312 propels 321 the embodiment forward, thereby enabling the embodiment's control circuit to navigate the embodiment, and/or steer the embodiment, to and/or toward a geospatial location at the surface (311 of FIG. 57) of the body of water on which it floats.

Figure 64:
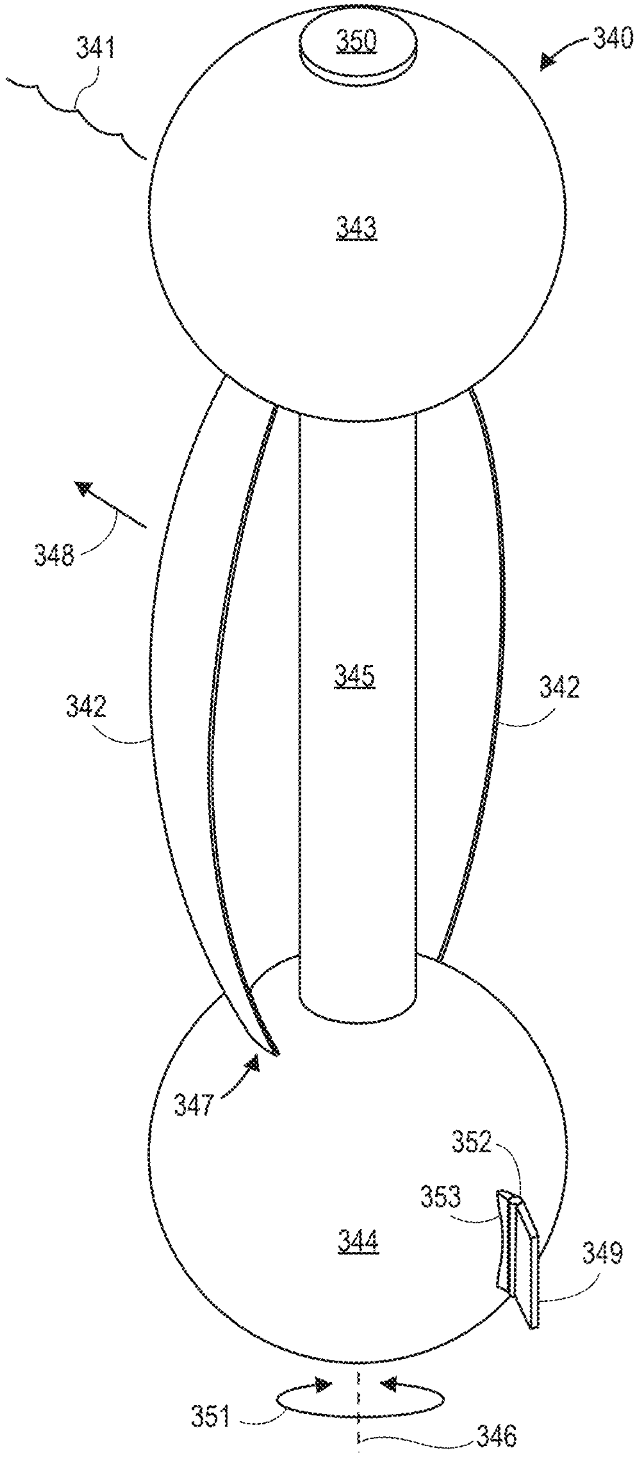
FIG. 64 is a perspective side view of a tenth embodiment of the present invention.

FIG. 64 shows a side perspective view of an embodiment 340 of the current disclosure.

The embodiment 340 floats adjacent to an upper surface 341 of a body of water over which waves pass. The embodiment 340 is similar to the embodiment 150 illustrated in FIGS. 15-21. However, unlike the semi-cylindrical shroud 152 of embodiment 150, the propulsive shroud 342 of embodiment 340 is semi-ellipsoidal. The radius of curvature of the propulsive shroud 342 of embodiment 340 is not constant.

Embodiment 340 comprises an upper buoyant chamber 343 which causes the embodiment to float adjacent to an upper surface 341 of a body of water over which waves pass. Embodiment 340 further comprises a lower chamber 344. And the upper and lower chambers of embodiment 340 are structurally connected by a central cylindrical tube 345.

The propulsive shroud 342 of embodiment 340 is attached, and/or affixed, to the upper chamber 343 at, and/or along, an upper seam (not visible) oriented horizontally, and/or within a plane normal to a longitudinal axis 346 of the embodiment. The propulsive shroud is attached, and/or affixed, to the lower chamber 344 at, and/or along, a lower seam 347 oriented horizontally, and/or within a plane normal to a longitudinal axis 346 of the embodiment. The propulsive shroud 342 may be considered as being directly attached to the upper chamber 343 and/or the lower chamber 344. For example, the propulsive shroud 342 may directly contact the surfaces of the upper chamber 343 and/or the surfaces of the lower chamber 344. Directly attached may also refer to the propulsive shroud 342 being welded or otherwise adhered to the upper chamber 343 and/or the lower chamber 344. That is, an upper seam and a lower seam may comprise welded material, an adhesive layer, or the like.

As a consequence of, and/or in response to, its obstruction of the motion of a wave at the embodiment 340, the propulsive shroud 342 produces a lateral force that tends to propel 348 the embodiment in a "forward" direction, i.e., in a direction at the propulsive shroud that is directed away from, a rudder 349 of the embodiment.

The semi-ellipsoidal propulsive shroud 342 of embodiment 340 is approximately radially symmetrical about, and coaxial with, the embodiment's longitudinal axis 346. The angular extent of the semi-ellipsoidal propulsive shroud about the embodiment's longitudinal axis is approximately 180 degrees. Thus, the propulsive shroud of embodiment 340 is substantially a "half-ellipsoid."

A dome 350 affixed to a top side of the upper buoyant chamber 343 contains radio and/or satellite communications equipment (not shown), enabling the embodiment to communicate with remote, and/or external, sources of information and control (not shown), e.g., for the purpose of receiving navigational targets and weather data. The dome also contains a GPS geospatial location sensor (not shown), an orientation sensor and accelerometer (not shown), an embodiment control circuit (not shown), and a rudder control circuit (not shown) that the embodiment control circuit uses to control the angular orientation of the rudder 349, e.g., through an activation and/or control of an electrical worm-screw a rotation of which controls the angular position and/or orientation of the rudder, in order to alter and/or control the yaw 351 of the embodiment.

The rudder 349 of embodiment 340 is rotatably connected to a rudder shaft 352. And, that rudder shaft is connected to the lower chamber 344 of the embodiment by a bulwark 353. The rudder shaft 352 rotatably connects the rudder 349 to the bulwark 353, and therethrough to the other parts and/or portions of the embodiment 340.

An embodiment similar to the one illustrated in FIG. 64 contains an internal power take off that converts a wave-induced motion of the embodiment into an electrical power that is then used to provide electrical power to, and energize, the electrical components and systems, as well as to provide power to the rudder 349, e.g., to an electrical worm-screw motor (not shown) that rotates the rudder about the vertical rudder shaft 352 rotatably connecting the rudder to the rest of the embodiment.

An embodiment similar to the one illustrated in FIG. 64 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the rudder 349, e.g., to an electrical worm-screw motor (not shown) that rotates the rudder about the vertical rudder shaft 352 rotatably connecting the rudder to the rest of the embodiment.

Figure 65:
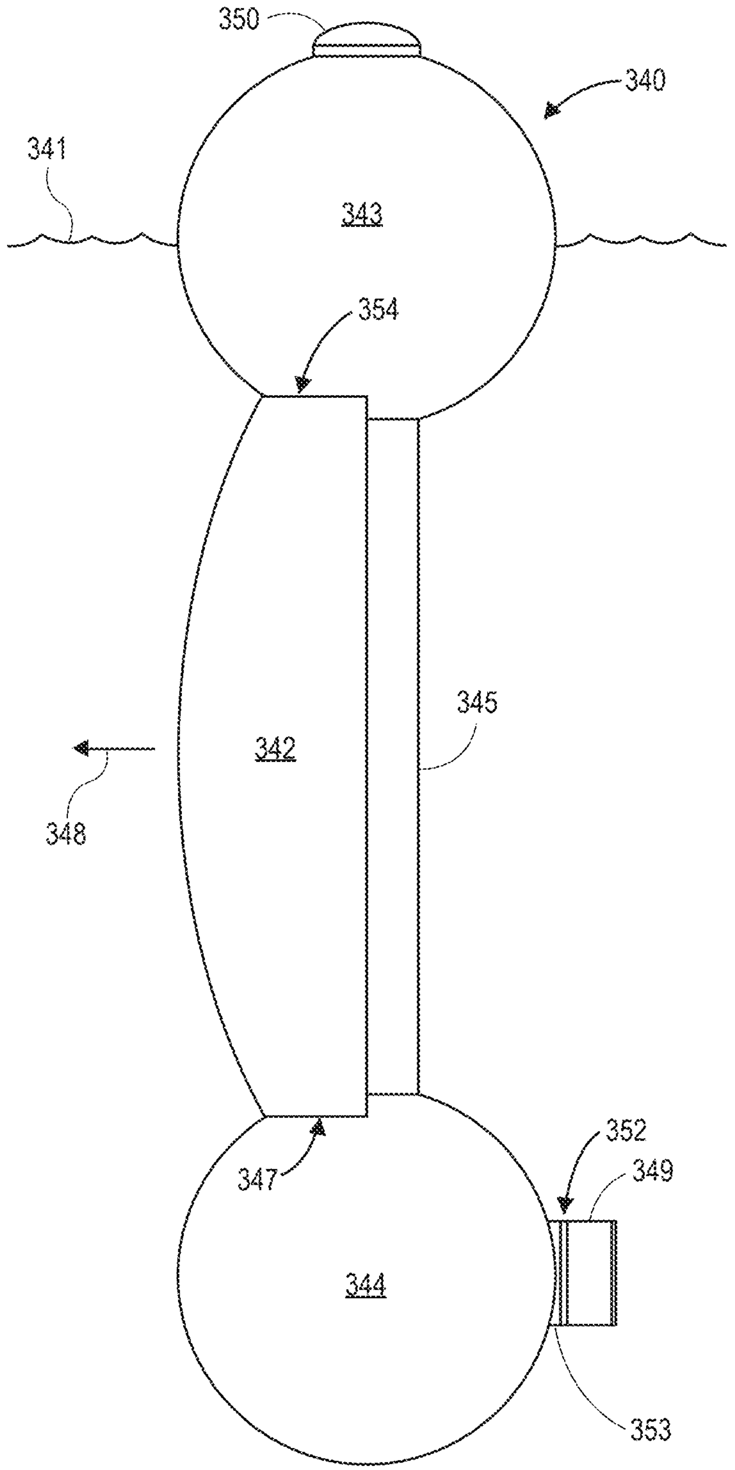
FIG. 65 is a side view of the tenth embodiment of the present invention.

FIG. 65 shows a side view of the same embodiment 340 of the current disclosure that is illustrated in FIG. 64.

The embodiment's propulsive shroud 342 is attached to the upper chamber 343 at, and/or along, an upper seam 354 oriented horizontally, and/or within a plane normal to a longitudinal axis (346 in FIG. 64) of the embodiment.

Figure 66:
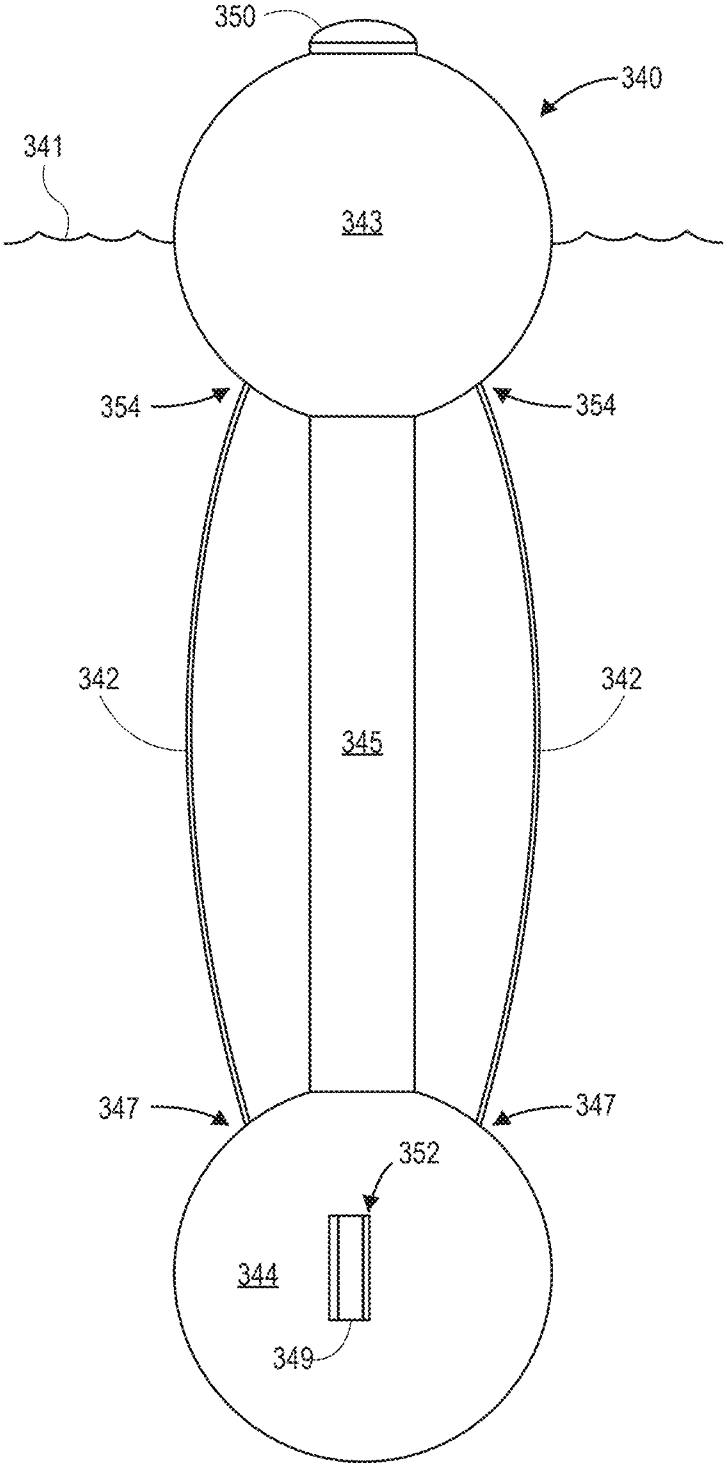
FIG. 66 is a side view of the tenth embodiment of the present invention.

FIG. 66 shows a side view of the same embodiment 340 of the current disclosure that is illustrated in FIGS. 64 and 65.

Figure 67:
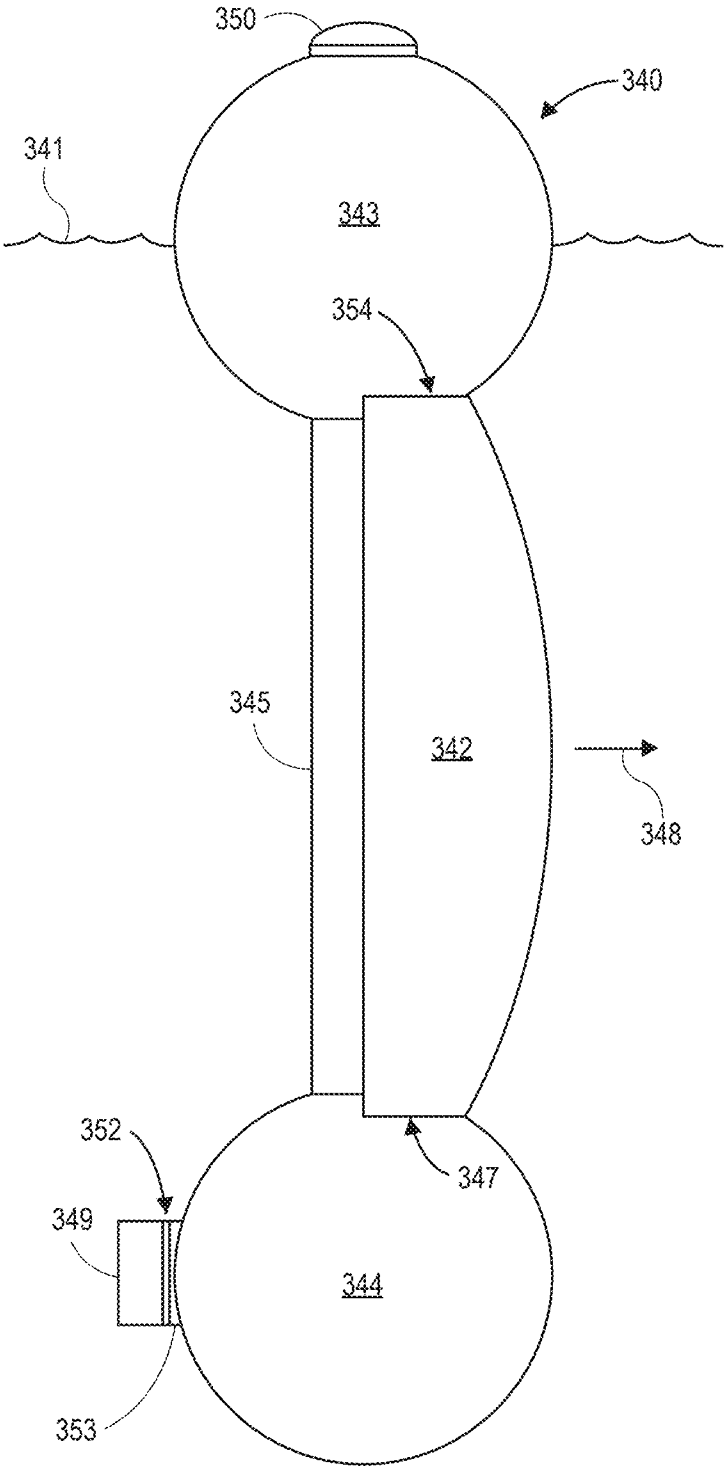
FIG. 67 is a side view of the tenth embodiment of the present invention.

FIG. 67 shows a side view of the same embodiment 340 of the current disclosure that is illustrated in FIGS. 64-66.

Figure 68:
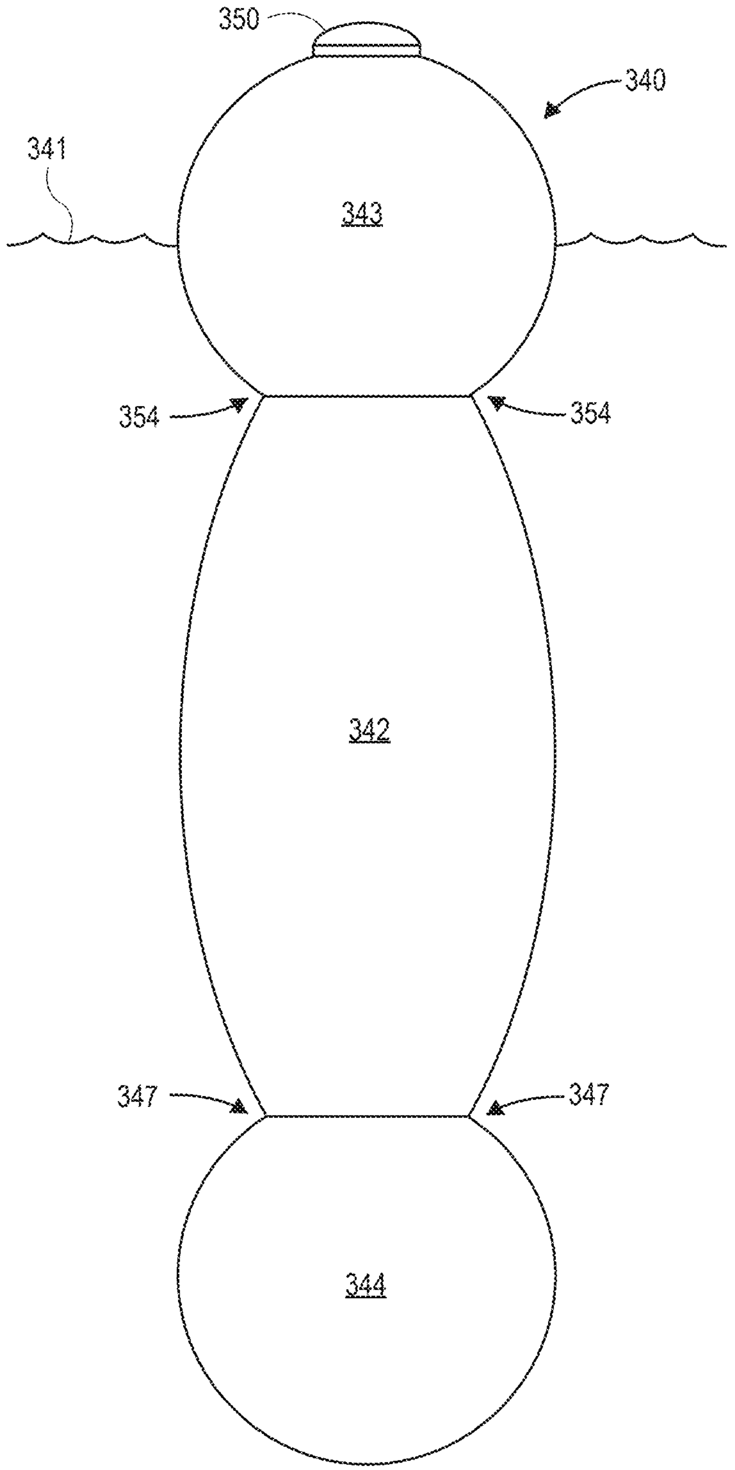
FIG. 68 is a side view of the tenth embodiment of the present invention.

FIG. 68 shows a side view of the same embodiment 340 of the current disclosure that is illustrated in FIGS. 64-68.

Figure 69:
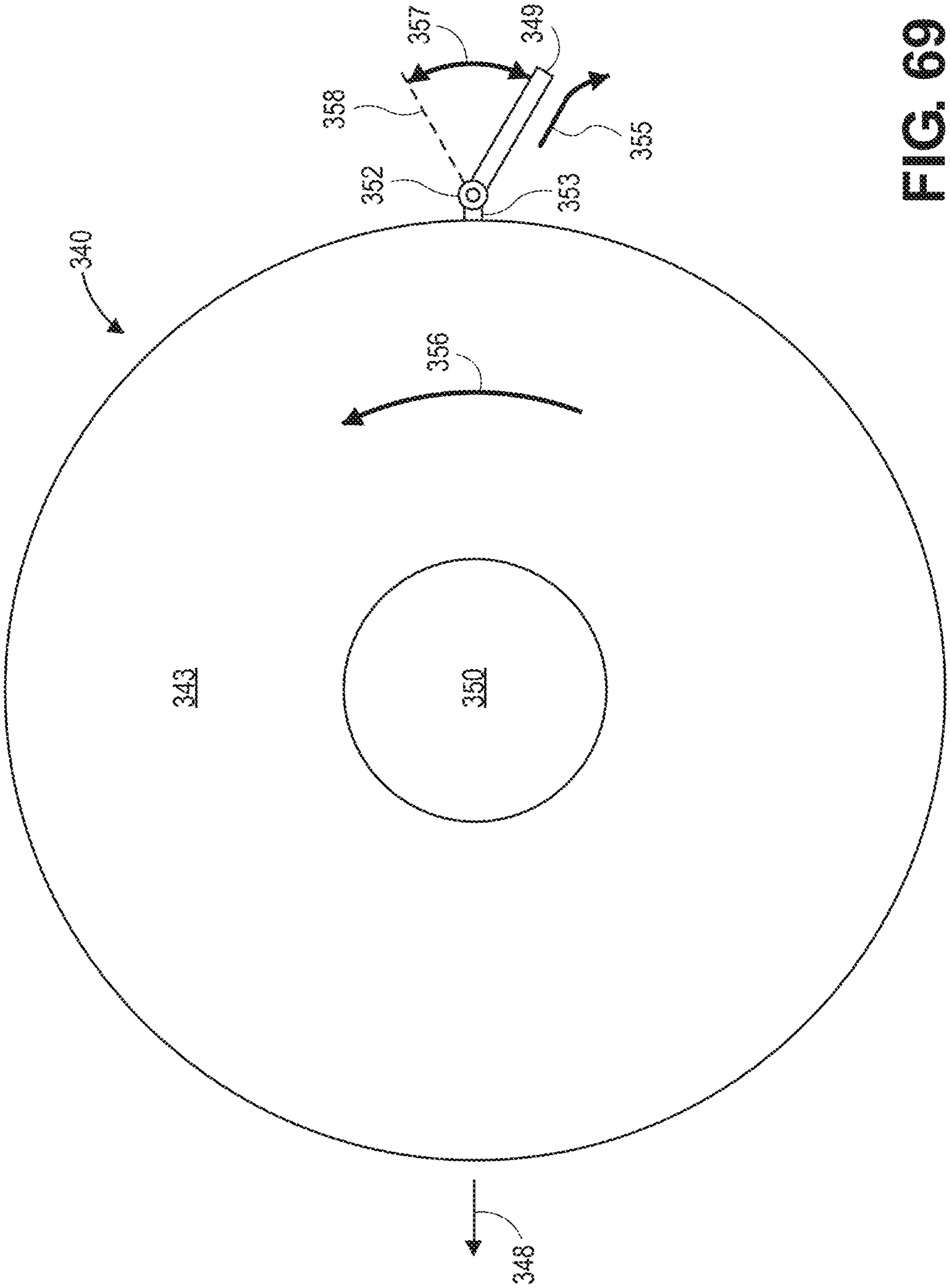
FIG. 69 is a top-down view of the tenth embodiment of the present invention.

FIG. 69 shows a top-down view of the same embodiment 340 of the current disclosure that is illustrated in FIGS. 64-69.

When the embodiment's control circuit (not shown) within the embodiment's dome 350 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 349, and not shown) operably connected to rudder 349 so as to rotate that rudder in a direction that deflects 355 water in a clockwise direction (relative to a top-down perspective), then that rudder's thrust will impart to the embodiment 340 a counterclockwise torque which will tend to alter the embodiment's yaw by rotating 356 the embodiment about its longitudinal axis (346 in FIG. 64) in a counterclockwise direction (relative to a top-down perspective).

By adjusting the angular position of the rudder 349, to an orientation within a range 357 of rudder orientations, the embodiment's control circuit can alter the yaw, e.g., 346 in FIG. 64, of the embodiment, thereby enabling the embodiment's control circuit to steer the embodiment and navigate the embodiment to a geospatial location at the surface 341 of the body of water. For example, when moved to an angular position 358 laterally opposite that of the illustrated angular position (at 349) the torque, and the rotation, imparted to the embodiment would be opposite that illustrated at 356.

An embodiment similar to the one illustrated in FIGS. 64-70 contains an internal power take off that converts a wave-induced motion of the embodiment into an electrical power that is then used to provide electrical power to, and energize, the electrical components and systems, as well as to provide power to the motor (not shown) that rotates the embodiment's rudder.

An embodiment similar to the one illustrated in FIG. 64-70 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder.

An embodiment similar to the one illustrated in FIG. 64-70 includes, incorporates, utilizes, and/or further comprises, thrusters, such as those illustrated in conjunction with embodiment 120 illustrated in FIGS. 8-14.

Figure 70:
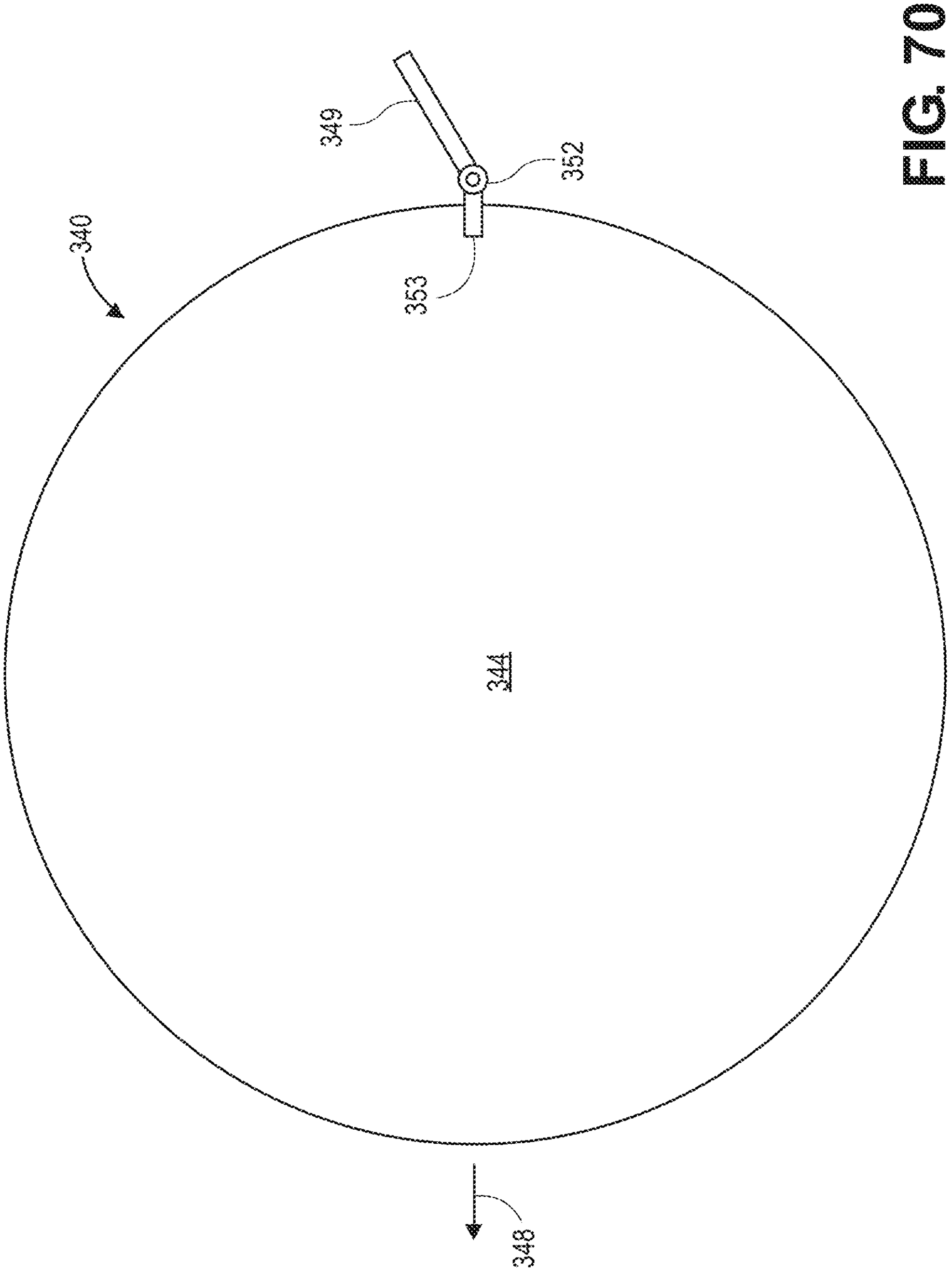
FIG. 70 is a bottom-up view of the tenth embodiment of the present invention.

FIG. 70 shows a bottom-up view of the same embodiment 340 of the current disclosure that is illustrated in FIGS. 64-70.

Figure 71:
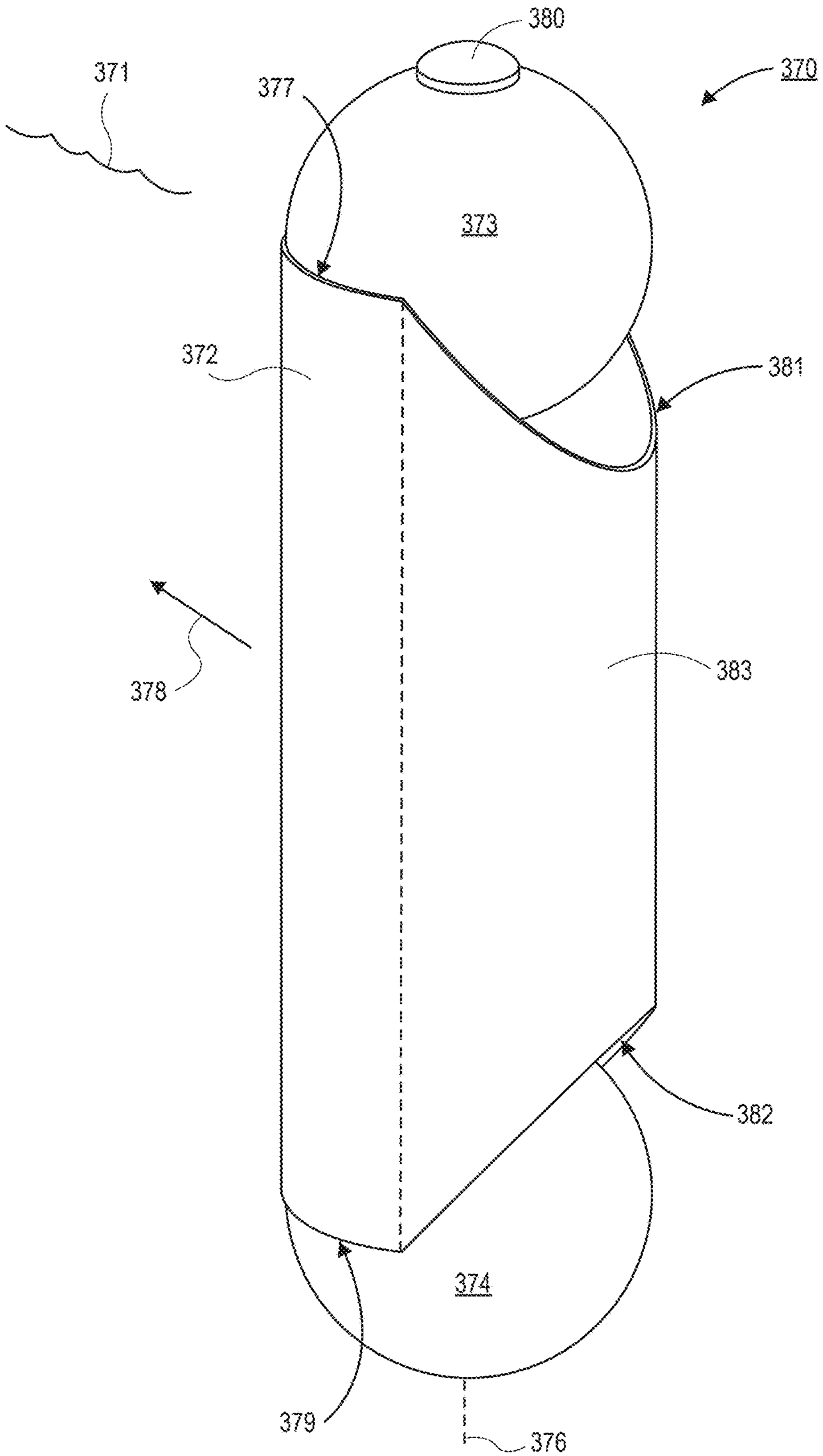
FIG. 71 is a perspective side view of an eleventh embodiment of the present invention.

FIG. 71 shows a side perspective view of an embodiment 370 of the current disclosure.

The embodiment 370 floats adjacent to an upper surface 371 of a body of water over which waves pass.

The embodiment 370 comprises an upper hollow and buoyant chamber 373, a lower chamber 374, and a tube (not visible in FIG. 71) that rigidly connects the upper chamber 373 to the lower chamber 374. Attached to a "forward" side of the upper 373 and lower 374 chambers is a cylindrical propulsive shroud 372. The radius of curvature of the cylindrical propulsive shroud is approximately equal to the radii of the upper 373 and lower 374 chambers. In contrast to other embodiments, the propulsive shroud 372 is a complete cylinder through at least some cross-sections. For example, the front of the propulsive shroud 372 (e.g., a half-pipe portion) may be connected to a backing portion 383 that wraps around the remainder of a longitudinal axis 376 of the embodiment 370. While a dashed line is shown between the propulsive shroud 372 and the backing portion 383 in FIG. 71, it is to be appreciated that the backing portion 383 and the propulsive shroud 372 may be a single monolithic structure (e.g., without any seams) in some instances.

The backing portion 383 may include cutouts 381 (top) and 382 (bottom). The cutouts 381 and 382 may be formed through the removal of sections of the backing portion 383 along planes that are non-orthogonal to a longitudinal axis 376 of the embodiment 370. For example, a minimum height of the backing portion 383 may be less than a height of the front of the propulsive shroud 372. While shown as being planar slices out of the backing portion 383, the cutouts 381 and 382 may take any profile. More generally, the backing portion 383 may be semi-cylindrical with a non-uniform height through cross-sections parallel to the longitudinal axis 376 of the embodiment 370.

The propulsive shroud is attached to the upper chamber 373 at, and/or along, an upper seam 377 oriented horizontally, and/or within a plane normal to the longitudinal axis 376 of the embodiment 370. The propulsive shroud 372 is attached to the lower chamber 374 at, and/or along, a lower seam 379 oriented horizontally, and/or within a plane normal to a longitudinal axis 376 of the embodiment 370. The partial cylindrical propulsive shroud 372 (with backing portion 383) of embodiment 370 is approximately radially symmetrical about, and coaxial with, the embodiment's longitudinal axis 376. The propulsive shroud 372 may be considered as being directly attached to the upper chamber 373 and/or the lower chamber 374. For example, the propulsive shroud 372 may directly contact the surfaces of the upper chamber 373 and/or the surfaces of the lower chamber 374. Directly attached may also refer to the propulsive shroud 372 being welded or otherwise adhered to the upper chamber 373 and/or the lower chamber 374. That is, an upper seam and a lower seam may comprise welded material, an adhesive layer, or the like.

The embodiment 370 is propelled in a forward direction 378 through the use of the propulsive shroud 372. The forward direction 378 can generally be described as being upstream and/or against the current of the body of water in which the embodiment 370 floats. In some instances, the propulsion mechanism may be similar to any of the propulsive mechanisms described in greater detail herein.

The embodiment 370 may include a dome 380 provided on the upper chamber 373. The dome 380 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 370 as a wave energy converter device.

An embodiment similar to the one illustrated in FIG. 71 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 71 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 71 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 71 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 72:
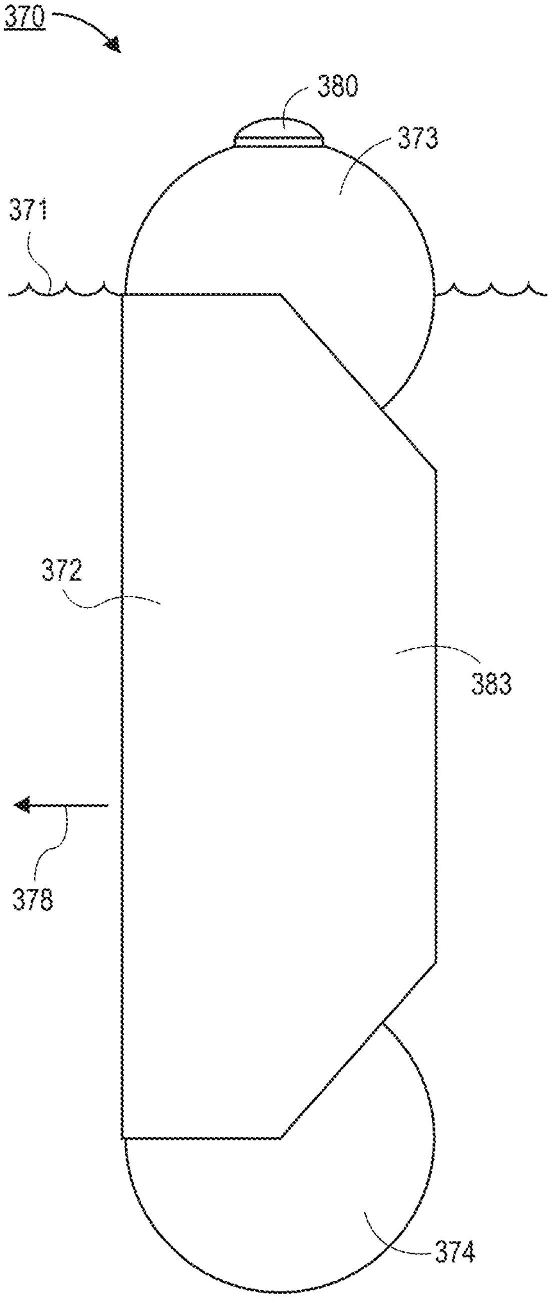
FIG. 72 is a side view of the eleventh embodiment of the present invention.

FIG. 72 shows a side view of the same embodiment 370 of the current disclosure that is illustrated in FIG. 71.

Figure 73:
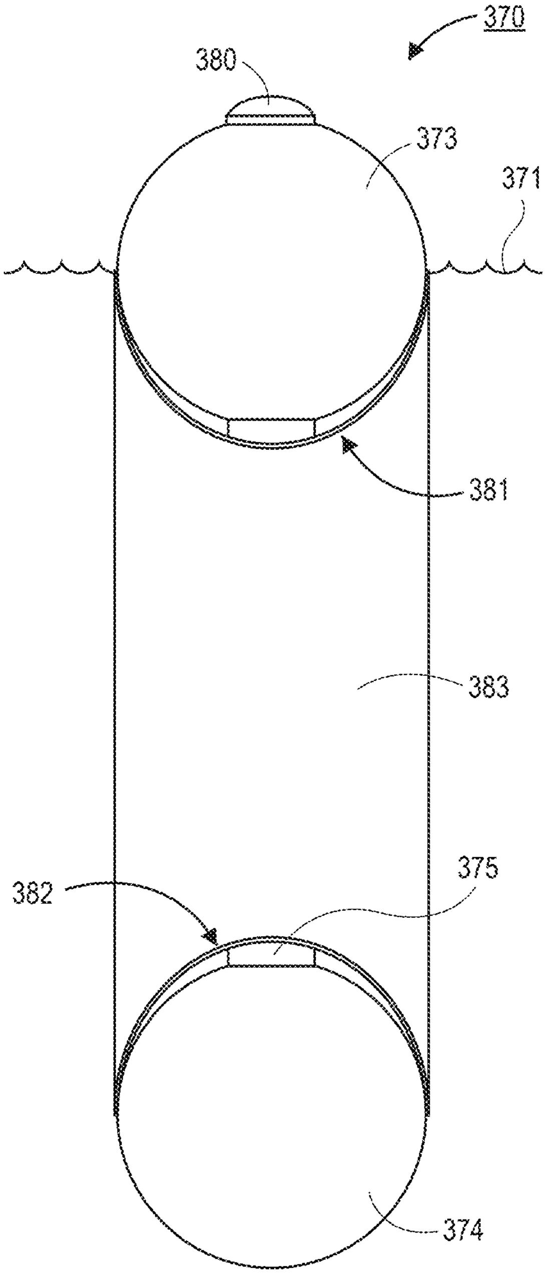
FIG. 73 is a side view of the eleventh embodiment of the present invention.

FIG. 73 shows a side view of the same embodiment 370 of the current disclosure that is illustrated in FIGS. 71 and 72. The cutouts 381 and 382 in FIG. 73 expose the tube 375 that couples the upper chamber 373 to the lower chamber 374.

Figure 74:
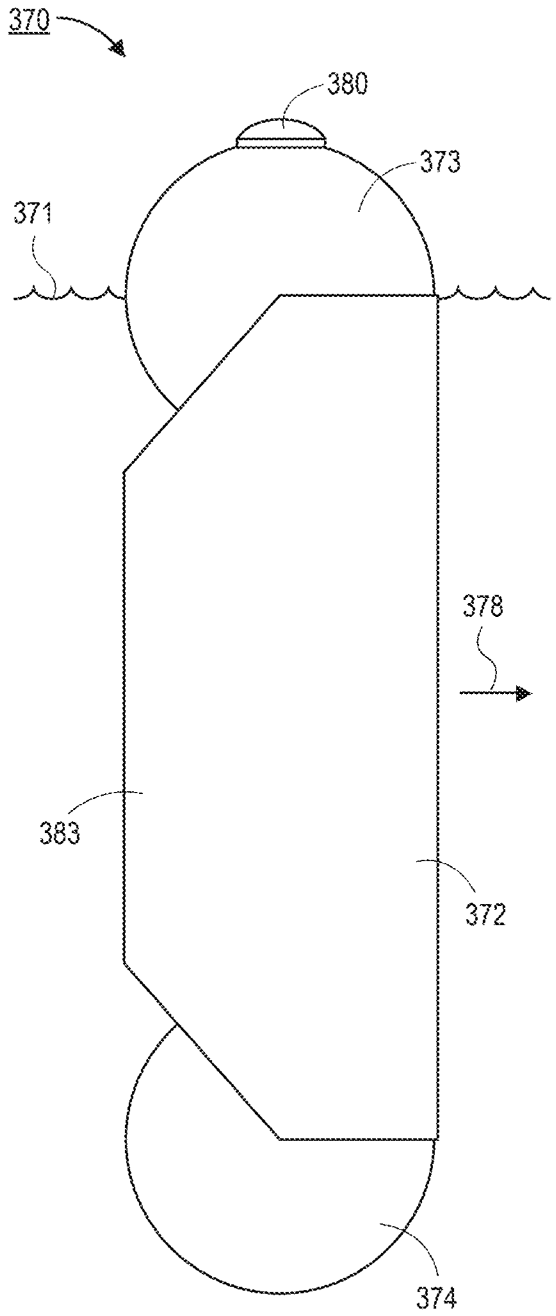
FIG. 74 is a side view of the eleventh embodiment of the present invention.

FIG. 74 shows a side view of the same embodiment 370 of the current disclosure that is illustrated in FIGS. 71-73.

Figure 75:
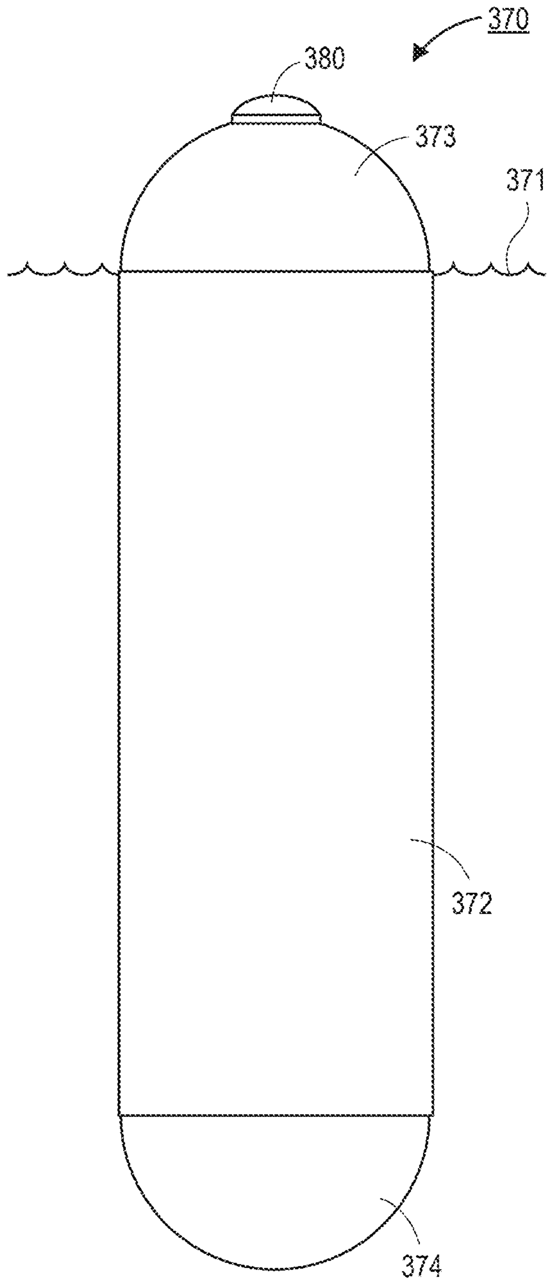
FIG. 75 is a side view of the eleventh embodiment of the present invention.

FIG. 75 shows a side view of the same embodiment 370 of the current disclosure that is illustrated in FIGS. 71-74.

Figure 76:
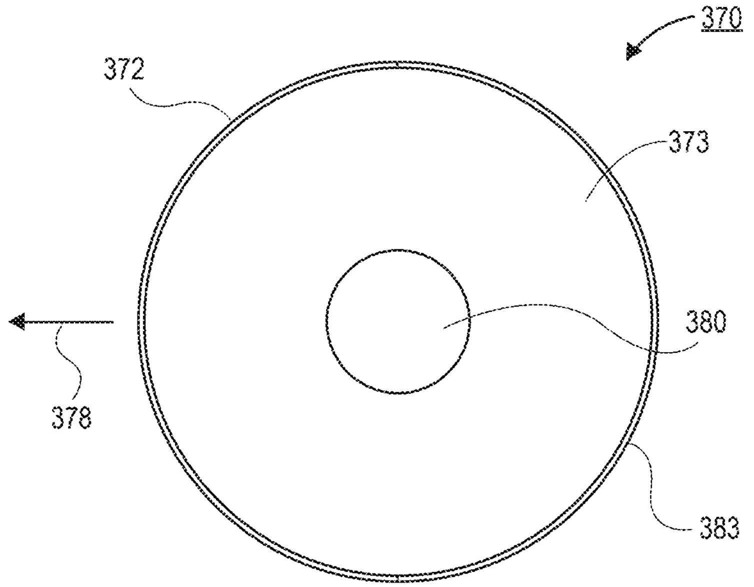
FIG. 76 is a top-down view of the eleventh embodiment of the present invention.

FIG. 76 shows a top-down view of the same embodiment 370 of the current disclosure that is illustrated in FIGS. 71-75.

Figure 77:
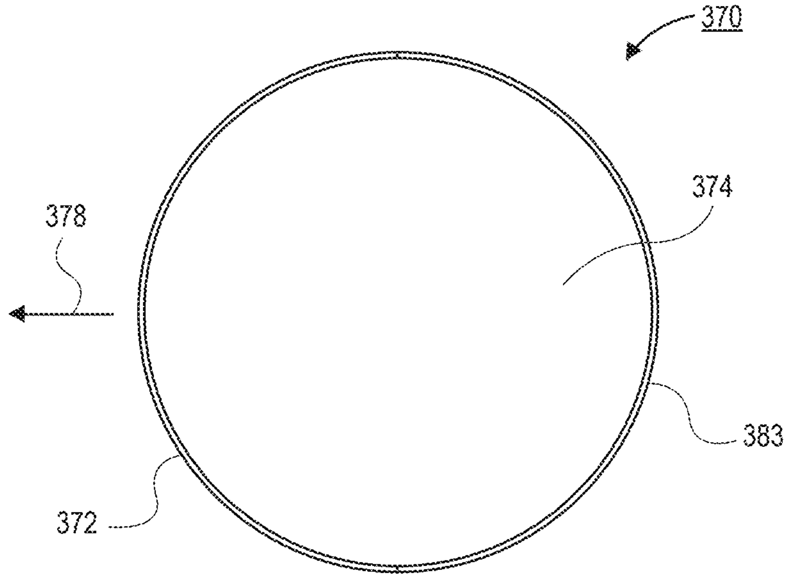
FIG. 77 is a bottom-up view of the eleventh embodiment of the present invention.

FIG. 77 shows a bottom-up view of the same embodiment 370 of the current disclosure that is illustrated in FIGS. 71-76.

Figure 78:
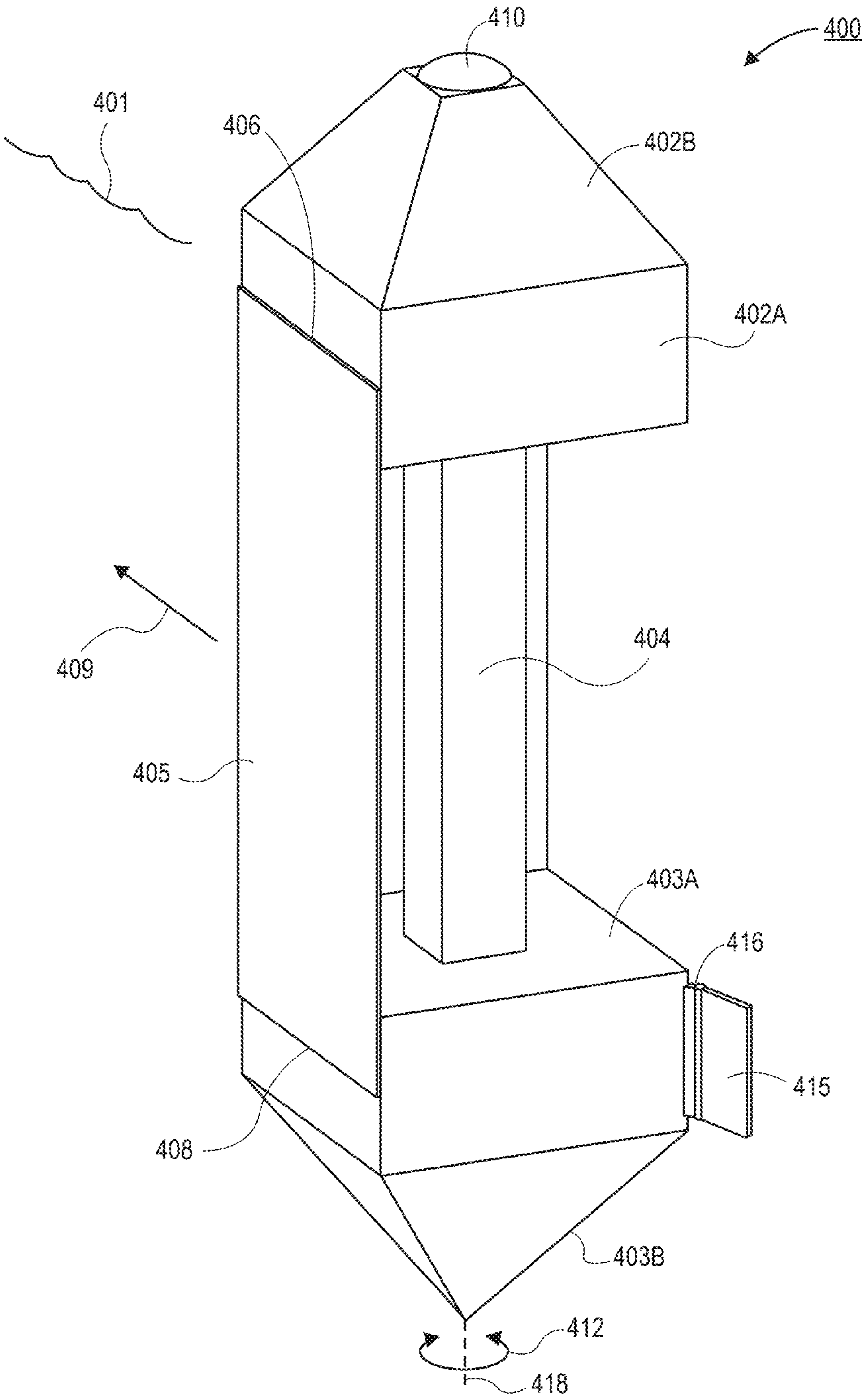
FIG. 78 is a perspective side view of a twelfth embodiment of the present invention.

FIG. 78 shows a side perspective view of an embodiment 400 of the current disclosure.

The embodiment 400 floats adjacent to an upper surface 401 of a body of water over which waves pass.

The embodiment 400 comprises an upper hollow and buoyant chamber 402, a lower chamber 403, and a tube 404 that rigidly connects the upper chamber 402 to the lower chamber 403. The upper chamber 402 may comprise two or more sub-chambers 402A and 402B. The sub-chambers 402A and 402B may be fluidically coupled to each other to form a single larger chamber. In some instances, the sub-chambers 402A and 402B may be considered as having a single continuous interior volume. In the example embodiment 400 of FIG. 78, the first sub-chamber 402A may have a rectangular prism volume, and the second sub-chamber 402B may have a pyramidal frustum volume. More generally, cross-sections of the upper chamber 402 orthogonal to the longitudinal axis 418 of the embodiment 400 may be non-axisymmetric. For example, the cross-sections of the upper chamber 402 may be any polygonal shape. This is in contrast to other embodiments described herein that may include axisymmetric chambers. Similarly, the lower chamber 403 may include a first sub-chamber 403A and a second sub-chamber 403B that form a non-axisymmetric volume. However, in the example of the embodiment 400 in FIG. 78, the second sub-chamber 403B has a complete pyramidal shape. Further while two "sub-chambers" are provided for both the upper chamber 402 and the lower chamber 403, one or both of the upper chamber 402 and the lower chamber 403 may have a single non-axisymmetric chamber, or more than two sub-chambers. While embodiment 400 includes a non-axisymmetric tube 404, the tube 404 may also be axisymmetric (e.g., a cylinder) in some instances.

Attached to a "forward" side of the upper 402 and lower 403 chambers is a propulsive shroud 405. The propulsive shroud 405 may be a sheet of material with one or more bends, edges, or corners that allows for the propulsive shroud 405 to conform to sidewalls of the upper chamber 402 and the lower chamber 403. For example, in the case of a rectangular prism upper chamber 402 and lower chamber 403, the propulsive shroud 405 may have a single leading edge, bend, or corner with portions of material coupled to adjacent sidewalls of the upper 402 and lower 403 chambers. The embodiment 400 includes a propulsive shroud 405 that covers approximately half of the outer perimeters of the upper chamber 402 and the lower chamber 403. Though, the propulsive shroud 405 may cover a smaller portion of the perimeter of the embodiment 400, or the propulsive shroud 405 may cover a greater portion of the perimeter of the embodiment 400 (e.g., covering more than two sides of the upper 402 and lower 403 chambers).

The propulsive shroud 405 is attached to the upper chamber 402 at, and/or along, an upper seam 406 oriented horizontally, and/or within a plane normal to the longitudinal axis 418 of the embodiment 400. The propulsive shroud 405 is attached to the lower chamber 403 at, and/or along, a lower seam 408 oriented horizontally, and/or within a plane normal to a longitudinal axis 418 of the embodiment 400. The propulsive shroud 405 may be considered as being directly attached to the upper chamber 402 and/or the lower chamber 403. For example, the propulsive shroud 405 may directly contact the surfaces of the upper chamber 402 and/or the surfaces of the lower chamber 403. Directly attached may also refer to the propulsive shroud 405 being welded or otherwise adhered to the upper chamber 402 and/or the lower chamber 403. That is, an upper seam and a lower seam may comprise welded material, an adhesive layer, or the like.

The embodiment 400 is propelled in a forward direction 409 through the use of the propulsive shroud 405. The forward direction 409 can generally be described as being upstream and/or against the current of the body of water in which the embodiment 400 floats. In some instances, the propulsion mechanism may be similar to any of the propulsive mechanisms described in greater detail herein.

The embodiment 400 may include a dome 410 provided on the upper chamber 402. The dome 410 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 400 as a wave energy converter device.

The embodiment 400 may include a rudder 415 that is rotatably coupled to a rudder shaft 416. Control of the rudder 415 allows for the embodiment 400 to controls, correct, adjust, and/or regulates, its yaw 412 about the longitudinal axis 412 of the embodiment 400. Accordingly, directional steering of the embodiment 400 is enabled so as to enable the use of its propulsive shroud 405 to cruise, travel, and/or navigate to specific geospatial locations at the surface 401 of the body of water.

An embodiment similar to the one illustrated in FIG. 78 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 78 stores compressed hydrogen gas in its upper chamber. It stores compressed oxygen within a tank positioned within its central tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 78 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 79:
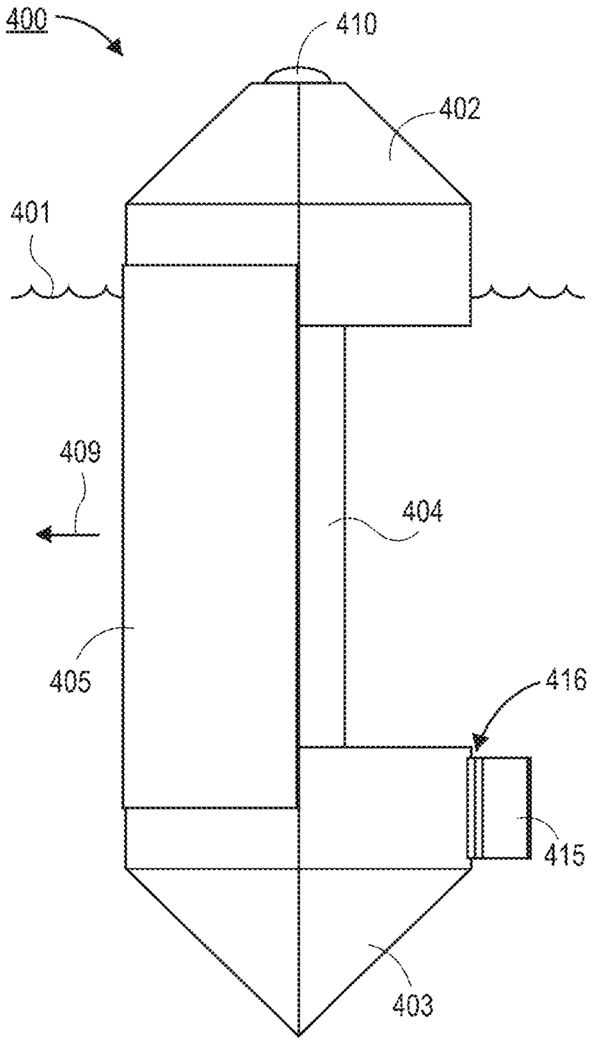
FIG. 79 is a side view of the twelfth embodiment of the present invention.

FIG. 79 shows a side view of the same embodiment 400 of the current disclosure that is illustrated in FIG. 78.

Figure 80:
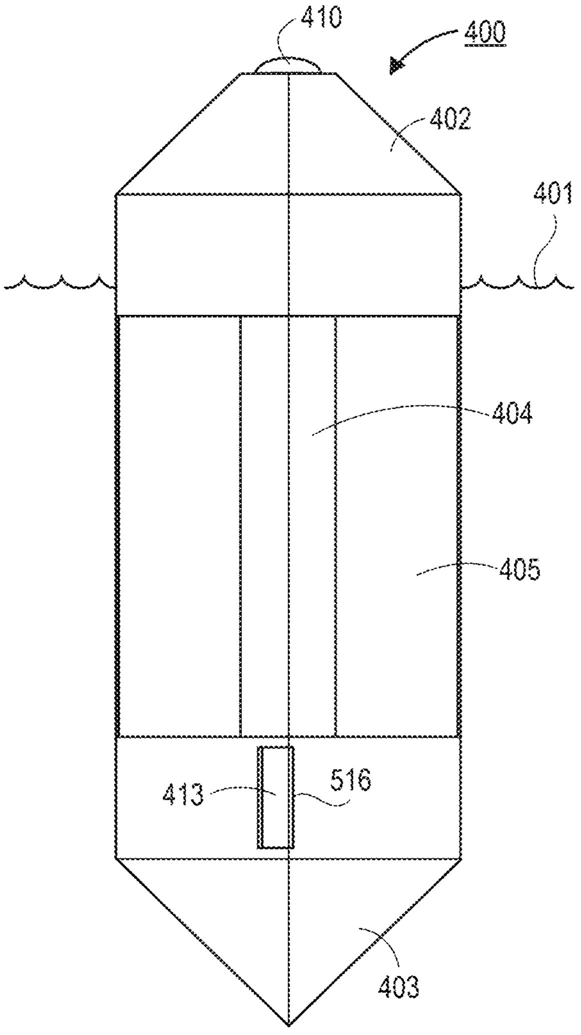
FIG. 80 is a side view of the twelfth embodiment of the present invention.

FIG. 80 shows a side view of the same embodiment 400 of the current disclosure that is illustrated in FIGS. 78 and 79.

Figure 81:
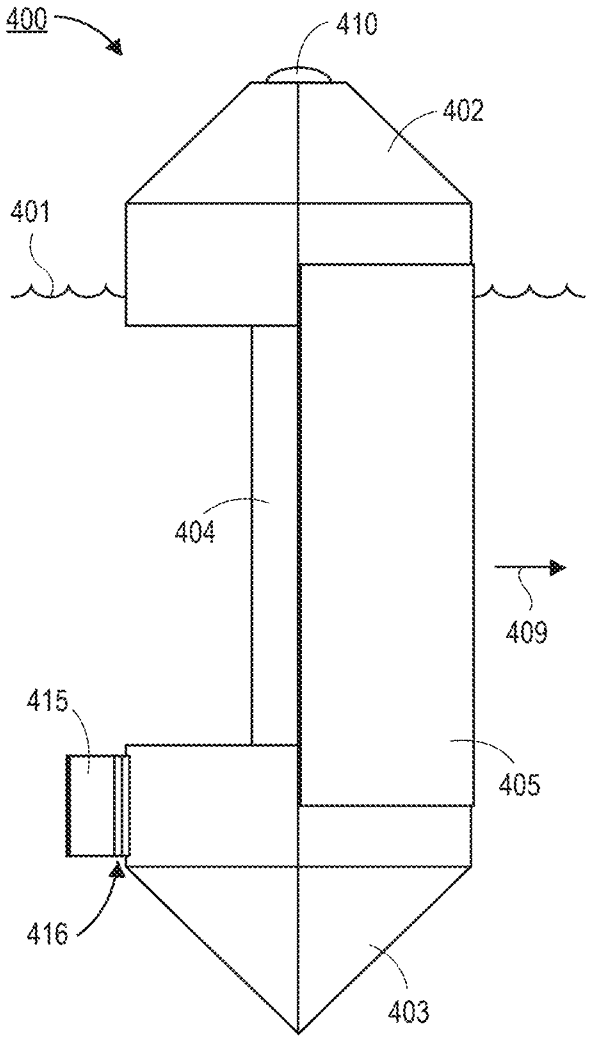
FIG. 81 is a side view of the twelfth embodiment of the present invention.

FIG. 81 shows a side view of the same embodiment 400 of the current disclosure that is illustrated in FIGS. 78-80.

Figure 82:
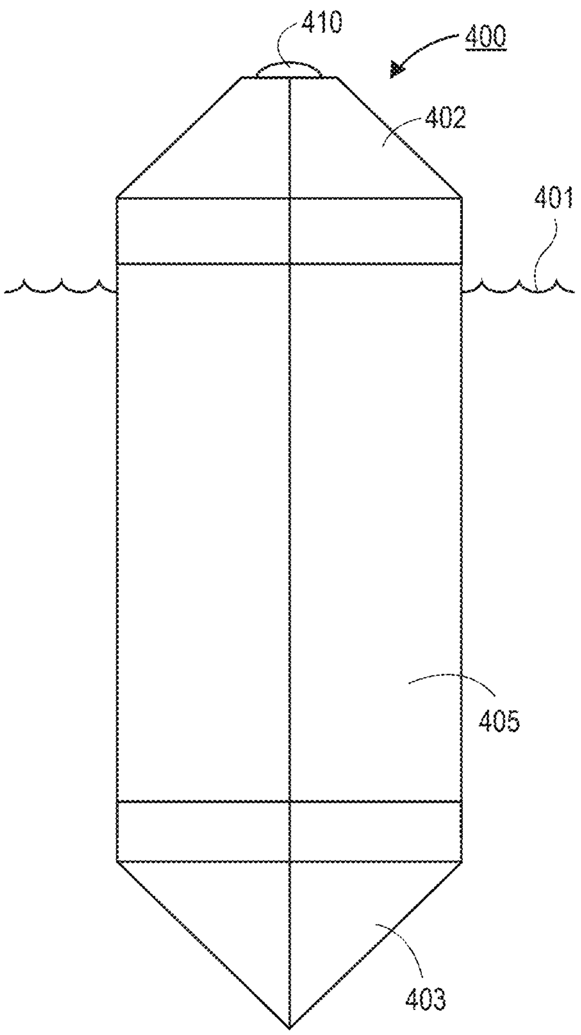
FIG. 82 is a side view of the twelfth embodiment of the present invention.

FIG. 82 shows a side view of the same embodiment 400 of the current disclosure that is illustrated in FIGS. 78-81.

Figure 83:
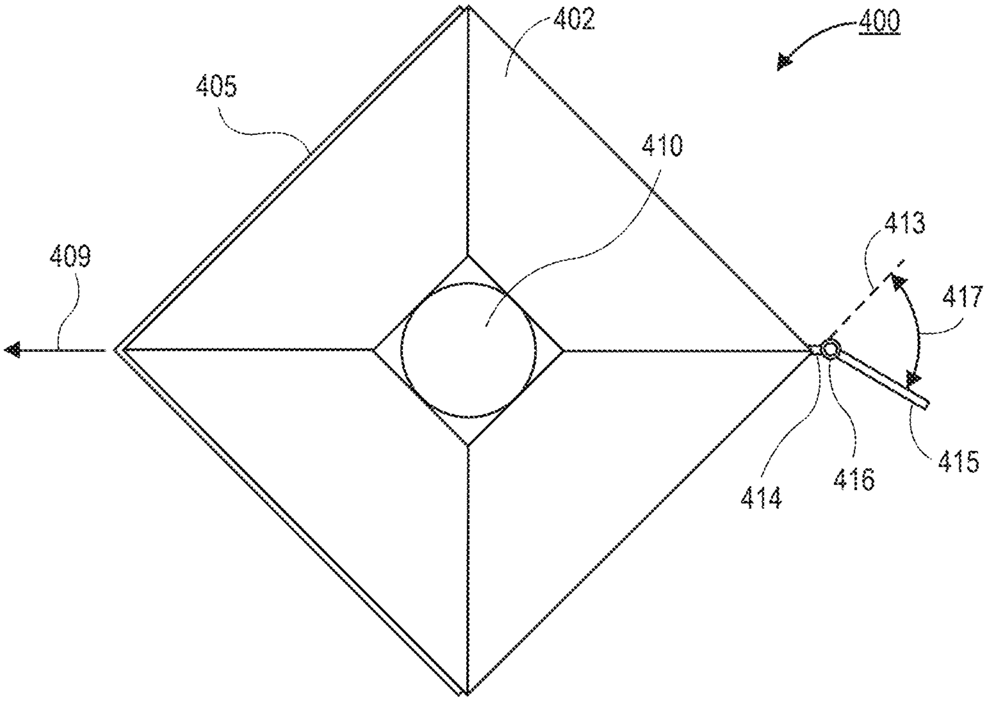
FIG. 83 is a top-down view of the twelfth embodiment of the present invention.

FIG. 83 shows a top-down view of the same embodiment 400 of the current disclosure that is illustrated in FIGS. 78-82.

The rudder shaft 416 by which the rudder 415 is rotatably connected to the other parts and/or portions of the embodiment 400 is mounted to a bulwark 414 rigidly connected to, and/or integrated within, the structure of the embodiment's lower chamber (not visible under upper chamber 402).

When the embodiment's control circuit (not shown) within the embodiment's dome 410 determines and/or detects a discrepancy between a reading from the embodiment's GPS geospatial location sensor (not shown) indicating the embodiment's present location; and a reading of the embodiment's yaw generated by its orientation sensor and accelerometer (not shown) indicating its present navigational heading; and its geospatial navigational target, e.g., as communicated to it by a remote source of control (not shown), e.g., in conjunction with current and wind data also received from a remote source of weather data; then the embodiment's control circuit will attempt to alter, and/or control, the embodiment's yaw in order to facilitate its journey, travel, cruise, and/or movement, toward, and/or to, that geospatial navigational target.

If the embodiment's control circuit actuates and/or energizes the motor (e.g., a worm-screw controlling an angular orientation of the embodiment's rudder 415, and not shown) operably connected to rudder 415 so as to rotate that rudder in a direction that deflects water in a clockwise direction (relative to a top-down perspective), then that rudder's 415 thrust will impart to the embodiment 400 a counterclockwise torque which will tend to alter the embodiment's 400 yaw by rotating the embodiment about its longitudinal axis (418 in FIG. 78) in a counterclockwise direction (relative to a top-down perspective).

By adjusting the angular position of the rudder 415, to an orientation within a range 417 of rudder orientations, the embodiment's control circuit can alter the yaw, e.g., 412 in FIG. 78, of the embodiment 400, thereby enabling the embodiment's control circuit to steer the embodiment and navigate the embodiment to a geospatial location at the surface 401 of the body of water. For example, when moved to an angular position 413 laterally opposite that of the illustrated angular position (at 415) the torque, and the rotation, imparted to the embodiment would be opposite that illustrated in FIG. 83.

An embodiment similar to the one illustrated in FIGS. 78-83 contains an internal power take off that converts a wave-induced motion of the embodiment into an electrical power that is then used to provide electrical power to, and energize, the electrical components and systems, as well as to provide power to the motor (not shown) that rotates the embodiment's rudder 415.

An embodiment similar to the one illustrated in FIG. 78-83 stores compressed hydrogen gas in its upper chamber. It stores compressed oxygen within a tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment. The embodiment uses a portion of the electrical power produced by its fuel cell to provide electrical power to, and energize, the electrical components and systems, as well as to provide power to the motor (not shown) that rotates the embodiment's rudder 415.

An embodiment similar to the one illustrated in FIG. 78-83 includes, incorporates, utilizes, and/or further comprises, thrusters, such as those illustrated in conjunction with embodiment 120 illustrated in FIGS. 8-14.

Figure 84:
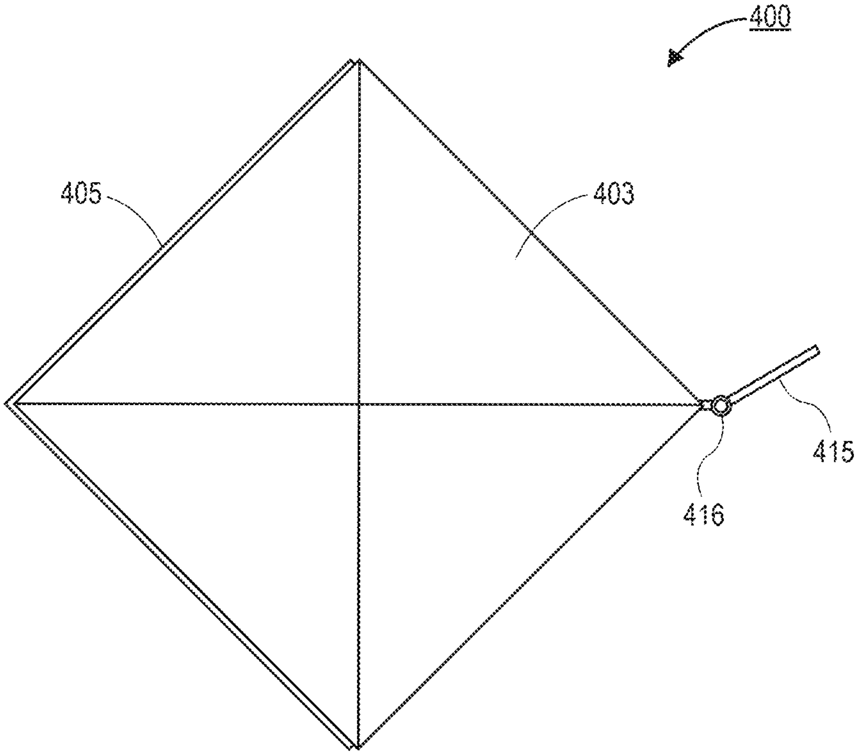
FIG. 84 is a bottom-up view of the twelfth embodiment of the present invention.

FIG. 84 shows a bottom-up view of the same embodiment 400 of the current disclosure that is illustrated in FIGS. 78-83.

Figure 85:
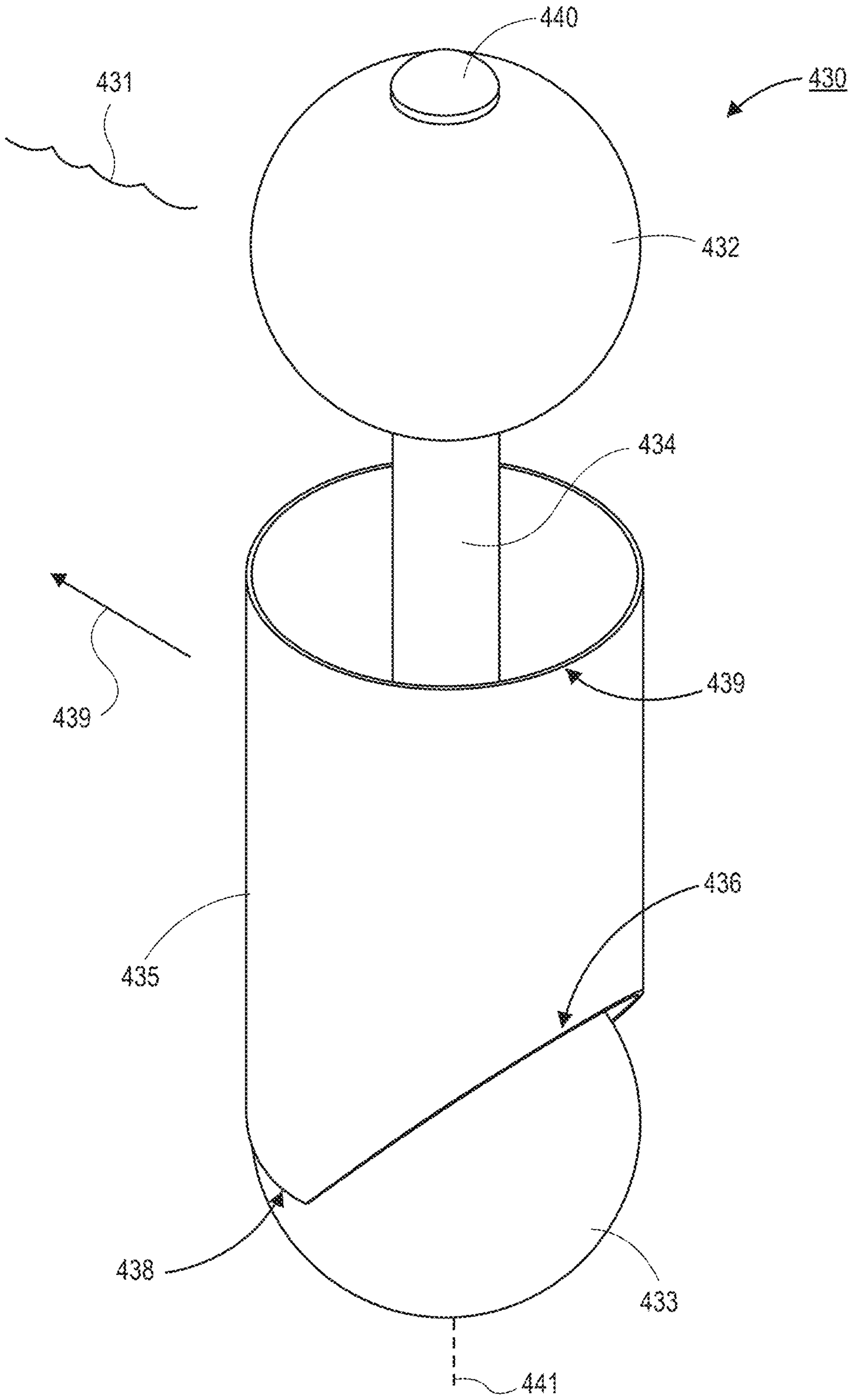
FIG. 85 is a perspective side view of a thirteenth embodiment of the present invention.

FIG. 85 shows a side perspective view of an embodiment 430 of the current disclosure.

The embodiment 430 floats adjacent to an upper surface 431 of a body of water over which waves pass.

The embodiment 430 comprises an upper hollow and buoyant chamber 432, a lower chamber 433, and a tube 434 that rigidly connects the upper chamber 432 to the lower chamber 433. Attached to a "forward" side of the lower 433 chamber is a cylindrical propulsive shroud 435. The radius of curvature of the cylindrical propulsive shroud 435 is approximately equal to the radius of the lower 433 chamber. In contrast to other embodiments, the propulsive shroud 435 is a complete cylinder through at least some cross-sections.

The propulsive shroud 435 is attached to the lower chamber 433 at, and/or along, a lower seam 438 oriented horizontally, and/or within a plane normal to a longitudinal axis 441 of the embodiment 430. The propulsive shroud 435 may be considered as being directly attached to the lower chamber 433. For example, the propulsive shroud 435 may directly contact the surfaces of the lower chamber 433. Directly attached may also refer to the propulsive shroud 435 being welded or otherwise adhered to the lower chamber 433. That is, a lower seam 438 may comprise welded material, an adhesive layer, or the like. The cylindrical propulsive shroud 435 of embodiment 430 is approximately radially symmetrical about, and coaxial with, the embodiment's longitudinal axis 441. The propulsive shroud 435 may have a top edge 439 that is positioned below a bottom-most surface of the upper chamber 432. A gap between the upper chamber 432 and the top edge 439 of the propulsive shroud 435 may expose at least a portion of the tube 434. That is, a length or height of the propulsive shroud 435 (i.e., a length of a line that is orthogonal to the seam 438 and extends linearly to the top edge 439) may be less than a length or height of the tube 434 between the upper chamber 432 and the lower chamber 433. In some instances, the length of the propulsive shroud 435 may be up to approximately three-fourths the length of the tube 434, up to approximately one-half the length of the tube 434, or up to approximately one-fourth the length of the tube 434.

The propulsive shroud 435 may include a cutout 436. The cutout 436 may be formed through the removal of a section of the propulsive shroud 435 along a plane that is non-orthogonal to a longitudinal axis 441 of the embodiment 430. For example, a minimum height of the propulsive shroud 435 may be less than a height of the propulsive shroud 435 between the seam 438 and the top edge 439. While shown as being a planar slice out of the propulsive shroud 435, the cutout 436 may take any profile. More generally, the propulsive shroud 435 may have a cylindrical cross-section at a first plane orthogonal to the longitudinal axis 441, and a semi-cylindrical cross-section at a second plane orthogonal to the longitudinal axis 441.

The embodiment 430 is propelled in a forward direction 439 through the use of the propulsive shroud 435. The forward direction 439 can generally be described as being upstream and/or against the current of the body of water in which the embodiment 430 floats. In some instances, the propulsion mechanism may be similar to any of the propulsive mechanisms described in greater detail herein.

The embodiment 430 may include a dome 440 provided on the upper chamber 432. The dome 440 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 430 as a wave energy converter device.

An embodiment similar to the one illustrated in FIG. 85 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 85 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 85 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 85 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 86:
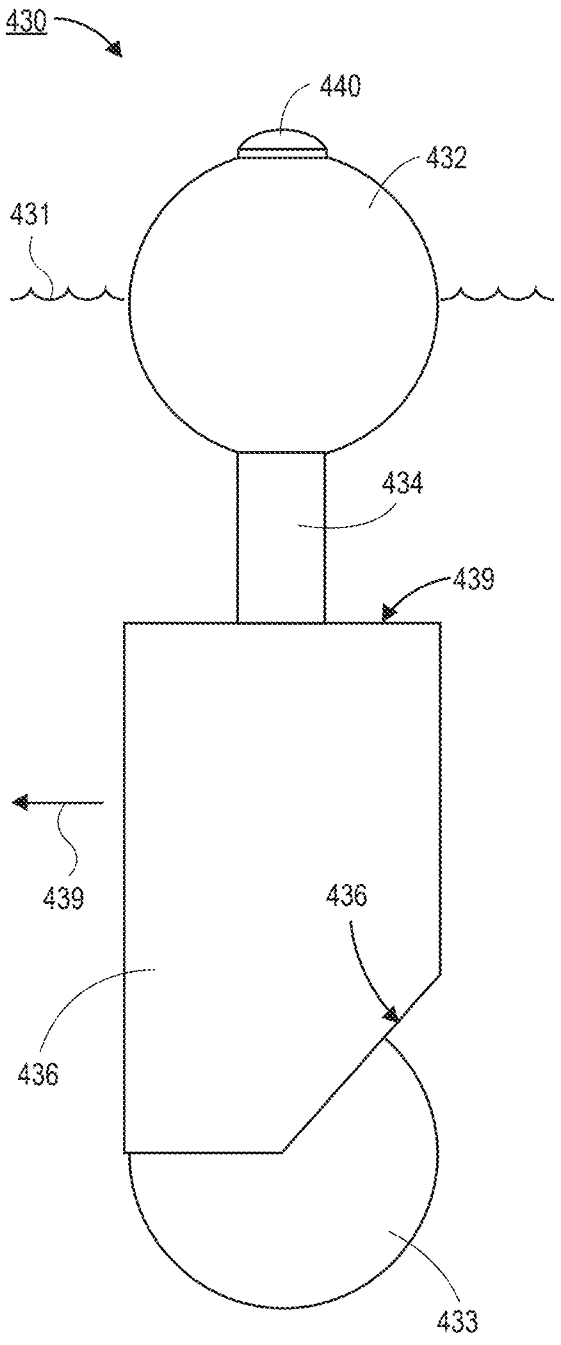
FIG. 86 is a side view of the thirteenth embodiment of the present invention.

FIG. 86 shows a side view of the same embodiment 430 of the current disclosure that is illustrated in FIG. 85.

Figure 87:
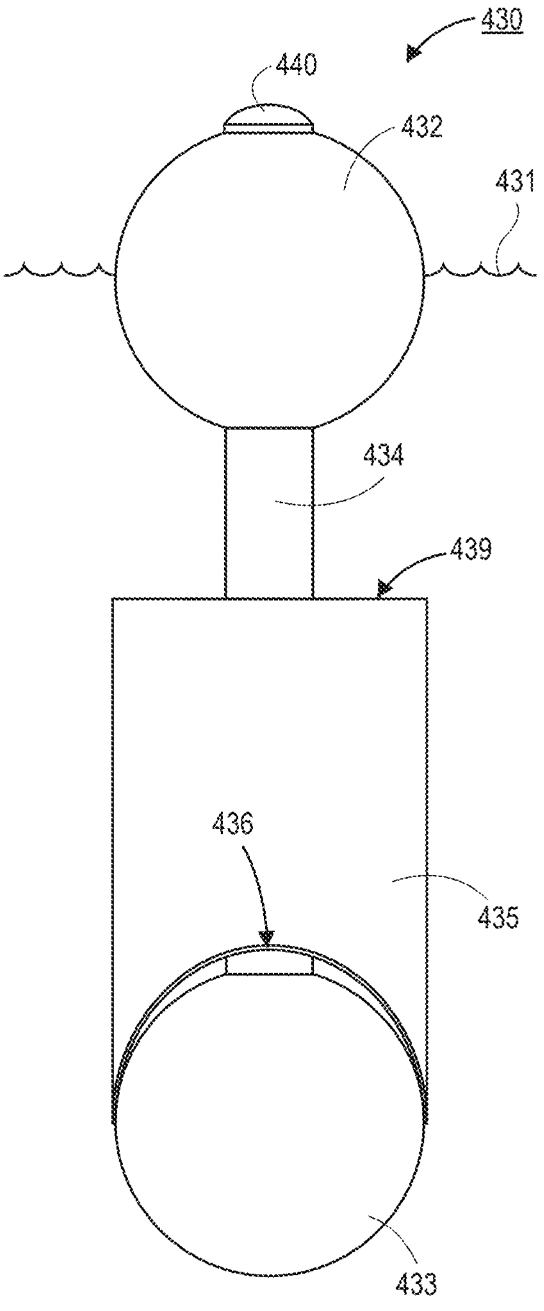
FIG. 87 is a side view of the thirteenth embodiment of the present invention.

FIG. 87 shows a side view of the same embodiment 430 of the current disclosure that is illustrated in FIGS. 85 and 86.

Figure 88:
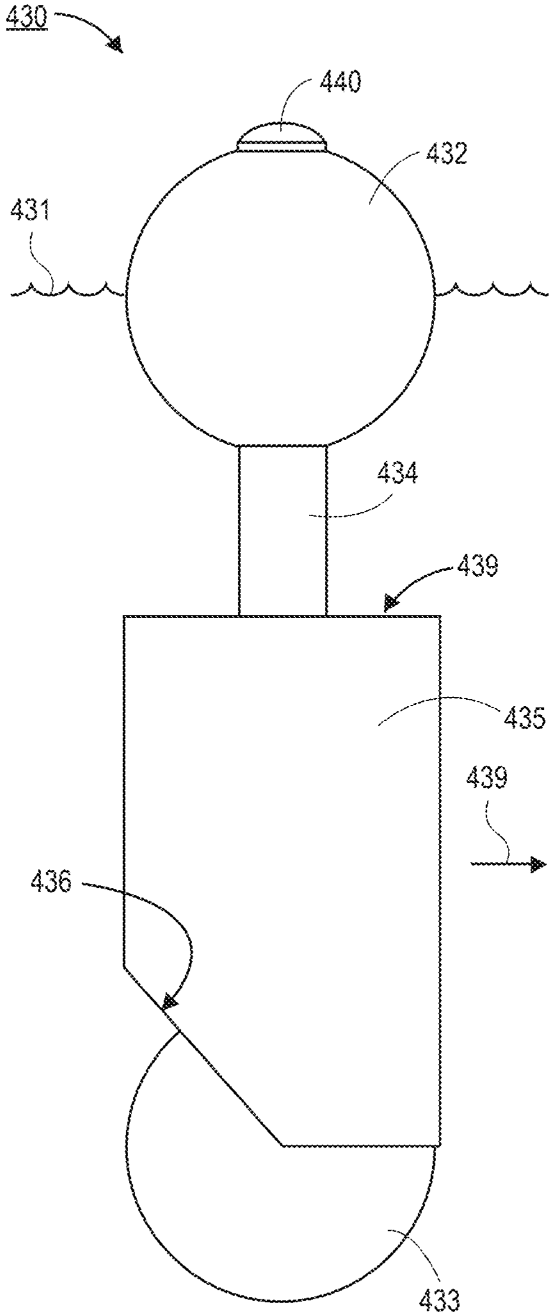
FIG. 88 is a side view of the thirteenth embodiment of the present invention.

FIG. 88 shows a side view of the same embodiment 430 of the current disclosure that is illustrated in FIGS. 85-87.

Figure 89:
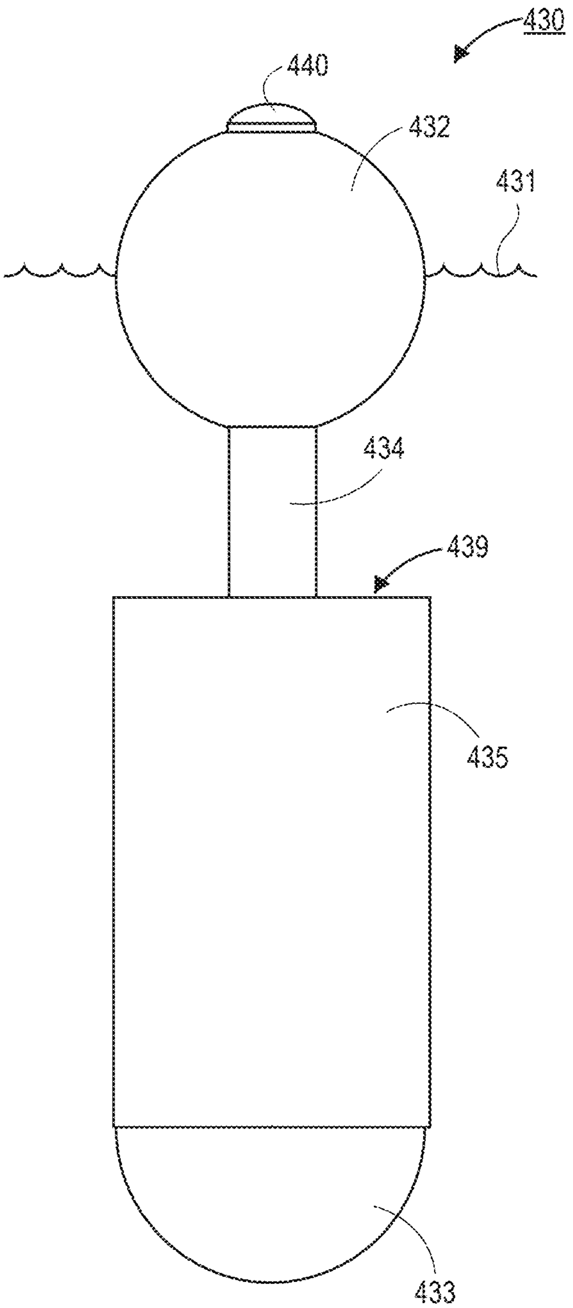
FIG. 89 is a side view of the thirteenth embodiment of the present invention.

FIG. 89 shows a side view of the same embodiment 430 of the current disclosure that is illustrated in FIGS. 85-88.

Figure 90:
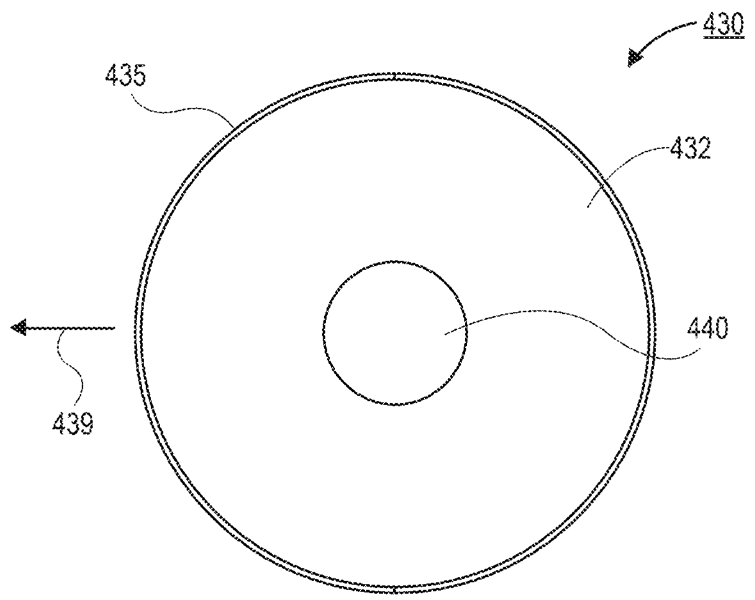
FIG. 90 is a top-down view of the thirteenth embodiment of the present invention.

FIG. 90 shows a top-down view of the same embodiment 430 of the current disclosure that is illustrated in FIGS. 85-89.

Figure 91:
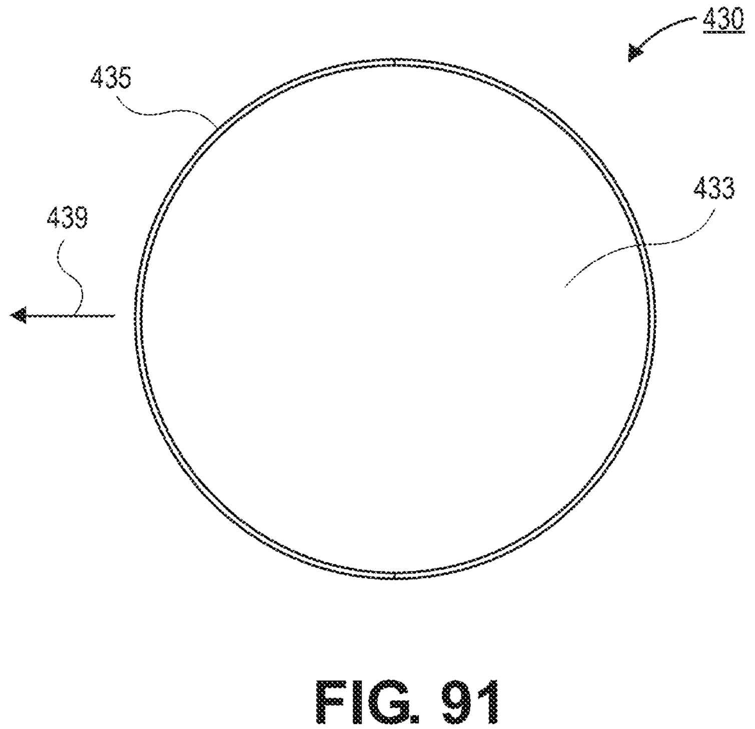
FIG. 91 is a bottom-up view of the thirteenth embodiment of the present invention.

FIG. 91 shows a bottom-up view of the same embodiment 430 of the current disclosure that is illustrated in FIGS. 85-90.

Figure 92:
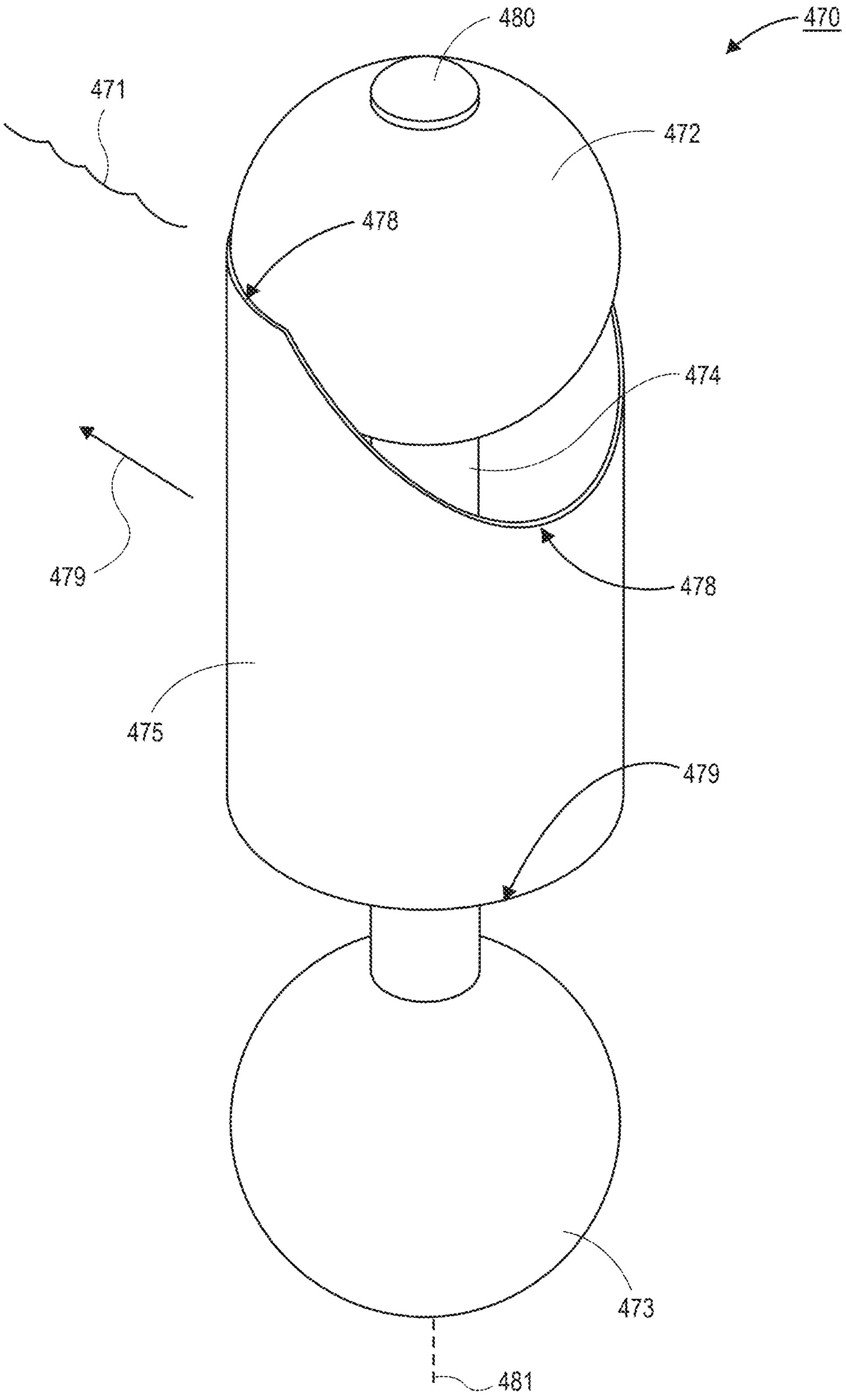
FIG. 92 is a perspective side view of a fourteenth embodiment of the present invention.

FIG. 92 shows a side perspective view of an embodiment 470 of the current disclosure.

The embodiment 470 floats adjacent to an upper surface 471 of a body of water over which waves pass.

The embodiment 470 comprises an upper hollow and buoyant chamber 472, a lower chamber 473, and a tube 474 that rigidly connects the upper chamber 472 to the lower chamber 473. Attached to a "forward" side of the upper 472 chamber is a cylindrical propulsive shroud 475. The radius of curvature of the cylindrical propulsive shroud 475 is approximately equal to the radius of the upper 472 chamber. In contrast to some other embodiments, the propulsive shroud 472 is a complete cylinder through at least some cross-sections.

The propulsive shroud 475 is attached to the upper chamber 472 at, and/or along, an upper seam 478 oriented horizontally, and/or within a plane normal to a longitudinal axis 481 of the embodiment 470. The propulsive shroud 475 may be considered as being directly attached to the upper chamber 472. For example, the propulsive shroud 475 may directly contact the surfaces of the upper chamber 472. Directly attached may also refer to the propulsive shroud 475 being welded or otherwise adhered to the upper chamber 472. That is, an upper seam 478 may comprise welded material, an adhesive layer, or the like. The cylindrical propulsive shroud 475 of embodiment 470 is approximately radially symmetrical about, and coaxial with, the embodiment's longitudinal axis 481. The propulsive shroud 475 may have a bottom edge 479 that is positioned above a topmost surface of the lower chamber 473. A gap between the lower chamber 473 and the bottom edge 479 of the propulsive shroud 475 may expose at least a portion of the tube 474. That is, a length or height of the propulsive shroud 475 (i.e., a length of a line that is orthogonal to the seam 478 and extends linearly to the bottom edge 479) may be less than a length or height of the tube 474 between the upper chamber 472 and the lower chamber 473. In some instances, the length of the propulsive shroud 475 may be up to approximately three-fourths the length of the tube 474, up to approximately one-half the length of the tube 474, or up to approximately one-fourth the length of the tube 474.

The propulsive shroud 475 may include a cutout 478. The cutout 436 may be formed through the removal of a section of the propulsive shroud 475 along a plane that is non-orthogonal to a longitudinal axis 481 of the embodiment 470. For example, a minimum height of the propulsive shroud 475 may be less than a height of the propulsive shroud 475 between the seam 478 and the bottom edge 479. While shown as being a planar slice out of the propulsive shroud 475, the cutout 478 may take any profile. More generally, the propulsive shroud 475 may have a cylindrical cross-section at a first plane orthogonal to the longitudinal axis 481, and a semi-cylindrical cross-section at a second plane orthogonal to the longitudinal axis 481.

The embodiment 470 is propelled in a forward direction 479 through the use of the propulsive shroud 475. The forward direction 479 can generally be described as being upstream and/or against the current of the body of water in which the embodiment 470 floats. In some instances, the propulsion mechanism may be similar to any of the propulsive mechanisms described in greater detail herein.

The embodiment 470 may include a dome 480 provided on the upper chamber 472. The dome 480 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 470 as a wave energy converter device.

An embodiment similar to the one illustrated in FIG. 92 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 92 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 92 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 92 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 93:
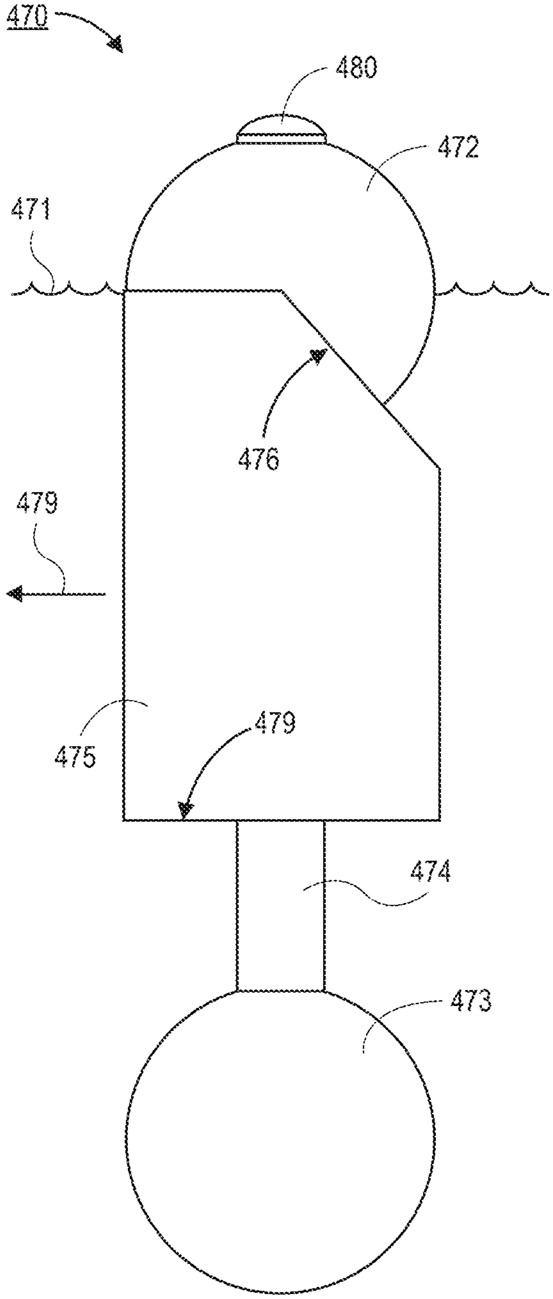
FIG. 93 is a side view of the fourteenth embodiment of the present invention.

FIG. 93 shows a side view of the same embodiment 470 of the current disclosure that is illustrated in FIG. 92.

Figure 94:
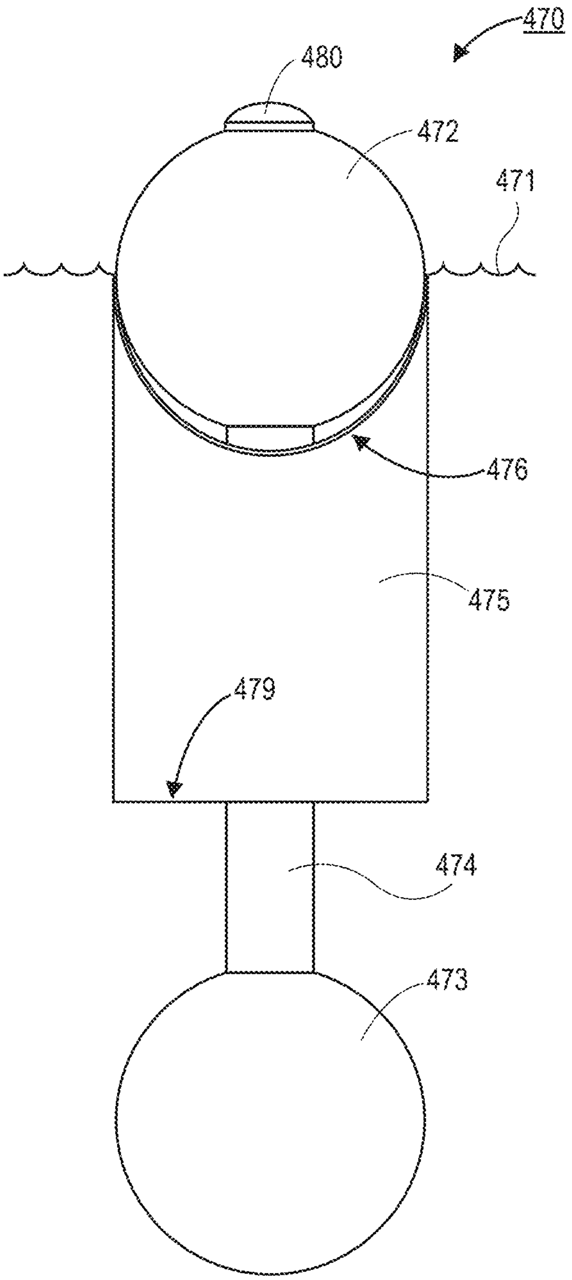
FIG. 94 is a side view of the fourteenth embodiment of the present invention.

FIG. 94 shows a side view of the same embodiment 470 of the current disclosure that is illustrated in FIGS. 92 and 93.

Figure 95:
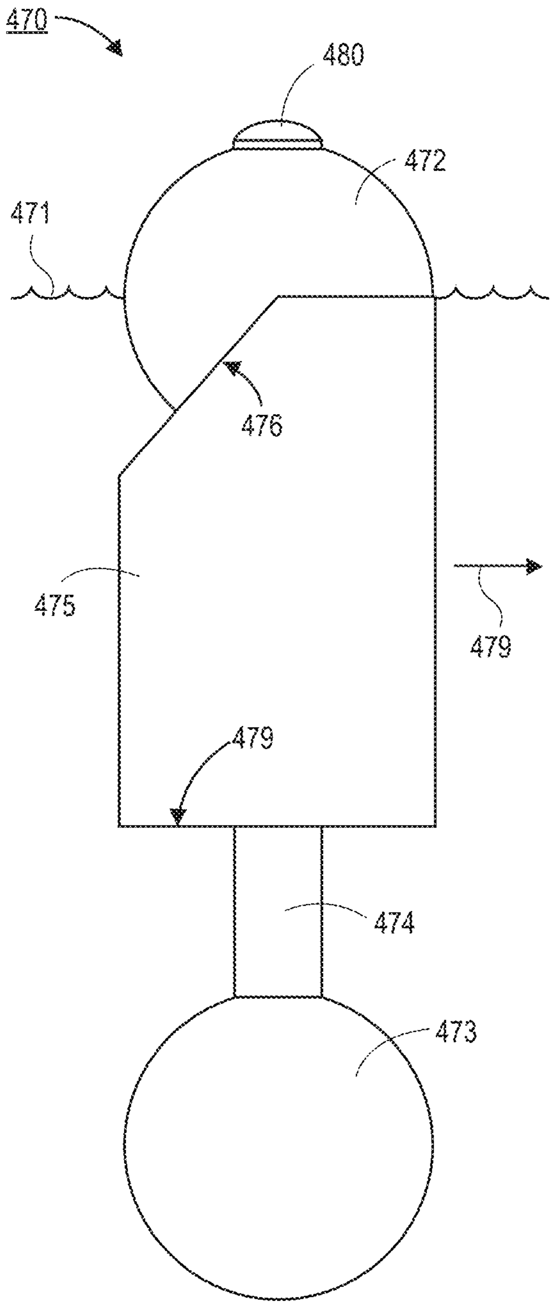
FIG. 95 is a side view of the fourteenth embodiment of the present invention.

FIG. 95 shows a side view of the same embodiment 470 of the current disclosure that is illustrated in FIGS. 92-94.

Figure 96:
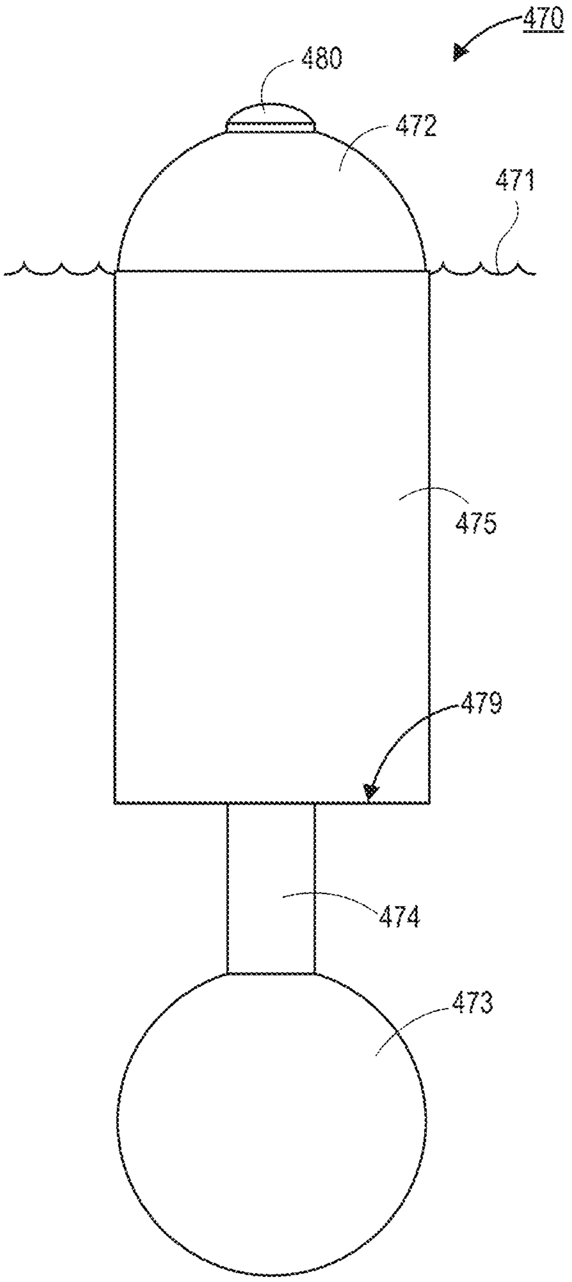
FIG. 96 is a side view of the fourteenth embodiment of the present invention.

FIG. 96 shows a side view of the same embodiment 470 of the current disclosure that is illustrated in FIGS. 92-95.

Figure 97:
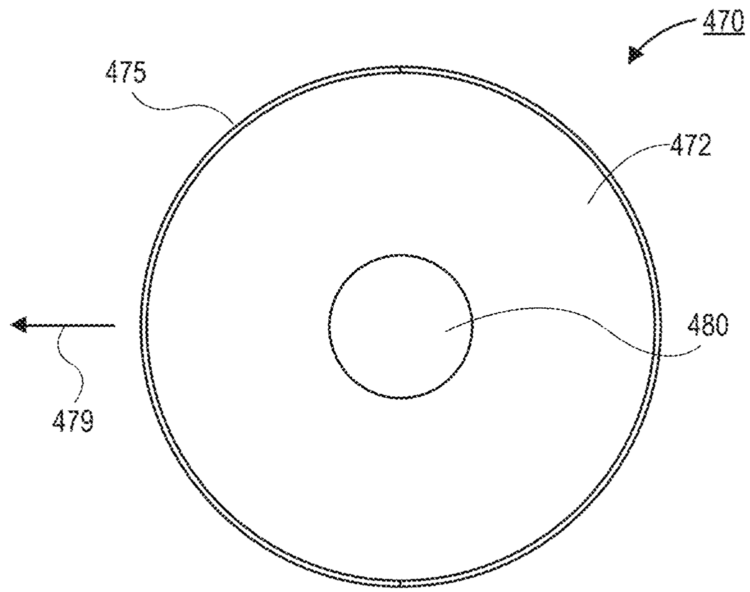
FIG. 97 is a top-down view of the fourteenth embodiment of the present invention.

FIG. 97 shows a top-down view of the same embodiment 470 of the current disclosure that is illustrated in FIGS. 92-96.

Figure 98:
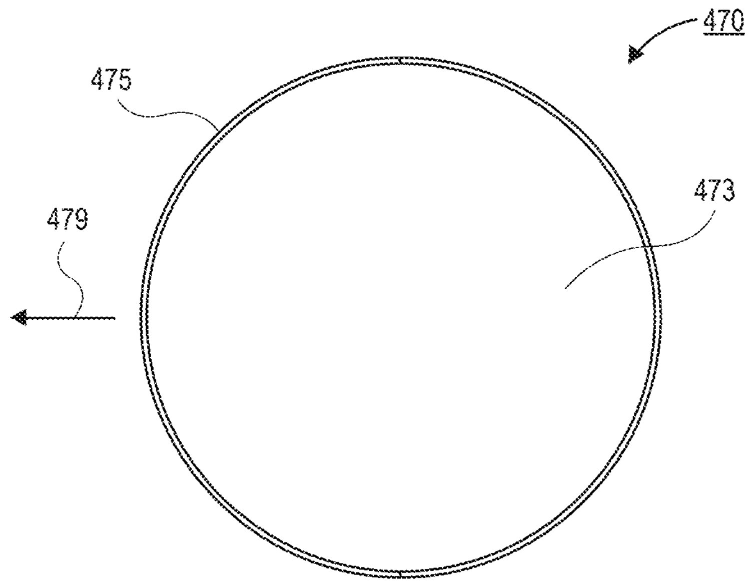
FIG. 98 is a bottom-up view of the fourteenth embodiment of the present invention.

FIG. 98 shows a bottom-up view of the same embodiment 470 of the current disclosure that is illustrated in FIGS. 92-97.

Figure 99:
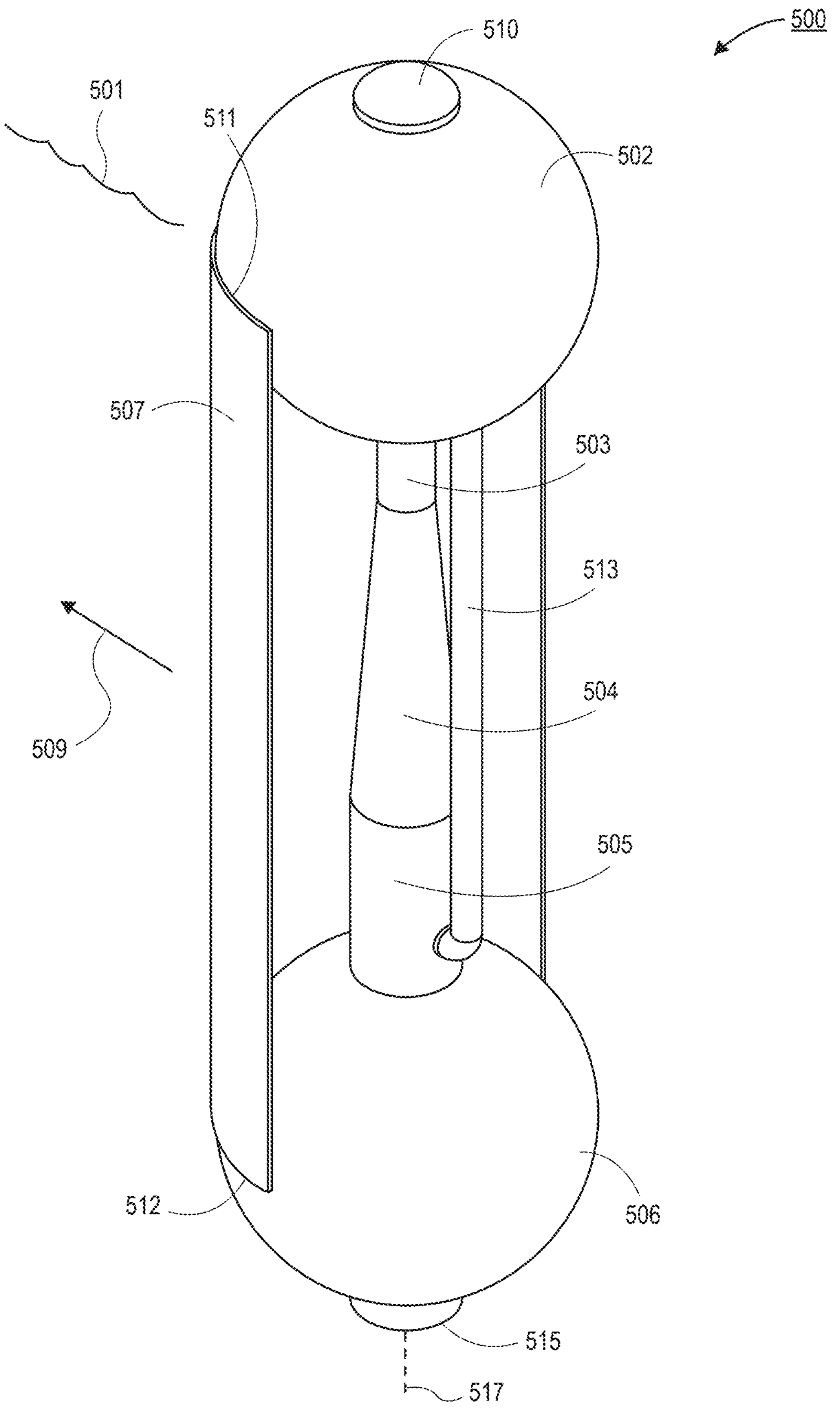
FIG. 99 is a perspective side view of a fifteenth embodiment of the present invention.

FIG. 99 shows a side perspective view of an embodiment 500 of the current disclosure.

The embodiment 500 floats adjacent to an upper surface 501 of a body of water over which waves pass.

The embodiment 500 comprises an upper buoyant chamber 502, a constricted tube 503-505, and a lower hollow chamber 506. The lower tube portion 505 of the constricted tube may pass through the lower chamber 506 with the interior of the lower tube portion 505 being fluidically separated from the interior of lower chamber 506. Tube extension 515 may be fluidly coupled to the lower tube portion 505 and extend below the lower chamber 506. The constricted tube 503-505 and the tube extension 515 may be in fluid communication with the body of water outside of the embodiment 500. Constricted tube 503-505 (and extension 515), which is one of a variety of inertial tubes, is adapted to permit oscillations of a column of water within it and to move water (on net) from the body of water to the upper hollow chamber 502. The constricted tube is comprised of a relatively small diameter upper tube portion 503, a frustoconical constriction portion 504, and a relatively large diameter lower tube portion 505. The tube extension 515 may have the same diameter as the lower tube portion 505. In some instances, tube extension 515 and the lower tube portion 505 may be a single monolithic tube section. An upper effluent fluid reservoir (not visible) within an interior of the upper hollow chamber 502 is fluidly coupled to an interior of the lower tube portion 505 by a liquid effluent pipe 513.

Attached to a "forward" side of the upper chamber 502 and the lower chamber 506 is a semi-cylindrical propulsive shroud 507. The radius of curvature of the semi-cylindrical propulsive shroud 507 is approximately equal to the radii of the upper chamber 502 and the lower chamber 506. The propulsive shroud 507 is attached to the upper chamber 502 at, and/or along, an upper seam 511 oriented horizontally, and/or within a plane normal to a longitudinal axis 517 of the embodiment 500. The propulsive shroud 507 is attached to the lower chamber 506 at, and/or along, a lower seam 512 oriented horizontally, and/or within a plane normal to a longitudinal axis 517 of the embodiment 500. The propulsive shroud 507 may be considered as being directly attached to the upper chamber 502 and/or the lower chamber 506. For example, the propulsive shroud 507 may directly contact the surfaces of the upper chamber 502 and/or the surfaces of the lower chamber 506. Directly attached may also refer to the propulsive shroud 507 being welded or otherwise adhered to the upper chamber 502 and/or the lower chamber 506. That is, an upper seam 511 and a lower seam 512 may comprise welded material, an adhesive layer, or the like.

The semi-cylindrical propulsive shroud 507 of embodiment 500 is approximately radially symmetrical about, and coaxial with, the embodiment's longitudinal axis 517. The angular extent of the semi-cylindrical propulsive shroud about the embodiment's longitudinal axis 517 is approximately 180 degrees. Thus, the propulsive shroud 507 of embodiment 500 is substantially a "half-pipe." Though, other angular extents (including fully cylindrical in at least some cross-sections) similar to other embodiments described herein may also be used for the propulsive shroud 507.

The embodiment 500 is propelled in a forward direction 509 through the use of the propulsive shroud 507. The forward direction 509 can generally be described as being upstream and/or against the current of the body of water in which the embodiment 500 floats. In some instances, the propulsion mechanism may be similar to any of the propulsive mechanisms described in greater detail herein.

The embodiment 500 may include a dome 510 provided on the upper chamber 502. The dome 510 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 500 as a wave energy converter device.

An embodiment similar to the one illustrated in FIG. 99 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 99 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 99 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 99 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 100:
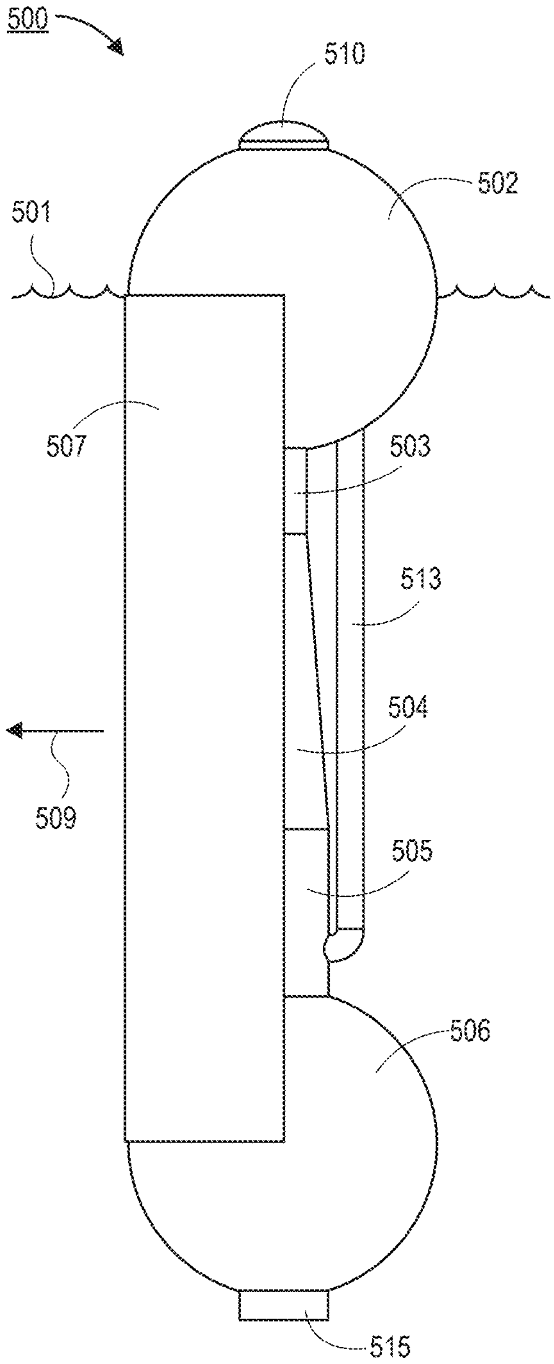
FIG. 100 is a side view of the fifteenth embodiment of the present invention.

FIG. 100 shows a side view of the same embodiment 500 of the current disclosure that is illustrated in FIG. 99.

Figure 101:
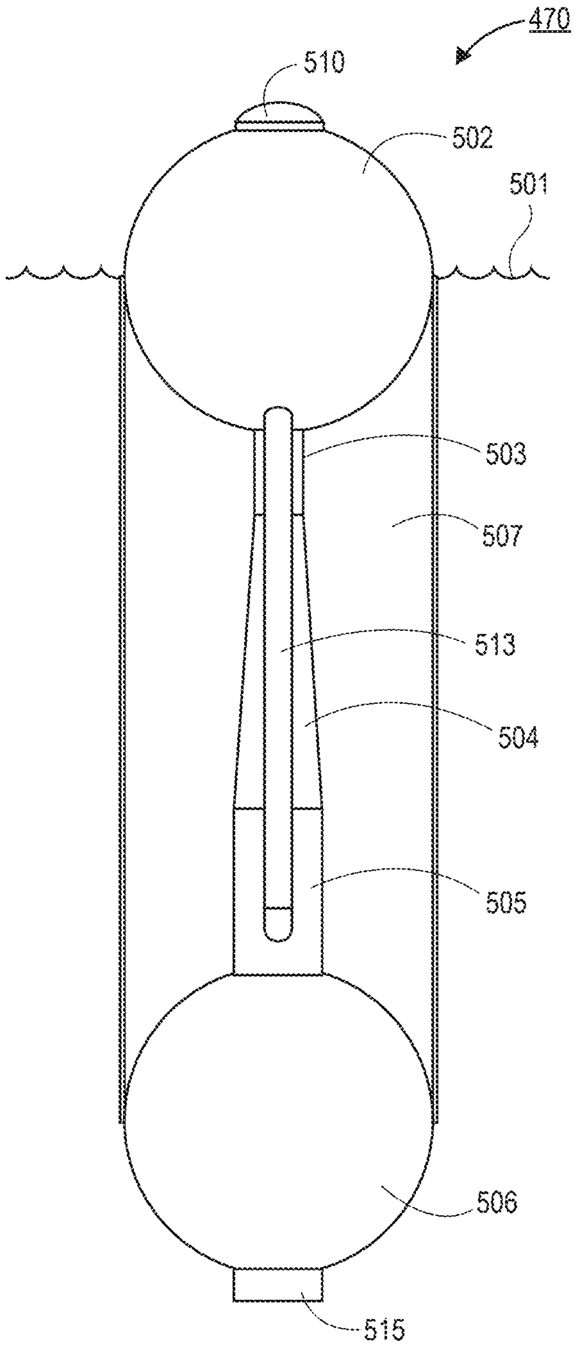
FIG. 101 is a side view of the fifteenth embodiment of the present invention.

FIG. 101 shows a side view of the same embodiment 500 of the current disclosure that is illustrated in FIGS. 99 and 100.

Figure 102:
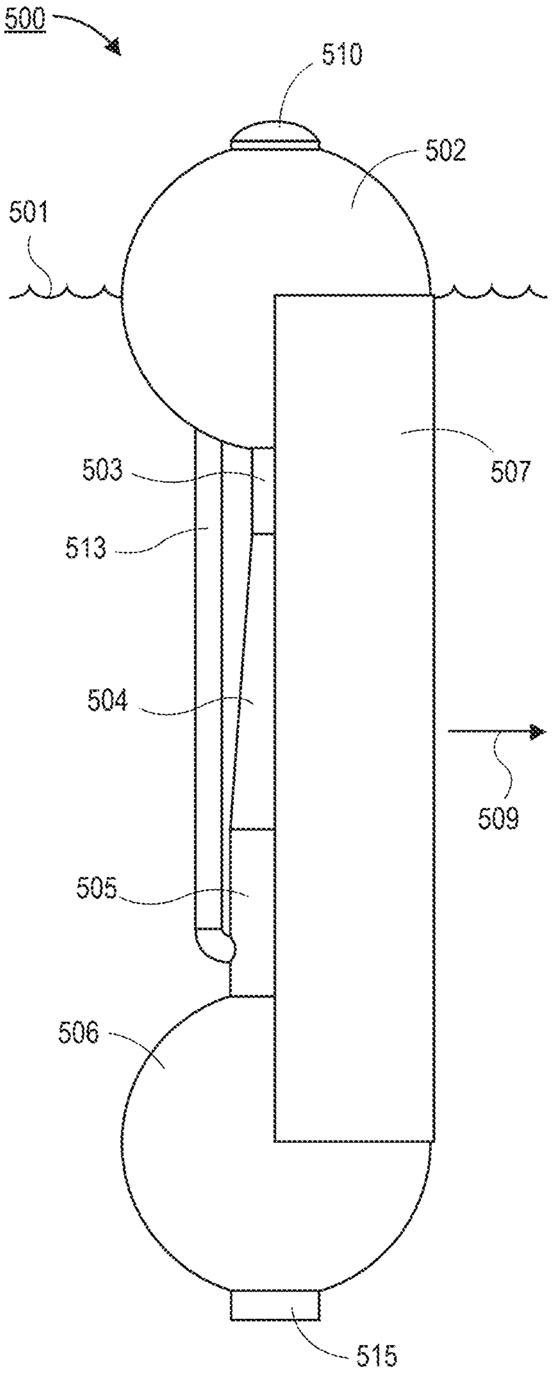
FIG. 102 is a side view of the fifteenth embodiment of the present invention.

FIG. 102 shows a side view of the same embodiment 500 of the current disclosure that is illustrated in FIGS. 99-101.

Figure 103:
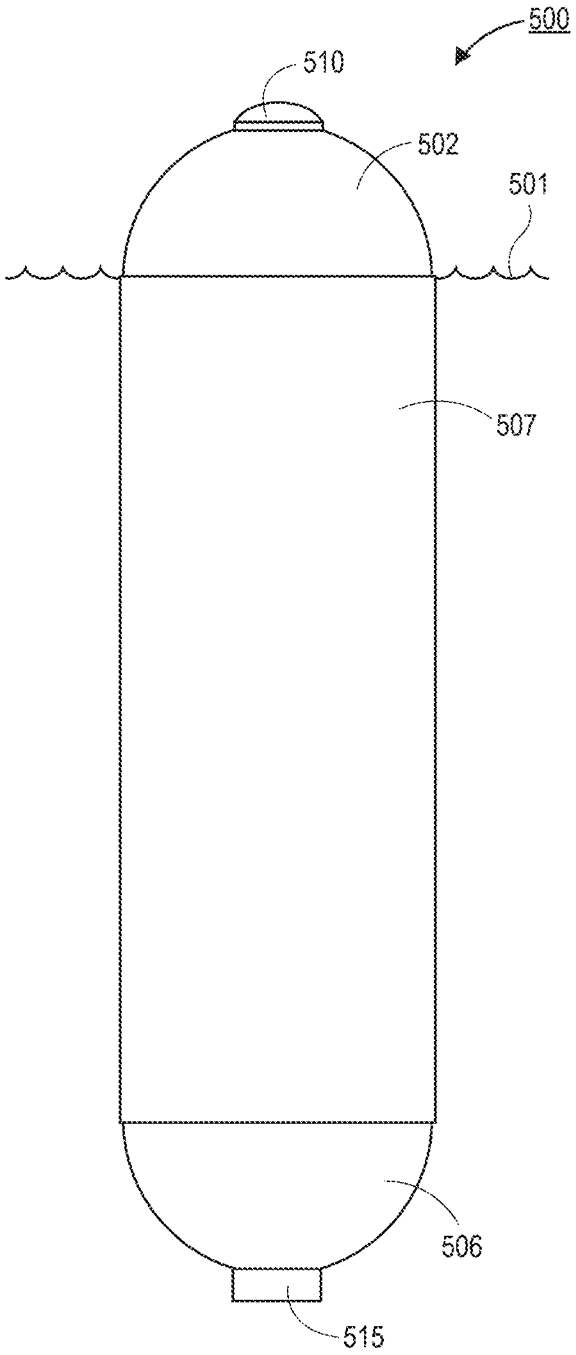
FIG. 103 is a side view of the fifteenth embodiment of the present invention.

FIG. 103 shows a side view of the same embodiment 500 of the current disclosure that is illustrated in FIGS. 99-102.

Figure 104:
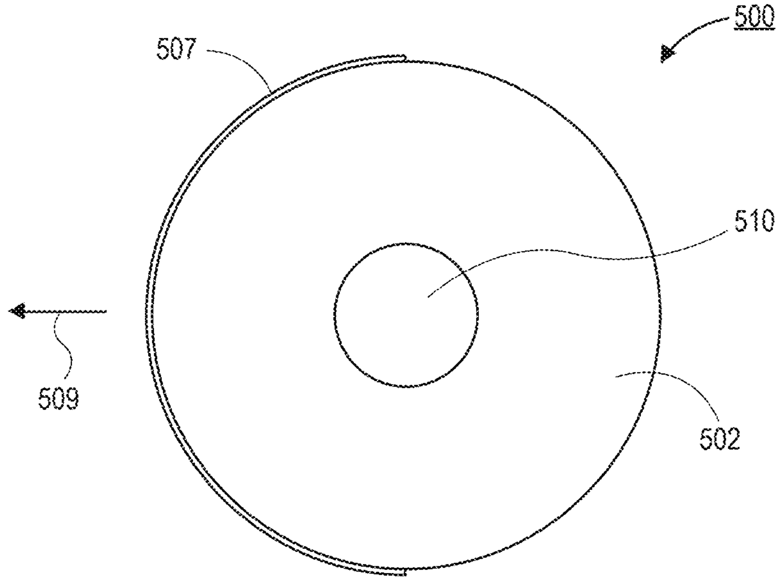
FIG. 104 is a top-down view of the fifteenth embodiment of the present invention.

FIG. 104 shows a top-down view of the same embodiment 500 of the current disclosure that is illustrated in FIGS. 99-103.

Figure 105:
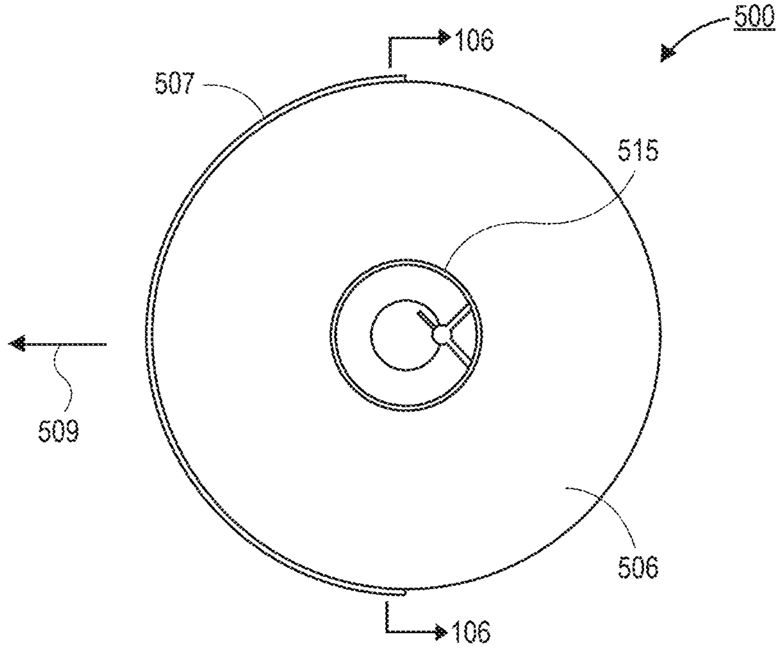
FIG. 105 is a bottom-up view of the fifteenth embodiment of the present invention.

FIG. 105 shows a bottom-up view of the same embodiment 500 of the current disclosure that is illustrated in FIGS. 99-104.

Figure 106:
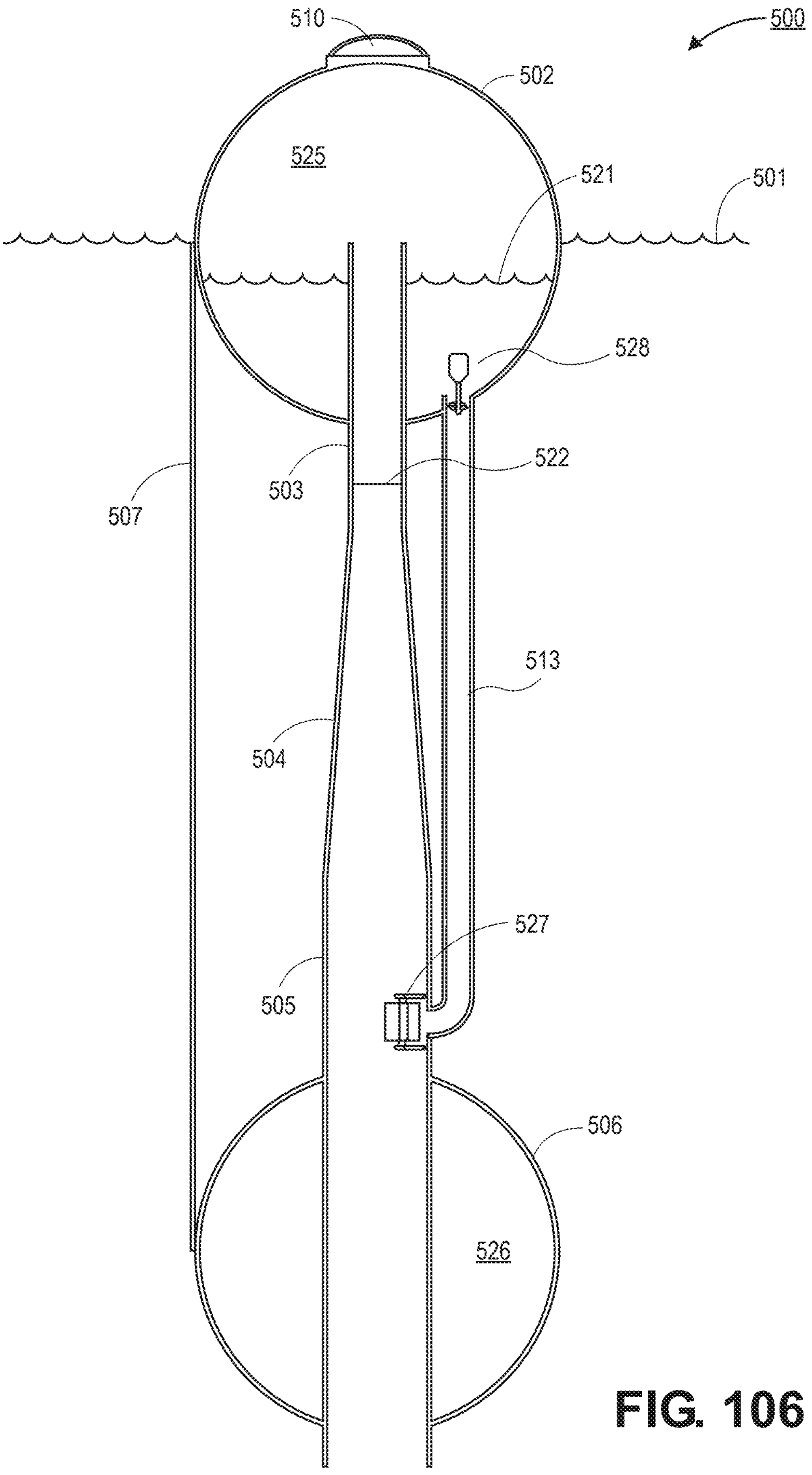
FIG. 106 is a side sectional view of the fifteenth embodiment of the present invention.

FIG. 106 shows a side sectional view of the same embodiment 600 of the current disclosure that is illustrated in FIGS. 99-105 wherein the section is taken across line 506-506 in FIG. 105.

The embodiment 500 illustrated in FIGS. 99-105 floats adjacent to an upper surface 501 of a body of water over which waves pass.

An interior of the constricted tube 503-505 is fluidly coupled to the external body of water. In response to the vertical displacement of the embodiment 500 during interaction with waves passing along the surface 501 of the body of water, water flows into the constricted tube 503-505 to a level of surface 522. The level of the surface 522 may raise and lower (e.g., in an oscillatory fashion). Occasionally, periodically, or at any other time duration, especially when the downward movements of the tapered walls of the inertial water tube impinge upon an upwelling body of water within the tube 503-505 thereby causing an increase in the pressure of water within the tube 503-505, the surface 522 of the water within the tube 503-505 moves high enough to allow a portion of the water to escape the upper mouth of the upper tube 503. The water is ejected and fills the upper chamber 502 with water 521.

Water 521 is able to flow through an opening in the upper chamber 502 (which may be pressurized) into the liquid effluent pipe 513. Within the pipe 513, the water flows down and through a water turbine 528 or any other power generation device. For example, the water turbine 528 may include a Kaplan or propeller turbine. The water causes turbine 528 and a connected, and/or attached, turbine shaft to rotate, thereby energizing a generator and causing the generator to produce electrical power.

After passing through the water turbine 528, water flowing through the pipe 513 may flow back into an opening in the constricted tube 503-505. The entrance to the constricted tube 503-505 may include an interface component 527. The interface component 527 may be used to control flow into the constricted tube 503-505, provide filtering, or function as an additional water turbine apparatus. In some instances, the pipe 513 may flow out of the embodiment 500 back into the external body of water. That is, the pipe 513 may not connect back to the constricted tube 503-505 to recirculate water. Externally releasing the water from the pipe 513 may be useful to provide additional propulsion, steering, or the like.

Figure 107:
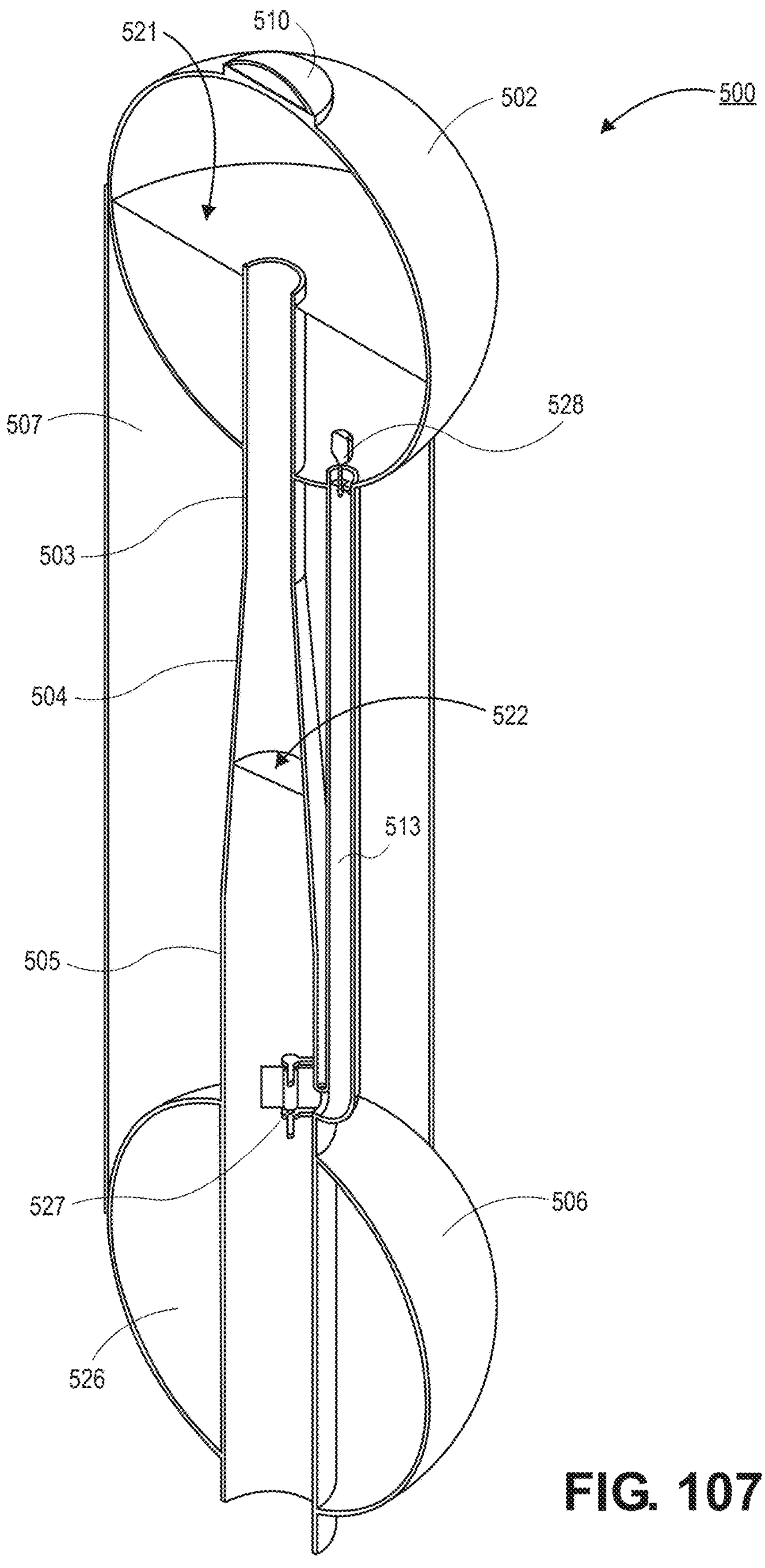
FIG. 107 is a sectional view from a perspective orientation of the fifteenth embodiment of the present invention.

FIG. 107 shows a sectional view FIG. 106 from a perspective orientation, and illustrates the same embodiment 500 of the current disclosure that is illustrated in FIGS. 99-106.

Figure 108:
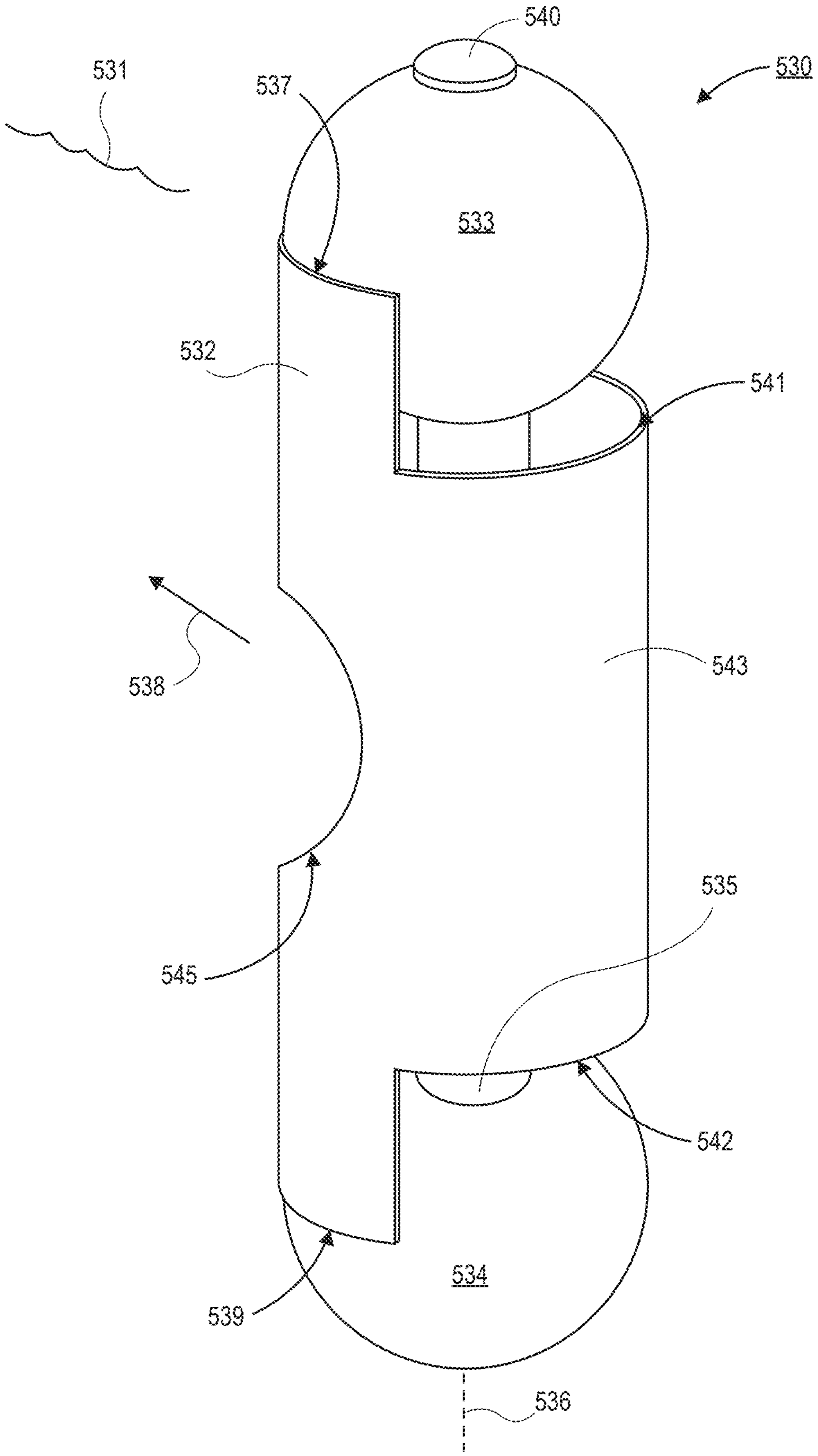
FIG. 108 is a perspective side view of a sixteenth embodiment of the present invention.

FIG. 108 shows a side perspective view of an embodiment 530 of the current disclosure.

The embodiment 530 floats adjacent to an upper surface 531 of a body of water over which waves pass.

The embodiment 530 comprises an upper hollow and buoyant chamber 533, a lower chamber 534, and a tube 535 that rigidly connects the upper chamber 533 to the lower chamber 534. The upper chamber 533 and the lower chamber 534 may be spherical in shape, or any other suitable three-dimensional shape. The upper chamber 533 may be substantially similar to the lower chamber 534 in shape and/or dimension. Though, in other instances, the upper chamber 533 and the lower chamber 534 may have different dimensions, shapes, and/or the like. The tube 535 may have a cylindrical shape, a rectangular prism shape, or any other suitable shape. In some instances, the tube 535 may have non-uniform cross-sections through a length of the tube 535. For example, the tube 535 may have a tapered portion, a constricted portion, or the like.

Attached to a "forward" side of the upper 533 and lower 534 chambers is a cylindrical propulsive shroud 532. The radius of curvature of the cylindrical propulsive shroud may be approximately equal to the radii of the upper 533 and lower 534 chambers. In contrast to some other embodiments, the propulsive shroud 532 is a complete cylinder through at least some cross-sections. For example, the front of the propulsive shroud 532 (e.g., a half-pipe portion) may be connected to a backing portion 543 that wraps around the remainder of a longitudinal axis 536 of the embodiment 530.

The backing portion 543 may include cutouts 541 (top) and 542 (bottom). The cutouts 541 and 542 may be formed through the removal of sections of the backing portion 543 along planes that are substantially orthogonal to the longitudinal axis 536 of the embodiment 530. For example, a height of the backing portion 543 may be less than a height of the front of the propulsive shroud 532. In the illustration of FIG. 108, the backing portion 543 is centered with the propulsive shroud 532 so that the cutout 541 is similar in shape and size as the cutout 542. Though, in other instances, the backing portion 543 may be raised or lowered relative to the propulsive shroud 532 so that the backing portion 543 is offset from the center of the propulsive shroud 532. That is, the cutout 541 may have different dimensions than the cutout 542.

The propulsive shroud 532 may further comprise an opening 545. The opening 545 may have any shape. In the illustration of FIG. 108, the opening 545 is circular. Rectangular shapes, square shapes, other polygonal shapes, elliptical shapes, or any irregular shape (e.g., cross, crescent, etc.) may be used for the opening 545. While a single opening 545 is shown, two or more openings 545 may also be provided through the propulsive shroud 532. In some instances, a plurality of openings 545 may be closely packed to form a screen-like feature in the propulsive shroud 532. The opening 545 may be located at any position along the propulsive shroud 532. For example, the opening 545 in FIG. 108 is centered (both vertically and horizontally) on the propulsive shroud 532.

The embodiment 530 is propelled in a forward direction 538 through the use of the propulsive shroud 532. The forward direction 538 can generally be described as being upstream and/or against the current of the body of water in which the embodiment 530 floats. In some instances, the propulsion mechanism may be similar to any of the propulsive mechanisms described in greater detail herein.

The propulsive shroud 532 is attached to the upper chamber 533 at, and/or along, an upper seam 537 oriented horizontally, and/or within a plane normal to the longitudinal axis 536 of the embodiment 530. The propulsive shroud 532 is attached to the lower chamber 534 at, and/or along, a lower seam 539 oriented horizontally, and/or within a plane normal to a longitudinal axis 536 of the embodiment 530. The partial cylindrical propulsive shroud 532 (with backing portion 543) of embodiment 530 is approximately radially symmetrical about, and coaxial with, the embodiment's longitudinal axis 536. The propulsive shroud 532 may be considered as being directly attached to the upper chamber 533 and/or the lower chamber 534. For example, the propulsive shroud 532 may directly contact the surfaces of the upper chamber 533 and/or the surfaces of the lower chamber 534. Directly attached may also refer to the propulsive shroud 532 being welded or otherwise adhered to the upper chamber 533 and/or the lower chamber 534. That is, upper seam 537 and lower seam 539 may comprise welded material, an adhesive layer, or the like.

The embodiment 530 may include a dome 540 provided on the upper chamber 533. The dome 540 may house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 530 as a wave energy converter device.

An embodiment similar to the one illustrated in FIG. 108 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 108 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 108 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 108 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 109:
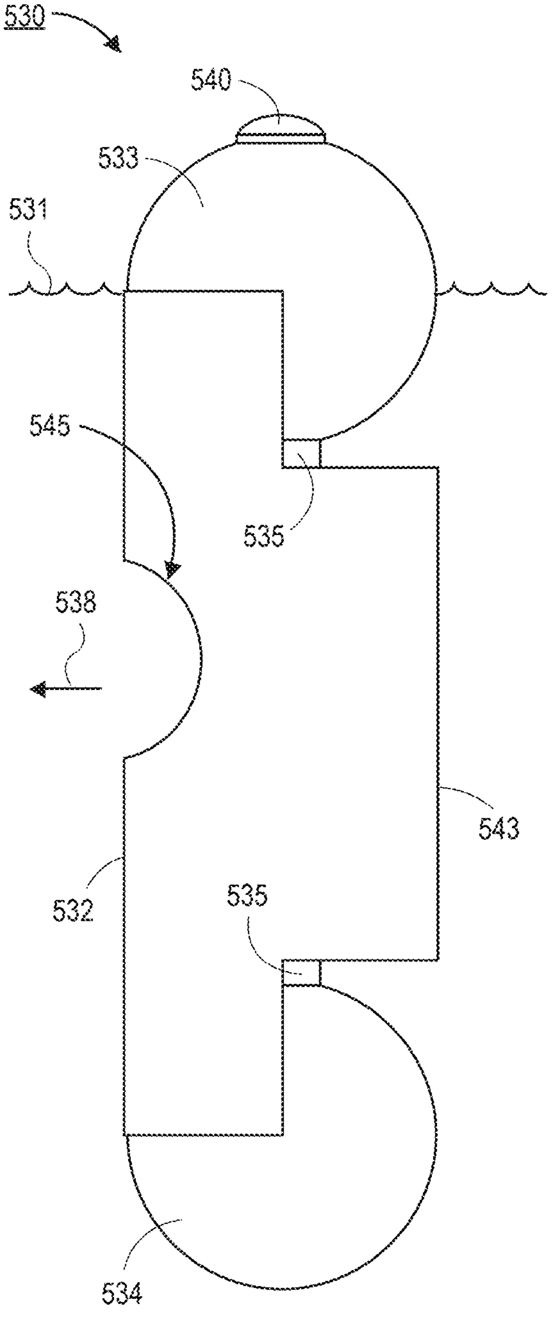
FIG. 109 is a side view of the sixteenth embodiment of the present invention.

FIG. 109 shows a side view of the same embodiment 530 of the current disclosure that is illustrated in FIG. 108.

Figure 110:
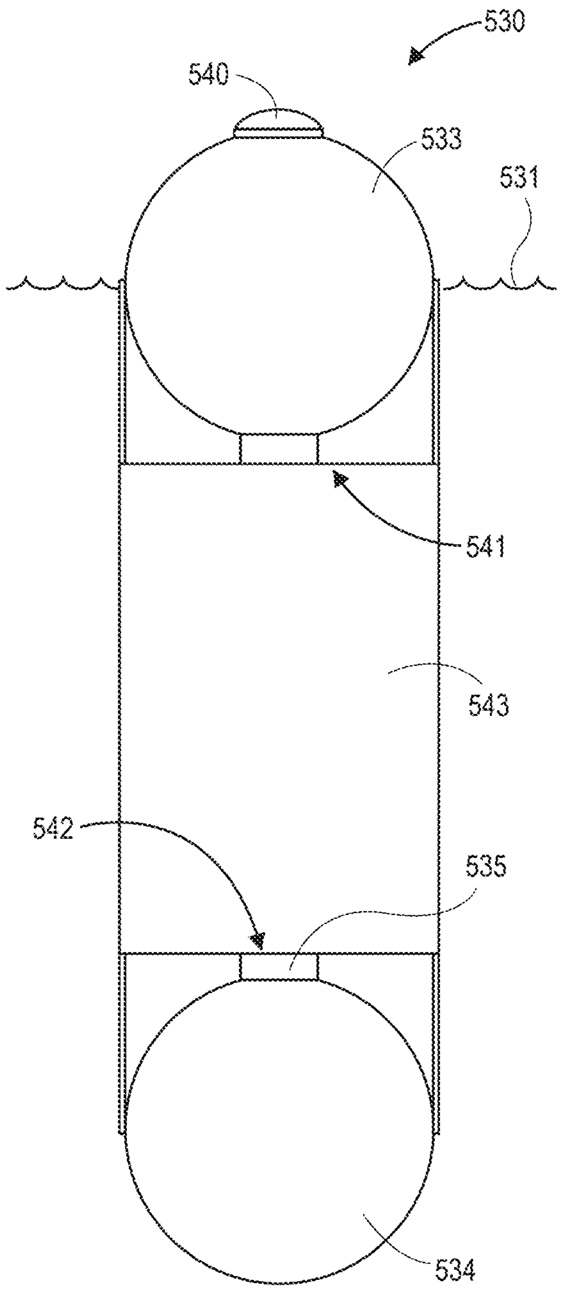
FIG. 110 is a side view of the sixteenth embodiment of the present invention.

FIG. 110 shows a side view of the same embodiment 530 of the current disclosure that is illustrated in FIGS. 108 and 109.

Figure 111:
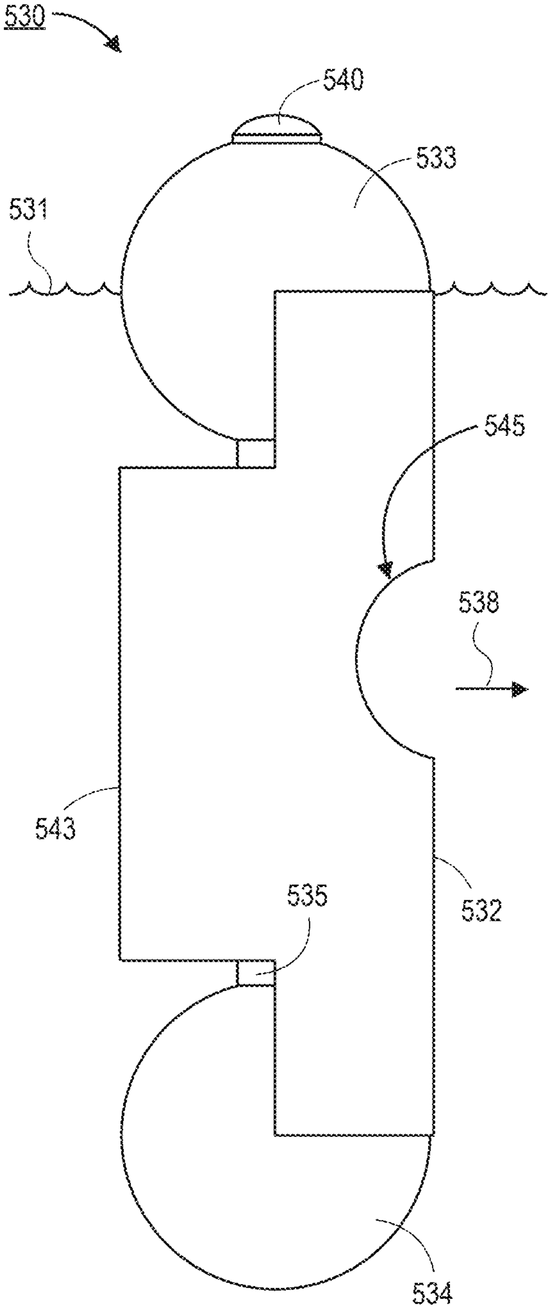
FIG. 111 is a side view of the sixteenth embodiment of the present invention.

FIG. 111 shows a side view of the same embodiment 530 of the current disclosure that is illustrated in FIGS. 108-110.

Figure 112:
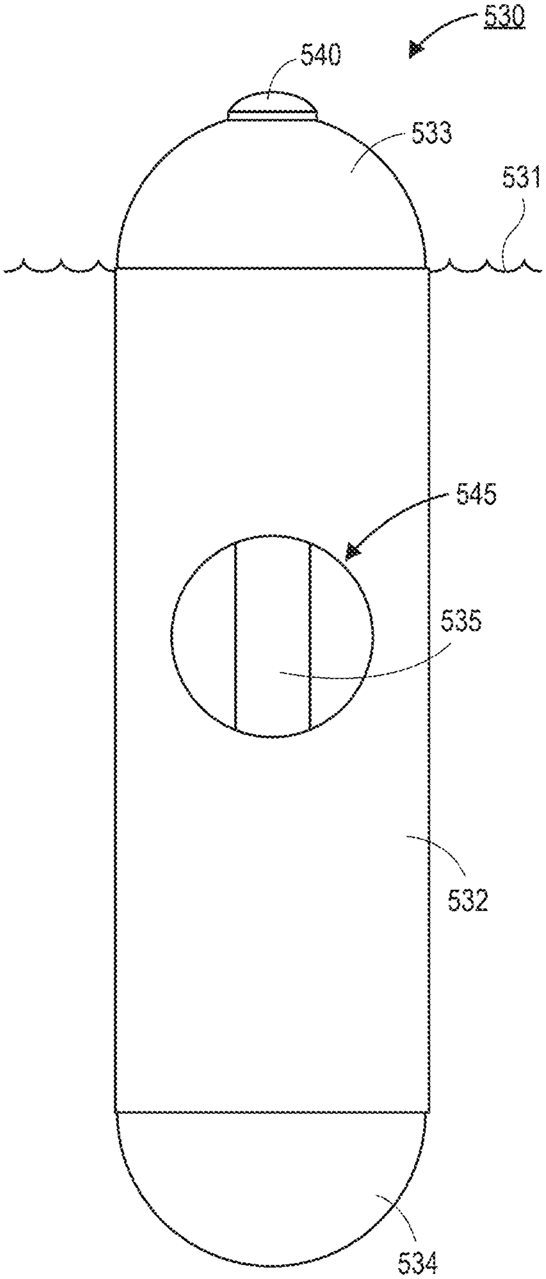
FIG. 112 is a side view of the sixteenth embodiment of the present invention.

FIG. 112 shows a side view of the same embodiment 530 of the current disclosure that is illustrated in FIGS. 108-111.

Figure 113:
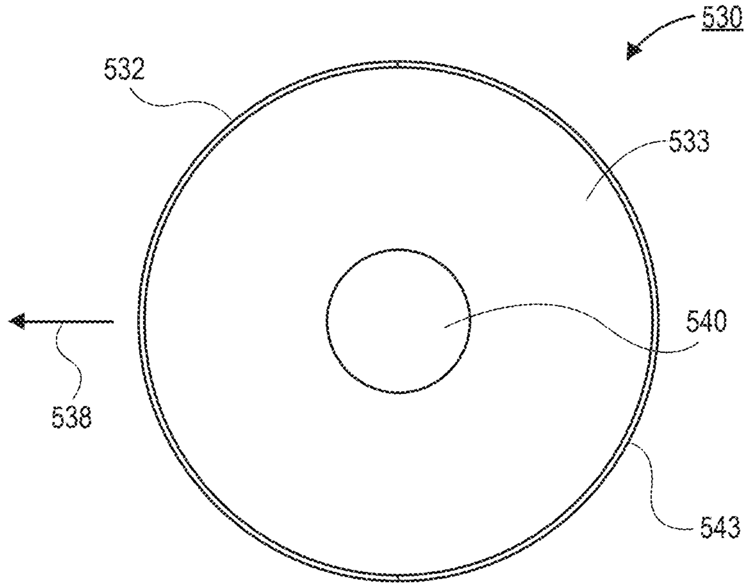
FIG. 113 is a top-down view of the sixteenth embodiment of the present invention.

FIG. 113 shows a top-down view of the same embodiment 530 of the current disclosure that is illustrated in FIGS. 108-112.

Figure 114:
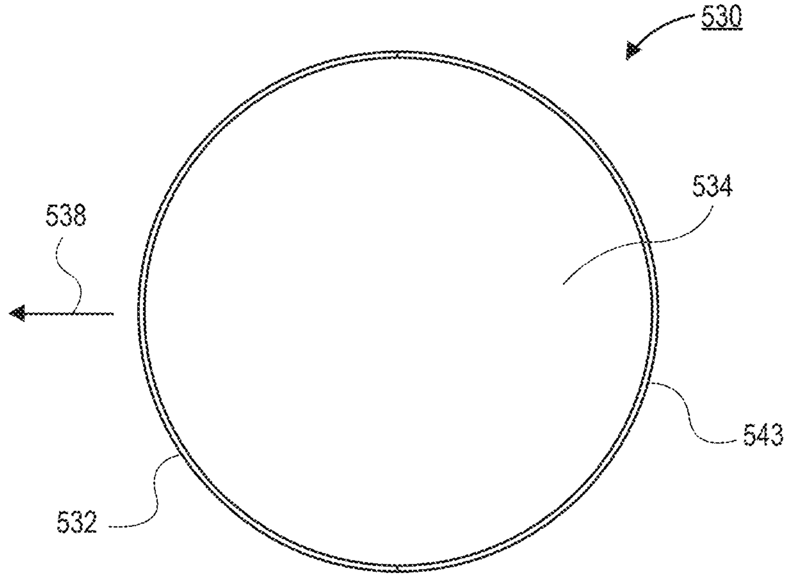
FIG. 114 is a bottom-up view of the sixteenth embodiment of the present invention.

FIG. 114 shows a bottom-up view of the same embodiment 530 of the current disclosure that is illustrated in FIGS. 108-113.

Figure 115:
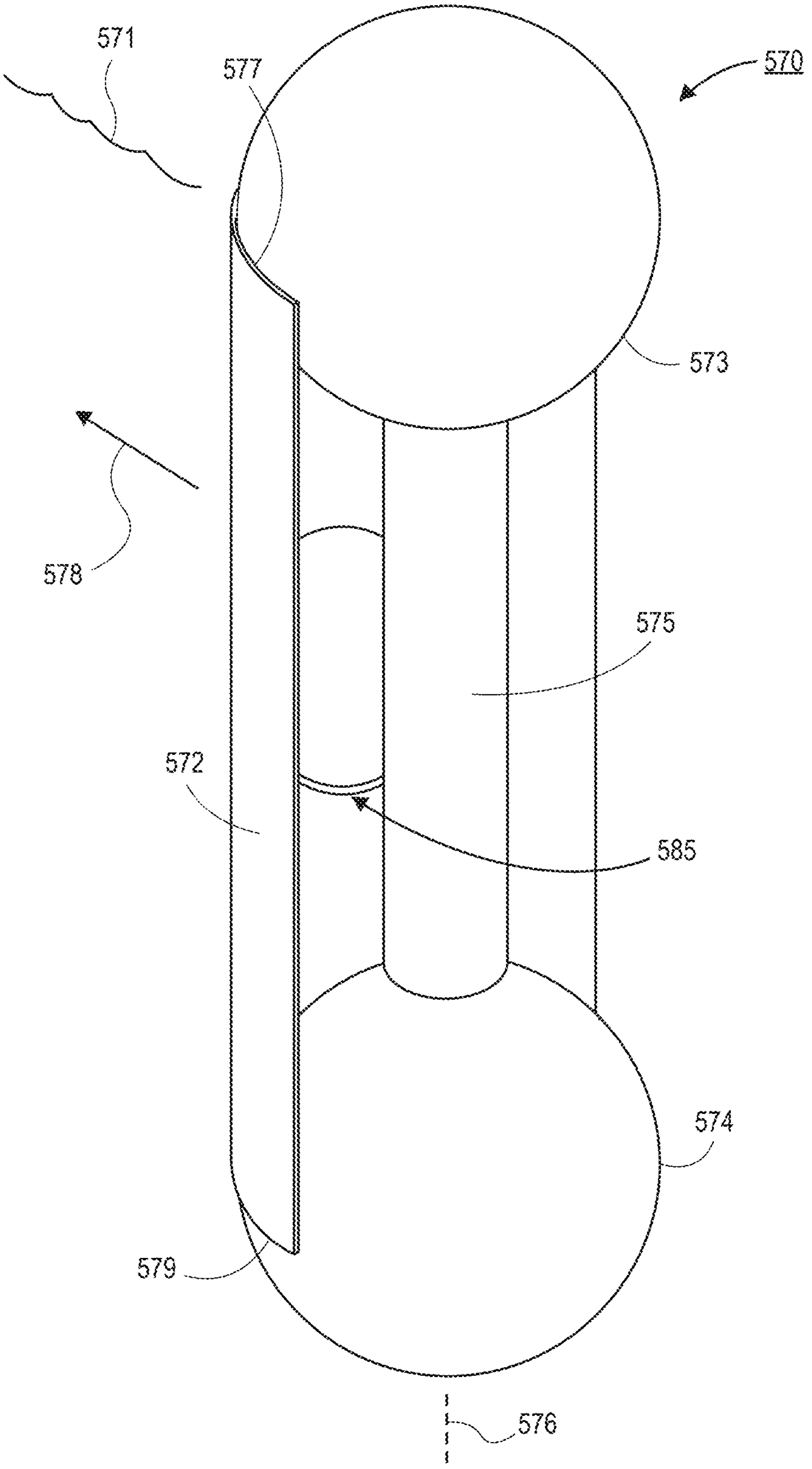
FIG. 115 is a perspective side view of a seventeenth embodiment of the present invention.

FIG. 115 shows a side perspective view of an embodiment 570 of the current disclosure.

The embodiment 570 floats adjacent to an upper surface 571 of a body of water over which waves pass.

The embodiment comprises an upper hollow and buoyant chamber 573, a lower chamber 574, and a tube 575 that rigidly connects the upper chamber 573 to the lower chamber 574. The upper chamber 573 and the lower chamber 574 may be spherical in shape, or any other suitable three-dimensional shape. The upper chamber 573 may be substantially similar to the lower chamber 574 in shape and/or dimension. Though, in other instances, the upper chamber 573 and the lower chamber 574 may have different dimensions, shapes, and/or the like. The tube 575 may have a cylindrical shape, a rectangular prism shape, or any other suitable shape. In some instances, the tube 535 may have non-uniform cross-sections through a length of the tube 535. For example, the tube 535 may have a tapered portion, a constricted portion, or the like.

Attached to a "forward" side of the upper 573 and lower 574 chambers is a semi-cylindrical propulsive shroud 572. The radius of curvature of the semi-cylindrical propulsive shroud 572 is approximately equal to the radii of the upper chamber 573 and lower chamber 574. Though, in other instances, a radius of curvature of the propulsive shroud 572 is different than the radii of one or both of the upper chamber 573 and the lower chamber 574.

The propulsive shroud 572 is attached to the upper chamber 573 at, and/or along, an upper seam 577 oriented horizontally, and/or within a plane normal to a longitudinal axis 576 of the embodiment 570. The propulsive shroud 572 is attached to the lower chamber 574 at, and/or along, a lower seam 579 oriented horizontally, and/or within a plane normal to a longitudinal axis 567 of the embodiment. The propulsive shroud 572 may be considered as being directly attached to the upper chamber 573 and/or the lower chamber 574. For example, the propulsive shroud 572 may directly contact the surfaces of the upper chamber 573 and/or the surfaces of the lower chamber 574. Directly attached may also refer to the propulsive shroud 572 being welded or otherwise adhered to the upper chamber 573 and/or the lower chamber 574. That is, upper seam 577 and lower seam 579 may comprise welded material, an adhesive layer, or the like.

The semi-cylindrical propulsive shroud 572 of embodiment 570 is approximately radially symmetrical about, and coaxial with, the embodiment's longitudinal axis 574. The angular extent of the semi-cylindrical propulsive shroud 572 about the embodiment's longitudinal axis is approximately 180 degrees. Thus, the propulsive shroud 572 of embodiment 570 is substantially a "half-pipe." Though, the angular extent of the propulsive shroud 572 may be any angle up to just shy of a complete 360 degrees.

The embodiment 570 is propelled in a forward direction 578 through the use of the propulsive shroud 572. The forward direction 578 can generally be described as being upstream and/or against the current of the body of water in which the embodiment 570 floats. In some instances, the propulsion mechanism may be similar to any of the propulsive mechanisms described in greater detail herein.

The opening 585 may have any shape. In the illustration of FIG. 115, the opening 585 is circular. Rectangular shapes, square shapes, other polygonal shapes, elliptical shapes, or any irregular shape (e.g., cross, crescent, etc.) may be used for the opening 585. While a single opening 585 is shown, two or more openings 585 may also be provided through the propulsive shroud 572. In some instances, a plurality of openings 585 may be closely packed to form a screen-like feature in the propulsive shroud 572. The opening 585 may be located at any position along the propulsive shroud 572. For example, the opening 585 in FIG. 115 is centered (both vertically and horizontally) on the propulsive shroud 572.

The embodiment 570 may include a dome or chamber (not shown) to house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 570 as a wave energy converter device.

An embodiment similar to the one illustrated in FIG. 115 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 115 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 115 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 115 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 116:
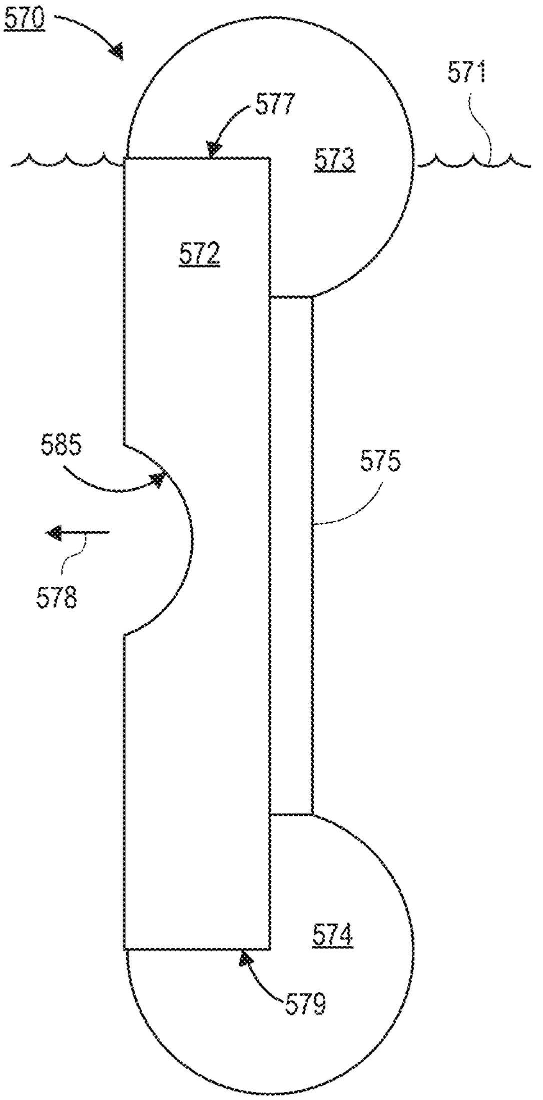
FIG. 116 is a side view of the seventeenth embodiment of the present invention.

FIG. 116 shows a side view of the same embodiment 570 of the current disclosure that is illustrated in FIG. 115.

Figure 117:
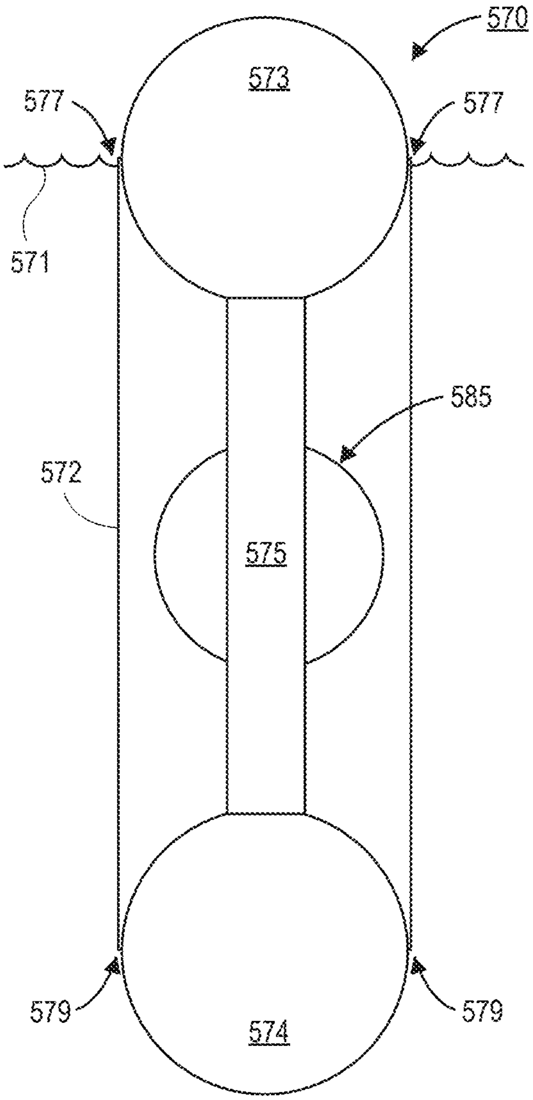
FIG. 117 is a side view of the seventeenth embodiment of the present invention.

FIG. 117 shows a side view of the same embodiment 570 of the current disclosure that is illustrated in FIGS. 115 and 116.

Figure 118:
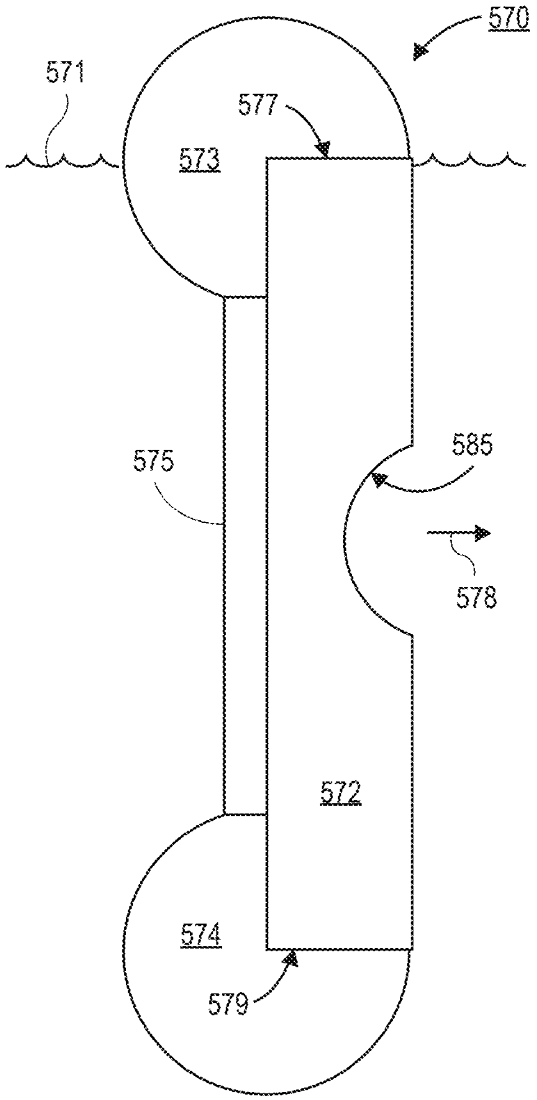
FIG. 118 is a side view of the seventeenth embodiment of the present invention.

FIG. 118 shows a side view of the same embodiment 570 of the current disclosure that is illustrated in FIGS. 115-117.

Figure 119:
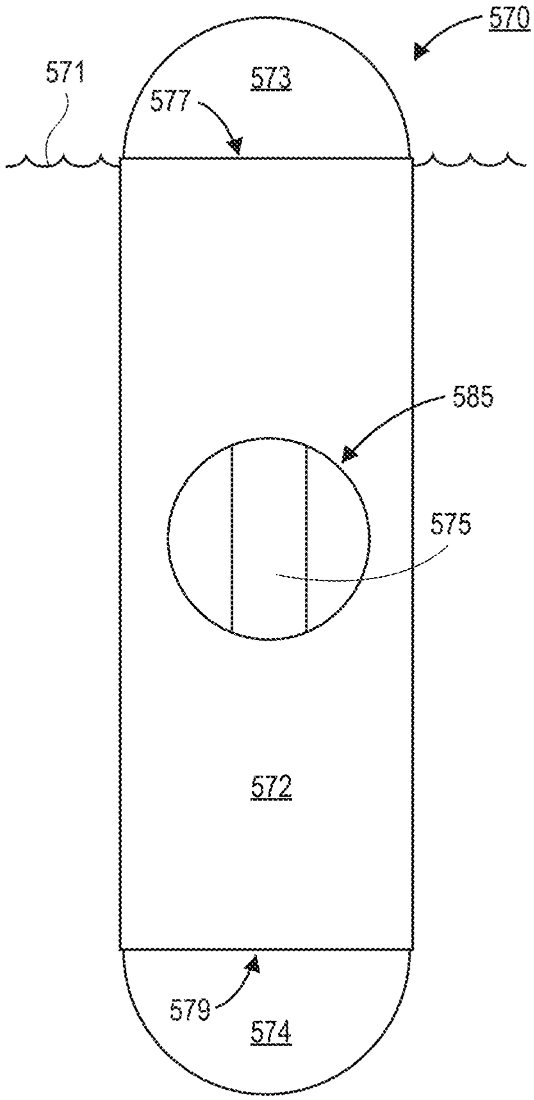
FIG. 119 is a side view of the seventeenth embodiment of the present invention.

FIG. 119 shows a side view of the same embodiment 570 of the current disclosure that is illustrated in FIGS. 115-118.

Figure 120:
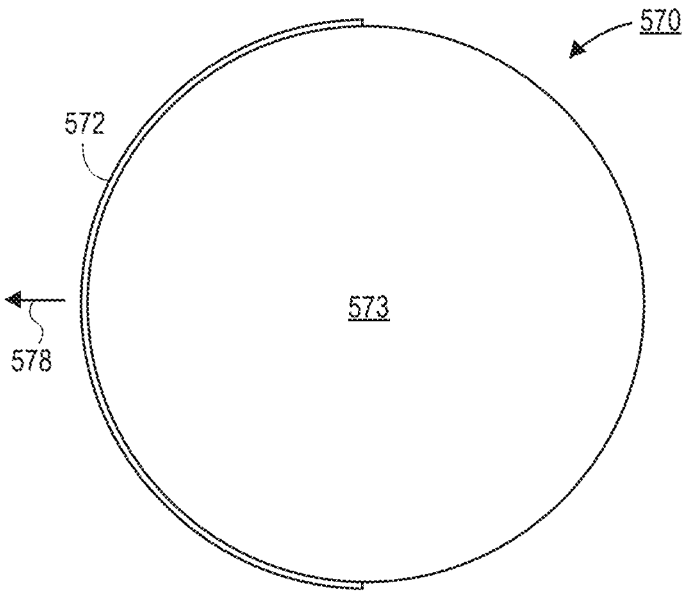

FIG. 120 shows a top-down view of the same embodiment 570 of the current disclosure that is illustrated in FIGS. 115-119.

Figure 121:
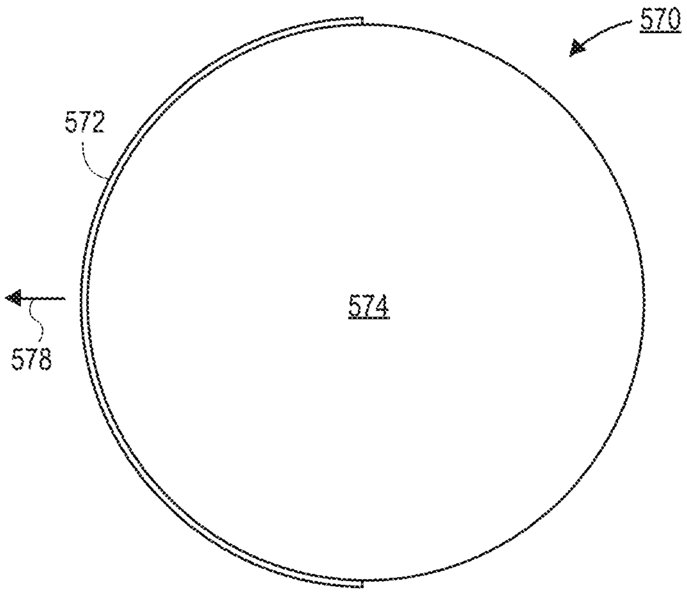

FIG. 121 shows a bottom-up view of the same embodiment 570 of the current disclosure that is illustrated in FIGS. 115-120.

Figure 122:
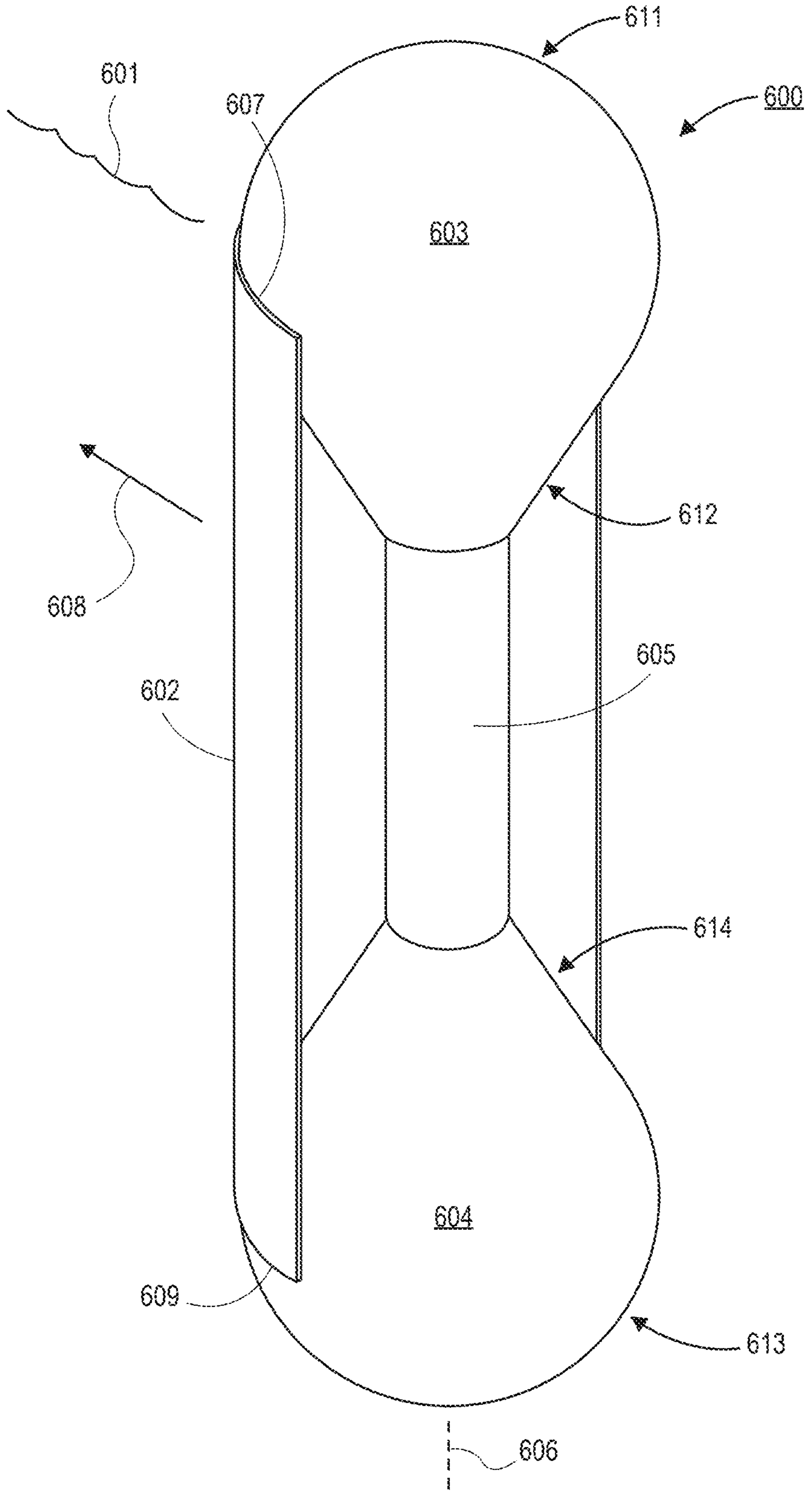

FIG. 122 shows a side perspective view of an embodiment 600 of the current disclosure.

The embodiment 600 floats adjacent to an upper surface 601 of a body of water over which waves pass.

The embodiment comprises an upper hollow and buoyant chamber 603, a lower chamber 604, and a tube 605 that rigidly connects the upper chamber 603 to the lower chamber 604. The upper chamber 603 and the lower chamber 604 may be spherical in shape, or any other suitable three-dimensional shapes. In the particular instance illustrated in FIG. 122, the upper chamber 603 and the lower chamber 604 have complex shapes or volumes. For example, the upper chamber 603 may have a frustoconical portion 612 with a spherical cap 611. The bottom of the frustoconical portion 612 may have a diameter that is substantially equal to a diameter of the tube 605. The spherical cap 611 may have a diameter that is substantially equal to an upper diameter of the frustoconical portion 612. That is, the spherical cap 611 may be a half-sphere. Though, the spherical cap 611 may also comprise smaller or larger portions of a sphere in some instances. Similarly, the lower chamber 604 may comprise a frustoconical portion 614 and a spherical cap 613. The upper chamber 603 may be substantially similar to the lower chamber 604 in shape and/or dimension. Though, in other instances, the upper chamber 603 and the lower chamber 604 may have different dimensions, shapes, and/or the like. The tube 605 may have a cylindrical shape, a rectangular prism shape, or any other suitable shape. In some instances, the tube 605 may have non-uniform cross-sections through a length of the tube 605. For example, the tube 605 may have a tapered portion, a constricted portion, or the like.

Attached to a "forward" side of the upper 603 and lower 604 chambers is a semi-cylindrical propulsive shroud 602. The radius of curvature of the semi-cylindrical propulsive shroud 602 is approximately equal to the radius of the spherical cap 611 of the upper chamber 603 and the radius of the spherical cap 613 of the lower chamber 604. Though, in other instances, a radius of curvature of the propulsive shroud 602 is different than the radii of one or both of the portions of the upper chamber 603 and the lower chamber 604.

The propulsive shroud 602 is attached to the upper chamber 603 at, and/or along, an upper seam 607 oriented horizontally, and/or within a plane normal to a longitudinal axis 606 of the embodiment 600. The propulsive shroud 602 is attached to the lower chamber 604 at, and/or along, a lower seam 609 oriented horizontally, and/or within a plane normal to a longitudinal axis 606 of the embodiment 600. The propulsive shroud 602 may be considered as being directly attached to the upper chamber 603 and/or the lower chamber 604. For example, the propulsive shroud 602 may directly contact the surfaces of the upper chamber 603 and/or the surfaces of the lower chamber 604. Directly attached may also refer to the propulsive shroud 602 being welded or otherwise adhered to the upper chamber 603 and/or the lower chamber 604. That is, upper seam 607 and lower seam 609 may comprise welded material, an adhesive layer, or the like.

The semi-cylindrical propulsive shroud 602 of embodiment 600 is approximately radially symmetrical about, and coaxial with, the embodiment's longitudinal axis 606. The angular extent of the semi-cylindrical propulsive shroud about the embodiment's longitudinal axis is approximately 180 degrees. Thus, the propulsive shroud 602 of embodiment 600 is substantially a "half-pipe." Though, the angular extent of the propulsive shroud 602 may be any angle up to just shy of a complete 360 degrees.

The embodiment 600 is propelled in a forward direction 608 through the use of the propulsive shroud 602. The forward direction 608 can generally be described as being upstream and/or against the current of the body of water in which the embodiment 600 floats. In some instances, the propulsion mechanism may be similar to any of the propulsive mechanisms described in greater detail herein. While not explicitly shown, it is to be appreciated that an opening may be formed through a portion of the propulsive shroud 602 similar to any of the propulsive shroud openings described in greater detail herein.

The embodiment 600 may include a dome or chamber (not shown) to house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 600 as a wave energy converter device.

An embodiment similar to the one illustrated in FIG. 122 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 122 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 122 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 122 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 123:
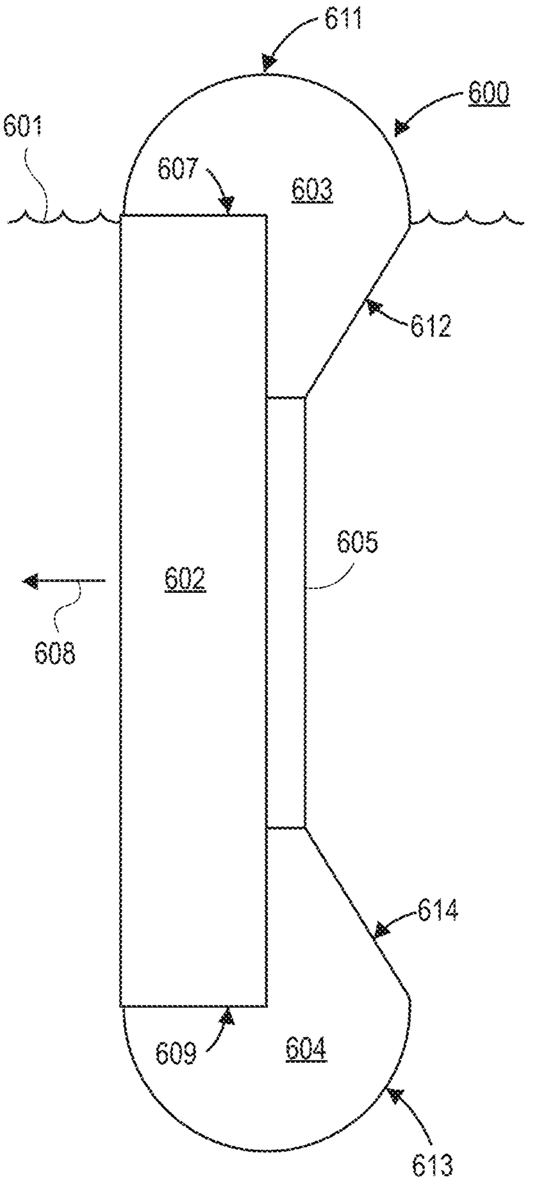

FIG. 123 shows a side view of the same embodiment 600 of the current disclosure that is illustrated in FIG. 122.

Figure 124:
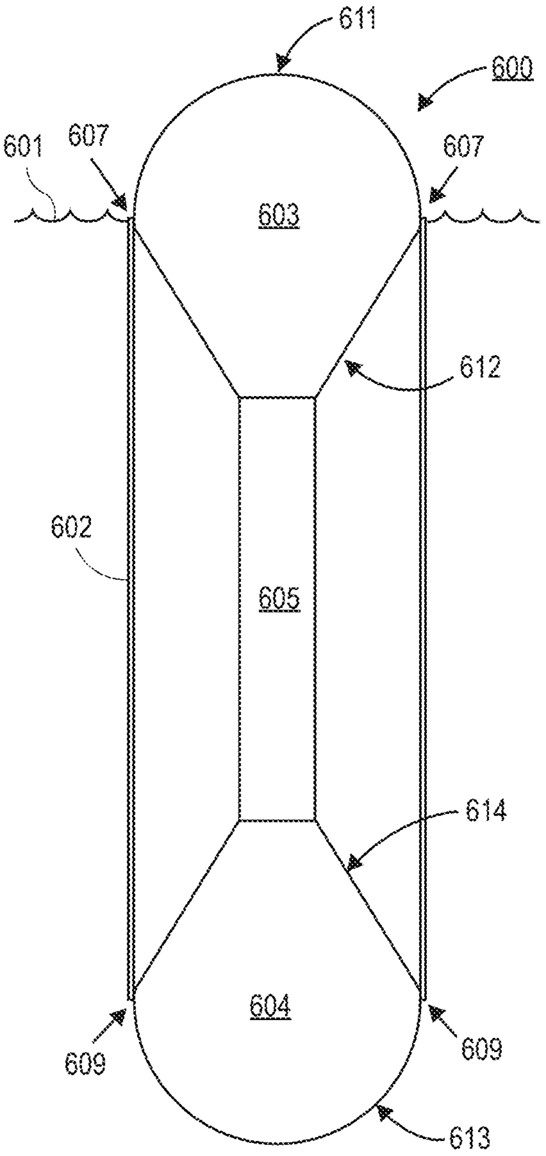

FIG. 124 shows a side view of the same embodiment 600 of the current disclosure that is illustrated in FIGS. 122 and 123.

Figure 125:
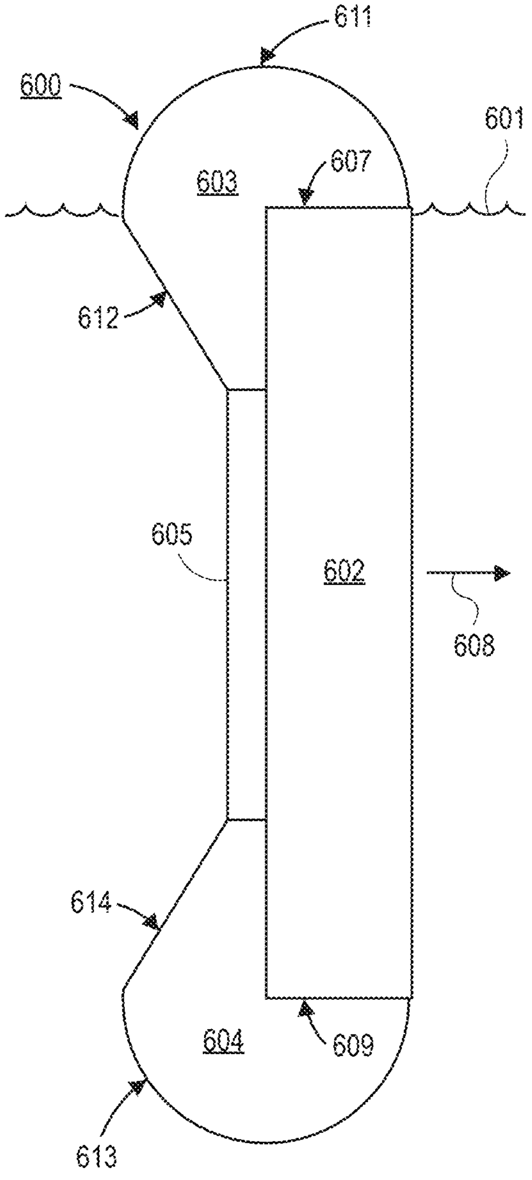

FIG. 125 shows a side view of the same embodiment 600 of the current disclosure that is illustrated in FIGS. 122-124.

Figure 126:
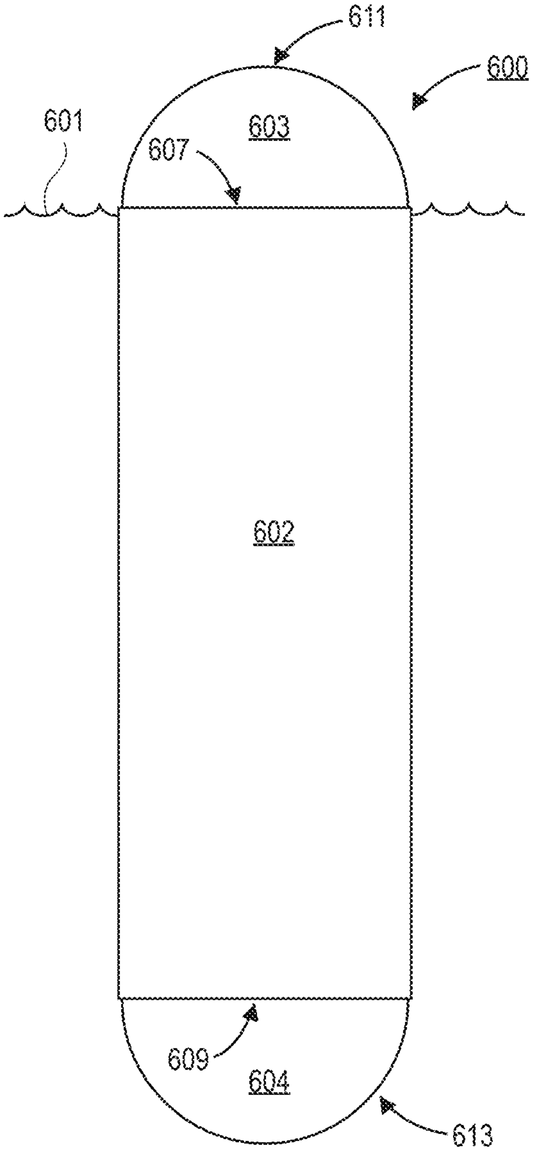

FIG. 126 shows a side view of the same embodiment 600 of the current disclosure that is illustrated in FIGS. 122-125.

Figure 127:
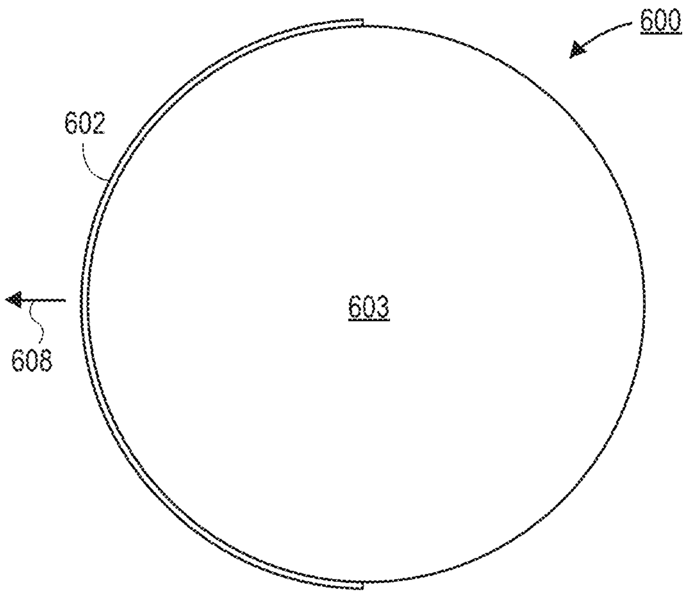

FIG. 127 shows a top-down view of the same embodiment 600 of the current disclosure that is illustrated in FIGS. 122-126.

Figure 128:
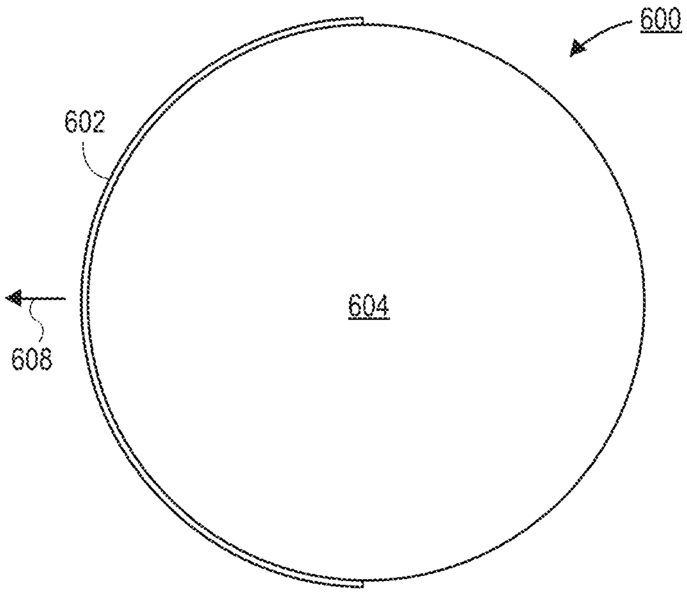

FIG. 128 shows a bottom-up view of the same embodiment 600 of the current disclosure that is illustrated in FIGS. 122-127.

Figure 129:
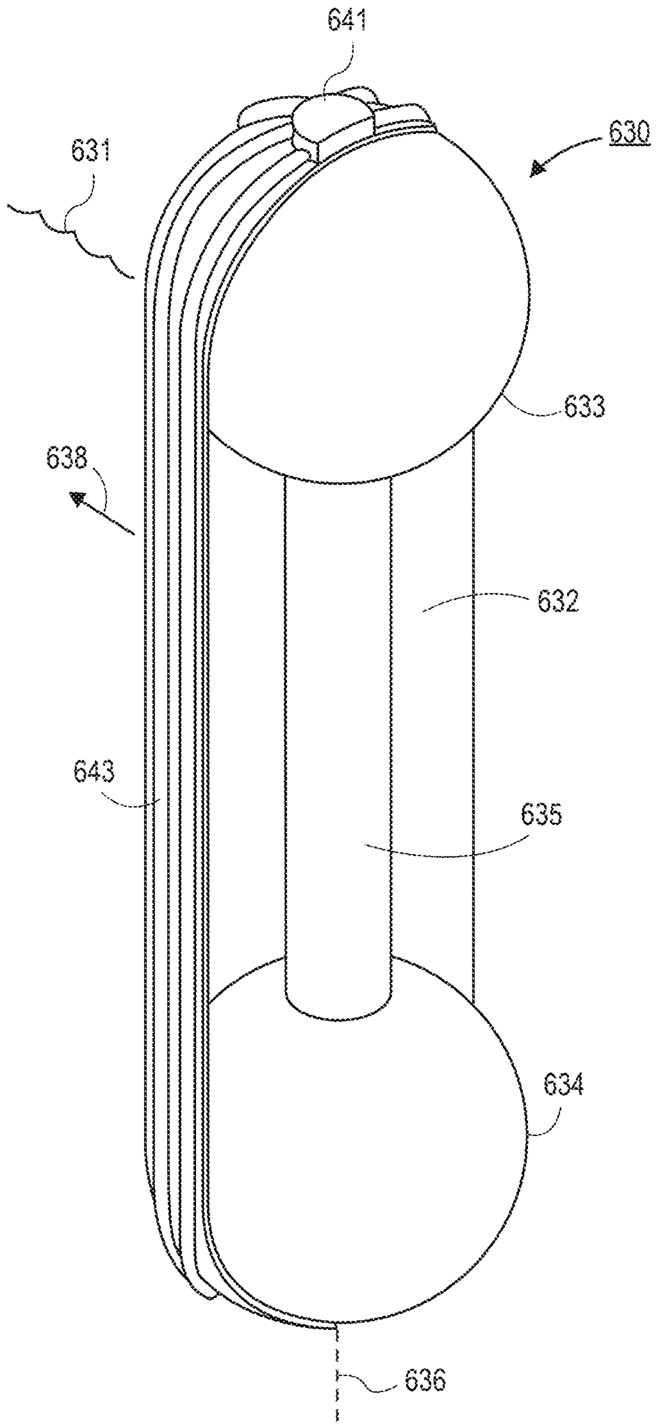

FIG. 129 shows a side perspective view of an embodiment 630 of the current disclosure.

The embodiment 630 floats adjacent to an upper surface 631 of a body of water over which waves pass.

The embodiment comprises an upper hollow and buoyant chamber 633, a lower chamber 634, and a tube 635 that rigidly connects the upper chamber 633 to the lower chamber 634. The upper chamber 633 and the lower chamber 634 may be spherical in shape, or any other suitable three-dimensional shapes. The upper chamber 633 may be substantially similar to the lower chamber 634 in shape and/or dimension. Though, in other instances, the upper chamber 633 and the lower chamber 634 may have different dimensions, shapes, and/or the like. The tube 635 may have a cylindrical shape, a rectangular prism shape, or any other suitable shape. In some instances, the tube 635 may have non-uniform cross-sections through a length of the tube 635. For example, the tube 635 may have a tapered portion, a constricted portion, or the like.

Attached to a "forward" side of the upper 633 and lower 634 chambers is a semi-capsule shaped propulsive shroud 632. The propulsive shroud 632 has a cylindrical portion that is between the upper chamber 633 and the lower chamber 634, and semi-spherical endcaps that wrap around the upper chamber 633 and the lower chamber 634. The radius of curvature of the semi-capsule shaped propulsive shroud 632 (at one or both of the semi-cylindrical portion or the semi-spherical portions) may be approximately equal to the radii of the upper chamber 633 and the lower chamber 634. Though, in other instances, a radius of curvature of the propulsive shroud 632 is different than the radii of one or both of the portions of the upper chamber 633 and the lower chamber 634.

The propulsive shroud 632 is attached to the upper chamber 603 at, and/or along, an upper seam that wraps along an upper half of the upper chamber 633. In some instances, the propulsive shroud 632 contacts approximately one quadrant of the upper chamber 633. The propulsive shroud 632 is attached to the lower chamber 634 at, and/or along, a lower seam that wraps along a lower half of the lower chamber 634. In some instances, the propulsive shroud 632 contacts approximately one quadrant of the lower chamber 634. The propulsive shroud 632 may be considered as being directly attached to the upper chamber 633 and/or the lower chamber 634. For example, the propulsive shroud 632 may directly contact the surfaces of the upper chamber 633 and/or the surfaces of the lower chamber 634. Directly attached may also refer to the propulsive shroud 632 being welded or otherwise adhered to the upper chamber 633 and/or the lower chamber 634. That is, upper seam and lower seam may comprise welded material, an adhesive layer, or the like.

The propulsive shroud 632 of embodiment 630 is approximately radially symmetrical about, and coaxial with, the embodiment's longitudinal axis 636. The angular extent of the semi-capsule propulsive shroud 632 about the embodiment's longitudinal axis 636 is approximately 180 degrees. Thus, the propulsive shroud 632 of embodiment 630 is substantially a "half-pill" shaped feature. Though, the angular extent of the propulsive shroud 632 may be any angle up to just shy of a complete 360 degrees.

The propulsive shroud 632 may further comprise one or more reinforcement members 643. The reinforcement members 643 may include pipes, beams, or other elongated members. The embodiment 630 includes reinforcement members 643 that are pipes that are provided on an exterior surface of the propulsive shroud 632 (i.e., facing away from the tube 635). In other instances, reinforcement members 643 may be provided on the interior surface of the propulsive shroud 632 or provided on both the exterior and interior surfaces of the propulsive shroud 632. In other instances, an array of reinforcement members 643 may be sandwiched between an outer propulsive shroud 632 and an inner propulsive shroud 632.

The reinforcement members 643 may extend from a top of the propulsive shroud 632 (or near the top of the propulsive shroud 632) to a bottom of the propulsive shroud 632 (or near the bottom of the propulsive shroud 632). Though, shorter reinforcement members 643 may also be used. For example, reinforcement members 643 may be located primarily between the upper chamber 633 and the lower chamber 634.

In the case of pipe based reinforcement members 643, the reinforcement members 643 may be used to transport fluids and/or gasses between the lower chamber 634 and the upper chamber 633. For example, lower ends of the reinforcement members 643 may pass through a thickness of the propulsive shroud 632 and fluidically coupled to an interior of the lower chamber 634. Upper ends of the reinforcement members 643 may be similarly fluidically coupled to an interior of the upper chamber 633. For example, the upper ends of the reinforcement members 643 may couple with a collector 641 that drains through the propulsive shroud 632 and into the upper chamber 633.

The embodiment 630 is propelled in a forward direction 638 through the use of the propulsive shroud 632. The forward direction 638 can generally be described as being upstream and/or against the current of the body of water in which the embodiment 630 floats. In some instances, the propulsion mechanism may be similar to any of the propulsive mechanisms described in greater detail herein. While not explicitly shown, it is to be appreciated that an opening may be formed through a portion of the propulsive shroud 632 similar to any of the propulsive shroud openings described in greater detail herein.

The embodiment 630 may include a dome or chamber (not shown) to house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 630 as a wave energy converter device.

An embodiment similar to the one illustrated in FIG. 129 generates electrical power in response to a wave-induced flow of fluid between the embodiment's upper and lower chambers. The embodiment uses a portion of the electrical power that it generates to power sensors (e.g., hydrophones, cameras, etc.), radio and/or satellite communications, cryptocurrency mining computers, etc.

An embodiment similar to the one illustrated in FIG. 129 stores compressed hydrogen gas in its upper chamber. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 129 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 129 further comprises, includes, and/or incorporates, a pair of rudders positioned along opposite vertical edges of the embodiment's propulsive shroud that alter, adjust, correct, and/or control, the yaw of the embodiment, and steer the embodiment so as to enable the use of its propulsive shroud to cruise, travel, and/or navigate to specific geospatial locations at the surface of the body of water.

Figure 130:
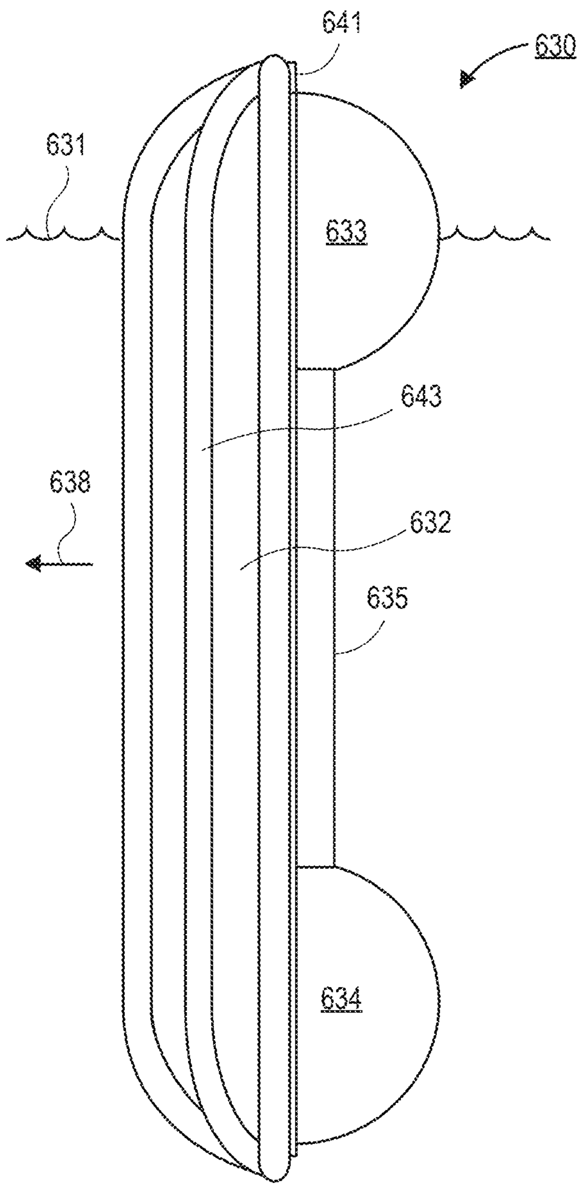

FIG. 130 shows a side view of the same embodiment 630 of the current disclosure that is illustrated in FIG. 129.

Figure 131:
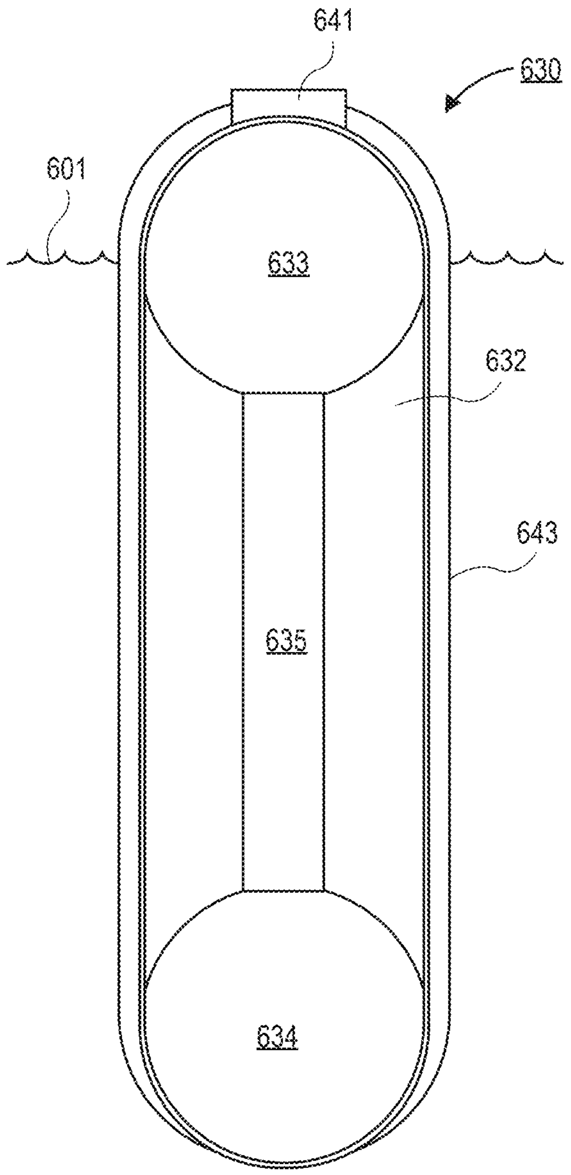

FIG. 131 shows a side view of the same embodiment 630 of the current disclosure that is illustrated in FIGS. 129 and 130.

FIG. 132 shows a side view of the same embodiment 630 of the current disclosure that is illustrated in FIGS. 129-131.

FIG. 133 shows a side view of the same embodiment 630 of the current disclosure that is illustrated in FIGS. 129-132.

FIG. 134 shows a top-down view of the same embodiment 630 of the current disclosure that is illustrated in FIGS. 129-133.

FIG. 135 shows a bottom-up view of the same embodiment 630 of the current disclosure that is illustrated in FIGS. 129-134.

FIG. 136 shows a side perspective view of an embodiment 670 of the current disclosure.

The embodiment 670 floats adjacent to an upper surface 671 of a body of water over which waves pass.

The embodiment comprises an upper hollow and buoyant chamber 672 and a tube 674 that is rigidly connected to the upper chamber 672. The upper chamber 672 may be spherical in shape, or any other suitable three-dimensional shapes. The chamber 672 may be axially symmetric in some instances. For example, in FIG. 136, the chamber 672 is a spherical segment with substantially horizontal top and bottom surfaces. In other instances, the chamber 672 may be a spherical cap, or any other type of axially symmetric shape. Though, the chamber 672 may be non-axially symmetric in other instances. For example, the chamber 672 may have a keel or hull shape similar to that of a floating vessel (e.g., a boat or ship). The tube 674 may have a cylindrical shape, a rectangular prism shape, or any other suitable shape. In some instances, the tube 674 may have non-uniform cross-sections through a length of the tube 674. For example, the tube 674 may have a tapered portion, a constricted portion, or the like.

Attached to a "forward" side of the upper chamber 672 is a semi-cylindrical propulsive shroud 673. The radius of curvature of the semi-cylindrical propulsive shroud 673 is approximately equal to the radius of the upper chamber 672. Though, in other instances, a radius of curvature of the propulsive shroud 673 is different than the radius of the upper chamber 672.

The propulsive shroud 673 is attached to the upper chamber 672 at, and/or along, an upper seam oriented horizontally, and/or within a plane normal to a longitudinal axis 676 of the embodiment 670. The propulsive shroud 673 may be considered as being directly attached to the upper chamber 672. For example, the propulsive shroud 673 may directly contact the surfaces of the upper chamber 672. Directly attached may also refer to the propulsive shroud 673 being welded or otherwise adhered to the upper chamber 672. That is, the upper seam may comprise welded material, an adhesive layer, or the like. The propulsive shroud 673 may be in a spaced apart relationship with the tube 674. In other instances, supports, beams, struts, or the like may be provided between the interior surface of the propulsive shroud 673 and the outer surface of the tube 674.

The semi-cylindrical propulsive shroud 673 of embodiment 670 is approximately radially symmetrical about, and coaxial with, the embodiment's longitudinal axis 676. The angular extent of the semi-cylindrical propulsive shroud about the embodiment's longitudinal axis is approximately 180 degrees. Thus, the propulsive shroud 673 of embodiment 670 is substantially a "half-pipe." Though, the angular extent of the propulsive shroud 673 may be any angle up to just shy of a complete 360 degrees.

The embodiment 670 is propelled in a forward direction 678 through the use of the propulsive shroud 673. The forward direction 678 can generally be described as being upstream and/or against the current of the body of water in which the embodiment 670 floats. In some instances, the propulsion mechanism may be similar to any of the propulsive mechanisms described in greater detail herein. While not explicitly shown, it is to be appreciated that an opening may be formed through a portion of the propulsive shroud 673 similar to any of the propulsive shroud openings described in greater detail herein.

The embodiment 670 may include a chamber 680 on the upper chamber 672 to house one or more electronic components. The electronic components may include one or more computers, sensors, communication devices, antennas, receivers, positioning devices (e.g., GPS, etc.), energy storage devices (e.g., batteries), or the like. Power to operate any of the electronic components may be provided at least in part through operation of the embodiment 670 as a wave energy converter device. An electrical generator 697 may also be provided on the upper chamber 672. The electrical generator 697 may be coupled to a turbine or the like (not visible in FIG. 136) that is within outlet pipes 683. The outlet pipes 683 may be used to expel fluid from the interior of the upper chamber 672. The outward flowing fluid turns the turbine and results in the electrical generator 697 generating energy. The outlet pipes 683 may also be used to provide a propulsive force to the embodiment 670.

An embodiment similar to the one illustrated in FIG. 136 stores compressed hydrogen gas in its upper chamber 672. It stores compressed oxygen within a cylindrical tank positioned within its central cylindrical tube. And, it incorporates, includes, and/or stores, ballast (including, but not limited to, water) in its lower chamber. The embodiment further comprises a fuel cell that consumes a portion of the hydrogen and oxygen gases stored within the respective upper and cylindrical chambers in order to produce, and/or to provide, a supply of electrical power to the embodiment.

An embodiment similar to the one illustrated in FIG. 136 further comprises, includes, and/or incorporates, a pair of electrically-powered propellers positioned on opposite lateral sides of the embodiment that alter, adjust, correct, and/or control, the yaw of the embodiment, and steer the embodiment so as to enable the use of its propulsive shroud to cruise, travel, and/or navigate to specific geospatial locations at the surface of the body of water.

An embodiment similar to the one illustrated in FIG. 136 further comprises, includes, and/or incorporates, a one or more rudder assemblies 682 positioned along the tube 674, the propulsive shroud 672, or the upper chamber 672 that alters, adjusts, corrects, and/or controls, the yaw of the embodiment 670, and steers the embodiment 670 so as to enable the use of its propulsive shroud 673 to cruise, travel, and/or navigate to specific geospatial locations at the surface of the body of water.

FIG. 137 shows a side view of the same embodiment 670 of the current disclosure that is illustrated in FIG. 136.

FIG. 138 shows a side view of the same embodiment 670 of the current disclosure that is illustrated in FIGS. 136 and 137.

FIG. 139 shows a side view of the same embodiment 670 of the current disclosure that is illustrated in FIGS. 136-138.

FIG. 140 shows a side view of the same embodiment 670 of the current disclosure that is illustrated in FIGS. 136-139.

FIG. 141 shows a top-down view of the same embodiment 670 of the current disclosure that is illustrated in FIGS. 136-140.

FIG. 142 shows a bottom-up view of the same embodiment 670 of the current disclosure that is illustrated in FIGS. 136-141.

FIG. 143 shows a cross-sectional view of an embodiment 670. The embodiment 670 floats adjacent to an upper surface 671 of a body of water over which waves pass. The embodiment 670 may include an upper chamber 672. The upper chamber 672 may be a buoyant chamber with an interior volume 695. The interior volume 695 may be partially filled with water 691. Gasses (e.g., oxygen, hydrogen, air, or the like) may fill additional portions of the interior volume 695. Internal structures may also be provided within the chamber 672. For example, baffles, walls, sub-chambers, doors, or the like may be provided within the chamber 672. The internal structures may be used to control flow or movement of water 691 within the chamber 672, provide housing for different gas species, or the like.

The chamber 672 may be axially symmetric in some instances. For example, in FIG. 136, the chamber 672 is a spherical segment with substantially horizontal top and bottom surfaces. In other instances, the chamber 672 may be a spherical cap, or any other type of axially symmetric shape. Though, the chamber 672 may be non-axially symmetric in other instances. For example, the chamber 672 may have a keel or hull shape similar to that of a floating vessel (e.g., a boat or ship). Openings, ports, or the like may also be provided through the walls of the chamber 672 in order to access materials and/or substances within the chamber 672, to provide control of pressure within the chamber 672, and/or the like.

A tube 674 may be coupled to the chamber 672. The tube 674 may have an open bottom 677 that is in fluid communication with the water 671 surrounding the embodiment 670. The tube 674 may pass through a wall of the chamber 672 and pass into the interior volume 695. An opening at the top of the tube 674 is fluidically coupled to the interior of the chamber 672. The tube 674 may have a constant diameter through its length. In other instances, the tube 674 may have a constricted portion 679 where the diameter is reduced. The tube 674/679 may be cylindrical or have any other shaped cross-section.

As shown, water may reside in the tube 674 with a free surface 692. As indicated by the double arrow across the free surface 692, the level of the oscillates up and down in response to oscillation of the embodiment 670. Oscillation is driven by interaction with waves that pass along the surface 671 of the body of water. The confined water within the tube 674 may acquire momentum during oscillation of the embodiment 670. At some points in time, the free surface 692 rises above the top opening of the tube 674 and is expelled (as indicated by arrow 693) into the interior volume 695 of the chamber 672. The water from the tube 674 maintains a level of water 691 within the chamber 672.

In order to generate energy, water 691 from the interior of the chamber 672 is expelled out a pipe 683. As water 691 passes through the pipe 683, an energy generation device 698 is engaged. The energy generation device 698 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the energy generation device 698, and in other instances, multiple turbines arranged in series are used for the energy generation device 698. While a single energy generation device 698 is shown in embodiment 670, embodiments may include a plurality of energy generation devices 698.

The energy generation device 698 may be coupled to an electrical generator 697 by one or more rotatable shafts 699. The rotatable shafts 699 transfer rotational energy from the energy generation device 698 to the electrical generator 697, which in turn converts rotational energy into electrical energy. The electrical energy may be stored (e.g., in a battery) or consumed for one or more purposes, which will be described in greater detail herein. While an electrical generator 697 is shown in embodiment 670, other generator types may also be used. For example, generators described herein may include any generator, alternator, other mechanism, device, and/or component that converts energy from one form into another. In some instances, one or more of the energy generation device 698, shafts 699, or generator 697 may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

As noted above, embodiment 670 may generate significant amounts of energy that needs to be stored or used in a constructive manner. In some instances, energy generated from embodiment 670 may be stored in a battery. The battery may provide an accessible energy source in order to run one or more electrical components integrated into the embodiment 670. Alternatively, embodiment 670 may provide a material conversion process in order to "store" energy in a more transportable form. For example, energy generated by embodiment 670 can be stored in the form of hydrogen or any other energy dense gas form (e.g., methanol, ammonia, etc.).

In the case of hydrogen, an electrolyzer 695 may be provided on the embodiment 670. The electrolyzer 695 may be fluidly coupled to a water source, such as water 691 within the chamber 672. Alternatively, a separate source of clean water (e.g., filtered or otherwise clean fresh water, etc.) may be provided on the embodiment 670 in order to implement electrolysis more effectively. Energy from the generator 697 (or otherwise stored on the embodiment 670) may be consumed by the electrolyzer 695 to convert water into oxygen and hydrogen. The hydrogen and oxygen gas may be stored in the internal volume 695 of the chamber 672, in a separate chamber (not shown) external to the chamber 672, or any other confined space associated with the embodiment 670. After hydrogen gas is produced, the gas may be collected (i.e., removed or offloaded from embodiment 670) periodically be an external vessel, ship, air-ship, submersible, drone, or any other vehicle.

Embodiment 670 may be an autonomous device with the ability to move and/or navigate in a controlled manner about the body of water. Propulsion of the embodiment 670 may be driven through one or more different mechanisms. In one instance, the expelled water 694 out of the pipe 683 provides a propulsive force that can move the embodiment 670. The embodiment 670 can be steered through control of the force of the expelled water 694 and/or the direction of the expelled water 694. In some instances, one or more rudders 682 can be coupled to the embodiment 670 in order to provide directional control, rotational control, and/or the like.

In other instances, passive propulsion mechanisms may be used. For example, a shroud 673 (e.g., a semi-cylindrical shroud) may partially confine a region of water surrounding the tube 674. Through, oscillation of the embodiment 670, the partially confined region of water develops momentum. When the momentum of the partially confined region of water oppose the displacement direction of the chamber 672, water is forced out the back of the embodiment 670 away from the shroud. This jetting of water provides a positive momentum flux for the embodiment 670 that drives the embodiment 670 in a forward direction (i.e., the direction the shroud faces). This process has even been shown to provide forward propulsion in an upstream direction (i.e., against the current of the body of water).

In yet another instance, propulsion of the embodiment 670 may be provided through one or more active propulsion devices. For example, propellers or the like may be used in some instances. Energy to drive the active propulsion devices may be obtained through the wave-energy generation of the embodiment 670, or from batteries that were charged through the wave-energy generation of the embodiment 670. In other instances, hydrogen or other gasses generated on the embodiment 670 can be consumed (e.g., through the use of a fuel cell) in order to power active propulsion devices.

The embodiment 670 may include an enclosure 680 that is provided on the chamber 672. The enclosure 680 may be a water proof chamber for securing one or more electrical components. For example, a computing system 684, a positioning system 685, and a communications system 686 may be provided in the enclosure 680. The computing system 684 may provide one or more processors and associated hardware and/or software that enables control of the embodiment 670. For example, the computing system 684 may control power generation, such as by controlling flow rates of water to the energy generation device 698. The positioning system 685 may include a GPS, a compass, an accelerometer, a gyroscope, or any other suitable navigational system. The positioning system 685 may control propulsion and steering systems in order to navigate the embodiment 670. The communications system 686 may include an antenna, a receiver, and associated circuitry, hardware, and/or software. The communications system 685 may provide a communication link to external systems, other waver-energy generation systems, or the like. The systems shown in the enclosure 680 in embodiment 670 are exemplary in nature, and it is to be appreciated that many different systems, control apparatuses, and/or the like may be provided in the enclosure 680.

FIG. 144 shows a perspective view of an embodiment 700 that may be integrated into a wave-energy generation device, such as those described in greater detail herein. The embodiment 700 may comprise an array of electronics, hardware, and/or software that are configured to control one or more aspects of the wave-energy generation device. While the components illustrated in FIG. 137 are shown on a single board, it is to be appreciated that components may be on separate boards, structures, or the like. The embodiment 700 may be housed within a water tight chamber or enclosure provided on the wave-energy generation device.

Embodiment 700 may comprise a computing device 710. The computing device 710 houses a board. The board may include a number of components, including but not limited to a processor 701. The processor 701 may include, but is not limited to, a central processing unit (CPU), a graphics processing unit (GPU), an application-specific integrated circuit (ASIC), a field programmable gate array (FPGA), and/or the like. The processor 701 is physically and electrically coupled to the board. Other components of computing device 710 include, but are not limited to, memory 703, such as volatile memory (e.g., DRAM), non-volatile memory (e.g., ROM), flash memory, a mass storage device (such as hard disk drive, compact disk (CD), digital versatile disk (DVD), and so forth). The computing device may comprise a communications chipset 704, a digital signal processor 705, a chipset 706, an antenna 707, and/or an input/out device 708.

Embodiment 700 may comprise a communications device 720. The communications device 720 enables wireless communications for the transfer of data to and from the embodiment 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 720 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The embodiment 700 may include a plurality of communications devices 720. For instance, a first communications device 720 may be dedicated to shorter range wireless communications such as Wi-Fi and Bluetooth and a second communications device 720 may be dedicated to longer range wireless communications such as GPS, EDGE, GPRS, CDMA, WiMAX, LTE, Ev-DO, and others. The communications device 720 may be communicatively coupled to one or more antennas, satellite dishes, or other device to broadcast and/or receive wireless communications. The antennas or the like may be external to the enclosure, or the antennas may be within the enclosure.

Embodiment 700 may also comprise a server rack 730. The server rack 730 may comprise a plurality of processors with associated hardware and software. The server rack 730 may execute computational work in order to provide a revenue generating service. The server rack 730 may be powered through energy generated by the wave-energy generation device, such as those described in greater detail herein. While a constant power supply may be desired, embodiment 700 may still function with an intermittent or non-constant power supply provided by wave-energy generation. To deal with the variable power supply, server rack 730 may include controllers that adjust clock speed for the processors. This allows for power consumption to be directly controlled to coincide with available power. In some instances, the server rack 730 may perform data center operations or tasks. The server rack 730 may host and deliver content, or otherwise provide a link between consumers and centralized data storage. In some instances, the server rack 730 may perform services in conjunction with block-chain technologies, such as cryptocurrency mining.

Embodiment 700 may include a positioning system 740. The positioning system 740 may include one or more modules, components, and/or apparatuses for determining a geolocation of the wave-energy generation device. In some instances, the positioning system 740 may comprise a GPS, a compass, an accelerometer, a gyroscope, and/or the like. The positioning system 740 may include a processor and/or controller to enable navigation for the wave-energy generation device. For example, actuators may be controlled in order to steer or direct the wave-energy generation device in a particular direction. Propulsion devices (e.g., propellers, water get flows, etc.) may also be powered and/or directed by components of the positioning system 740.

Embodiment 700 may include a sensor module 750. The sensor module 750 may include processors, memory, and associated hardware and software to control and/or record data from one or more sensors that monitor various aspects of the wave-energy generation device. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the wave-energy generation device, and the controlling circuitry/software may be provided in the sensor module 750 within the embodiment 700.

Embodiment 700 may include an interface module 750. The interface module 750 may comprise one or more components used to interface with the wave-energy generation device. The interface module 750 may include one or more input devices. For example, a keyboard, a mouse, a touchscreen display, or the like may be provided in the interface module 750. Output devices, such as a display screen, a speaker, or the like may also be provided in the interface module 750. The interface module 750 may further comprise a camera, a video camera, a biometric screening device, or the like.

Embodiment 700 may include a battery module 770. The battery module 770 may include any type of battery. The battery may include a rechargeable battery, such as a lithium based battery (e.g., a lithium-ion battery). The battery of the battery module 770 may be charged by electricity generated by the wave-energy generation device. The battery module 770 may be used as a store of power in order to power one or more electrical components of the embodiment 700, or any other powered device of the wave-energy generation device. The battery module 770 may be used in order to normalize power delivery to electrical components. For example, the battery module may supply power in order to equalize total power delivery when the wave-energy generation device provides variable power over time.

FIG. 145 shows a perspective view of a server rack 730 that may be integrated into a wave-energy generation device, such as those described in greater detail herein. As shown, the server rack 730 may include a plurality of server blades 735 that are provided on a rack 732. The server blades 735 may be communicatively coupled to each other through the rack 732 and/or associated cabling, in order to provide enhanced processing power. The server blades 735 may include processors, such as, but not limited to, central processing units (CPUs), graphics processing units (GPUs), application-specific integrated circuits (ASICs), field programmable gate arrays (FPGAs), and/or the like.

In some instances the server rack 730 is communicatively coupled to an antenna 737 to enable wireless communication. The antenna 737 may include a parabolic dish antenna or any other antenna configuration. The ability to wirelessly transmit data from the server rack 730 allows for data to be processed remotely at the source of power generation (e.g., in the ocean) while still being useful to the end consumer. The data delivery, hosting, computation, and the like can be executed at lower energy costs using such wave-energy generation devices. Further, the server rack 730 can be passively cooled by the body of water surrounding the wave-energy generation device (e.g., the server rack 730 can be in a water tight enclosure that is submersed in water). In some instances, the server rack 730 functions as a cryptocurrency mining rig that is powered through the energy produced by the wave-energy generation device.

Embodiments disclosed herein include any angular extent of the frustoconical propulsive shroud about the embodiment's longitudinal axis, such as approximately 180 degrees, approximately 90 degrees, approximately 270 degrees, less than approximately 180 degrees, less than approximately 90 degrees, greater than approximately 180 degrees, or greater than approximately 270 degrees.

Embodiments disclosed herein may include any upper chamber radius, and any radius for the lower chamber (if any). The radius of the upper and lower chambers may be the same or different. Embodiments, include any central tube diameter or dimension, including cylindrical or non-cylindrical tubes.

Embodiments include any mode of steering, tangential thrust, rotational control, yaw control, and the like. For example, thrusters, rudders, and the like may be used. Embodiments may also include any type, variety, and/or assortment of supplemental and/or backup forward propulsion mechanisms in addition to the use of propulsive shroud implementations.

Embodiments include any type of power take off (PTO) or energy source of energy generation. For example, wave energy conversion, wind energy conversion, and/or the like may be used in accordance with various implementations.

Embodiments disclosed herein may include the generation, storage, onloading, and/or offloading of any type or assortment of gasses and liquids through the use of various valves, systems, and/or the like.

Embodiments may include components (e.g., chambers, tubes, shrouds, and/or the like) with any size, width, height, and/or length to enable suitable functionality such as those described herein. Embodiments may be implemented through the use of various materials, material compositions, hybrid materials, composites, and/or the like.

What is claimed is:

1. A buoyant apparatus, comprising:

a wave energy converter comprising an upper bulbous portion fluidly coupled to a lower tubular portion along a longitudinal axis; and a shroud attached directly to the upper bulbous portion of the wave energy converter, wherein the shroud only partially laterally surrounds the wave energy converter around the longitudinal axis.

2. The buoyant apparatus of claim 1, wherein the shroud has a height along the longitudinal axis less than a height of the wave energy converter along the longitudinal axis.

3. The buoyant apparatus of claim 1, wherein the shroud partially laterally surrounds less than an entirety of the upper bulbous portion of the wave energy converter along the longitudinal axis.

4. The buoyant apparatus of claim 1, wherein the shroud partially laterally surrounds at least a portion of the lower tubular portion of the wave energy converter along the longitudinal axis.

5. The buoyant apparatus of claim 1, wherein the shroud has a non-fully cylindrical shape around the longitudinal axis.

6. The buoyant apparatus of claim 1, wherein the upper bulbous portion of the wave energy converter is a buoyant pressurized component, and wherein the lower tubular portion is a hollow submergible component.

7. The buoyant apparatus of claim 1, wherein the upper bulbous portion of the wave energy converter comprises a reservoir.

8. A buoyant apparatus, comprising:

a first chamber;

a tube with a first end and a second end, wherein the first end is fluidly coupled to the first chamber;

a second chamber coupled to the second end of the tube; and a shroud coupled to at least one of the first chamber or the second chamber, wherein the shroud wraps partially around a longitudinal axis of the buoyant apparatus.

9. The buoyant apparatus of claim 8, wherein the shroud is coupled to the first chamber.

10. The buoyant apparatus of claim 8, wherein the shroud is coupled to the second chamber.

11. The buoyant apparatus of claim 8, wherein the shroud is coupled to both the first chamber and the second chamber.

12. The buoyant apparatus of claim 8, wherein the shroud is attached directly to the first chamber.

13. The buoyant apparatus of claim 8, wherein the shroud is attached directly to the second chamber.

14. The buoyant apparatus of claim 8, wherein the shroud is attached directly to both the first chamber and the second chamber.

15. The buoyant apparatus of claim 8, wherein the shroud has a height along the longitudinal axis less than a combined height of the first chamber, the tube and the second chamber along the longitudinal axis.

16. The buoyant apparatus of claim 8, wherein the shroud partially laterally surrounds less than an entirety of at least one of the first chamber or the second chamber along the longitudinal axis.

17. The buoyant apparatus of claim 8, wherein the shroud partially laterally surrounds at least a portion of the tube along the longitudinal axis.

18. The buoyant apparatus of claim 8, wherein the shroud has a non-fully cylindrical shape around the longitudinal axis.

19. The buoyant apparatus of claim 8, wherein at least one of the first chamber or the second chamber comprises a reservoir.

* * * * *